US012497439B2

United States Patent
Tykocinski et al.

(10) Patent No.: US 12,497,439 B2
(45) Date of Patent: Dec. 16, 2025

(54) MULTI-FUNCTIONAL FUSION PROTEINS AND USES THEREOF

(71) Applicant: Thomas Jefferson University, Philadelphia, PA (US)

(72) Inventors: Mark L. Tykocinski, Merion Station, PA (US); Matthew C. Weber, Philadelphia, PA (US); Carmella Romeo Smith, Philadelphia, PA (US)

(73) Assignee: Thomas Jefferson University, Philadelphia, PA (US)

( * ) Notice: Subject to any disclaimer, the term of this patent is extended or adjusted under 35 U.S.C. 154(b) by 782 days.

(21) Appl. No.: 17/421,053

(22) PCT Filed: Jan. 7, 2020

(86) PCT No.: PCT/US2020/012624
§ 371 (c)(1),
(2) Date: Jul. 7, 2021

(87) PCT Pub. No.: WO2020/146423
PCT Pub. Date: Jul. 16, 2020

(65) Prior Publication Data
US 2022/0056102 A1    Feb. 24, 2022

Related U.S. Application Data

(60) Provisional application No. 62/789,212, filed on Jan. 7, 2019.

(51) Int. Cl.
| | |
|---|---|
| *C07K 14/705* | (2006.01) |
| *A61P 35/02* | (2006.01) |
| *C07K 14/52* | (2006.01) |
| *C07K 14/735* | (2006.01) |
| *C07K 19/00* | (2006.01) |
| *A61K 38/00* | (2006.01) |

(52) U.S. Cl.
CPC ........ *C07K 14/70521* (2013.01); *A61P 35/02* (2018.01); *C07K 14/522* (2013.01); *C07K 14/70535* (2013.01); *A61K 38/00* (2013.01); *C07K 2317/52* (2013.01); *C07K 2317/622* (2013.01); *C07K 2319/30* (2013.01)

(58) Field of Classification Search
CPC ............ C07K 2317/52; C07K 2319/30; C07K 2319/00; C07K 16/28
See application file for complete search history.

(56) References Cited

U.S. PATENT DOCUMENTS

| | | |
|---|---|---|
| 2004/0110165 A1 | 6/2004 | Kwak et al. |
| 2012/0276099 A1 | 11/2012 | Poppe |
| 2013/0224199 A1 | 8/2013 | KWalk et al. |
| 2015/0361155 A1 | 12/2015 | Tykocinski |
| 2018/0057561 A1 | 3/2018 | Tykocinski |
| 2018/0334504 A1 | 11/2018 | Qu et al. |
| 2018/0371086 A1 | 12/2018 | Cihlar et al. |

FOREIGN PATENT DOCUMENTS

| | | |
|---|---|---|
| CN | 1511040 | 7/2004 |
| CN | 109311967 | 2/2019 |
| JP | 2003-521521 | 7/2003 |
| JP | 2013-511966 | 4/2013 |
| JP | 2016-527303 | 9/2016 |
| JP | 2018-516969 | 6/2018 |
| RU | 2487888 | 7/2013 |
| RU | 2665790 | 9/2018 |
| WO | WO 01/56591 | 8/2001 |
| WO | WO2007/146968 | 12/2007 |
| WO | WO 2014/121085 | 8/2014 |
| WO | WO 2016/201425 | 12/2016 |
| WO | WO 2017/093408 | 6/2017 |
| WO | WO 2017/106346 | 6/2017 |
| WO | WO 2017/162797 | 9/2017 |
| WO | WO-2017162797 A1 * | 9/2017 ............. A61P 31/12 |
| WO | WO 2018/083204 | 5/2018 |
| WO | WO 2018/209017 | 11/2018 |
| WO | WO 2018/210230 | 11/2018 |
| WO | WO-2018218215 A1 * | 11/2018 ......... A61K 39/3955 |
| WO | WO 2018/234793 | 12/2018 |
| WO | WO 2020146423 | 7/2020 |

OTHER PUBLICATIONS

Huang, Current Opinion in Biotechnology, 2009, 20:692-699.*
Leninger, Inducing conformational preference of the membrane protein transporter EmrE through conservative mutations. Elife. Oct. 22, 2019;8:e48909, pp. 1-16.*
Burgess et al., J of Cell Bio. 111:2129-2138, 1990.*
Lazar et al. Molecular and Cellular Biology 8:1247-1252, 1988.*
Supplementary Partial European Search Report and the European Provisional Opinion Dated Sep. 26, 2022 From the European Patent Office Re. Application No. 20738361.3. (10 Pages).
Notification of Office Action and Search Report Dated Jan. 10, 2024 From the State Intellectual Property Office of the People's Republic of China Re. Application No. 202080016520.5 and Its Machine Translation. (25 Pages).
Notice of Reason(s) for Rejection Dated Dec. 12, 2023 From the Japan Patent Office Re. Application No. 2021-539880. (5 pages).
English Translation Dated Jan. 23, 2024 of Notice of Reason(s) for Rejection Dated Dec. 12, 2023 From the Japan Patent Office Re. Application No. 2021-539880. (7 Pages).
Machine Translation Dated Sep. 23, 2023 of Request for Examination and Search Report Dated Sep. 1, 2023 From the Federal Government Institution, Federal Institute of Industrial Property of the Federal Service of Intellectual Property, Patents and Trademarks of the Russian Federation, FIPS Re. Application No. 2021121848. (9 Pages).

(Continued)

*Primary Examiner* — Hong Sang
(74) *Attorney, Agent, or Firm* — Saul Ewing LLP; Kathryn Doyle; Justin Crotty

(57) ABSTRACT

The present invention relates to a fusion protein and to methods of treatment comprising administering a therapeutically effective amount of the fusion protein to a patient in need thereof.

1 Claim, 29 Drawing Sheets

Specification includes a Sequence Listing.

(56) References Cited

OTHER PUBLICATIONS

International Search Report and the Written Opinion Dated May 20, 2020 From the International Searching Authority Re. Application No. PCT/US2020/012624. (14 Pages).
Translation Dated May 17, 2023 of Request for Examination and Search Report Dated Apr. 6, 2023 Federal Government Institution, Federal Institute of Industrial Property of the Federal Service of Intellectual Property, Patents and Trademarks of the Russian Federation, FIPS Re. Application No. 2021121848. (5 Pages).
Notice of Eligibility for Grant and Examination Report Dated Jul. 17, 2024 From the Intellectual Property Office of Singapore, IPOS Re. Application No. 11202107454U. (4 Pages).
Requisition by the Examiner Dated Jun. 22, 2023 From the Innovation, Science and Economic Development Canada, Canadian Intellectual Property Office Re. Application No. 3,125,748. (3 Pages).
Translation Dated May 27, 2024 of Notice of Reason(s) for Rejection Dated May 7, 2024 From the Japan Patent Office Re. Application No. 2021-539880. (2 pages).
English Summary Dated Jan. 26, 2024 of Notification of Office Action Dated Jan. 10, 2024 From the State Intellectual Property Office of the People's Republic of China Re. Application No. 202080016520.5 (4 Pages).
Search Report and Written Opinion Dated Sep. 13, 2022 From the Intellectual Property Office of Singapore, IPOS Re. Application No. 11202107454U. (12 Pages).
Yamin et al. "The Viral KSHV Chemokine vMIP-II Inhibits the Migration of Naive and Activated Human NK Cells by Antagonizing Two Distinct Chemokine Receptors", PLoS Pathognes, 9(8): e1003568-1-e1003568-13, Published Online Aug. 15, 2013.
Request for Examination and Search Report Dated Sep. 1, 2023 From the Federal Government Institution, Federal Institute of Industrial Property of the Federal Service of Intellectual Property, Patents and Trademarks of the Russian Federation, FIPS Re. Application No. 2021121848. (15 Pages).
Berry et al. "Substitution of Cysteine For Selenocysteine in Type I Iodothyronine Dciodinasc Reduces The Catalytic Efficiency of the Protein But Enhances Its Translation", Endocrinology, 131(4): 1848-1852, Oct. 1, 1992. Abstract.
Chen et al. "Fusion Protein Linkers: Property, Design and Functionality", Advanced Drug Delivery Reviews, 65(10): 1357-1369, Oct. 15, 2013. Abstract.
Frankel et al. "Characterization of Diphtheria Fusion Proteins Targeted to The Human Interleukin-3 Receptor", Protein Engineering, Design and Selection, 13(8): 575-581, Aug. 1, 2000.
Gasser et al. "Antibody Production With Yeasts and Filamentous Fungi: On The Road to Large Scale?", Biotechnology Letters, 29: 201-212, Nov. 22, 2006. Abstract.
Halin et al. "Synergistic Therapeutic Effects of a Tumor Targeting Antibody Fragment, Fused to Interleukin 12 and to Tumor Necrosis Factor $\alpha$", Cancer Research, 63(12): 3202-3210, Jun. 15, 2003.
Kontermann et al. "Bispecific Antibodies", Drug Discovery Today, 20(7): 838-847, Jul. 2015.
Maeda et al. "Engineering of Functional Chimeric Protein G-VargulaLuciferase", Analytical Biochemistry, 249(2): 147-152, Jul. 1, 1997. Abstract.
Muller et al. "Spliceosomal Peptide P140 for Immunotherapy of Systemic Lupus Erythematosus: Results of an Early Phase II Clinical Trial", Arthritis & Rheumatism, 58(12): 3873-3883, Nov. 26, 2008. Abstract.

Nelson et al. "The "Trojan Horse" Approach to Tumor Immunotherapy: Targeting the Tumor Microenvironment", Journal of Immunology Rescarch, 2014, p. 1-14, May 18, 2014.
Yang et al. "High-Level Expression and Deletion Mutagenesis of Human Tryptophan Hydroxylase", PNAS, 91(14): 6659-6663, Jul. 5, 1994.
Request for Examination and Search Report Dated Apr. 6, 2023 From the Federal Government Institution, Federal Institute of Industrial Property of the Federal Service of Intellectual Property, Patents and Trademarks of the Russian Federation, FIPS Re. Application No. 2021121848. (11 Pages).
Kayman et al. "Presentation of Native Epitopes in the V1/V2 and V3 Regions of Human Immunodeficiency Virus Type 1 gp120 by Fusion Glycoproteins Containing Isolated gp120 Domains", Journal of Virology, 68(1): 400-410, Jan. 1, 1994.
Luker et al. "Bioluminescent CXCL12 Fusion Protein for Cellular Studies of CXCR4 and CXCR7", BioTecniques, 47(1): 625-632, Jul. 2009.
Wang et al. "A Biologically Active vMIP-II-IgG3-TfN Fusion Protein, Secreted From Methylotrophic Yeast Pichia Pastoris", Protein Expression and Purification, 87(1): 47-54, Jan. 2013, Abstract.
Request for Examination and Search Report Dated Aug. 28, 2024 From the (ROSPATENT), The Federal Service for Intellectual Property, Patents and Trademarks of the Russian Federation Re. Application No. 2024106039 and Its Summary in English. (7 Pages).
Supplementary European Search Report and the European Search Opinion Dated Dec. 22, 2022 From the European Patent Office Re. Application No. 20738361.3. (9 Pages).
Boado et al. "IgG-Single Chain Fv Fusion Protein Therapeutic for Alzheimer's Disease: Expression in CHO Cells and Pharmacokinetics and Brain Delivery in the Rhesus Monkey", Biotechnology and Bioengineering, 105(3): 627-635, Published Online Oct. 8, 2009.
Fromm et al. "Agonist Redirected Checkpoint, PD1-Fc-OX40L, for Cancer Immunotherapy", Journal for Immuno Therapy of Cancer, 6(149): 1-16, Dec. 18, 2018.
Transaltion Dated Sep. 6, 2024 of Request for Examination and Search Report Dated Aug. 28, 2024 From the (ROSPATENT), The Federal Service for Intellectual Property, Patents and Trademarks of the Russian Federation Re. Application No. 2024106039. (3 Pages).
Notification of Office Action and Search Report Dated Dec. 8, 2024 From the State Intellectual Property Office of the People's Republic of China Re. Application No. 202080016520.5 and a machine translation of the Office Action into English. (18 Pages).
Communication Pursuant to Article 94(3) EPC Dated Feb. 13, 2025 From the European Patent Office Re. Application No. 20738361.3 (4 Pages).
Examination Report Dated Mar. 19, 2025 From the Australian Government, IP Australia Re. Application No. 2020207265. (4 Pages).
Request for Examination and Search Report Dated Jan. 10, 2025 From the (ROSPATENT), Federal Government Institution of Industrial Property of the Federal Service of Intellectual Property, Patents and Trademark of the Russian Federation Re. Application No. 2024106039 and Its Translation Into English. (25 Pages).
Requisition by the Examiner Dated Jan. 10, 2025 From the Innovation, Science and Economic Development Canada, Canadian Intellectual Property Office Re. Application No. 3,125,748. (5 Pages).
Singer et al. "Genes and Genomes in Two Volumes", 1: 373 pages, See p. 63, Molecules of The Genetic Apparatus, English-Russian Translation, 1998.

\* cited by examiner

Figure 7

TriTouch Δ106-109

Activating NK Cells via FcγRIIIa and Dual Mode Inhibitory Pathway Blockade

One configuration is to incorporate a peptide antagonist of one of the NK inhibitory receptors, as well as a counter-receptor for one of the inhibitory receptors, in which case all three touch points contribute to net NK cell activation hMICA-FcA/hFcB

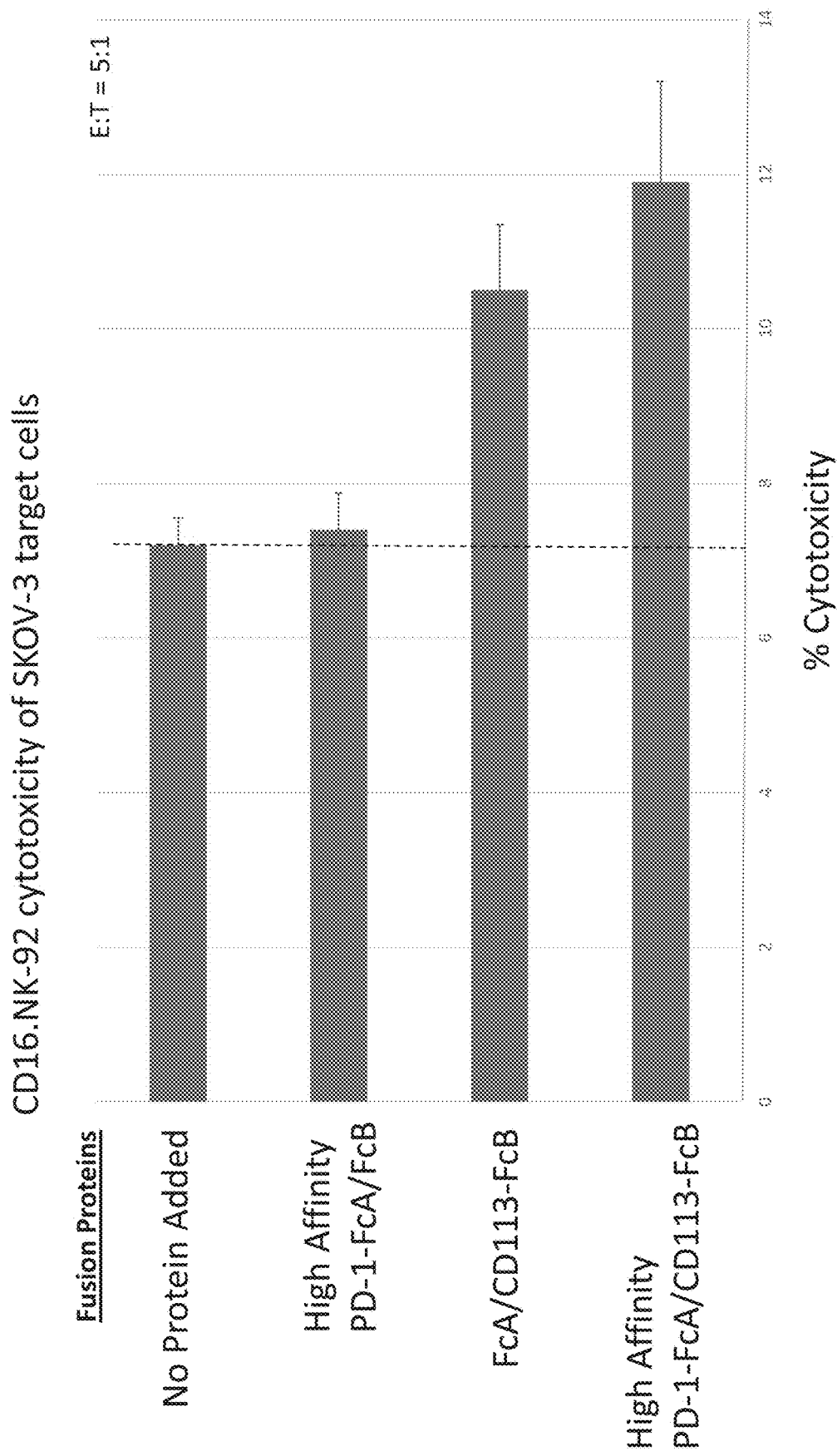

MULTI-FUNCTIONAL FUSION PROTEINS AND USES THEREOF

RELATED APPLICATIONS

This application is a National Phase of PCT Patent Application No. PCT/US2020/012624 having International filing date of Jan. 7, 2020, which claims the benefit of priority under 35 U.S.C. § 119(e) of U.S. Provisional Patent Application No. 62/789,212 filed on Jan. 7, 2019. The contents of the above applications are all incorporated by reference as if fully set forth herein in their entirety.

SEQUENCE LISTING STATEMENT

The ASCII file, entitled 88696SequenceListing.txt, created on Jul. 7, 2021, comprising 146,297 bytes, submitted concurrently with the filing of this application is incorporated herein by reference. The sequence listing submitted herewith is identical to the sequence listing forming part of the international application.

FIELD AND BACKGROUND OF THE INVENTION

Multiple pathways regulate the survival of infected cells and of cancer cells, as well as the activation or suppression of cells of the immune system such as T cells and Natural Killer (NK) cells. One pathway that provides costimulatory and inhibitory second signals to T cells is represented by the programmed death 1 (PD-1; also known as CD279) receptor and its ligands, PD-L1 (B7-H1; CD274) and PD-L2 (B7-DC; CD273). PD-1 is a member of the CD28/CTL4 family that is expressed on activated, but not resting T cells (Nishimura et al. (1996) Int. Immunol. 8:773). Binding of PD-1 by its ligands mediates an inhibitory signal that results in reduced cytokine production, and reduced T cell survival (Nishimura et al. (1999) Immunity 11:141; Nishimura et al. (2001) Science 291:319; Chemitz et al. (2004) J. Immunol. 173:945).

The viral Macrophage Inflammatory Protein-II (vMIP-II) is a chemokine encoded by human herpesvirus 8 (HHV-8) that interacts with the CC and CXC chemokine receptors, including CCR5 and CXCR4 chemokine receptors. vMIP-II inhibition of HIV-1 entry is mediated through CCR3, CCR5 and CXCR4, which are HIV-1 receptors for the entry of HIV-1 into a target cell.

A complex interplay of positive and negative signals regulates T cell activation and maintenance of T cell effector function. Members of the TNF ligand/TNF receptor superfamily figure prominently in this matrix of signals, bridging cells of the immune system, as well as with cells of other organ systems. In doing so, TNF superfamily members contribute to both homeostasis and pathogenesis, via effects on cell survival and death, cellular differentiation, and inflammation.

There remains a need for improved therapeutics for treating diseases such as cancer. The present invention addresses this need.

SUMMARY OF THE INVENTION

As described herein, the present invention relates to a fusion protein with multipoint molecular attachment capability and methods of use thereof.

One aspect of the invention includes a fusion protein comprising Component A and/or Component B. Component A comprises Component Y, Component $Z_2$ and Component $Z_3$. Component B comprises Component X', Component $Z_2$' and Component $Z_3$'.

Another aspect of the invention includes a fusion protein comprising Component A, Component B, and Component C. Component A comprises Component Y, Component Z2 and Component Z3. Component B comprises Component X', Component Z2' and Component Z3'. Component C comprises Component X, and Component C'L. Component Y comprises at least a portion of PD-1, Component Z2 and Component Z2' comprise CH2 domains of human Fc, and Component Z3 and Component Z3' comprise CH3 domains of human Fc. Component X' and Component X comprise at least a portion of vMIP-II, and Component CL' comprises at least one CH1 domain of human IgG1 kappa.

Yet another aspect of the invention includes a method of generating a fusion protein. The method comprises administering to the cell a first nucleic acid encoding human PD-1-hFcA, a second nucleic acid encoding vMIPII-CH'-hFcB, and a third nucleic acid encoding vMIPII-CL'.

Still another aspect of the invention includes a fusion protein comprising the amino acid sequences of SEQ ID NO: 14, SEQ ID NO: 49, and SEQ ID NO: 57.

In another aspect, the invention includes a pharmaceutical composition comprising a pharmaceutically acceptable carrier and any of the fusion proteins disclosed herein.

In another aspect, the invention includes a method of treating a proliferative disorder in a patient. The method comprises administering a therapeutically effective amount of any of the fusion proteins disclosed herein to a patient in need of such treatment.

In various embodiments of the above aspects or any other aspect of the invention delineated herein, Component B further comprises Component $Z_1$'. In certain embodiments, Component A further comprises Component $Z_1$.

In certain embodiments, the fusion protein of further comprises Component C, wherein Component C comprises Component X and Component $C_L$'.

In certain embodiments, the fusion protein further comprises component D, wherein Component D comprises Component Q and Component $C_L$.

In certain embodiments, Component Y comprises a ligand domain, a receptor domain, an scFv domain or a lipocalin domain. In certain embodiments, Component Y comprises at least a portion of PD-1, CD112R, CD113 or MHC-I polypeptide-related sequence A (MICA).

In certain embodiments, the fusion protein binds PD-L1 or PD-L2.

In certain embodiments, Component X' comprises a virus-derived peptide, a ligand-derived, a receptor-derived peptide, or an HTS-selected peptide.

In certain embodiments, Component X' comprises at least a portion of vMIP-II. In certain embodiments, Component X' comprises V1 or V1delta.

In certain embodiments, Component X comprises a virus-derived peptide, a ligand-derived, a receptor-derived peptide, or an HTS-selected peptide. In certain embodiments, Component X comprises V1 or V1delta.

In certain embodiments, the fusion protein binds CXCR4.

In certain embodiments, Component Y and Component $Z_2$ are connected via a hinge. In certain embodiments, Component $Z_1$' and Component $Z_2$' are connected via a hinge.

In certain embodiments, Component X' and Component $Z_1$' are connected via a linker. In certain embodiments, Component X and Component $C_L$ are connected via a linker. In certain embodiments, Component Q and Component $C_L$ are connected via a linker.

In certain embodiments, the fusion protein binds a receptor or ligand on an immune cell. In certain embodiments, the receptor is an Fc receptor.

In certain embodiments, Component X' comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

In certain embodiments, Component Y comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

In certain embodiments, Component X comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

In certain embodiments, Component Q comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

In certain embodiments, Component A comprises the amino acid sequence of any one of SEQ ID NOs: 14-22.

In certain embodiments, Component B comprises the amino acid sequence of any one of SEQ ID NOs: 32-35. In certain embodiments, Component B comprises the amino acid sequence of any one of SEQ ID NOs: 49-55.

In certain embodiments, Component A comprises the amino acid sequence of any one of SEQ ID NOs: 14-22 and Component B comprises the amino acid sequence of any one of SEQ ID NOs: 32-35.

In certain embodiments, Component C comprises the amino acid sequence of any one of SEQ ID NOs: 57-63.

In certain embodiments, Component B comprises the amino acid sequence of any one of SEQ ID NOs: 49-55 and Component C comprises the amino acid sequence of any one of SEQ ID NOs: 57-63.

In certain embodiments, the fusion protein is capable of binding i) PD-L1 or PD-L2, ii) CXCR4, and iii) an Fc receptor or ligand on an immune cell.

In certain embodiments, Component A comprises the amino acid sequence of SEQ ID NO: 29 and Component B comprises the amino acid sequence of SEQ ID NO: 30.

In certain embodiments, Component Y comprises the amino acid sequence of SEQ ID NO: 1 or SEQ ID NO: 2.

In certain embodiments, Component $Z_2$ comprises the amino acid sequence of SEQ ID NO: 12 and/or Component $Z_3$ comprises the amino acid sequence of SEQ ID NO: 13.

In certain embodiments, Component A comprises the amino acid sequence of SEQ ID NO: 14 or SEQ ID NO: 15.

In certain embodiments, Component B comprises the amino acid sequence of SEQ ID NO: 49.

In certain embodiments, Component X' comprises the amino acid sequence of SEQ ID NO: 37. In certain embodiments, Component X comprises the amino acid sequence of SEQ ID NO: 37.

In certain embodiments, Component $Z_2$' comprises SEQ ID NO: 12 and/or Component $Z_3$' comprises SEQ ID NO: 48.

In certain embodiments, Component $C_L$' comprises the amino acid sequence of SEQ ID NO: 64.

In certain embodiments, Component B comprises the amino acid sequence of SEQ ID NO: 53.

In certain embodiments, Component C comprises the amino acid sequence of SEQ ID NO: 61.

In certain embodiments, Component A comprises the amino acid sequence of SEQ ID NO: 14, Component B comprises the amino acid sequence of SEQ ID NO: 53, and Component C comprises the amino acid sequence of SEQ ID NO: 61.

In certain embodiments, the method comprises wherein the first nucleic acid encodes the amino acid sequence of SEQ ID NO: 14, and/or the second nucleic acid encodes the amino acid sequence of SEQ ID NO: 49, and/or the third nucleic acid encodes the amino acid sequence of SEQ ID NO: 57.

In certain embodiments, the proliferative disorder is cancer. In certain embodiments, the cancer is a solid tumor. In certain embodiments, the cancer is pancreatic cancer, breast cancer, ovarian cancer, bladder cancer, melanoma, glioblastoma, acute lymphoblastic leukemia (ALL), acute myelogenous leukemia (AML), multiple myeloma or colon cancer.

BRIEF DESCRIPTION OF THE SEVERAL VIEWS OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 7 is a schematic representation of the possible interaction(s) with various types of cells of various fusion proteins.

FIG. 26B shows representative images of one mouse from the PBS only treatment group (top) and PD1-hFcA/v1Δ-CH'-hFcB/v1Δ-CL' (FP) treatment group (bottom).

FIG. 27 shows that NK cell-mediated ADCC is augmented by addition of multi-functional fusion proteins. The SKOV-3 ovarian cell line [target cell (T)]was plated in a 96-well plate at 3000 cells/well, allowed to adhere and labeled with CellTracker Red CMTPX reagent. The SKOV-3 cells were then labeled with a green fluorescence Caspase-3 reagent. The CD16.NK-92 cell line [V158 variant, i.e., effector cell (E)]was added to the wells at a E:T 5:1 with the various fusion proteins at 25 mg/ml or no protein and analyzed using the Incucyte live-cell analysis system, measuring the number of fluorescent double positive (red+green) cells. Results shown depict the 20 h time point. Fusion proteins tested: High Affinity (HA)-PD-1-hFcA/FcB (SEQ ID NO: 15 plus SEQ ID NO: 36), hFcA/hCD113-FcB (SEQ ID NO: 23 plus SEQ ID NO: 35) and High Affinity (HA)-PD-1-hFcA/hCD113-FcB (SEQ ID NO: 15 plus SEQ ID NO: 35).

DESCRIPTION OF SPECIFIC EMBODIMENTS OF THE INVENTION

Definitions

Figure 1A:
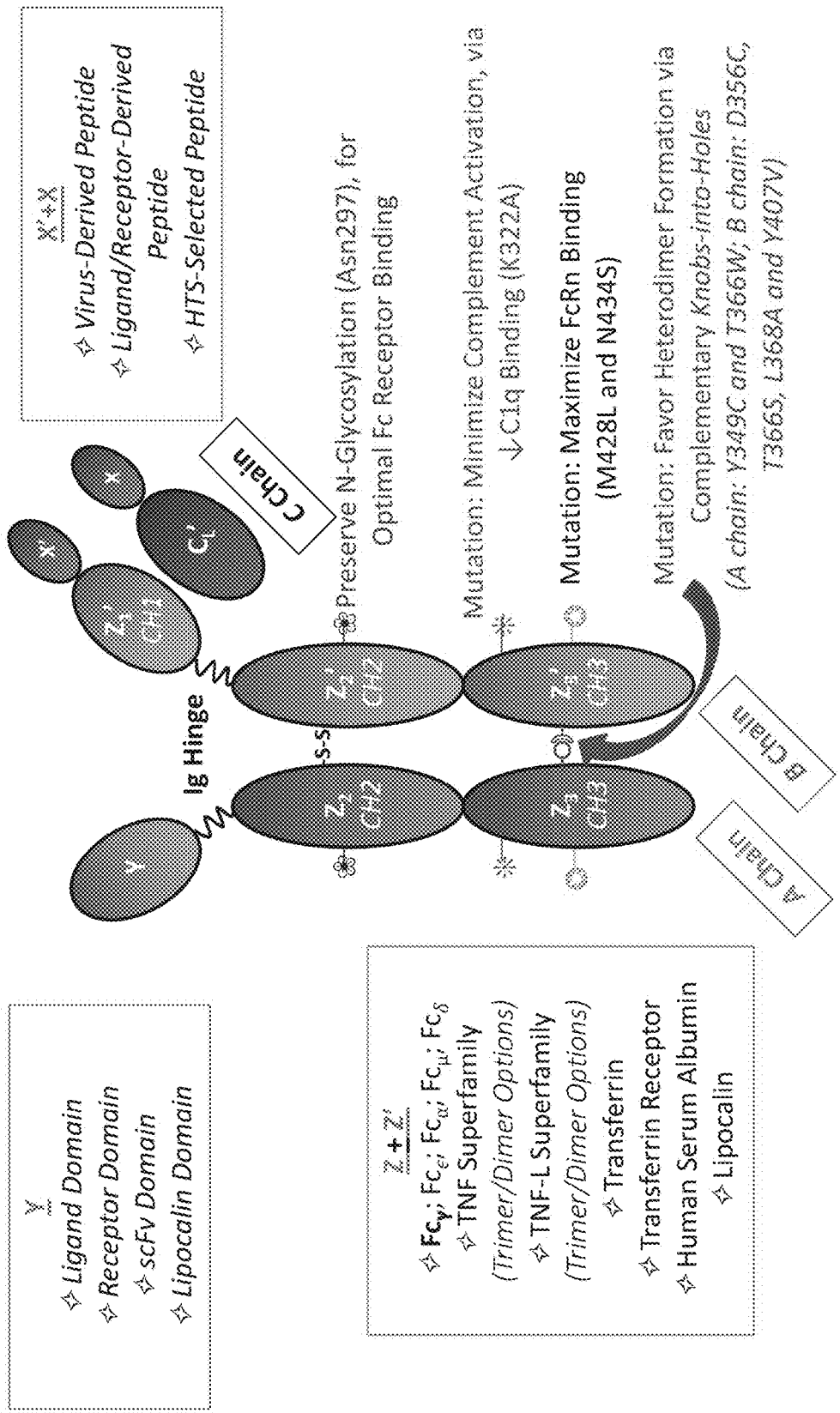
FIGS. 1A and 1B are schematic representations of some embodiments of a fusion protein platform.
Figure 1B:
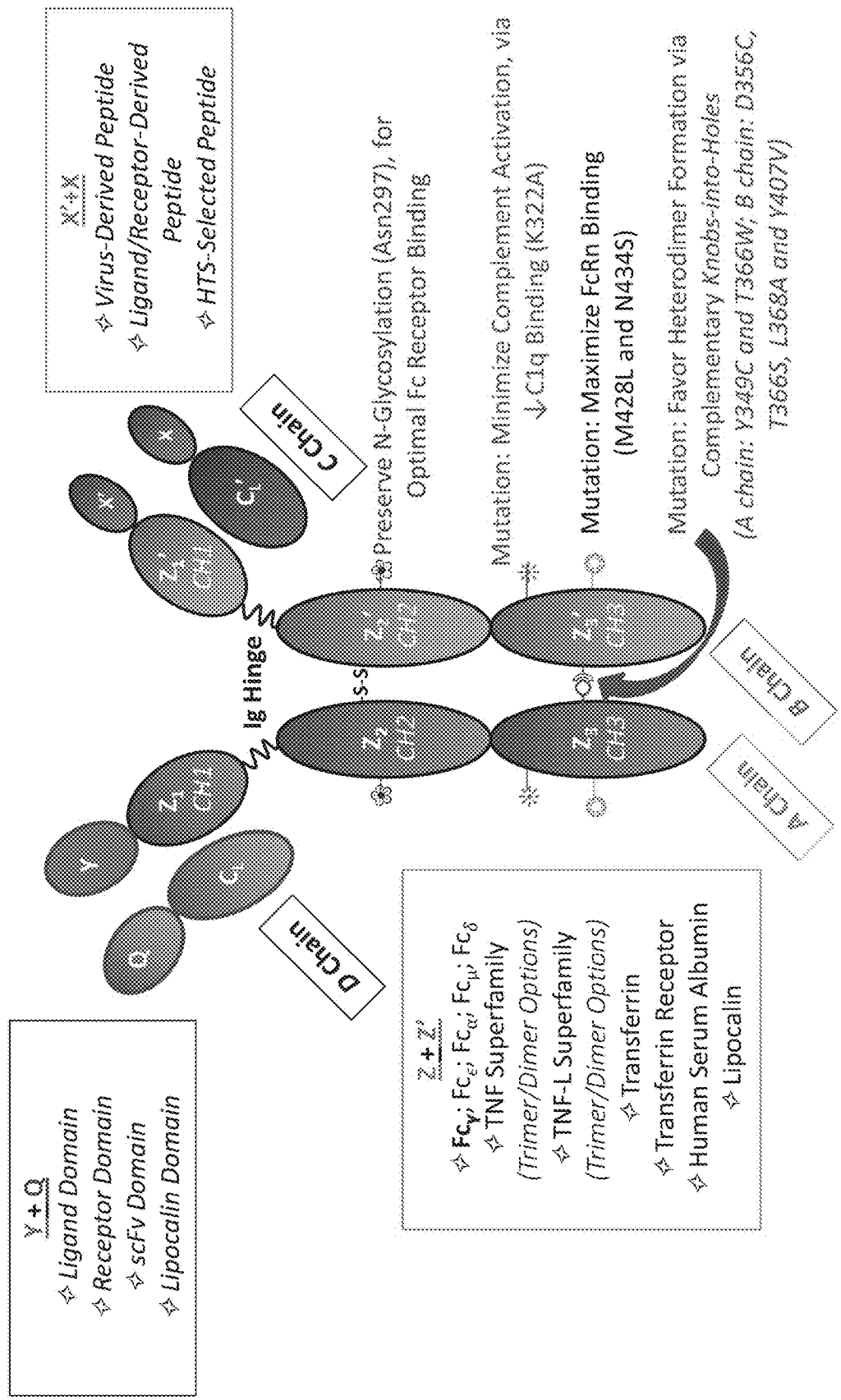
Figure 2:
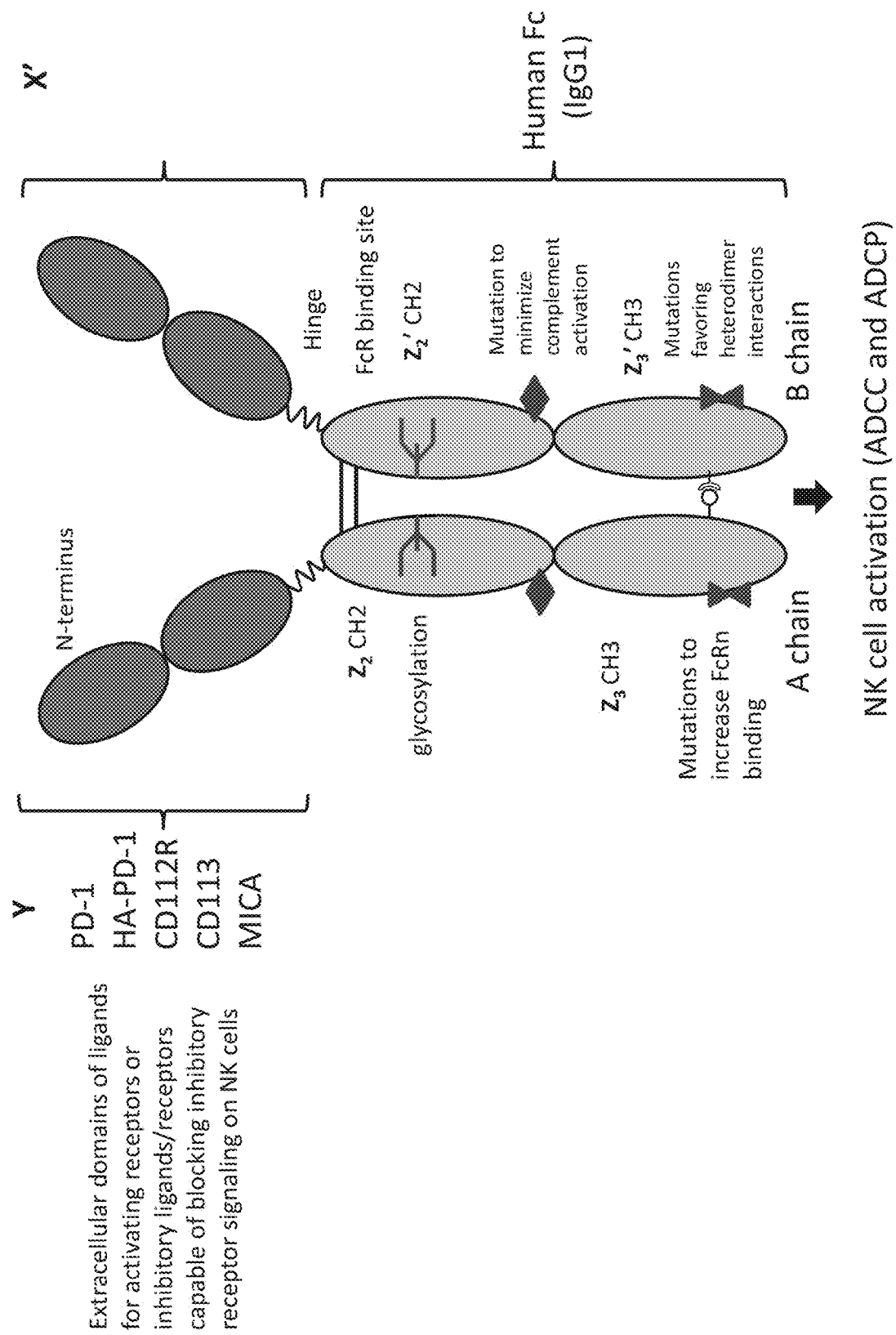
FIG. 2 is a schematic representation of some embodiments of a fusion protein platform. The figure illustrates a fusion protein targeting the Natural Killer (NK) cell:tumor cell interface.
Figure 3:
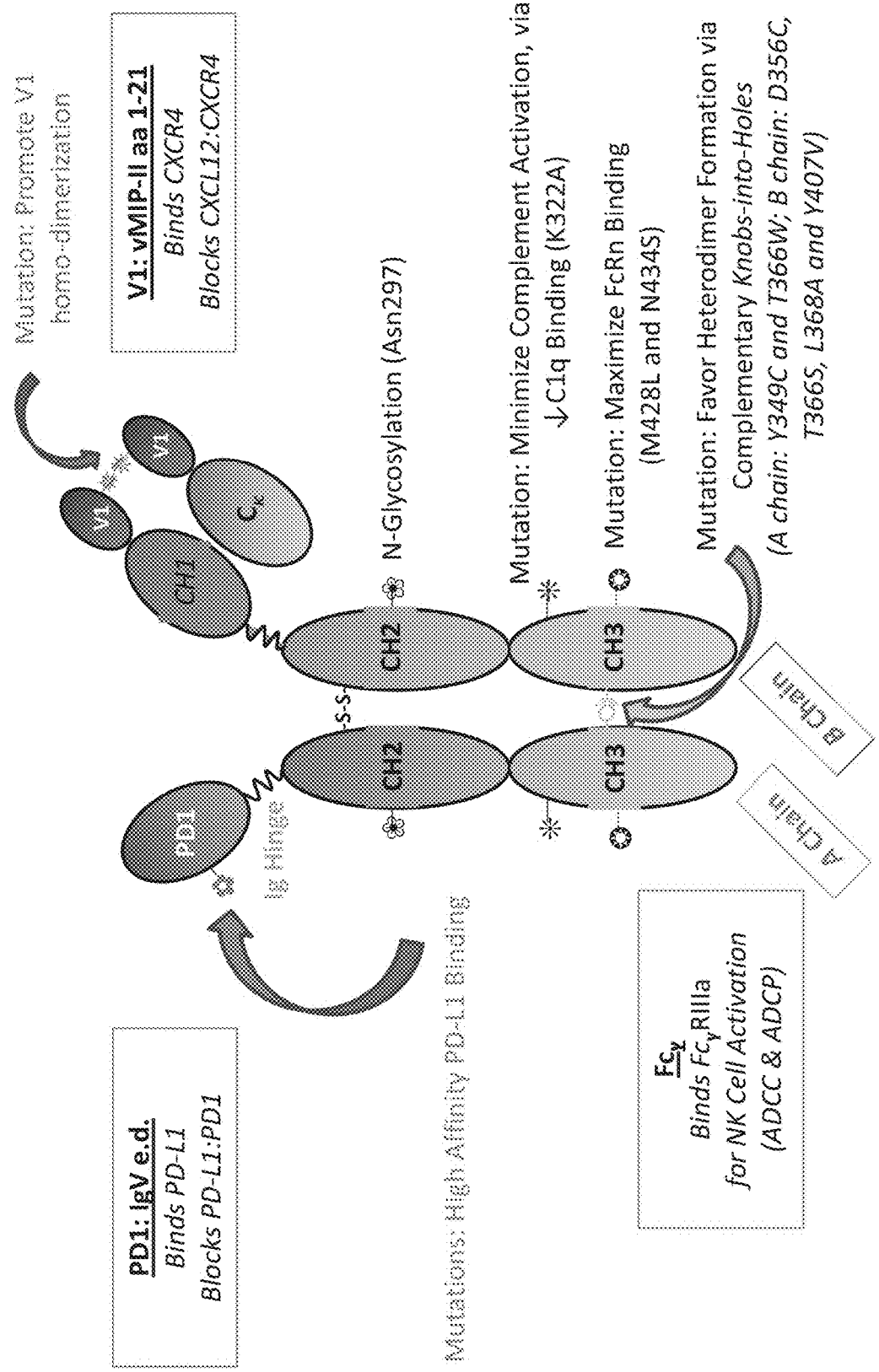
FIG. 3 is a schematic representation of a fusion protein that binds CXCR4, PD-L1 and FcγRIIIa.
Figure 4:
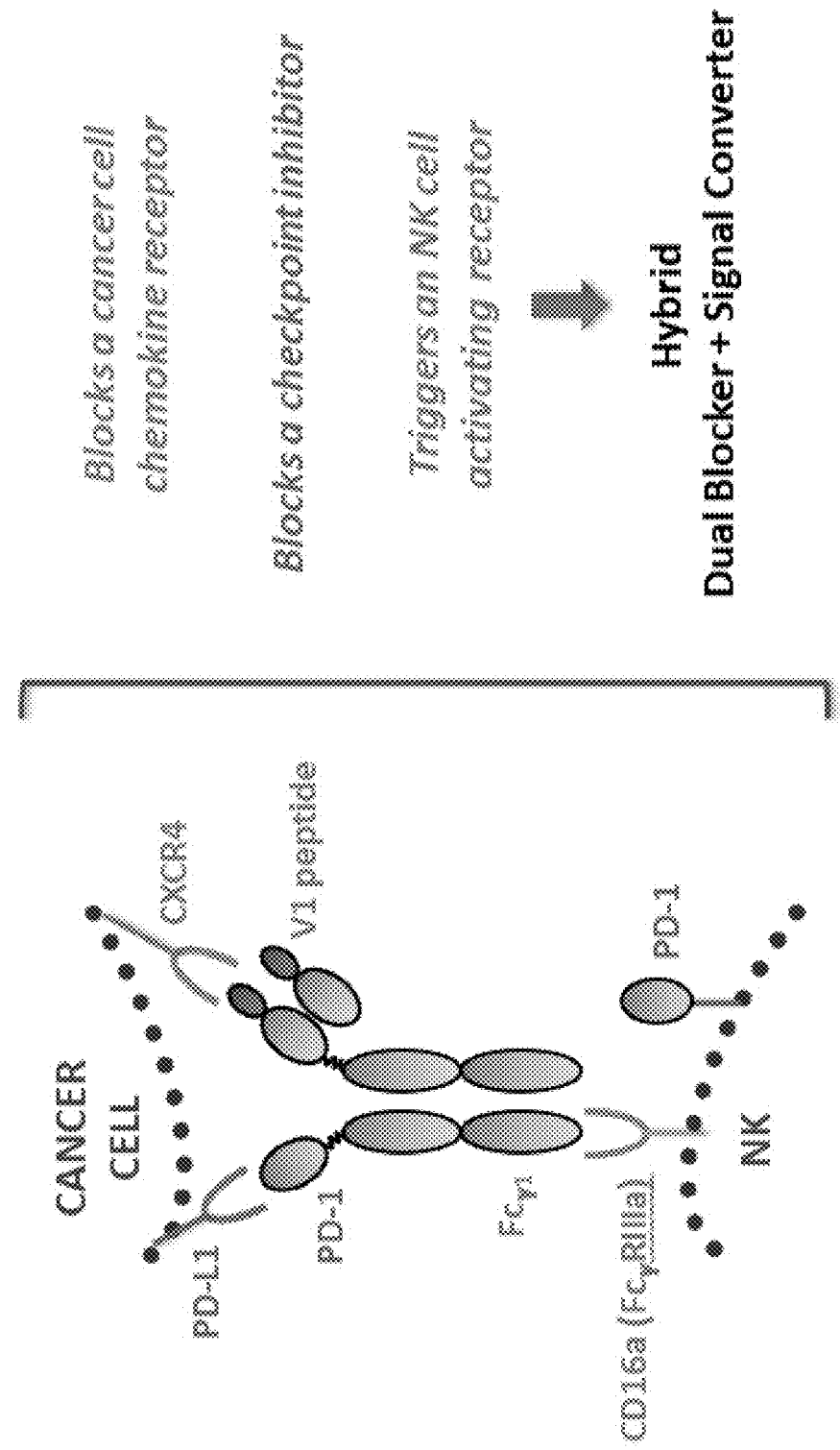
FIG. 4 is a schematic representation of the interaction with a cancer cell and with an NK cell of a fusion protein that binds CXCR4, PD-L1 and FcγRIIIa.

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, the preferred materials and methods are described herein. In describing and claiming the present invention, the following terminology will be used.

It is also to be understood that the terminology used herein is for the purpose of describing particular embodiments only, and is not intended to be limiting.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

"Activation," as used herein, refers to the state of a T cell that has been sufficiently stimulated to induce one or more of cytokine production, detectable effector functions, and cellular proliferation. The term "activated T cells" refers to, among other things, T cells that manifest one or more of these activation features.

The term "antibody," as used herein, refers to an immunoglobulin molecule which specifically binds with an antigen. Antibodies can be intact immunoglobulins derived from natural sources or from recombinant sources and can be immunoreactive portions of intact immunoglobulins. Antibodies are typically tetramers of immunoglobulin molecules, and can also exist as higher order multimers of such tetramers. The antibodies in the present invention may exist in a variety of forms including, for example, polyclonal antibodies, monoclonal antibodies, Fv, Fab and F(ab)$_2$, as well as single chain antibodies (scFv) and humanized antibodies (Harlow et al., 1999, In: Using Antibodies: A Laboratory Manual, Cold Spring Harbor Laboratory Press, NY; Harlow et al., 1989, In: Antibodies: A Laboratory Manual, Cold Spring Harbor, New York; Houston et al., 1988, Proc. Natl. Acad. Sci. USA 85:5879-5883; Bird et al., 1988, Science 242:423-426).

The term "antibody fragment" refers to a portion of an intact antibody and refers to the antigenic determining variable regions of an intact antibody. Examples of antibody fragments include, but are not limited to, Fab, Fab', F(ab')$_2$, and Fv fragments, linear antibodies, scFv antibodies, and multi-specific antibodies formed from antibody fragments.

An "antibody heavy chain," as used herein, refers to the larger of the two types of polypeptide chains present in all antibody molecules in their naturally occurring conformations. Gamma ($\gamma$), Mu ($\mu$), Delta ($\delta$), Alpha ($\alpha$) and Epsilon ($\epsilon$) heavy chains refer to the five major antibody heavy chain isotypes.

An "antibody light chain," as used herein, refers to the smaller of the two types of polypeptide chains present in all antibody molecules in their naturally occurring conformations. Kappa ($\kappa$) and lambda ($\lambda$) light chains refer to the two major antibody light chain isotypes.

By the term "synthetic antibody" as used herein, is meant an antibody which is generated using recombinant DNA technology, such as, for example, an antibody expressed by a bacteriophage as described herein. The term should also be construed to mean an antibody which has been generated by the synthesis of a DNA molecule encoding the antibody and which DNA molecule expresses an RNA encoding an antibody protein, or an amino acid sequence specifying the antibody, wherein the DNA, RNA or amino acid sequence has been obtained using synthetic nucleic acid or amino acid sequence technology which is available and well known in the art.

The term "antigen" or "Ag" as used herein is defined as a molecule that provokes an immune response or binds to an immune recognition moiety such as an antibody and a T cell receptor. This immune response may involve either antibody production, or the activation of specific immunologically-competent cells, or both. The skilled artisan will understand that any macromolecule, including virtually all proteins or peptides, can serve as an antigen. Furthermore, antigens can be derived from recombinant or genomic DNA. A skilled artisan will understand that any DNA, which comprises a nucleotide sequences or a partial nucleotide sequence encoding a protein that elicits an immune response therefore encodes an "antigen" as that term is used herein. Furthermore, one skilled in the art will understand that an antigen need not be encoded solely by a full-length nucleotide sequence of a gene. It is readily apparent that the present invention includes, but is not limited to, the use of partial nucleotide sequences of more than one gene, and that these nucleotide sequences are arranged in various combinations to elicit the desired immune response. Moreover, a skilled artisan will understand that an antigen need not be encoded by a "gene" at all. It is readily apparent that an antigen can be generated, synthesized, or can be derived from a biological sample. Such a biological sample can include, but is not limited to a tissue sample, a tumor sample, a cell or a biological fluid.

The term "anti-tumor effect" as used herein, refers to a biological effect which can be manifested by a decrease in tumor volume, a decrease in the number of tumor cells, a decrease in the number of metastases, an increase in life expectancy, or amelioration of various physiological symptoms associated with the cancerous condition. An "anti-tumor effect" can also be manifested by the ability of the peptides, polynucleotides, cells and antibodies of the invention in prevention of the occurrence of tumor in the first place.

The term "auto-antigen" means, in accordance with the present invention, any self-antigen which is recognized by the immune system as being foreign. Auto-antigens comprise, but are not limited to, cellular proteins, phosphoproteins, cellular surface proteins, cellular lipids, nucleic acids, glycoproteins, including cell surface receptors.

The term "autoimmune disease" as used herein is defined as a disorder that results from an autoimmune response. An autoimmune disease is the result of an inappropriate and excessive response to a self-antigen. Examples of autoimmune diseases include but are not limited to, Addision's disease, alopecia areata, ankylosing spondylitis, autoimmune hepatitis, autoimmune parotitis, Crohn's disease, diabetes (Type I), dystrophic epidermolysis bullosa, epididymitis, glomerulonephritis, Graves' disease, Guillain-Barr syndrome, Hashimoto's disease, hemolytic anemia, systemic lupus erythematosus, multiple sclerosis, myasthenia gravis, pemphigus vulgaris, psoriasis, rheumatic fever, rheumatoid arthritis, sarcoidosis, scleroderma, Sjogren's syndrome, spondyloarthropathies, thyroiditis, vasculitis, vitiligo, myxedema, pernicious anemia, ulcerative colitis, among others.

As used herein, the term "autologous" is meant to refer to any material derived from the same individual to which it is later to be re-introduced into the individual.

"Allogeneic" refers to a graft derived from a different animal of the same species.

"Xenogeneic" refers to a graft derived from an animal of a different species.

The term "cancer" as used herein is defined as disease characterized by the rapid and uncontrolled proliferation and/or accumulation of aberrant cells. Cancer cells can spread locally or through the bloodstream and lymphatic system to other parts of the body. Examples of various cancers include but are not limited to, breast cancer, prostate cancer, ovarian cancer, cervical cancer, skin cancer, pancreatic cancer, colorectal cancer, renal cancer, liver cancer, brain cancer, lymphoma, leukemia, lung cancer and the like. In certain embodiments, the cancer is medullary thyroid carcinoma.

The term "cleavage" refers to the breakage of covalent bonds, such as in the backbone of a nucleic acid molecule. Cleavage can be initiated by a variety of methods, including, but not limited to, enzymatic or chemical hydrolysis of a phosphodiester bond. Both single-stranded cleavage and double-stranded cleavage are possible. Double-stranded cleavage can occur as a result of two distinct single-stranded cleavage events. DNA cleavage can result in the production of either blunt ends or staggered ends. In certain embodiments, fusion polypeptides may be used for targeting cleaved double-stranded DNA.

As used herein, the term "conservative sequence modifications" is intended to refer to amino acid modifications that do not significantly affect or alter the binding characteristics of the antibody containing the amino acid sequence. Such conservative modifications include amino acid substitutions, additions and deletions. Modifications can be introduced into an antibody of the invention by standard techniques known in the art, such as site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). Thus, one or more amino acid residues within the CDR regions of an antibody can be replaced with other amino acid residues from the same side chain family and the altered antibody can be tested for the ability to bind antigens using the functional assays described herein.

A "disease" is a state of health of an animal wherein the animal cannot maintain homeostasis, and wherein if the disease is not ameliorated then the animal's health continues to deteriorate. In contrast, a "disorder" in an animal is a state of health in which the animal is able to maintain homeostasis, but in which the animal's state of health is less favorable than it would be in the absence of the disorder. Left untreated, a disorder does not necessarily cause a further decrease in the animal's state of health.

"Effective amount" or "therapeutically effective amount" are used interchangeably herein, and refer to an amount of a compound, formulation, material, or composition, as described herein effective to achieve a particular biological result or provides a therapeutic or prophylactic benefit. Such results may include, but are not limited to, anti-tumor activity as determined by any means suitable in the art.

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription to mRNA and translation of mRNA corresponding to that gene produces the protein in a cell or other biological system. Both the coding strand, the nucleotide sequence of which is identical to the mRNA sequence and is usually provided in sequence listings, and the non-coding strand, used as the template for transcription of a gene or cDNA, can be referred to as encoding the protein or other product of that gene or cDNA.

As used herein, "endogenous" refers to any material from or produced inside an organism, cell, tissue or system.

As used herein, the term "exogenous" refers to any material introduced from or produced outside an organism, cell, tissue or system.

The term "expand" as used herein refers to increasing in number, as in an increase in the number of T cells. In one embodiment, the T cells that are expanded ex vivo increase in number relative to the number originally present in the culture. In another embodiment, the T cells that are expanded ex vivo increase in number relative to other cell types in the culture. The term "ex vivo," as used herein, refers to cells that have been removed from a living organism, (e.g., a human) and propagated outside the organism (e.g., in a culture dish, test tube, or bioreactor).

The term "expression" as used herein is defined as the transcription and/or translation of a particular nucleotide sequence driven by its regulatory element, such as a promoter.

"Expression vector" refers to a vector comprising a recombinant polynucleotide comprising expression control sequences operatively linked to a nucleotide sequence to be expressed. An expression vector comprises sufficient cis-acting elements for expression; other elements for expression can be supplied by the host cell or in an in vitro expression system. Expression vectors include all those known in the art, such as cosmids, plasmids (e.g., naked or contained in liposomes) and viruses (e.g., Sendai viruses, lentiviruses, retroviruses, adenoviruses, and adeno-associated viruses) that incorporate the recombinant polynucleotide.

"Homologous" as used herein refers to the subunit sequence identity between two polymeric molecules, e.g., between two nucleic acid molecules, such as, two DNA molecules or two RNA molecules, or between two polypeptide molecules. When a subunit position in both of the two molecules is occupied by the same monomeric subunit; e.g., if a position in each of two DNA molecules is occupied by adenine, then they are homologous at that position. The homology between two sequences is a direct function of the number of matching or homologous positions; e.g., if half (e.g., five positions in a polymer ten subunits in length) of the positions in two sequences are homologous, the two sequences are 50% homologous; if 90% of the positions (e.g., 9 of 10), are matched or homologous, the two sequences are 90% homologous.

"Humanized" forms of non-human (e.g., murine) antibodies are chimeric immunoglobulins, immunoglobulin chains or fragments thereof (such as Fv, Fab, Fab', F(ab')2 or other antigen-binding subsequences of antibodies) which contain minimal sequence derived from non-human immunoglobulin. For the most part, humanized antibodies are human immunoglobulins (recipient antibody) in which residues from a complementary-determining region (CDR) of the recipient are replaced by residues from a CDR of a non-human species (donor antibody) such as mouse, rat or rabbit having the desired specificity, affinity, and capacity. In some instances, Fv framework region (FR) residues of the human immunoglobulin are replaced by corresponding non-human residues. Furthermore, humanized antibodies can comprise residues which are found neither in the recipient antibody nor in the imported CDR or framework sequences. These modifications are made to further refine and optimize antibody performance. In general, the humanized antibody will comprise substantially all of at least one, and typically two, variable domains, in which all or substantially all of the CDR regions correspond to those of a non-human immunoglobulin and all or substantially all of the FR regions are those of a human immunoglobulin sequence. The humanized antibody optimally also will comprise at least a portion of an immunoglobulin constant region (Fc), typically that of a human immunoglobulin. For further details, see Jones et al., Nature, 321: 522-525, 1986; Reichmann et al., Nature, 332: 323-329, 1988; Presta, Curr. Op. Struct. Biol., 2: 593-596, 1992.

"Fully human" refers to an immunoglobulin, such as an antibody, where the whole molecule is of human origin or consists of an amino acid sequence identical to a human form of the antibody.

"Identity" as used herein refers to the subunit sequence identity between two polymeric molecules particularly between two amino acid molecules, such as, between two polypeptide molecules. When two amino acid sequences have the same residues at the same positions; e.g., if a position in each of two polypeptide molecules is occupied by an arginine, then they are identical at that position. The identity or extent to which two amino acid sequences have the same residues at the same positions in an alignment is often expressed as a percentage. The identity between two amino acid sequences is a direct function of the number of matching or identical positions; e.g., if half (e.g., five positions in a polymer ten amino acids in length) of the positions in two sequences are identical, the two sequences are 50% identical; if 90% of the positions (e.g., 9 of 10), are matched or identical, the two amino acids sequences are 90% identical.

The term "immunoglobulin" or "Ig," as used herein is defined as a class of proteins, which function as antibodies. Antibodies expressed by B cells are sometimes referred to as the BCR (B cell receptor) or antigen receptor. The five members included in this class of proteins are IgG, IgM, IgD, IgA, and IgE. IgG is the most common circulating antibody. IgM is the main immunoglobulin produced in the primary immune response in most subjects. It is the most efficient immunoglobulin in agglutination, complement fixation, and other antibody responses, and is important in defense against bacteria and viruses. IgD is the immunoglobulin that has no known antibody function, but may serve as an antigen receptor. IgA is the primary antibody that is present in body secretions, such as saliva, tears, breast milk, gastrointestinal secretions and mucus secretions of the respiratory and genitourinary tracts. IgE is the immunoglobulin that mediates immediate hypersensitivity by causing release of mediators from mast cells and basophils upon exposure to allergen.

The term "immune response" as used herein is defined as a cellular response to an antigen that occurs when lymphocytes identify antigenic molecules as foreign and induce the formation of antibodies and/or activate lymphocytes to remove the antigen.

The term "lipocalin" as used herein is defined as a class of proteins, which function in their natural setting to transport small hydrophobic molecules such as steroids, bilins, retinoids, and lipids. They share limited regions of sequence homology and a common tertiary structure architecture comprising an eight-stranded antiparallel beta barrel with a repeated+1 topology enclosing an internal ligand binding site. Lipocalins are found in gram negative bacteria, vertebrate cells, invertebrate cells, and in plants, and have been associated with many biological processes, among them immune response, pheromone transport, biological prostaglandin synthesis, retinoid binding, and cancer cell interactions. Lipocalins can be modified in many of the same ways described for antibody modification in order to alter or enhance their binding properties, e.g., bind to a cell surface molecule and in this way block, enhance, or otherwise modify its functional properties.

As used herein, an "instructional material" includes a publication, a recording, a diagram, or any other medium of expression which can be used to communicate the usefulness of the compositions and methods of the invention. The instructional material of the kit of the invention may, for example, be affixed to a container which contains the nucleic acid, peptide, and/or composition of the invention or be shipped together with a container which contains the nucleic acid, peptide, and/or composition. Alternatively, the instructional material may be shipped separately from the container with the intention that the instructional material and the compound be used cooperatively by the recipient.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein can exist in substantially purified form, or can exist in a non-native environment such as, for example, a host cell.

A "lentivirus" as used herein refers to a genus of the Retroviridae family. Lentiviruses are unique among the retroviruses in being able to infect non-dividing cells; they can deliver a significant amount of genetic information into the DNA of the host cell, so they are one of the most efficient methods of a gene delivery vector. HIV, SIV, and FIV are all examples of lentiviruses. Vectors derived from lentiviruses offer the means to achieve significant levels of gene transfer in vivo.

By the term "modified" as used herein, is meant a changed state or structure of a molecule or cell of the invention. Molecules may be modified in many ways, including chemically, structurally, and functionally. Cells may be modified through the introduction of nucleic acids.

By the term "modulating," as used herein, is meant mediating a detectable increase or decrease in the level of a response in a subject compared with the level of a response in the subject in the absence of a treatment or compound, and/or compared with the level of a response in an otherwise identical but untreated subject. The term encompasses perturbing and/or affecting a native signal or response thereby mediating a beneficial therapeutic response in a subject, preferably, a human.

In the context of the present invention, the following abbreviations for the commonly occurring nucleic acid bases are used. "A" refers to adenosine, "C" refers to cytosine, "G" refers to guanosine, "T" refers to thymidine, and "U" refers to uridine.

Unless otherwise specified, a "nucleotide sequence encoding an amino acid sequence" includes all nucleotide sequences that are degenerate versions of each other and that encode the same amino acid sequence. The phrase nucleotide sequence that encodes a protein or an RNA may also include introns to the extent that the nucleotide sequence encoding the protein may in some version contain an intron(s).

The term "operably linked" refers to functional linkage between a regulatory sequence and a heterologous nucleic acid sequence resulting in expression of the latter. For example, a first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein coding regions, in the same reading frame.

The term "overexpressed" tumor antigen or "overexpression" of a tumor antigen is intended to indicate an abnormal level of expression of a tumor antigen in a cell from a disease area like a solid tumor within a specific tissue or organ of the patient relative to the level of expression in a normal cell from that tissue or organ. Patients having solid tumors or a hematological malignancy characterized by overexpression of the tumor antigen can be determined by standard assays known in the art.

"Parenteral" administration of an immunogenic composition includes, e.g., subcutaneous (s.c.), intravenous (i.v.), intramuscular (i.m.), or intrasternal injection, or infusion techniques.

The term "polynucleotide" as used herein is defined as a chain of nucleotides. Furthermore, nucleic acids are polymers of nucleotides. Thus, nucleic acids and polynucleotides as used herein are interchangeable. One skilled in the art has the general knowledge that nucleic acids are polynucleotides, which can be hydrolyzed into monomeric "nucleotides." The monomeric nucleotides can be hydrolyzed into nucleosides. As used herein, polynucleotides include, but are not limited to, all nucleic acid sequences which are obtained by any means available in the art, including, without limitation, recombinant means, i.e., the cloning of nucleic acid sequences from a recombinant library or a cell genome, using ordinary cloning technology and PCR™, and the like, and by synthetic means.

As used herein, the terms "peptide," "polypeptide," and "protein" are used interchangeably, and refer to a compound comprised of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

As used herein, the terms "fusion protein" and "chimeric protein" are used interchangeably, and refer to a compound comprised of two or more polypeptides. In some embodiments, the two or more polypeptides are covalently linked. In further embodiments, the two or more polypeptides are covalently linked by peptide bonds, linkers or disulfide bonds. Fusion proteins can be produced by a number of methods that are well known to those familiar with the art, most commonly, by introducing into a cell a vector(s) comprising a nucleic acid sequence that encodes or specifies a fusion protein amino acid sequence. Additional amino acid or polypeptides can be incorporated into a fusion protein in order to elicit additional functional properties, e.g., stability, half-life, multimerization, ease of purification. An example of such an element is a polypeptide linker.

The term "promoter" as used herein is defined as a DNA sequence recognized by the synthetic machinery of the cell, or introduced synthetic machinery, required to initiate the specific transcription of a polynucleotide sequence.

As used herein, the term "promoter/regulatory sequence" means a nucleic acid sequence which is required for expression of a gene product operably linked to the promoter/regulatory sequence. In some instances, this sequence may be the core promoter sequence and in other instances, this sequence may also include an enhancer sequence and other regulatory elements which are required for expression of the gene product. The promoter/regulatory sequence may, for example, be one which expresses the gene product in a tissue specific manner.

A "constitutive" promoter is a nucleotide sequence which, when operably linked with a polynucleotide which encodes or specifies a gene product, causes the gene product to be produced in a cell under most or all physiological conditions of the cell.

An "inducible" promoter is a nucleotide sequence which, when operably linked with a polynucleotide which encodes or specifies a gene product, causes the gene product to be produced in a cell substantially only when an inducer which corresponds to the promoter is present in the cell.

A "tissue-specific" promoter is a nucleotide sequence which, when operably linked with a polynucleotide encodes or specified by a gene, causes the gene product to be produced in a cell substantially only if the cell is a cell of the tissue type corresponding to the promoter.

A "signal transduction pathway" refers to the biochemical relationship between a variety of signal transduction molecules that play a role in the transmission of a signal from one portion of a cell to another portion of a cell. The phrase "cell surface receptor" includes molecules and complexes of molecules capable of receiving a signal and transmitting signal across the plasma membrane of a cell.

By the term "specifically binds," as used herein with respect to an antibody, is meant an antibody which recognizes a specific antigen, but does not substantially recognize or bind other molecules in a sample. For example, an antibody that specifically binds to an antigen from one species may also bind to that antigen from one or more species. But, such cross-species reactivity does not itself alter the classification of an antibody as specific. In another example, an antibody that specifically binds to an antigen may also bind to different allelic forms of the antigen. However, such cross reactivity does not itself alter the classification of an antibody as specific. In some instances, the terms "specific binding" or "specifically binding," can be used in reference to the interaction of an antibody, a protein, or a peptide with a second chemical species, to mean that the interaction is dependent upon the presence of a particular structure (e.g., an antigenic determinant or epitope) on the chemical species; for example, an antibody recognizes and binds to a specific protein structure rather than to proteins generally. If an antibody is specific for epitope "A", the presence of a molecule containing epitope A (or free, unlabeled A), in a reaction containing labeled "A" and the antibody, will reduce the amount of labeled A bound to the antibody.

The term "subject" is intended to include living organisms in which an immune response can be elicited (e.g., mammals). A "subject" or "patient," as used therein, may be a human or non-human mammal. Non-human mammals include, for example, livestock and pets, such as ovine, bovine, porcine, canine, feline and murine mammals. Preferably, the subject is human.

As used herein, a "substantially purified" cell is a cell that is essentially free of other cell types. A substantially purified cell also refers to a cell which has been separated from other cell types with which it is normally associated in its naturally occurring state. In some instances, a population of substantially purified cells refers to a homogenous population of cells. In other instances, this term refers simply to cell that have been separated from the cells with which they are naturally associated in their natural state. In some embodiments, the cells are cultured in vitro. In other embodiments, the cells are not cultured in vitro.

A "target site" or "target sequence" refers to a genomic nucleic acid sequence that defines a portion of a nucleic acid to which a binding molecule may specifically bind under conditions sufficient for binding to occur.

The term "therapeutic" as used herein means a treatment and/or prophylaxis. A therapeutic effect is obtained by suppression, remission, or eradication of a disease state.

The term "transfected" or "transformed" or "transduced" as used herein refers to a process by which exogenous nucleic acid is transferred or introduced into the host cell. A "transfected" or "transformed" or "transduced" cell is one which has been transfected, transformed or transduced with exogenous nucleic acid. The cell includes the primary subject cell and its progeny.

The term "transgene" refers to the genetic material that has been or is about to be artificially inserted into the genome of an animal, particularly a mammal and more particularly a mammalian cell of a living animal.

To "treat" a disease, as the term is used herein, means to reduce the frequency or severity of at least one sign or symptom of a disease or disorder experienced by a subject.

The phrase "under transcriptional control" or "operatively linked" as used herein means that the promoter is in the correct location and orientation in relation to a polynucleotide to control the initiation of transcription by RNA polymerase and expression of the polynucleotide.

A "vector" is a composition of matter which comprises an isolated nucleic acid and which can be used to deliver the isolated nucleic acid to the interior of a cell. Numerous vectors are known in the art including, but not limited to, linear polynucleotides, polynucleotides associated with ionic or amphiphilic compounds, plasmids, and viruses. Thus, the term "vector" includes an autonomously replicating plasmid or a virus. The term should also be construed to include non-plasmid and non-viral compounds which facilitate transfer of nucleic acid into cells, such as, for example, polylysine compounds, liposomes, and the like. An example of a plasmid vector is an episomal vector, wherein self-replication is driven or enhanced by regulatory elements derived from a virus, e.g., Epstein-Barr virus and BK virus. Examples of viral vectors include, but are not limited to, Sendai virus vectors, adenovirus vectors, adeno-associated virus vectors, retroviral vectors, lentiviral vectors, and the like.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Where any amino acid sequence is specifically referred to by a GENBANK® accession number, the sequence is incorporated herein by reference, in part and/or in its entirety. Information associated with the accession number, such as identification of signal peptide, extracellular domain, transmembrane domain, promoter sequence and translation start, is also incorporated by reference herein, in part and/or in its entirety.

As envisioned in the present invention with respect to the disclosed compositions of matter and methods, in one aspect the embodiments of the invention comprise the components and/or steps disclosed herein. In another aspect, the embodiments of the invention consist essentially of the components and/or steps disclosed herein. In yet another aspect, the embodiments of the invention consist of the components and/or steps disclosed therein.

DESCRIPTION

Provided is a fusion protein. In some exemplary embodiments, said first component of the fusion protein blocks a chemokine receptor, e.g., CXCR4 and/or CXCR7 (via binding of a vMIPII or V1 peptide or derivatives thereof in the fusion protein), and this blockade serves to immobilize the tumor cells and interfere with its migratory, invasive, metastatic, and other tumorigenic properties; said second component of the fusion protein blocks a checkpoint inhibitor on said tumor cell, e.g., PD-L1 and/or PD-L2 (via binding of PD1 or derivatives thereof in the fusion protein), and this blockade serves to interfere with inhibition of a tumor-directed immune effector cell, e.g., an NK cell; and said third component of the fusion protein, triggers an activating receptor on the same immune effector cell, e.g., the $Fc_\gamma RIIIa$ receptor (via binding of $Fc_\gamma$ or derivatives thereof in the fusion protein), that drives NK cell activation and promotes ADCC and ADCP.

In some exemplary embodiments, one component of the fusion protein blocks a checkpoint inhibitor on a tumor or other cell and two other components each trigger a distinct activating receptor on an immune effector cell. In some embodiments, where the checkpoint inhibitor is on a tumor cell, the fusion protein molecularly bridges an immune effector cell and a target tumor cell. Further, the three interactions of the fusion protein, a combination of checkpoint inhibitory pathway blockade and activating receptor triggering, serve to functionally reinforce each other, all three cooperatively driving activation of said immune effector cell, e.g., an NK cell. In a preferred embodiment, the checkpoint inhibitor blocked by the fusion protein consists of PD-L1, PD-L2, CD113, CD112, CD155, or CD111, and the two activating receptors co-triggered by the fusion protein are the $Fc_\gamma RIIIa$ receptor and 4-1BB on an NK cell.

Fusion Proteins

Provided is fusion protein comprising Component A and/or Component B; wherein Component A comprises Component Y, Component $Z_2$ and Component $Z_3$; and wherein Component B comprises Component X', Component $Z_2'$ and Component $Z_3'$. In some embodiments, Component B further comprises Component $Z_1'$. Thus, in some embodiments, Component B comprises Component X', Component $Z_1'$, Component $Z_2'$ and Component $Z_3'$.

In some embodiments, Component A further comprises Component $Z_1$. Thus, in some embodiments, Component A comprises Component Y, Component $Z_1$, Component $Z_2$ and Component $Z_3$.

In some embodiments, the fusion protein further comprises Component C, wherein Component C comprises Component X and Component $C_L'$. In further embodiments, Component $C_L'$ comprises at least a portion of an immunoglobulin light chain. In some embodiments, the fusion protein further comprises Component D, wherein Component D comprises Component Q and Component $C_L$. In further embodiments, Component $C_L$ comprises at least a portion of an immunoglobulin light chain.

In some embodiments, Component A further comprises a leader sequence. In further embodiments, the leader sequence is a human albumin leader sequence.

In some embodiments, Component B further comprises a leader sequence. In further embodiments, the leader sequence is a human albumin leader sequence.

In some embodiments, Component Y comprises a ligand domain, a receptor domain, an scFv domain or a lipocalin domain. In further embodiments, Component Y comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48. In yet further embodiments, the fusion protein binds PD-L1 or PD-L2.

In some embodiments, Component $Z_1$ comprises a domain of an immunoglobulin, a TNF superfamily member, a TNF-L superfamily member, a transferrin, a transferrin receptor, a human serum albumin or a lipocalin. In some embodiments, the domain of an immunoglobulin is a CH1 domain. In some embodiments, the immunoglobulin is an IgG. In yet further embodiments, the immunoglobulin is an IgE.

In some embodiments, Component $Z_2$ comprises a domain of an immunoglobulin, a TNF superfamily member, a TNF-L superfamily member, a transferrin, a transferrin receptor, a human serum albumin or a lipocalin. In some embodiments, the domain of an immunoglobulin is a CH2 domain. In some embodiments, the immunoglobulin is an IgG. In yet further embodiments, the immunoglobulin is an IgE.

In some embodiments, Component $Z_3$ comprises a domain of an immunoglobulin, a TNF superfamily member, a TNF-L superfamily member, a transferrin, a transferrin receptor, a human serum albumin or a lipocalin. In some embodiments, the domain of an immunoglobulin is a CH3 domain. In some embodiments, the immunoglobulin is an IgG. In yet further embodiments, the immunoglobulin is an IgE.

In some embodiments, Component $Z_1'$ comprises a domain of an immunoglobulin, a TNF superfamily member, a TNF-L superfamily member, a transferrin, a transferrin receptor, a human serum albumin or a lipocalin. In some embodiments, the domain of an immunoglobulin is a CH1 domain. In some embodiments, the immunoglobulin is an IgG. In yet further embodiments, the immunoglobulin is an IgE.

In some embodiments, Component $Z_2'$ comprises a domain of an immunoglobulin, a TNF superfamily member, a TNF-L superfamily member, a transferrin, a transferrin receptor, a human serum albumin or a lipocalin. In some embodiments, the domain of an immunoglobulin is a CH2 domain. In some embodiments, the immunoglobulin is an IgG. In yet further embodiments, the immunoglobulin is an IgE.

In some embodiments, Component $Z_3'$ comprises a domain of an immunoglobulin, a TNF superfamily member, a TNF-L superfamily member, a transferrin, a transferrin receptor, a human serum albumin or a lipocalin. In some embodiments, the domain of an immunoglobulin is a CH3 domain. In some embodiments, the immunoglobulin is an IgG. In yet further embodiments, the immunoglobulin is an IgE.

In some embodiments, Component X' comprises a virus-derived peptide, a ligand-derived, a receptor-derived peptide or a high-throughput screen (HTS)-selected peptide. In some embodiments, Component X' comprises a peptide sequence that binds a chemokine receptor, a cytokine receptor, a counter-receptor for a functional ligand, an integrin, a ligand, or a part of a membrane-signaling complex. In some embodiments, Component X' comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48. In further embodiments, Component X' comprises at least a portion of vMIP-II. In further embodiments, Component X' comprises V1 or V1delta polypeptides. In yet further embodiments, the fusion protein binds CXCR4.

In some embodiments, Component Q comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

In some embodiments, Component X comprises a virus-derived peptide, a ligand-derived peptide, a receptor-derived peptide or an HTS-selected peptide. In further embodiments, Component X comprises V1 or V1delta polypeptides. In further embodiments, the fusion protein binds CXCR4.

In some embodiments, Component Y and Component $Z_2$ are connected via a hinge, for example an IgG hinge. In some embodiments, Component $Z_1'$ and Component $Z_2'$ are connected via a hinge, for example an IgG hinge. In some embodiments, Component X' and Component $Z_1'$ are connected via a linker. In some embodiments, Component X and Component $C_L$ are connected via a linker.

In some embodiments, the fusion protein comprises Component A and Fc. In further embodiments, the fusion protein comprises Component A and human FcB (hFcB).

In some embodiments, the fusion protein comprises Component B and Fc. In further embodiments, the fusion protein comprises Component B and human FcA (hFcA).

In some embodiments, Component A and Component B are covalently linked. In some embodiments, the covalent linkage is via a disulfide bond, or via a linker.

In some embodiments, Component A and Component B are not covalently linked. In some embodiments, Component A and Component B are held together via knobs-into-holes interactions. In some embodiments, Component A and Component B comprise knobs-into-holes mutations and covalent linkage via disulfide bond. In some embodiments, Component A comprises mutations Y349C and T366W, and Component B comprises mutations D356C, T366S, L368A and Y407V ("Knobs-into-holes" mutations). The positions of mutations and alterations in these component chains are defined by the Kabat numbering convention (Johnson, G and Wu, T T, (2001) *Nucleic Acids Res.*, 28(1), 214-18).

In some embodiments, the fusion protein comprises Component A and a domain of an immunoglobulin. In some embodiments, the immunoglobulin domain is an Fc domain.

In some embodiments, the fusion protein comprises Component B and a domain of an immunoglobulin. In some embodiments, the immunoglobulin domain is an Fc domain.

In some embodiments, Component B and Component C are covalently linked. In some embodiments, the covalent linkage is via a disulfide bond.

In some embodiments, Component B and Component C are not covalently linked.

In some embodiments, Component A and Component D are covalently linked. In some embodiments, the covalent linkage is via a disulfide bond.

In some embodiments, Component A and Component D are not covalently linked.

In some embodiments, the fusion protein binds a receptor or ligand on an immune cell.

In some embodiments, the receptor is an Fc receptor.

Also provided is a pharmaceutical composition comprising a pharmaceutically acceptable carrier and the fusion protein of any one of the preceding embodiments.

Also provided is a method of treating a proliferative disorder in a patient comprising administering a therapeutically effective amount of the fusion protein of any one of the preceding embodiments to a patient in need of such treatment. In some embodiments, the proliferative disorder is cancer. In further embodiments, the cancer is a solid tumor. In yet further embodiments, the cancer is pancreatic cancer, breast cancer, ovarian cancer, bladder cancer, melanoma, glioblastoma, acute lymphoblastic leukemia (ALL), acute myelogenous leukemia (AML), multiple myeloma, colon cancer, lung cancer, liver cancer, or any solid or liquid tumor type.

The present invention provides novel fusion proteins useful for treating proliferative disorders, such as cancer. On a cell expressing a receptor or ligand for Component Y and a receptor or ligand for Component X', the fusion protein of the invention may block one or both receptors or ligands. Thus, on a cell co-expressing a receptor or ligand for Component Y and a receptor or ligand for Component X', the fusion protein of the invention may lead to death, immobilization, and clearance of the tumor cell. Furthermore, on a cell expressing a receptor or ligand for Component $Z_3$ or Component $Z_3$', for instance on a Natural Killer (NK) cell, the fusion protein of the invention may trigger the receptor or ligand, and may lead to activation of the cell. Thus, the fusion protein of the present invention may mediate its activity by spanning two neighboring cells. Further, the fusion protein of the present invention may bind three or more distinct molecules on said cells. In some embodiments, the fusion protein may act to treat a disease such as cancer by causing inhibition or a reduction in certain cells, or activation or an increase in certain cells.

Component A

Component A comprises Component Y, Component $Z_2$ and Component $Z_3$.

Component Y

In some embodiments, Component Y comprises a ligand domain, a receptor domain, a scFv domain or a lipocalin domain. In further embodiments, Component Y comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

An exemplary sequence for component Y comprises or consists of:

```
                                            (SEQ ID NO: 1)
GWFLDSPDRPWNPPTFSPALLVVTEGDNATFTCSFSNTSESFVLNWYRM

SPSNQTDKLAAFPEDRSQPGQDCRFRVTQLPNGRDFHMSVVRARRNDSG

TYLCGAISLAPKAQIKESLRAELRVTERRAEVPTAHPSPSPRPAGQ
```

Human PD-1 extracellular domain, GENBANK® Accession No. NM_005018.3.

An exemplary sequence for component Y comprises or consists of:

```
                                            (SEQ ID NO: 2)
GWFLDSPDRPWNPPTFSPALLVVTEGDNATFTCSFSNTSESFHVVWHRE

SPSGQTDTLAAFPEDRSQPGQDCRFRVTQLPNGRDFHMSVVRARRNDSG

TYVCGVISLAPKIQIKESLRAELRVTERRAEVPTAHPSPSPRPAGQ
```

High affinity human PD-1 extracellular domain.

An exemplary sequence for component Y comprises or consists of:

```
                                            (SEQ ID NO: 3)
MMTGTIETTGNISAEKGGSIILQCHLSSTTAQVTQVNWEQQDQLLAICN

ADLGWHISPSFKDRVAPGPGLGLTLQSLTVNDTGEYFCIYHTYPDGTYT

GRIFLEVLESSVAEHGARFQIP
``` human TIGIT extracellular domain, GENBANK® Accession No. NM_173799.4.

An exemplary sequence for component Y comprises or consists of:

```
                                            (SEQ ID NO: 4)
VWEKTVNTEENVYATLGSDVNLTCQTQTVGFFVQMQWSKVTNKIDLIAV

YHPQYGFYCAYGRPCESLVTFTETPENGSKWTLHLRNMSCSVSGRYECM

LVLYPEGIQTKIYNLLIQTHVTADEWNSNHTIEIEINQTLEIPCFQNSS

SKISSEFTYAWSVENSSTDSWVLLSKGIKEDNGTQETLISQNHLISNST

LLKDRVKLGTDYRLHLSPVQIFDDGRKFSCHIRVGPNKILRSSTTVKVF

AKPEIPVIVENNSTDVLVERRFTCLLKNVFPKANITWFIDGSFLHDEKE

GIYITNEERKGKDGFLELKSVLTRVHSNKPAQSDNLTIWCMALSPVPGN

KVWNISSEKITFLLGSEISSTDPPLSVTESTLDTQPSPASSVSPARYPA

TSSVTLVDVSALRPNTTPQPSNSSMTTRGFNYPWTSSGTDTKKSVSRIP

SETYSSSPSGAGSTLHDNVFTSTARAFSEVPTTANGSTKTNHVHITGIV

VNKPKDGM
``` human CD96 extracellular domain, GENBANK® Accession No. NM_198196.2.

An exemplary sequence for component Y comprises or consists of:

```
                                            (SEQ ID NO: 5)
MGHRTLVLPWVLLTLCVTAGTPEVWVQVRMEATELSSFTIRCGFLGSGS

ISLVTVSWGGPNGAGGTTLAVLHPERGIRQWAPARQARWETQSSISLIL
```

-continued

EGSGASSPCANTTFCCKFASFPEGSWEACGSLPPSSDPGLSAPPTPAPI

LRAD human CD112R extracellular domain, GENBANK® Accession No. NM_024070.3.

An exemplary sequence for component Y comprises or consists of:

(SEQ ID NO: 6)
EEVLWHTSVPFAENMSLECVYPSMGILTQVEWFKIGTQQDSIAIFSPTH

GMVIRKPYAERVYFLNSTMASNNMTLFFRNASEDDVGYYSCSLYTYPQG

TWQKVIQVVQSDSFEAAVPSNSHIVSEPGKNVTLTCQPQMTWPVQAVRW

EKIQPRQIDLLTYCNLVHGRNFTSKFPRQIVSNCSHGRWSVIVIPDVTV

SDSGLYRCYLQASAGENETFVMRLTVAEGKTDNQYTLFVA human CD226 extracellular domain, GENBANK® Accession No. NM_006566.3.

An exemplary sequence for component Y comprises or consists of:

(SEQ ID NO: 7)
QNLFTKDVTVIEGEVATISCQVNKSDDSVIQLLNPNRQTIYFRDFRPLK

DSRFQLLNFSSSELKVSLTNVSISDEGRYFCQLYTDPPQESYTTITVLV

PPRNLMIDIQKDTAVEGEEIEVNCTAMASKPATTIRWFKGNTELKGKSE

VEEWSDMYTVTSQLMLKVHKEDDGVPVICQVEHPAVTGNLQTQRYLEVQ

YKPQVHIQMTYPLQGLTREGDALELTCEAIGKPQPVMVTWVRVDDEMPQ

HAVLSGPNLFINNLNKTDNGTYRCEASNIVGKAHSDYMLYVYDPPTTIP

PPTTTTTTTTTTTTTILTIITDSRAGEEGSIRAVDH human NECL2 extracellular domain, GENBANK® Accession No. NM_014333.3.

An exemplary sequence for component Y comprises or consists of:

(SEQ ID NO: 8)
PIIVEPHVTAVWGKNVSLKCLIEVNETITQISWEKIHGKSSQTVAVHHP

QYGFSVQGEYQGRVLFKNYSLNDATITLHNIGFSDSGKYICKAVTFPLG

NAQSSTTVTVLVEPTVSLIKGPDSLIDGGNETVAAICIAATGKPVAHID

WEGDLGEMESTTTSFPNETATIISQYKLFPTRFARGRRITCVVKHPALE

KDIRYSFILDIQYAPEVSVTGYDGNWFVGRKGVNLKCNADANPPPFKSV

WSRLDGQWPDGLLASDNTLHFVHPLTFNYSGVYICKVTNSLGQRSDQKV

IYISDPPTTTTLQPTIQWHPSTADIEDLATEPKKLPFPLSTLATIKDD human CD113 extracellular domain, GENBANK® Accession No. NM_015480.3.

An exemplary sequence for component Y comprises or consists of:

(SEQ ID NO: 9)
AEPHSLRYNLTVLSWDGSVQSGFLTEVHLDGQPFLRCDRQKCRAKPQGQW

AEDVLGNKTWDRETRDLTGNGKDLRMTLAHIKDQKEGLHSLQEIRVCEIH

EDNSTRSSQHFYYDGELFLSQNLETKEWTMPQSSRAQTLAMNVRNFLKED

AMKTKTHYHAMHADCLQELRRYLKSGVVLRRTVPPMVNVTRSEASEGNIT

VTCRASGFYPWNITLSWRQDGVSLSHDTQQWGDVLPDGNGTYQTWVATRI

CQGEEQRFTCYMEHSGNHSTHPVPSGKVLVLQSHW human MICA (MHC-I polypeptide-related sequence A) extracellular domain, GENBANK® Accession No. NM_000247.3.

Leader Sequence

An exemplary sequence for the leader sequence comprises or consists of:

(SEQ ID NO: 10)
MKWVTFISLLFLFSSAYS
human albumin leader sequence.

Hinge

An exemplary sequence for the hinge comprises or consists of:

(SEQ ID NO: 11)
EPKSSDKTHTCPPCPAPELLGG
human IgG hinge.

Component $Z_2$

An exemplary sequence for component $Z_2$ comprises or consists of:

(SEQ ID NO: 12)
PSVFLFPPKPKDTLMISRTPEVTCVVVDVSHEDPEVKFNWYVDGVEVHN

AKTKPREEQYNSTYRVVSVLTVLHQDWLNGKEYKCAVSNKALPAPIEKT

ISKAK

IgG1.

Component $Z_3$

An exemplary sequence for component $Z_3$ comprises or consists of:

(SEQ ID NO: 13)
GQPREPQVCTLPPSRDELTKNQVSLWCLVKGFYPSDIAVEWESNGQPEN

NYKTTPPVLDSDGSFFLYSKLTVDKSRWQQGNVFSCSVLHEALHSHYTQ

KSLSLSPGK

IgG1.

An exemplary sequence for component A comprises or consists of:
Human PD-1-hFcA (SEQ ID NO: 14)
MKWVTFISLLFLFSSAYSASGWFLDSPDRPWNPPTFSPALLVVTEGDNATFTCSFSNTSE

SFVLNWYRMSPSNQTDKLAAFPEDRSQPGQDCRFRVTQLPNGRDFHMSVVRARRN

DSGTYLCGAISLAPKAQIKESLRAELRVTERRAEVPTAHPSPSPRPAGQEPKSSDKTH

TCPPCPAPELLGGPSVFLFPPKPKDTLMISRTPEVTCVVVDVSHEDPEVKENWYVD

GVEVHNAKTKPREEQYNSTYRVVSVLTVLHQDWLNGKEYKCAVSNKALPAPIEKTI

SKAK<u>GQPREPQVCTLPPSRDELTKNQVSLWCLVKGFYPSDIAVEWESNGQPENNYK</u>

<u>TTPPVLDSDGSFFLYSKLTVDKSRWQQGNVFSCSVLHEALHSHYTQKSLSLSPGK</u>

Italics—human albumin leader sequence
Wavy underline—human PD-1 extracellular domain; Y domain
Bold—IgG1 hinge region
Double underline—IgG1 $Z_2$ domain
Bold underline—IgG1 $Z_3$ domain Another exemplary sequence for component A comprises or consists of:
High Affinity Human PD-1-hFcA (SEQ ID NO: 15)
*MKWVTFISLLFLFSSAYS*ASGWFLDSPDRPWNPPTFSPALLVVTEGDNATFTCSFSNTSE

SFHVVWHRESPSGQTDTLAAFPEDRSQPGQDCRFRVTQLPNGRDFHMSVVRARRND

SGTYVCGVISLAPKIQIKESLRAELRVTERRAEVPTAHPSPSPRPAGQEPKSSDKTHT

CPPCPAPELLGGPSVFLFPPKPKDTLMISRTPEVTCVVVDVSHEDPEVKENWYVDG

VEVHNAKTKPREEQYNSTYRVVSVLTVLHQDWLNGKEYKCAVSNKALPAPIEKTIS

Italics—human albumin leader sequence
Wavy underline—high affinity human PD-1 extracellular domain; Y domain
Bold—IgG1 hinge region
Double underline—IgG1 $Z_2$ domain
Bold underline—IgG1 $Z_3$ domain Another exemplary sequence for component A comprises or consists of:
Human CD112R-hFcA (SEQ ID NO: 16)
*MKWVTFISLLFLFSSAYSAS*MGHRTLVLPWVLLTLCVTAGTPEVWVQVRMEATELSSF

TIRCGFLGSGSISLVTVSWGGPNGAGGTTLAVLHPERGIRQWAPARQARWETQSSISL

ILEGSGASSPCANTTFCCKFASFPEGSWEACGSLPPSSDPGLSAPPTPAPILRADEPKSS

DKTHTCPPCPAPELLGGPSVFLFPPKPKDTLMISRTPEVTCVVVDVSHEDPEVKEN

WYVDGVEVHNAKTKPREEQYNSTYRVVSVLTVLHQDWLNGKEYKCAVSNKALPA

PIEKTISKAK<u>GQPREPQVCTLPPSRDELTKNQVSLWCLVKGFYPSDIAVEWESNGQPE</u>

<u>NNYKTTPPVLDSDGSFFLYSKLTVDKSRWQQGNVFSCSVLHEALHSHYTQKSLSLSP</u>

<u>GK</u>

Italics—human albumin leader sequence
Wavy underline—human CD112R extracellular domain; Y domain
Bold—IgG1 hinge region
Double underline—IgG1 $Z_2$ domain
Bold underline—IgG1 $Z_3$ domain Another exemplary sequence for component A comprises or consists of:
Human TIGIT-hFcA (SEQ ID NO: 17)

*MKWVTFISLLFLFSSAYS*MMTGTIETTGNISAEKGGSIILQCHLSSTTAQVTQVNWEQQ

DQLLAICNADLGWHISPSFKDRVAPGPGLGLTLQSLTVNDTGEYFCIYHTYPDGTYT

GRIFLEVLESSVAEHGARFQIPEPKSSDKTHTCPPCPAPELLGGPSVFLFPPKPKDTL

MISRTPEVTCVVVDVSHEDPEVKENWYVDGVEVHNAKTKPREEQYNSTYRVVSVLT

VLHQDWLNGKEYKCAVSNKALPAPIEKTISKAKGQPREPQVCTLPPSRDELTKNQVS

LWCLVKGFYPSDIAVEWESNGQPENNYKTTPPVLDSDGSFFLYSKLTVDKSRWQQG

NVFSCSVLHEALHSHYTQKSLSLSPGK

Italics—human albumin leader sequence
Wavy underline—high affinity human TIGIT extracellular domain; Y domain
Bold—IgG1 hinge region
Double underline—IgG1 $Z_2$ domain
Bold underline—IgG1 $Z_3$ domain Another exemplary sequence for component A comprises or consists of:
Human CD96-hFcA (SEQ ID NO: 18)

VTNKIDLIAVYHPQYGFYCAYGRPCESLVTFTETPENGSKWTLHLRNMSCSVSGRYE

CMLVLYPEGIQTKIYNLLIQTHVTADEWNSNHTIEIEINQTLEIPCFQNSSSKISSEFTY

AWSVENSSTDSWVLLSKGIKEDNGTQETLISQNHLISNSTLLKDRVKLGTDYRLHLSP

VQIFDDGRKFSCHIRVGPNKILRSSTTVKVFAKPEIPVIVENNSTDVLVERRFTCLLKN

VFPKANITWFIDGSFLHDEKEGIYITNEERKGKDGFLELKSVLTRVHSNKPAQSDNLTI

WCMALSPVPGNKVWNISSEKITFLLGSEISSTDPPLSVTESTLDTQPSPASSVSPARYP

ATSSVTLVDVSALRPNTTPQPSNSSMTTRGFNYPWTSSGTDTKKSVSRIPSETYSSSPS

GAGSTLHDNVFTSTARAFSEVPTTANGSTKTNHVHITGIVVNKPKDGMEPKSSDKT

HTCPPCPAPELLGGPSVFLFPPKPKDTLMISRTPEVTCVVVDVSHEDPEVKENWYV

DGVEVHNAKTKPREEQYNSTYRVVSVLTVLHQDWLNGKEYKCAVSNKALPAPIEK

TISKAKGQPREPQVCTLPPSRDELTKNQVSLWCLVKGFYPSDIAVEWESNGQPENNY

KTTPPVLDSDGSFFLYSKLTVDKSRWQQGNVFSCSVLHEALHSHYTQKSLSLSPGK

Italics—human albumin leader sequence
Wavy underline—human CD96 extracellular domain; Y domain
Bold—IgG1 hinge region
Double underline—IgG1 $Z_2$ domain
Bold underline—IgG1 $Z_3$ domain Another exemplary sequence for component A comprises or consists of:
Human CD226-hFcA (SEQ ID NO: 19)

*MKWVTFISLLFLFSSAYS*EEVLWHTSVPFAENMSLECVYPSMGILTQVEWFKIGTQQDS

IAIFSPTHGMVIRKPYAERVYFLNSTMASNNMTLFFRNASEDDVGYYSCSLYTYPQG

TWQKVIQVVQSDSFEAAVPSNSHIVSEPGKNVTLTCQPQMTWPVQAVRWEKIQPRQI

DLLTYCNLVHGRNFTSKFPRQIVSNCSHGRWSVIVIPDVTVSDSGLYRCYLQASAGE

NETFVMRLTVAEGKTDNQYTLFVAEPKSSDKTHTCPPCPAPELLGGPSVFLFPPKP

KDTLMISRTPEVTCVVVDVSHEDPEVKFNWYVDGVEVHNAKTKPREEQYNSTYRV

VSVLTVLHQDWLNGKEYKCAVSNKALPAPIEKTISKAKGQPREPQVCTLPPSRDELT

KNQVSLWCLVKGFYPSDIAVEWESNGQPENNYKTTPPVLDSDGSFFLYSKLTVDKSR

WQQGNVFSCSVLHEALHSHYTQKSLSLSPGK

Italics—human albumin leader sequence
Wavy underline—human CD226 extracellular domain; Y domain
Bold—IgG1 hinge region
Double underline—IgG1 $Z_2$ domain
Bold underline—IgG1 $Z_3$ domain Another exemplary sequence for component A comprises or consists of:
Human NECL2-hFcA (SEQ ID NO: 20)

*MKWVTFISLLFLFSSAYS*QNLFTKDVTVIEGEVATISCQVNKSDDSVIQLLNPNRQTIYF

RDFRPLKDSRFQLLNFSSSELKVSLTNVSISDEGRYFCQLYTDPPQESYTTITVLVPPR

NLMIDIQKDTAVEGEEIEVNCTAMASKPATTIRWFKGNTELKGKSEVEEWSDMYTV

TSQLMLKVHKEDDGVPVICQVEHPAVTGNLQTQRYLEVQYKPQVHIQMTYPLQGLT

REGDALELTCEAIGKPQPVMVTWVRVDDEMPQHAVLSGPNLFINNLNKTDNGTYRC

EASNIVGKAHSDYMLYVYDPPTTIPPPTTTTTTTTTTTTTILTIITDSRAGEEGSIRAVD

HEPKSSDKTHTCPPCPAPELLGGPSVFLFPPKPKDTLMISRTPEVTCVVVDVSHEDP

EVKFNWYVDGVEVHNAKTKPREEQYNSTYRVVSVLTVLHQDWLNGKEYKCAVSN

KALPAPIEKTISKAKGQPREPQVCTLPPSRDELTKNQVSLWCLVKGFYPSDIAVEWES

NGQPENNYKTTPPVLDSDGSFFLYSKLTVDKSRWQQGNVFSCSVLHEALHSHYTQK

SLSLSPGK

Italics—human albumin leader sequence
Wavy underline—human NECL2 extracellular domain; Y domain
Bold—IgG1 hinge region
Double underline—IgG1 $Z_2$ domain
Bold underline—IgG1 $Z_3$ domain Another exemplary sequence for component A comprises or consists of:
Human CD113-hFcA (SEQ ID NO: 21)

*MKWVTFISLLFLFSSAYSA*SPIIVEPHVTAVWGKNVSLKCLIEVNETITQISWEKIHGKSS

QTVAVHHPQYGFSVQGEYQGRVLFKNYSLNDATITLHNIGFSDSGKYICKAVTFPLG

NAQSSTTVTVLVEPTVSLIKGPDSLIDGGNETVAAICIAATGKPVAHIDWEGDLGEME

-continued
STTTSFPNETATIISQYKLFPTRFARGRRITCVVKHPALEKDIRYSFILDIQYAPEVSVT

GYDGNWFVGRKGVNLKCNADANPPPFKSVWSRLDGQWPDGLLASDNTLHFVHPLT

FNYSGVYICKVTNSLGQRSDQKVIYISDPPTTTTLQPTIQWHPSTADIEDLATEPKKLP

FPLSTLATIKDDEEPKSSDKTHTCPPCPAPELLGGPSVELFPPKPKDTLMISRTPEVTC

VVVDVSHEDPEVKFNWYVDGVEVHNAKTKPREEQYNSTYRVVSVLTVLHQDWLN

GKEYKCAVSNKALPAPIEKTISKAKGQPREPQVCTLPPSRDELTKNQVSLWCLVKGF

YPSDIAVEWESNGQPENNYKTTPPVLDSDGSFFLYSKLTVDKSRWQQGNVFSCSVLH

EALHSHYTQKSLSLSPGK

Italics—human albumin leader sequence
Wavy underline—human CD113 extracellular domain; Y domain
Bold—IgG1 hinge region
Double underline—IgG1 $Z_2$ domain
Bold underline—IgG1 $Z_3$ domain
Another exemplary sequence for component A comprises or consists of:
Human MICA-hFcA (MHC-I Polypeptide-Related Sequence A)

(SEQ ID NO: 22)
*MKWVTFISLLFLFSSAYS*ASAEPHSLRYNLTVLSWDGSVQSGFLTEVHLDGQPFLRCDR

QKCRAKPQGQWAEDVLGNKTWDRETRDLTGNGKDLRMTLAHIKDQKEGLHSLQEI

RVCEIHEDNSTRSSQHFYYDGELFLSQNLETKEWTMPQSSRAQTLAMNVRNFLKED

AMKTKTHYHAMHADCLQELRRYLKSGVVLRRTVPPMVNVTRSEASEGNITVTCRA

SGFYPWNITLSWRQDGVSLSHDTQQWGDVLPDGNGTYQTWVATRICQGEEQRFTC

YMEHSGNHSTHPVPSGKVLVLQSHWEPKSSDKTHTCPPCPAPELLGGPSVELFPPK

PKDTLMISRTPEVTCVVVDVSHEDPEVKENWYVDGVEVHNAKTKPREEQYNSTYRV

VSVLTVLHQDWLNGKEYKCAVSNKALPAPIEKTISKAKGQPREPQVCTLPPSRDELT

KNQVSLWCLVKGFYPSDIAVEWESNGQPENNYKTTPPVLDSDGSFFLYSKLTVDKSR

WQQGNVFSCSVLHEALHSHYTQKSLSLSPGK

Italics—human albumin leader sequence
Wavy underline—human MICA extracellular domain; Y domain
Bold—IgG1 hinge region
Double underline—IgG 1 $Z_2$ domain
Bold underline—IgG1 $Z_3$ domain
Human FcA Italics—human albumin leader sequence
Bold—IgG1 hinge region
Double underline—IgG1 $Z_2$ domain
Bold underline—IgG1 $Z_3$ domain Component B Component B comprises Component X', Component $Z_2$' and Component $Z_3$'. In some embodiments, Component X' comprises a virus-derived peptide, a ligand-derived peptide, a receptor-derived peptide or an HTS-selected peptide. In some embodiments, Component X' comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

(SEQ ID NO: 23)
*MKWVTFISLLFLFSSAYSAS*EPKSSDKTHTCPPCPAPELLGGPSVELFPPKPKDTLMIS

RTPEVTCVVVDVSHEDPEVKFNWYVDGVEVHNAKTKPREEQYNSTYRVVSVLTVL

HQDWLNGKEYKCAVSNKALPAPIEKTISKAKGQPREPQVCTLPPSRDELTKNQVSLW

CLVKGFYPSDIAVEWESNGQPENNYKTTPPVLDSDGSFFLYSKLTVDKSRWQQGNV

FSCSVLHEALHSHYTQKSLSLSPGK

Component X'

An exemplary sequence for component X' comprises or consists of:

(SEQ ID NO: 24)
WPPPGTGDVVVQAPTQVPGFLGDSVTLPCYLQVPNMEVTHVSQLTWARH

GESGSMAVFHQTQGPSYSESKRLEFVAARLGAELRNASLRMFGLRVEDE

GNYTCLFVTFPQGSRSVDIWLRVLAKPQNTAEVQKVOLTGEPVPMARCV

STGGRPPAQITWHSDLGGMPNTSQVPGFLSGTVTVTSLWILVPSSQVDG

KNVTCKVEHESFEKPQLLTVNLTVYYPPEVSISGYDNNWYLGQNEATLT

CDARSNPEPTGYNWSTTMGPLPPFAVAQGAQLLIRPVDKPINTTLICNV

TNALGARQAELTVQVKEGPPSEHSGMSRN human CD155 (Polio virus receptor, PVR) extracellular domain, GENBANK® Accession No. NM_006505.5.

An exemplary sequence for component X' comprises or consists of:

(SEQ ID NO: 25)
MMTGTIETTGNISAEKGGSIILQCHLSSTTAQVTQVNWEQQDQLLAICN

ADLGWHISPSFKDRVAPGPGLGLTLQSLTVNDTGEYFCIYHTYPDGTYT

GRIFLEVLESSVAEHGARFQIP human TIGIT (T cell immunoreceptor with Ig and ITIM domains) extracellular domain, GENBANK® Accession No. NM_173799.4.

An exemplary sequence for component X' comprises or consists of:

(SEQ ID NO: 26)
LEDGYKVEVGKNAYLPCSYTLPTSGTLVPMCWGKGFCPWSQCTNELLRT

DERNVTYQKSSRYQLKGDLNKGDVSLIIKNVTLDDHGTYCCRIQFPGLM

NDKKLELKLDIKAAKVTPAQTAHGDSTTASPRTLTTERNGSETQTLVTL

HNNNGTKISTWADEIKDSGETIR

Mouse Tim-3 extracellular domain, GENBANK® Accession No. NM_134250.2. Mouse TIM-3 possesses good binding to human galactin-9.

An exemplary sequence for component X' comprises or consists of:

(SEQ ID NO: 27)
PIIVEPHVTAVWGKNVSLKCLIEVNETITQISWEKIHGKSSQTVAVHHP

QYGFSVQGEYQGRVLFKNYSLNDATITLHNIGFSDSGKYICKAVTFPLG

NAQSSTTVTVLVEPTVSLIKGPDSLIDGGNETVAAICIAATGKPVAHID

WEGDLGEMESTTTSFPNETATIISQYKLFPTRFARGRRITCVVKHPALE

KDIRYSFILDIQYAPEVSVTGYDGNWFVGRKGVNLKCNADANPPPFKSV

WSRLDGQWPDGLLASDNTLHFVHPLTFNYSGVYICKVTNSLGQRSDQKV

IYISDPPTTTTLQPTIQWHPSTADIEDLATEPKKLPFPLSTLATIKDD human CD113 extracellular domain, GENBANK® Accession No. NM_015480.3.

Leader Sequence

An exemplary sequence for the leader sequence comprises or consists of:

(SEQ ID NO: 10)
MKWVTFISLLFLFSSAYS
human albumin leader sequence.

Hinge

An exemplary sequence for the hinge comprises or consists of:

(SEQ ID NO: 11)
EPKSSDKTHTCPPCPAPELLGG
human IgG hinge.

Component Z₂'

An exemplary sequence for component Z₂ comprises or consists of:

(SEQ ID NO: 12)
PSVFLFPPKPKDTLMISRTPEVTCVVVDVSHEDPEVKFNWYVDGVEVHN

AKTKPREEQYNSTYRVVSVLTVLHQDWLNGKEYKCAVSNKALPAPIEKT

ISKAK

IgG1.

Component Z₃'

An exemplary sequence for component Z₃ comprises or consists of:

(SEQ ID NO: 13)
GQPREPQVCTLPPSRDELTKNQVSLWCLVKGFYPSDIAVEWESNGQPEN

NYKTTPPVLDSDGSFFLYSKLTVDKSRWQQGNVFSCSVLHEALHSHYTQ

KSLSLSPGK

IgG1.

An exemplary sequence for component B comprises or consists of:
Human CD155-hFcB (SEQ ID NO: 32)
*MKWVTFISLLFLFSSAYS*ASWPPPGTGDVVVQAPTQVPGFLGDSVTLPCYLQVPNMEV
THVSQLTWARHGESGSMAVFHQTQGPSYSESKRLEFVAARLGAELRNASLRMFGLR
VEDEGNYTCLFVTFPQGSRSVDIWLRVLAKPQNTAEVQKVQLTGEPVPMARCSTG
GRPPAQITWHSDLGGMPNTSQVPGFLSGTVTVTSLWILVPSSQVDGKNVTCKVEHES
FEKPQLLTVNLTVYYPPEVSISGYDNNWYLGQNEATLTCDARSNPEPTGYNWSTTM -continued

GPLPPFAVAQGAQLLIRPVDKPINTTLICNVTNALGARQAELTVQVKEGPPSEHGMS

RNEPKSSDKTHTCPPCPAPELLGGPSVFLPPPKPKDTLMISRTPEVTCVVVDVSHED

PEVKFNWYVDGVEVHNAKTKPREEQYNSTYRVVSVLTVLHQDWLNGKEYKCAVS

NKALPAPIEKTISKAKGQPREPQVYTLPPSRCELTKNQVSLSCAVKGFYPSDIAVEWE

SNGQPENNYKTTPPVLDSDGSFFLVSKLTVDKSRWQQGNVFSCSVLHEALHSHYTQ

KSLSLSPGK

Italics—human albumin leader sequence
Wavy underline—human CD155 (Polio virus receptor, PVR) extracellular domain; X' domain
Bold—IgG1 hinge region
Double underline—IgG1 Z'$_2$ domain
Bold underline—IgG1 Z'$_3$ domain Another exemplary sequence for component B comprises or consists of:

Human TIGIT-hFcB (SEQ ID NO: 33)
*MKWVTFISLLFLFSSAYSAS*MMTGTIETTGNISAEKGGSIILQCHLSSTTAQVTQVNWEQ

QDQLLAICNADLGWHISPSFKDRVAPGPGLGLTLQSLTVNDTGEYFCIYHTYPDGTY

TGRIFLEVLESSVAEHGARFQIPEPKSSDKTHTCPPCPAPELLGGPSVFLFPPPKPKDT

LMISRTPEVTCVVVDVSHEDPEVKFNWYVDGVEVHNAKTKPREEQYNSTYRVVSVL

TVLHQDWLNGKEYKCAVSNKALPAPIEKTISKAKGQPREPQVYTLPPSRCELTKNQV

SLSCAVKGFYPSDIAVEWESNGQPENNYKTTPPVLDSDGSFFLVSKLTVDKSRWQQG

NVFSCSVLHEALHSHYTQKSLSLSPGK

Italics—human albumin leader sequence
Wavy underline—human TIGIT (T cell immunoreceptor with Ig and ITIM domains) extracellular domain; X' domain
Bold—IgG1 hinge region
Double underline—IgG1 Z'$_2$ domain
Bold underline—IgG1 Z'$_3$ domain Another exemplary sequence for component B comprises or consists of:

Mouse TIM-3-hFcB (SEQ ID NO: 34)
*MKWVTFISLLFLFSSAYSAS*LEDGYKVEVGKNAYLPCSYTLPTSGTLVPMCWGKGFCP

WSQCTNELLRTDERNVTYQKSSRYQLKGDLNKGDVSLIIKNVTLDDHGTYCCRIQFP

GLMNDKKLELKLDIKAAKVTPAQTAHGDSTTASPRTLTTERNGSETQTLVTLHNNN

GTKISTWADEIKDSGETIREPKSSDKTHTCPPCPAPELLGGPSVFLFPPPKPKDTLMIS

RTPEVTCVVVDVSHEDPEVKFNWYVDGVEVHNAKTKPREEQYNSTYRVVSVLTVL

HQDWLNGKEYKCAVSNKALPAPIEKTISKAKGQPREPQVYTLPPSRCELTKNQVSLS

CAVKGFYPSDIAVEWESNGQPENNYKTTPPVLDSDGSFFLVSKLTVDKSRWQQGNV

FSCSVLHEALHSHYTQKSLSLSPGK

Italics—human albumin leader sequence
Wavy underline—mouse TIM-3 extracellular domain; X' domain
Bold—IgG1 hinge region
Double underline—IgG1 Z'$_2$ domain
Bold underline—IgG1 Z'$_3$ domain Another exemplary sequence for component B comprises or consists of:
Human CD113-hFcB (SEQ ID NO: 35)

*MKWVTFISLLFLFSSAYSAS*PIIVEPHVTAVWGKNVSLKCLIEVNETITQISWEKIHGKSS

QTVAVHHPQYGFSVQGEYQGRVLFKNYSLNDATITLHNIGFSDSGKYICKAVTFPLG

NAQSSTTVTVLVEPTVSLIKGPDSLIDGGNETVAAICIAATGKPVAHIDWEGDLGEME

STTTSFPNETATIISQYKLFPTRFARGRRITCVVKHPALEKDIRYSFILDIQYAPEVSVT

GYDGNWFVGRKGVNLKCNADANPPPFKSVWSRLDGQWPDGLLASDNTLHFVHPLT

FNYSGVYICKVTNSLGQRSDQKVIYISDPPTTTTLQPTIQWHPSTADIEDLATEPKKLP

FPLSTLATIKDDEPKSSDKTHTCPPCPAPELLGGPSVFLFPPKPKDTLMISRTPEVTC

VVVDVSHEDPEVKFNWYVDGVEVHNAKTKPREEQYNSTYRVVSVLTVLHQDWLN

GKEYKCAVSNKALPAPIEKTISKAKGQPREPQVYTLPPSRCELTKNQVSLSCAVKGF

YPSDIAVEWESNGQPENNYKTTPPVLDSDGSFFLVSKLTVDKSRWQQGNVFSCSVLH

EALHSHYTQKSLSLSPGK

Italics—human albumin leader sequence
Wavy underline—human CD113 extracellular domain; X' domain
Bold—IgG1 hinge region
Double underline—IgG1 Z'$_2$ domain
Bold underline—IgG1 Z'$_3$ domain Human FcB (SEQ ID NO: 36)

*MKWVTFISLLFLFSSAYSAS*EPKSSDKTHTCPPCPAPELLGGPSVFLFPPKPKDTLMIS

RTPEVTCVVVDVSHEDPEVKFNWYVDGVEVHNAKTKPREEQYNSTYRVVSVLTVL

HQDWLNGKEYKCAVSNKALPAPIEKTISKAKGQPREPQVYTLPPSRCELTKNQVSLS

CAVKGFYPSDIAVEWESNGQPENNYKTTPPVLDSDGSFFLVSKLTVDKSRWQQGNV

FSCSVLHEALHSHYTQKSLSLSPGK

Italics—human albumin leader sequence
Bold—IgG1 hinge region
Double underline—IgG1 Z'$_2$ domain
Bold underline—IgG1 Z'$_3$ domain Component B Comprising Component Z$_1$'

In some embodiments, Component B further comprises Component Z1'. Thus, in some embodiments, Component B comprises Component X', Component Z$_1$', Component Z$_2$' and Component Z$_3$'.

In some embodiments, Component X' comprises a virus-derived peptide, a ligand-derived peptide, a receptor-derived peptide or an HTS-selected peptide. In some embodiments, Component X' comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48. In further embodiments, Component X' comprises at least a portion of CD155, TIGIT, TIM-3 or CD113.

Component X'

An exemplary sequence for component X' comprises or consists of:

(SEQ ID NO: 37)

LGASWHRPDKCCLGYQKRPLPQVLLSSWYPTSQLCSKPGVIFLTKRGRQ

VCADKSKDWVKKLMQQLPVTAR vMIPII, GENBANK® Accession No. YP_001129362.

An exemplary sequence for component X' comprises or consists of:

(SEQ ID NO: 38)
LGASWHRPDKCCLGYQKRPLP
V1

An exemplary sequence for component X' comprises or consists of:

(SEQ ID NO: 39)
LGASWHRPDKCALGYQKRPLP
V1Δ

An exemplary sequence for component X' comprises or consists of:

(SEQ ID NO: 40)
LGASWHRPDACALGYQKRPLP
V1Δmut

An exemplary sequence for component X' comprises or consists of:

(SEQ ID NO: 41)
LGASWHRPDKCCLGYQKRPLPQVLLSSWYPTSQL
Vp1

An exemplary sequence for component X' comprises or consists of:

(SEQ ID NO: 42)
LGASWHRPDKCALGYQKRPLPQVLLSSWYPTSQL
Vp1Δ

An exemplary sequence for component X' comprises or consists of:

(SEQ ID NO: 43)
LGASWHRPDACALGYQKRPLPQVLLSSWYPTSQL
Vp1Δmut

Leader Sequence

An exemplary sequence for the leader sequence comprises or consists of:

(SEQ ID NO: 10)
MKWVTFISLLFLFSSAYS
human albumin leader sequence.

Component $Z_1$'

An exemplary sequence for component $Z_1$' comprises or consists of:

(SEQ ID NO: 45)
SSASTKGPSVFPLAPSSKSTSGGTAALGCLVKDYFPEVTVSWNSGALTS

GVHTFPAVLQSSGLYSLSSVVTVPSSSLGTQTYICNVNHKPSNTKVDKK

VX

Hinge

An exemplary sequence for the hinge comprises or consists of:

(SEQ ID NO: 11)
EPKSSDKTHTCPPCPAPELLGG

Component $Z_2$'

An exemplary sequence for component $Z_2$' comprises or consists of:

(SEQ ID NO: 12)
PSVFLFPPKPKDTLMISRTPEVTCVVVDVSHEDPEVKFNWYVDGVEVHN

AKTKPREEQYNSTYRVVSVLTVLHQDWLNGKEYKCAVSNKALPAPIEKT

ISKAK

Component $Z_3$'

An exemplary sequence for component $Z_3$' comprises or consists of:

(SEQ ID NO: 48)
GQPREPQVYTLPPSRCELTKNQVSLSCAVKGFYPSDIAVEWESNGQPEN

NYKTTPPVLDSDGSFFLVSKLTVDKSRWQQGNVFSCSVLHEALHSHYTQ

KSLSLSPGK

An exemplary sequence for component B comprises or consists of:

vMIPII-CH' - hFcB (SEQ ID NO: 49)
*MKWVTFISLLFLFSSAYS*LGASWHRPDKCCLGYQKRPLPQVLLSSWYPTSQLCSKPGVI

FLTKRGRQVCADKSKDWVKKLMQQLPVTARSSASTKGPSVFPLAPSSKSTSGGTA

ALGCLVKDYFPEVTVSWNSGALTSGVHTFPAVLQSSGLYSLSSVVTVPSSSLGTQ

TYICNVNHKPSNTKVDKKVXEPKSSDKTHTCPPCPAPELLGGPSVFLFPPKPKDTL

MISRTPEVTCVVVDVSHEDPEVKENWYVDGVEVHNAKTKPREEQYNSTYRVVSVLT

VLHQDWLNGKEYKCAVSNKALPAPIEKTISKAKGQPREPQVYTLPPSRCELTKNQVS

LSCAVKGFYPSDIAVEWESNGQPENNYKTTPPVLDSDGSFFLVSKLTVDKSRWQQG

NVFSCSVLHEALHSHYTQKSLSLSPGK

Italic—human albumin leader sequence

Wavy underline —vMIPII

Bold Wavy underline Amino acid differences between V1, V1Δ and V1Δmut

Bold underline —CH'

Bold—IgG1 hinge region

Double underline—IgG1 $Z'_2$ domain

Bold underline —IgG1 $Z'_3$ domain

An exemplary sequence for component B comprises or consists of:

```
V1-CH' - hFcB
                                                  (SEQ ID NO: 50)
MKWVTFISLLFLFSSAYSLGASWHRPDKCCLGYQKRPLPSSASTKGPSVFPLAPSSKS

TSGGTAALGCLVKDYFPEVTVSWNSGALTSGVHTFPAVLQSSGLYSLSSVVTVPS

SSLGTQTYICNVNHKPSNTKVDKKVXEPKSSDKTHTCPPCPAPELLGGPSVFLFP

PKPKDTLMISRTPEVTCVVVDVSHEDPEVKFNWYVDGVEVHNAKTKPREEQYNSTY

RVVSVLTVLHQDWLNGKEYKCAVSNKALPAPIEKTISKAKGQPREPQVYTLPPSRCE

LTKNQVSLSCAVKGFYPSDIAVEWESNGQPENNYKTTPPVLDSDGSFFLVSKTVDK

SRWQQGNVFSCSVLHEALHSHYTQKSLSLSPGK
```

Italics—human albumin leader sequence

Wavy underline —V1 (V1 is the first 21 amino acids of VMIPII)

Bold Wavy underline —Amino acid differences between V1, V1Δ and V1Δmut

Bold underline —CH'

Bold—IgG1 hinge region

Double underline—IgG1 $Z'_2$ domain

Bold underline —IgG1 $Z'_3$ domain

An exemplary sequence for component B comprises or consists of:

```
V1Δ-CH' - hFcB
                                                  (SEQ ID NO: 51)
MKWVTFISLLFLFSSAYSLGASWHRPDKCALGYQKRPLP

SSASTKGPSVFPLAPSSKSTSGGTAALGCLVKDYFPEVTVSWNSGALTSGVHTFP

AVLQSSGLYSLSSVVTVPSSSLGTQTYICNVNHKPSNTKVDKKVXEPKSSDKTHT

CPPCPAPELLGGPSVFLFPPKPKDTLMISRTPEVTCVVVDVSHEDPEVKFNWYVDG

VEVHNAKTKPREEQYNSTYRVVSVLTVLHQDWLNGKEYKCAVSNKALPAPIEKTIS

KAKGQPREPQVYTLPPSRCELTKNQVSLSCAVKGFYPSDIAVEWESNGQPENNYKTT

PPVLDSDGSFFLVSKLTVDKSRWQQGNVFSCSVLHEALHSHYTQKSLSLSPGK
```

Italics—human albumin leader sequence

Wavy underline —V1Δ(V1Δ is V1 with a C to A mutation at amino acid 11 that increases dimerization of two V1 peptides)

Bold Wavy underline —Amino acid differences between V1, V1Δ and V1Δmut

Bold underline —CH'

Bold—IgG1 hinge region

Double underline—IgG1 $Z'_2$ domain

Bold underline —IgG1 $Z'_3$ domain

An exemplary sequence for component B comprises or consists of:

V1Δmut-CH' - hFcB (SEQ ID NO: 52)

*MKWVTFISLLFLFSSAYS*LGASWHRPDACALGYQKRPLP

SSASTKGPSVFPLAPSSKSTSGGTAALGCLVKDYFPEVTVSWNSGALTSGVHTFP

AVLQSSGLYSLSSVVTVPSSSLGTQTYICNVNHKPSNTKVDKKVXEPKSSDKTHT

CPPCPAPELLGGPSVELFPPKPKDTLMISRTPEVTCVVVDVSHEDPEVKENWYVDG

VEVHNAKTKPREEQYNSTYRVVSVLTVLHQDWLNGKEYKCAVSNKALPAPIEKTIS

KAKGQPREPQVYTLPPSRCELTKNQVSLSCAVKGFYPSDIAVEWESNGQPENNYKTT

PPVLDSDGSFFLVSKLTVDKSRWQQGNVFSCSVLHEALHSHYTQKSLSLSPGK

Italics—human albumin leader sequence

Wavy underline—V1Δmut (V1Δmut has the same C to A mutation at amino acid 11 as V1 but a K to A mutation at amino acid 9 was added that prevents receptor binding)

Bold Wavy underline—Amino acid differences between V1, V1Δ and V1Δmut

Bold underline—CH'

Bold—IgG1 hinge region

Double underline—IgG1 $Z'_2$ domain

Bold underline—IgG1 $Z'_3$ domain

An exemplary sequence for component B comprises or consists of:

Vp1-CH' - hFcB (SEQ ID NO: 53)

*MKWVTFISLLFLFSSAYS*LGASWHRPDKCCLGYQKRPLPQVLLSSWYPTSQLSSASTK

GPSVFPLAPSSKSTSGGTAALGCLVKDYFPEVTVSWNSGALTSGVHTFPAVLQSS

GLYSLSSVVTVPSSSLGTQTYICNVNHKPSNTKVDKKVXEPKSSDKTHTCPPCPA

PELLGGPSVFLFPPKPKDTLMISRTPEVTCVVVDVSHEDPEVKENWYVDGVEVHNA

KTKPREEQYNSTYRVVSVLTVLHQDWLNGKEYKCAVSNKALPAPIEKTISKAKGQP

REPQVYTLPPSRCELTKNQVSLSCAVKGFYPSDIAVEWESNGQPENNYKTTPPVLDS

DGSFFLVSKLTVDKSRWQQGNVFSCSVLHEALHSHYTQKSLSLSPGK

Italics—human albumin leader sequence

Wavy underline—Vp1 (Vp1 is the first 34 amino acids of vMIPII)

Bold Wavy underline—Amino acid differences between V1, V1Δ and V1Δmut

Bold underline—CH'

Bold—IgG1 hinge region

Double underline—IgG1 $Z'_2$ domain

Bold underline—IgG1 $Z'_3$ domain

An exemplary sequence for component B comprises or consists of:

Vp1Δ-CH' - hFcB (SEQ ID NO: 54)

*MKWVTFISLLFLFSSAYS*LGASWHRPDKCALGYQKRPLPQVLLSSWYPTSQLSSASTK

GPSVFPLAPSSKSTSGGTAALGCLVKDYFPEVTVSWNSGALTSGVHTFPAVLQSS

GLYSLSSVVTVPSSSLGTQTYICNVNHKPSNTKVDKKVXEPKSSDKTHTCPPCPA

PELLGGPSVELFPPKPKDTLMISRTPEVTCVVVDVSHEDPEVKENWYVDGVEVHNA

KTKPREEQYNSTYRVVSVLTVLHQDWLNGKEYKCAVSNKALPAPIEKTISKAKGQP

REPQVYTLPPSRCELTKNQVSLSCAVKGFYPSDIAVEWESNGQPENNYKTTPPVLDS

DGSFFLVSKLTVDKSRWQQGNVFSCSVLHEALHSHYTQKSLSLSPGK

Italics—human albumin leader sequence
Wavy underline—Vp1Δ
Bold Wavy underline—Amino acid differences between V1, V1Δ and V1Δmut
Bold underline—CH'
Bold—IgG1 hinge region
Double underline—IgG1 Z'$_2$ domain
Bold underline—IgG1 Z'$_3$ domain Vp1Δmut-CH' - hFcB (SEQ ID NO: 55)

*MKWVTFISLLFLFSSAYS*LGASWHRPDACALGYQKRPLPQVLLSSWYPTSQLSSASTK
GPSVFPLAPSSKSTSGGTAALGCLVKDYFPEVTVSWNSGALTSGVHTFPAVLQSS
GLYSLSSVVTVPSSSLGTQTYICNVNHKPSNTKVDKKVXEPKSSDKTHTCPPCPA
PELLGGPSVFLFPPKPKDTLMISRTPEVTCVVVDVSHEDPEVKFNWYVDGVEVHNA
KTKPREEQYNSTYRVVSVLTVLHQDWLNGKEYKCAVSNKALPAPIEKTISKAK
REPQVYTLPPSRCELTKNQVSLSCAVKGFYPSDIAVEWESNGQPENNYKTTPPVLDS
DGSFFLVSKLTVDKSRWQQGNVFSCSVLHEALHSHYTQKSLSLSPGK Italics—human albumin leader sequence
Wavy underline—Vp1Δmut
Bold Wavy underline—Amino acid differences between V1, V1Δ and V1Δmut
Bold underline—CH'
Bold—IgG1 hinge region
Double underline—IgG1 Z'$_2$ domain
Bold underline—IgG1 Z'$_3$ domain Component C In some embodiments, the fusion protein further comprises Component C, wherein Component C comprises Component X and Component $C_L$'.

Component X

An exemplary sequence for component X comprises or consists of:

(SEQ ID NO: 37)
LGASWHRPDKCCLGYQKRPLPQVLLSSWYPTSQLCSKPGVIFLTKRGRQ
VCADKSKDWVKKLMQQLPVTAR vMIPII, GENBANK® Accession No. YP_001129362.

An exemplary sequence for component X comprises or consists of:

(SEQ ID NO: 38)
LGASWHRPDKCCLGYQKRPLP
V1

An exemplary sequence for component X comprises or consists of:

(SEQ ID NO: 39)
LGASWHRPDKCALGYQKRPLP
V1Δ

An exemplary sequence for component X comprises or consists of:

(SEQ ID NO: 40)
LGASWHRPDACALGYQKRPLP
V1Δmut

An exemplary sequence for component X comprises or consists of:

(SEQ ID NO: 41)
LGASWHRPDKCCLGYQKRPLPQVLLSSWYPTSQL
Vp1

An exemplary sequence for component X comprises or consists of:

Vp1Δ
(SEQ ID NO: 42)
LGASWHRPDKCALGYQKRPLPQVLLSSWYPTSQL

An exemplary sequence for component X comprises or consists of:

Vp1Δmut
(SEQ ID NO: 43)
LGASWHRPDACALGYQKRPLPQVLLSSWYPTSQL

In some embodiments, Component X and Component X' are the same. In further embodiments, Component X and Component X' are different.

Leader Sequence

An exemplary sequence for the leader sequence comprises or consists of:

human albumin leader sequence
(SEQ ID NO: 10)
MKWVTFISLLFLFSSAYS

Component $C_L$'

An exemplary sequence for component $C_L$' comprises or consists of:

(SEQ ID NO: 64)
KRTVAAPSVFIFPPSDEQLKSGTASVVCLLNNFYPREAKVQWKVDNALQS
GNSQESVTEQDSKDSTYSLSSTLTLSKADYEKHKVYACEVTHQGLSSPVT
KSFNRGEC

An exemplary sequence for component C comprises or consists of:

vMIPII-CL'
(SEQ ID NO: 57)
*MKWVTFISLLFLFSSAYS*
LGASWHRPDKCCLGYQKRPLPQVLLSSWYPTSQLCSKPGVI
FLTKRGRQVCADKSKDWVKKLMQQLPVTARKRTVAAPSVFIFPPSDEQLK
SGTASVVCLLNNFYPREAKVQWKVDNALQSGNSQESVTEQDSKDSTYSLS
STLTLSKADYEKHKVYACEVTHQGLSSPVTKSFNRGEC

Italics—human albumin leader sequence

Wavy underline —vMIPII

Bold Wavy underline —Amino acid differences between V1, V1Δ and V1Δmut

Bold underline —CL'

An exemplary sequence for component C comprises or consists of:

V1-CL'
(SEQ ID NO: 58)

*MKWVTFISLLFLFSSAYS*LGASWHRPDKCCLGYQKRPLPKRTVAAPSVFI

FPPSDEQLKSGTASVVCLLNNFYPREAKVQWKVDNALQSGNSQESVTEQD

SKDSTYSLSSTLTLSKADYEKHKVYACEVTHQGLSSPVTKSFNRGEC

Italics—human albumin leader sequence

Wavy underline —Wavy underline—V1

Bold Wavy underline —Amino acid differences between V1, V1Δ and V1Δmut

Bold underline —CL'

An exemplary sequence for component C comprises or consists of:

V1Δ-CL'
(SEQ ID NO: 59)

*MKWVTFISLLFLFSSAYS*LGASWHRPDKCALGYQKRPLPKRTVAAPSVFI

FPPSDEQLKSGTASVVCLLNNFYPREAKVQWKVDNALQSGNSQESVTEQD

SKDSTYSLSSTLTLSKADYEKHKVYACEVTHQGLSSPVTKSFNRGEC

Italics—human albumin leader sequence

Wavy underline —V1Δ

Bold Wavy underline —Amino acid differences between V1, V1Δ and V1Δmut

Bold underline —CL'

An exemplary sequence for component C comprises or consists of:

V1Δmut-CL'
(SEQ ID NO: 60)

*MKWVTFISLLFLFSSAYS*LGASWHRPDACALGYQKRPLPKRTVAAPSVFI

FPPSDEQLKSGTASVVCLLNNFYPREAKVQWKVDNALQSGNSQESVTEQD

SKDSTYSLSSTLTLSKADYEKHKVYACEVTHQGLSSPVTKSFNRGEC

Italics—human albumin leader sequence

Wavy underline —V1Δmut

Bold Wavy underline —Amino acid differences between V1, V1Δ and V1Δmut

Bold underline —CL'

An exemplary sequence for component C comprises or consists of:

Vp1-CL'

(SEQ ID NO: 61)

*MKWVTFISLLFLFSSAYS*

LGASWHRPDKCCLGYQKRPLPQVLLSSWYPTSQLKRTVAAPSVFIFPPS

DEQLKSGTASVVCLLNNFYPREAKVQWKVDNALQSGNSQESVTEQDSKDS

TYSLSSTLTLSKADYEKHKVYACEVTHQGLSSPVTKSFNRGEC

Italics—human albumin leader sequence

Wavy underline —Vp1

Bold Wavy underline —Amino acid differences between V1, V1Δ and V1Δmut

Bold underline —CL'

An exemplary sequence for component C comprises or consists of:

Vp1Δ-CL'

(SEQ ID NO: 62)

*MKWVTFISLLFLFSSAYS*

LGASWHRPDKCALGYQKRPLPQVLLSSWYPTSQLKRTVAAPSVFIFPPSD

EQLKSGTASVVCLLNNFYPREAKVQWKVDNALQSGNSQESVTEQDSKDST

YSLSSTLTLSKADYEKHKVYACEVTHQGLSSPVTKSFNRGEC

Italics—human albumin leader sequence

Wavy underline —Vp1A

Bold Wavy underline —Amino acid differences between V1, V1Δ and V1Δmut

Bold underline —CL'

An exemplary sequence for component C comprises or consists of:

Vp1Δmut-CL'

(SEQ ID NO: 63)

*MKWVTFISLLFLFSSAYS*

LGASWHRPDACALGYQKRPLPQVLLSSWYPTSQLKRTVAAPSVFIFPPS

DEQLKSGTASVVCLLNNFYPREAKVQWKVDNALQSGNSQESVTEQDSKD

STYSLSSTLTLSKADYEKHKVYACEVTHQGLSSPVTKSFNRGEC

Italics—human albumin leader sequence

Wavy underline —Vp1Δmut

Bold Wavy underline —Amino acid differences between V1, V1Δ and V1Δmut

Bold underline —CL'

Component D

In some embodiments, the fusion protein further comprises Component D, wherein Component D comprises Component Q and Component $C_L$. In some embodiments, Component Q comprises at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

An exemplary sequence for Component Q comprises or consists of SEQ ID NO: 1, 2, 3, 4, 5, 6, 7, 8, or 9. In some embodiments, Component Q and Component Y are the same. In further embodiments, Component Q and Component Y are different.

Component $C_L$

An exemplary sequence for component $C_L$ comprises or consists of:

(SEQ ID NO: 64)
KRTVAAPSVFIFPPSDEQLKSGTASVVCLLNNFYPREAKVQWKVDNALQS

GNSQESVTEQDSKDSTYSLSSTLTLSKADYEKHKVYACEVTHQGLSSPVT

KSFNRGEC

Configuration of Fusion Protein

In some embodiments of the fusion protein of the present invention, when prepared by recombinant methods described elsewhere herein, the coding sequences of the components of Component A are fused together in frame, either directly or through a linker. As used herein, the term "directly" refers to a fusion of the two components without a peptide linker in between (i.e., in an expression construct, the codons encoding Component Y, Component $Z_2$ and Component $Z_3$ are contiguous). As used herein, "fused in frame" means that the expression of the fused coding sequences results in the fusion protein comprising all of the polypeptide components, e.g., in some embodiments Component A comprises all of the polypeptide components of Component Y, Component $Z_2$ and Component $Z_3$ in frame.

In some embodiments of the fusion protein of the present invention, when prepared by recombinant methods described elsewhere herein, the coding sequences of the components of Component B are fused together in frame, either directly or through a linker. In some embodiments in an expression construct for Component B, the codons encoding Component X', Component $Z_2$ and Component $Z_3$' are contiguous. In further embodiments, in an expression construct for component B, the codons encoding Component X', Component $Z_1$', Component $Z_2$ and Component $Z_3$' are contiguous. In some embodiments, Component B comprises all of the polypeptide components of Component X', Component $Z_2$ and Component $Z_3$' in frame. In further embodiments, Component B comprises all of the polypeptide components of Component X', Component $Z_1$', Component $Z_2$' and Component $Z_3$' in frame.

In some embodiments of the fusion protein of the present invention, when prepared by recombinant methods described elsewhere herein, the coding sequences of the components of Component C are fused together in frame, either directly or through a linker. In some embodiments in an expression construct for Component C, the codons encoding Component X and Component $C_L$' are contiguous. In some embodiments, Component C comprises all of the polypeptide components of Component X and Component $C_L$' in frame.

In some embodiments, any Component A and any Component B can be mixed and matched with each other. In some exemplary embodiments of the fusion protein of the invention, Component A and Component B are as shown in Table 1. In some embodiments, Component A and Component B from Table 1 can be mixed and matched with each other and with additional Component A and Component B options. Said additional options can also be mixed and matched with each other. Additional options of Component A or Component B may comprise at least a portion of PD-1, TIGIT, CD96, CD112R, CD113, CD155, CD111, CD112, MHC-I polypeptide-related sequence A (MICA), NKG2A (CD94), MICB, ULBP1-5, TIM-3, CD226, NECL2, CRTAM, CD80, CTLA-4, KIR2DL1/2/3, or CD48.

In some embodiments, the fusion protein comprises a Component A and hFcB. In some embodiments, the fusion protein comprises a Component B and hFcA.

In some exemplary embodiments, one component of the fusion protein blocks an inhibitory receptor, and two other components of the fusion protein each trigger distinct activating receptors. In a preferred embodiment, these three receptors are co-located on the surface of the same immune effector cell, e.g., an NK cell, and the fusion protein's three interactions, consisting of a combination of inhibitory receptor blockade and activating receptor triggering, serve to reinforce each other, all three cooperatively driving activation of the NK cell.

In other exemplary embodiments, two components of the fusion protein each block distinct inhibitory receptors, and one other component of the fusion protein triggers an activating receptor. In a preferred embodiment, these three receptors are co-located on the surface of the same immune effector cell, e.g., an NK cell, and the fusion protein's three interactions, consisting of a combination of inhibitory receptor blockade and activating receptor triggering, serve to functionally reinforce each other, all three cooperatively driving activation of the NK cell.

In yet other exemplary embodiments, three components of the fusion protein each triggers an activating receptor. In a preferred embodiment, these three receptors are co-located on the surface of the same immune effector cell, e.g., an NK cell, and the fusion protein's three interactions, all consisting of activating receptor triggering, serve to functionally reinforce each other, all three cooperatively driving activation of the NK cell.

For NK cells, an activating receptor in the aforementioned embodiments can be the $Fc_\gamma RIIIa$ receptor that drives NK cell activation and promotes antibody-dependent cellular cytotoxicity (ADCC) and antibody-dependent cellular phagocytosis (ADCP).

TABLE 1

Exemplary Components A and B

| Component A | Component B |
| --- | --- |
| Human PD-1-hFcA (SEQ ID NO: 14) | Human CD155-hFcB (SEQ ID NO: 32) |
| High affinity (HA) human PD-1-hFcA (SEQ ID NO: 15) | Human TIGIT-hFcB (SEQ ID NO: 33) |
| Human CD112R-hFcA (SEQ ID NO: 16) | Mouse TIM-3-hFcB (SEQ ID NO: 34) |
| Human CD113-hFcA (SEQ ID NO: 21) | Human CD113-hFcB (SEQ ID NO: 35) |
| Human MICA-hFcA (SEQ ID NO: 22) | |
| Human CD96-hFcA (SEQ ID NO: 18) | |
| Human TIGIT-hFcA (SEQ ID NO: 17) | |
| Human CD226-hFcA (SEQ ID NO: 19) | |
| Human NECL2-hFcA (SEQ ID NO: 20) | |

In some exemplary embodiments, the fusion protein comprises Component B and Component C. In some embodiments, any Component B and any Component C can be mixed and matched with each other. In some embodiments, Component B and Component C are as shown in Table 2. In some embodiments, each row of Table 2 shows a pairing of a Component B and a Component C in a fusion protein.

TABLE 2

| Component B | Component C |
| --- | --- |
| vMIPII-CH'-hFcB (SEQ ID NO: 49) | vMIPII-CL' (SEQ ID NO: 57) |
| V1-CH'-hFcB (SEQ ID NO: 50) | V1-CL' (SEQ ID NO: 58) |
| V1Δ-CH'-hFcB (SEQ ID NO: 51) | V1Δ-CL' (SEQ ID NO: 59) |
| V1Δmut-CH'-hFcB (SEQ ID NO: 52) | V1Δmut-CL' (SEQ ID NO: 60) |
| Vp1-CH'-hFcB (SEQ ID NO: 53) | Vp1-CL' (SEQ ID NO: 61) |
| Vp1Δ-CH'-hFcB (SEQ ID NO: 54) | Vp1Δ-CL' (SEQ ID NO: 62) |
| Vp1Δmut-CH'-hFcB (SEQ ID NO: 55) | Vp1Δmut-CL' (SEQ ID NO: 63) |

In some embodiments, Component A and Component B are held together via disulfide bond stabilized knobs-into-holes interactions (KiH$_{S-S}$). In some embodiments, Component A comprises mutations Y349C and T366W (e.g. SEQ ID NO: 29), and Component B comprises mutations D356C, T366S, L368A and Y407V (e.g. SEQ ID NO: 30) ("Knobs-into-holes" mutations), enabling the enforced dimerization of Component A and Component B. The $Z_1$, $Z_2$ and $Z_3$ components are based upon the polypeptide amino acid backbone of the CH1, CH2 and CH3 domains of human IgG1, respectively. The positions of mutations and alterations in these component chains are defined by the Kabat numbering convention (Johnson, G and Wu, T T (2011) *Nucleic Acids Res.*, 28(1), 214-18) and are based upon the wild-type human IgG1 sequence.

Wild-Type Human IgG1 (CH1, CH2 and CH3 Domains) (Beginning with Amino Acid Number 118)

(SEQ ID NO: 28)
A$_{118}$STKGPSVFPLAPSSKSTSGGTAALGCLVKDYFPEPVTVSWNSGALT

SGVHTFPAVLQSSGLYSLSSVVTVPSSSLGTQTYIC$_{200}$NVNHKPSNT

KVDKKVEPKSCDKTHTCPPCPAPELLGGPSVFLFPPKPKDTLMISRTPEV

TCVVVDVSHEDPEVKENWYVDGVEVHNAKTKPREEQYNSTY$_{300}$RVVSVL

TVLHQDWLNGKEYKCKVSNKALPAPIEKTISKAKGQPREPQVYTLPPSRDE

LTKNQVSLTCLVKGFYPSDIAVEWESNGQPENNYKTTPPVLDSDGSFFLY

SKLTVDKSRWQQGNVESCSVMHEALHNHYTQKSLSLSPGK$_{447}$

Wavy underline—IgG1 $Z_1$ domain
Bold—IgG1 hinge region
Double underline—IgG1 $Z_2$ domain
Bold underline—IgG1 $Z_3$ domain In some embodiments, Component A comprises or consists of the following sequence (Y349C and T366W):

(SEQ ID NO: 29)
A$_{118}$STKGPSVFPLAPSSKSTSGGTAALGCLVKDYFPEPVTVSWNSGALT

SGVHTFPAVLQSSGLYSLSSVVTVPSSSLGTQTYIC$_{200}$NVNHKPSNT

KVDKKVEPKSS*DKTHTCPPCPAPELLGGPSVELFPPKPKDTLMISRTPEV

TCVVVDVSHEDPEVKENWYVDGVEVHNAKTKPREEQYNSTY$_{300}$RVVSVL

TVLHQDWLNGKEYKCA**VSNKALPAPIEKTISKAKGQPREPQVCTLPPS

RDELTKNQVSLTCLVKGFYPSDIAVEWESNGQPENNYKTTPPVLDSDGSF

FLYSKLTVDKSRWQQGNVESCSVL*HEALHNS*YTQKSLSLSPG

K$_{447}$

Wavy underline—IgG1 $Z_1$ domain (SEQ ID NO: 67) (see e.g. FIG. 1a)
Bold—IgG1 hinge region (SEQ ID NO: 68)
S*—Compared to wild-type, this mutation was added to the hinge region to eliminate an unpaired cysteine (C) which could bind aberrantly to another cysteine
Double underline—IgG1 $Z_2$ domain (SEQ ID NO: 69)
A**—Mutation added to reduce C1q binding (see e.g. FIG. 1a)
Bold underline—IgG1 $Z_3$ domain (SEQ ID NO: 44)
L* and S*—Mutations added to increase FcRn binding (see e.g. FIG. 1a)

In some embodiments, Component B comprises or consists of the following sequence (D356C, T366S, L368A and Y407V):

(SEQ ID NO: 30)
A$_{118}$STKGPSVFPLAPSSKSTSGGTAALGCLVKDYFPEPVTVSWNSGALT

SGVHTFPAVLQSSGLYSLSSVVTVPSSSLGTQTYIC$_{200}$NVNHKPSNT

KVDKKVEPKSSDKTHTCPPCPAPELLGGPSVELFPPKPKDTLMISRTPEV

TCVVVDVSHEDPEVKENWYVDGVEVHNAKTKPREEQYNSTY$_{300}$RVVSVL

TVLHQDWLNGKEYKCAVSNKALPAPIEKTISKAKGQPREPQVYTLPPS

RCELTKNQVSLSCAVKGFYPSDIAVEWESNGQPENNYKTTPPVLDSDGSF

FLVSKLTVDKSRWQQGNVESCSVLHEALHSHYTQKSLSLSPGK$_{447}$

Wavy underline—IgG1 $Z_1$' domain

The components shown in Tables 1 and 2 are meant to be exemplary and non-limiting.

In some exemplary embodiments, one component of the fusion protein blocks a receptor on a tumor cell that contributes to said tumor cell's tumorigenicity and/or metastatic potential; a second component of the fusion protein blocks a checkpoint inhibitor on said tumor cell; and a third component of the fusion protein triggers an activating receptor on an immune effector cell. Without wishing to be bound by theory, the fusion protein serves to molecularly bridge an immune effector cell and a target tumor cell, and the second and third components of the fusion protein serve to reinforce each other through a combination of blocking a checkpoint inhibitor and triggering an activating receptor on an immune effector cell, e.g., an NK cell, together cooperatively driving activation of said immune effector cell.

Figure 5:
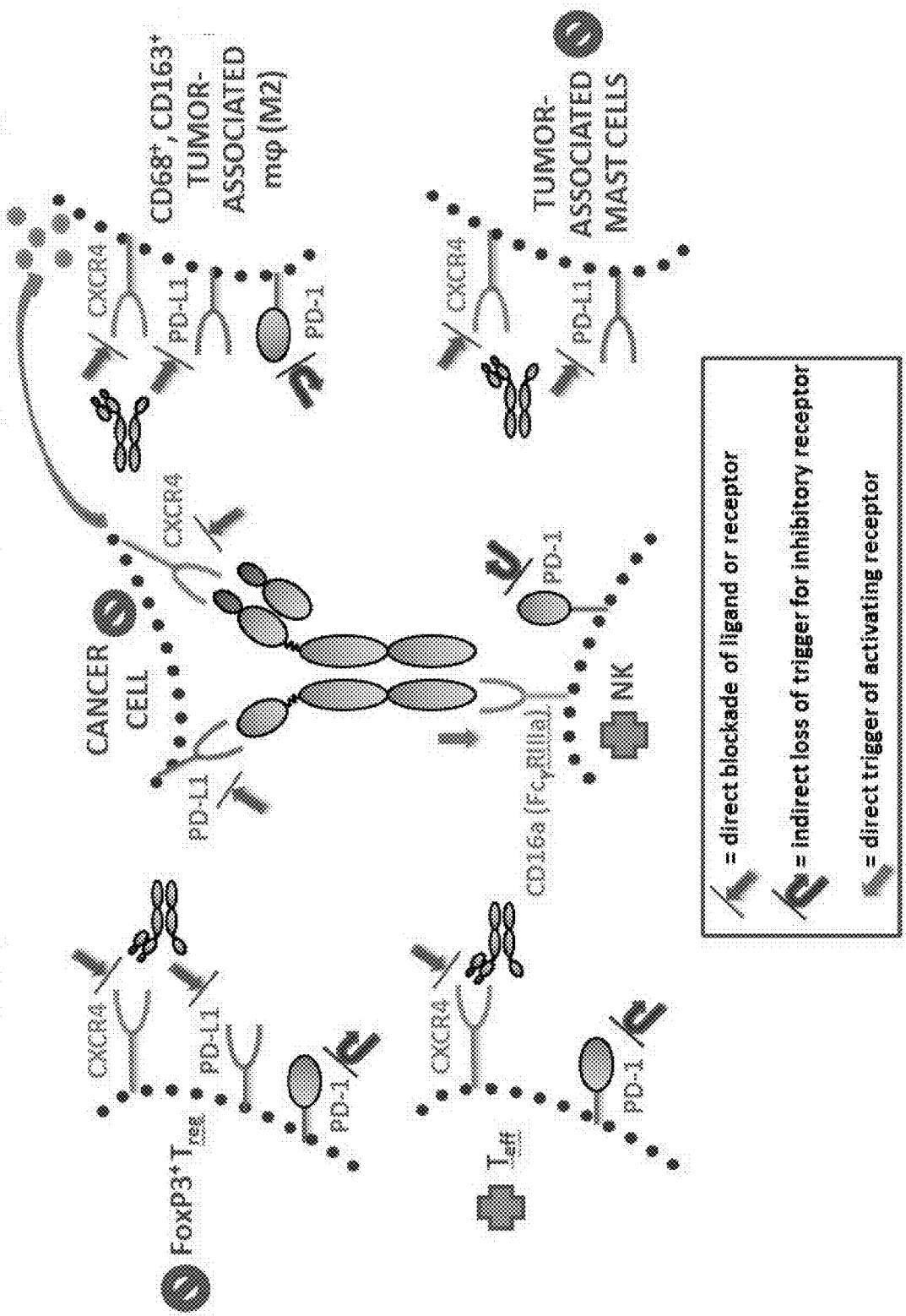
FIG. 5 is a schematic representation of the possible interaction(s) with various types of cells of a fusion protein that binds CXCR4, PD-L1 and FcγRIIIa.

In a preferred embodiment, said first component of the fusion protein blocks a chemokine receptor, e.g., CXCR4 and/or CXCR7 (via binding of a vMIPII or V1 peptide or derivatives thereof in the fusion protein), and this blockade serves to immobilize the tumor cells and interfere with its migratory, invasive, metastatic, and other tumorigenic properties; said second component of the fusion protein blocks a checkpoint inhibitor on said tumor cell, e.g., PD-L1 and/or PD-L2 (via binding of PD1 or derivatives thereof in the fusion protein), and this blockade serves to interfere with inhibition of a tumor-directed immune effector cell, e.g., an NK cell; and said third component of the fusion protein, triggers an activating receptor on the same immune effector cell, e.g., the Fc$_\gamma$RIIIa receptor (via binding of Fc$_\gamma$ or derivatives thereof in the fusion protein), that drives NK cell activation and promotes ADCC and ADCP. A beneficial feature of said embodiment is the same fusion protein also coordinately modulates other immune cells, beyond NK cells, with a net anti-tumor effect (See FIG. 5).

Figure 6:
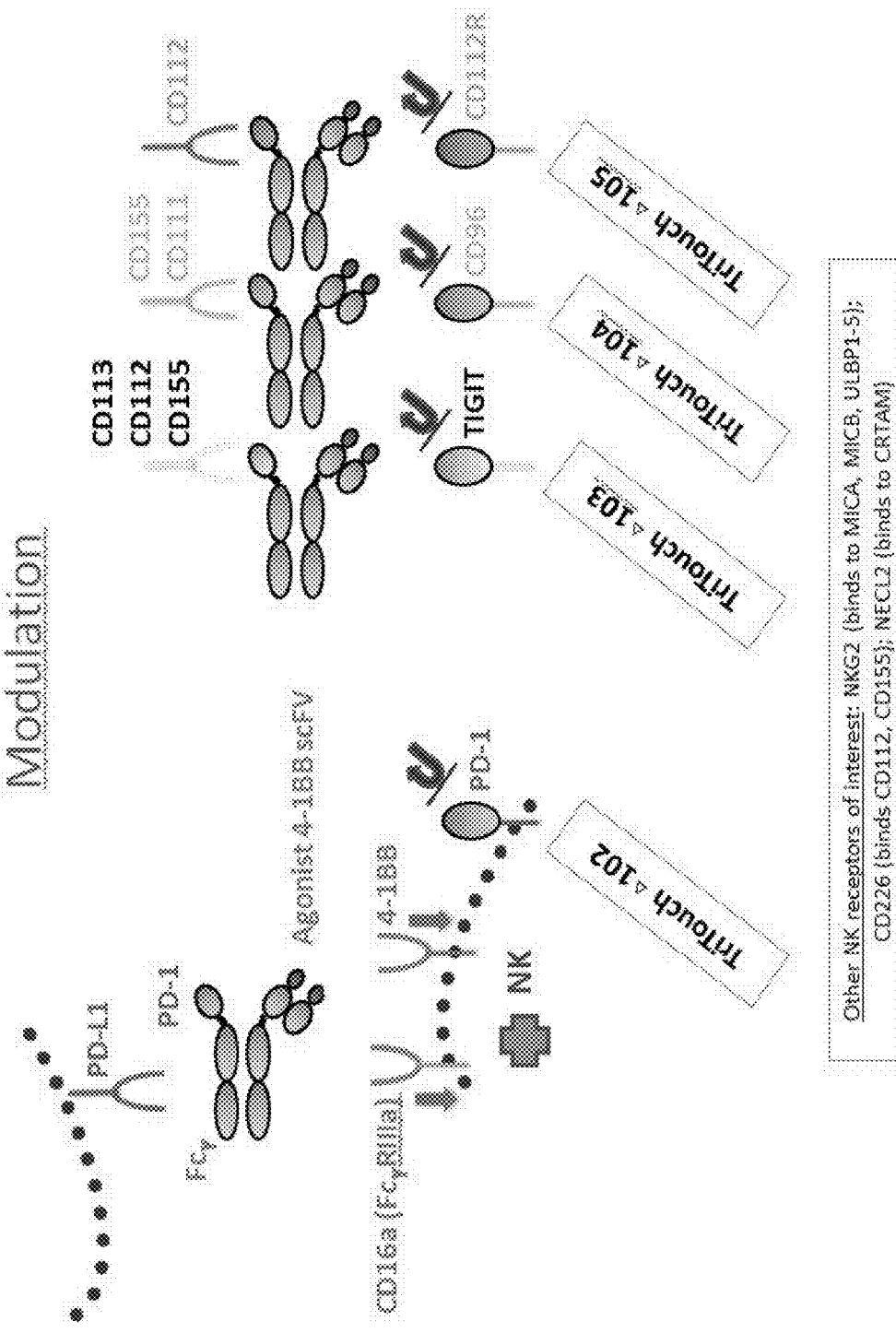
FIG. 6 is a schematic representation of the possible interaction(s) with various types of cells of various fusion proteins.

In some exemplary embodiments, one component of the fusion protein blocks a checkpoint inhibitor on a tumor or other cell and the other two components each trigger a distinct activating receptor on an immune effector cell. Where the checkpoint inhibitor is on a tumor cell, the fusion protein in effect serves to molecularly bridge an immune effector cell and a target tumor cell. Further, the fusion protein's three interactions, a combination of checkpoint inhibitory pathway blockade and activating receptor triggering, serve to functionally reinforce each other, all three cooperatively driving activation of said immune effector cell, e.g., an NK cell. In a preferred embodiment, the checkpoint inhibitor blocked by the fusion protein consists of PD-L1, PD-L2, CD113, CD112, CD155, or CD111, and the two activating receptors co-triggered by the fusion protein are the $Fc_\gamma RIIIa$ receptor and 4-1BB on an NK cell (see FIG. 6).

In some exemplary embodiments, one component of the fusion protein blocks a checkpoint inhibitor on a tumor or other cell; a second component of the fusion protein blocks a coinhibitory receptor for the same or a different checkpoint inhibitor on an immune effector cell; and a third component of the fusion protein triggers an activating receptor on an immune effector cell. Where the checkpoint inhibitor is on a tumor cell, the fusion protein in effect serves to molecularly bridge an immune effector cell and a target tumor cell, and the fusion protein's three interactions, a combination of checkpoint inhibitory pathway blockade and activating receptor triggering, serve to functionally reinforce each other, all three cooperatively driving activation of said immune effector cell, e.g., an NK cell. In a preferred embodiment, the checkpoint inhibitor blocked by the first component of the fusion protein consists of PD-L1, PD-L2, CD113, CD112, CD155, or CD111; the coinhibitory receptor on an NK cell blocked by the fusion protein consists of PD-1, TIGIT, CD96, or CD112R; and the activating receptor triggered by the fusion protein is the $Fc_\gamma RIIIa$ receptor the same NK cell (see FIG. 7).

Figure 8:
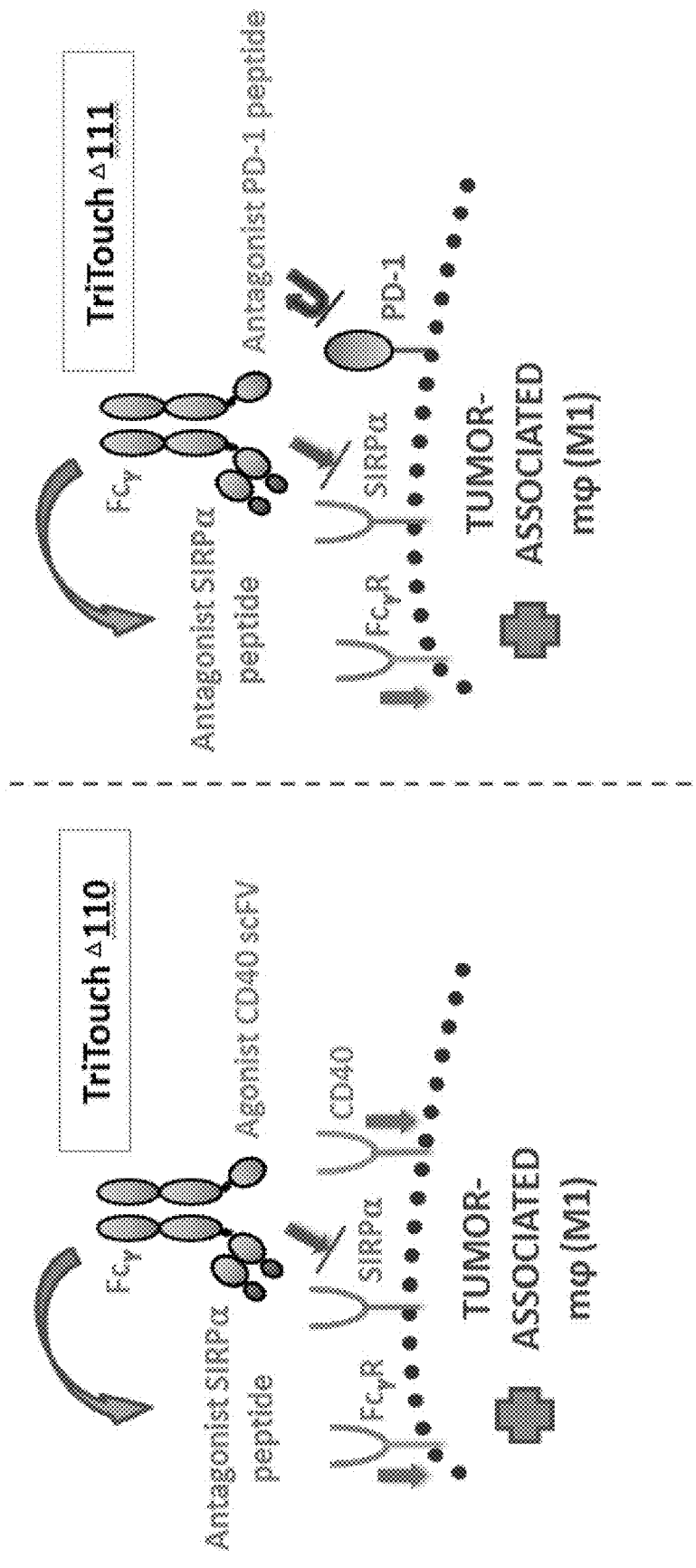
FIG. 8 is a schematic representation of the possible interaction(s) with tumor-associated macrophages (M1) of various fusion proteins.
Figure 9:
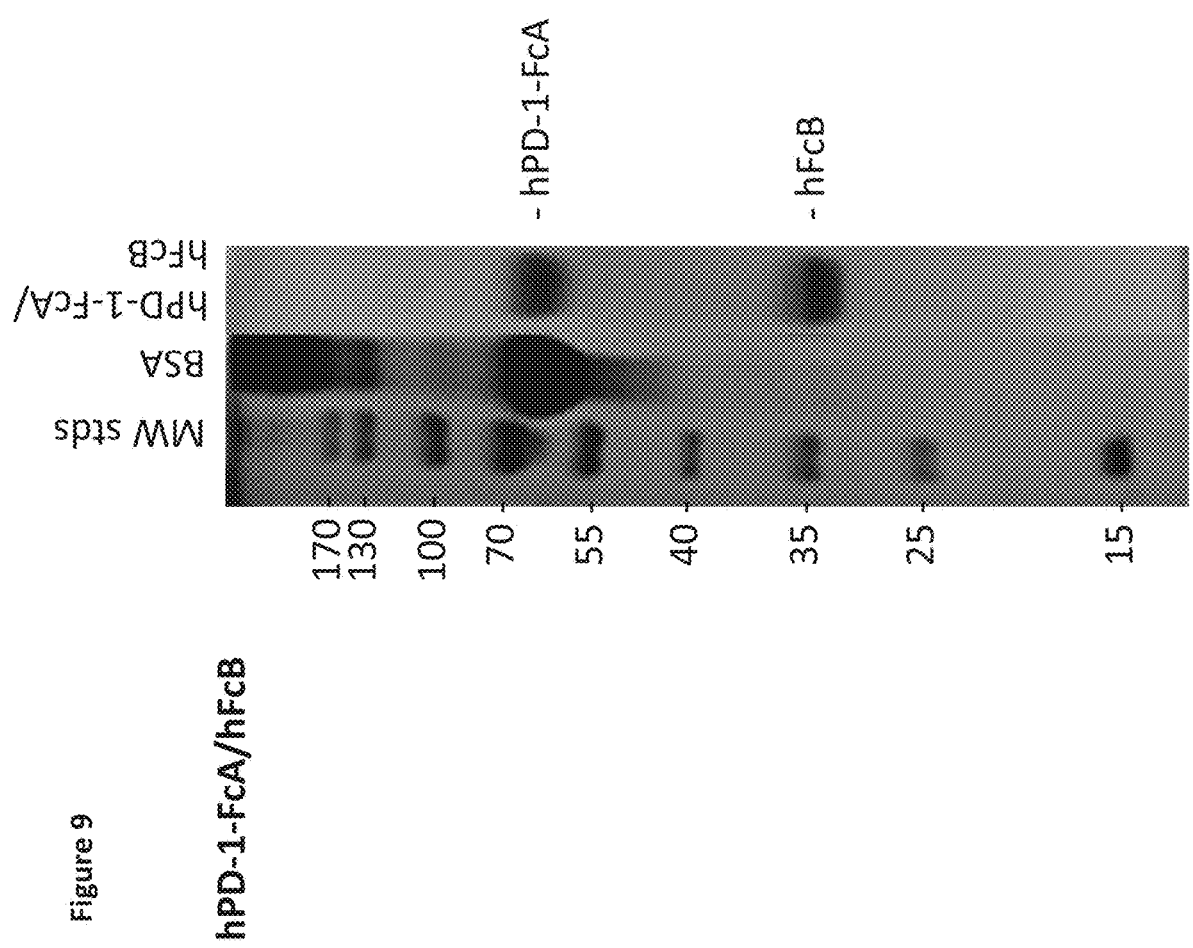
FIG. 9 is a Coomassie blue-stained (reduced) SDS-PAGE gel of hPD-1-FcA/hFcB (SEQ ID NO: 14 plus SEQ ID NO: 36).
Figure 10:
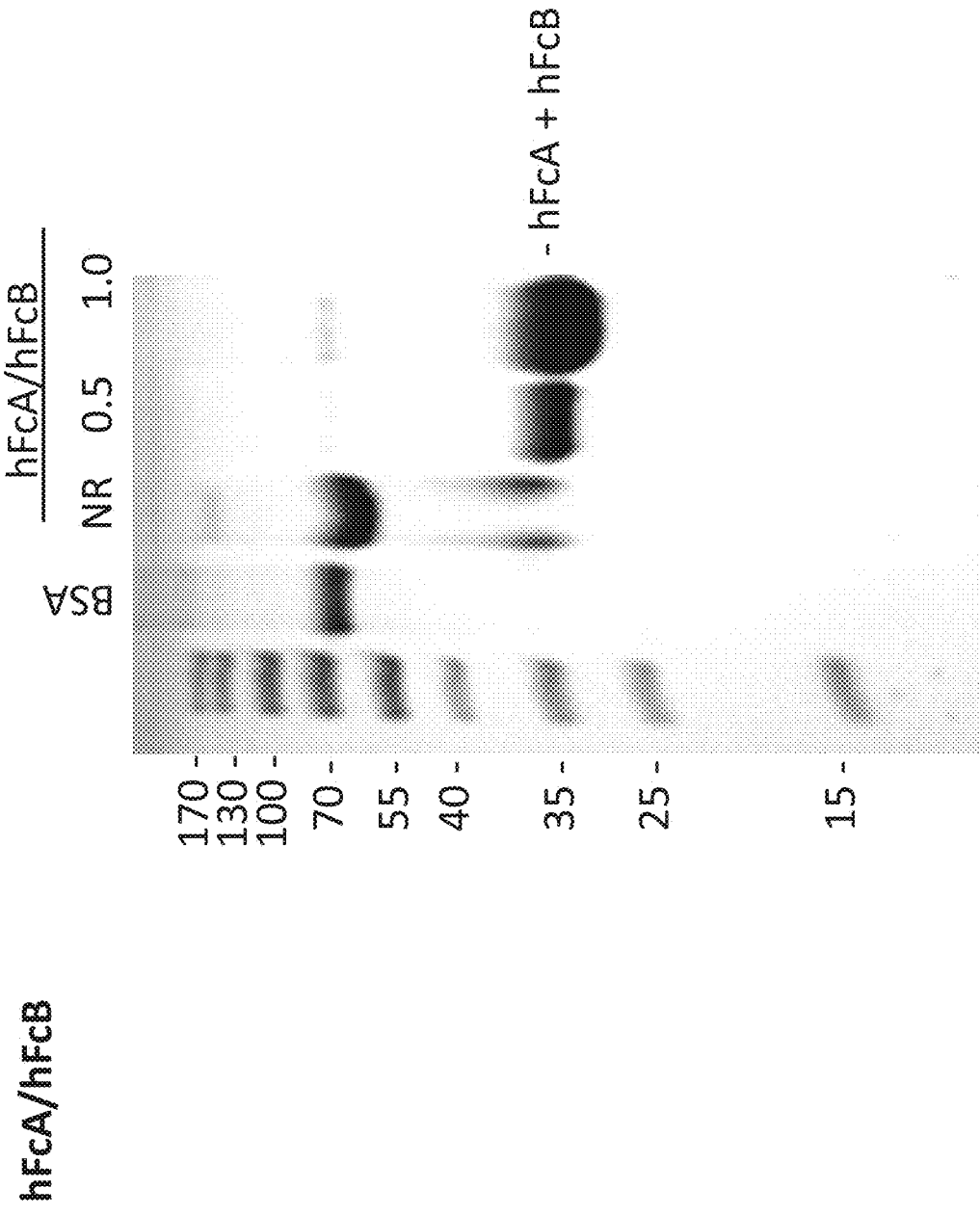
FIG. 10 is a Coomassie blue-stained SDS-PAGE gel of hFcA/hFcB (SEQ ID NO: 23 plus SEQ ID NO: 36).
Figure 11:
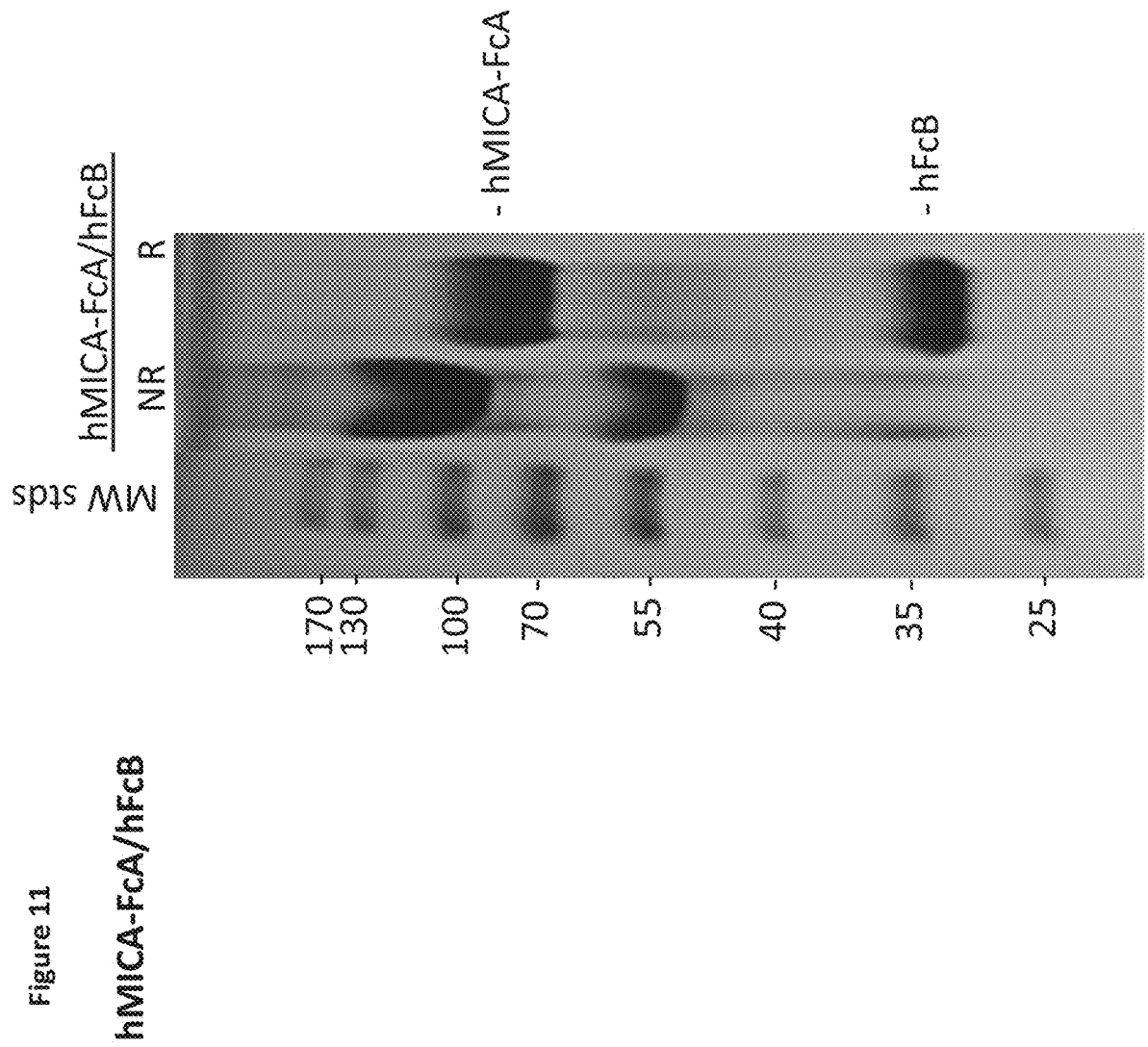
FIG. 11 is a Coomassie blue-stained SDS-PAGE gel of hMICA-FcA/hFcB (SEQ ID NO: 22 plus SEQ ID NO: 36).
Figure 12:
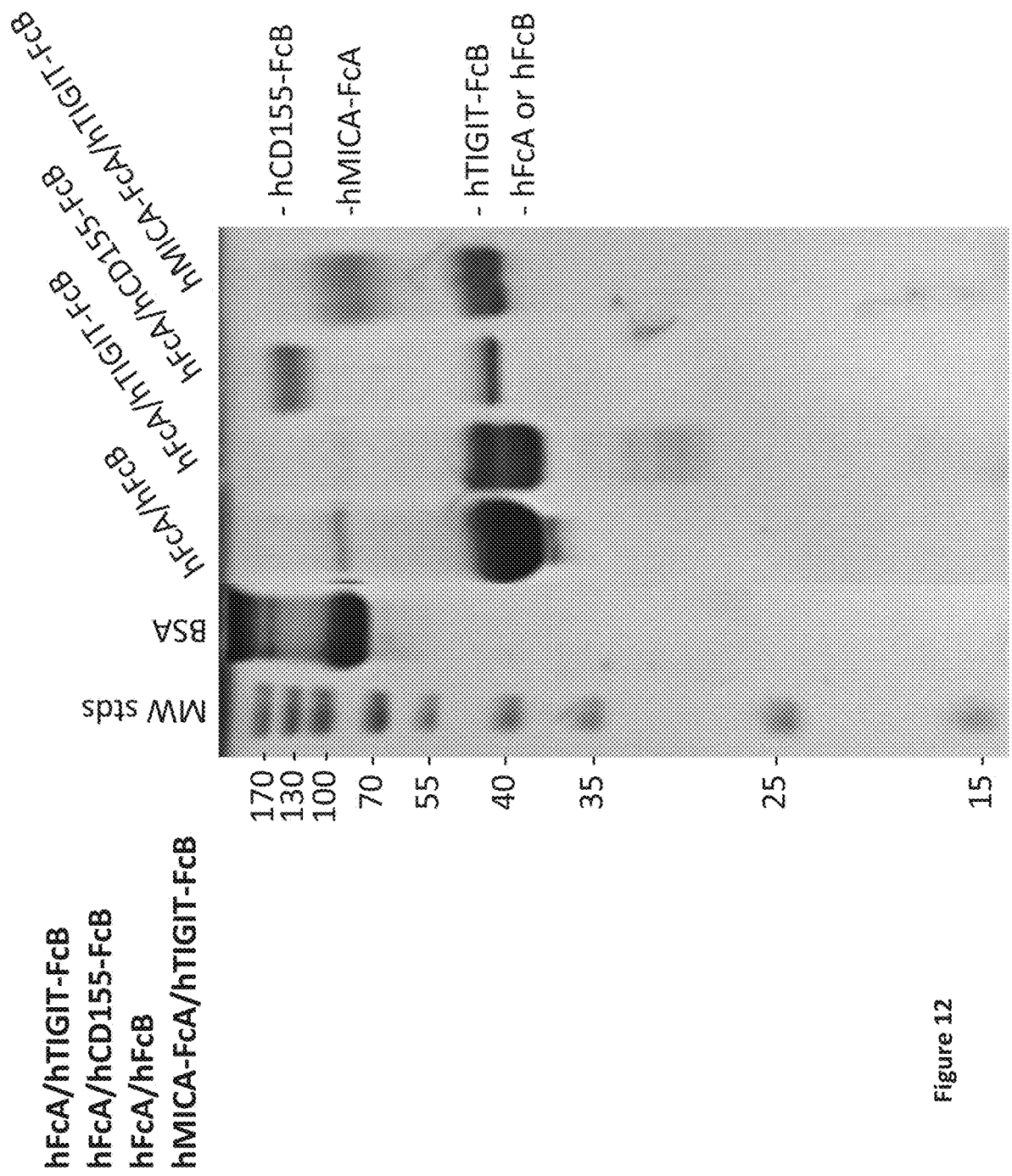
FIG. 12 is a Coomassie blue-stained (reduced) SDS-PAGE gel of hFcA/hTIGIT-FcB (SEQ ID NO: 14 plus SEQ ID NO: 36), hFcA/hCD155-FcB (SEQ ID NO: 23 plus SEQ ID NO: 32), hFcA/hFcB (SEQ ID NO: 23 plus SEQ ID NO: 36), and hMICA-FcA/hTIGIT-FcB (SEQ ID NO: 22 plus SEQ ID NO: 33).
Figure 13:
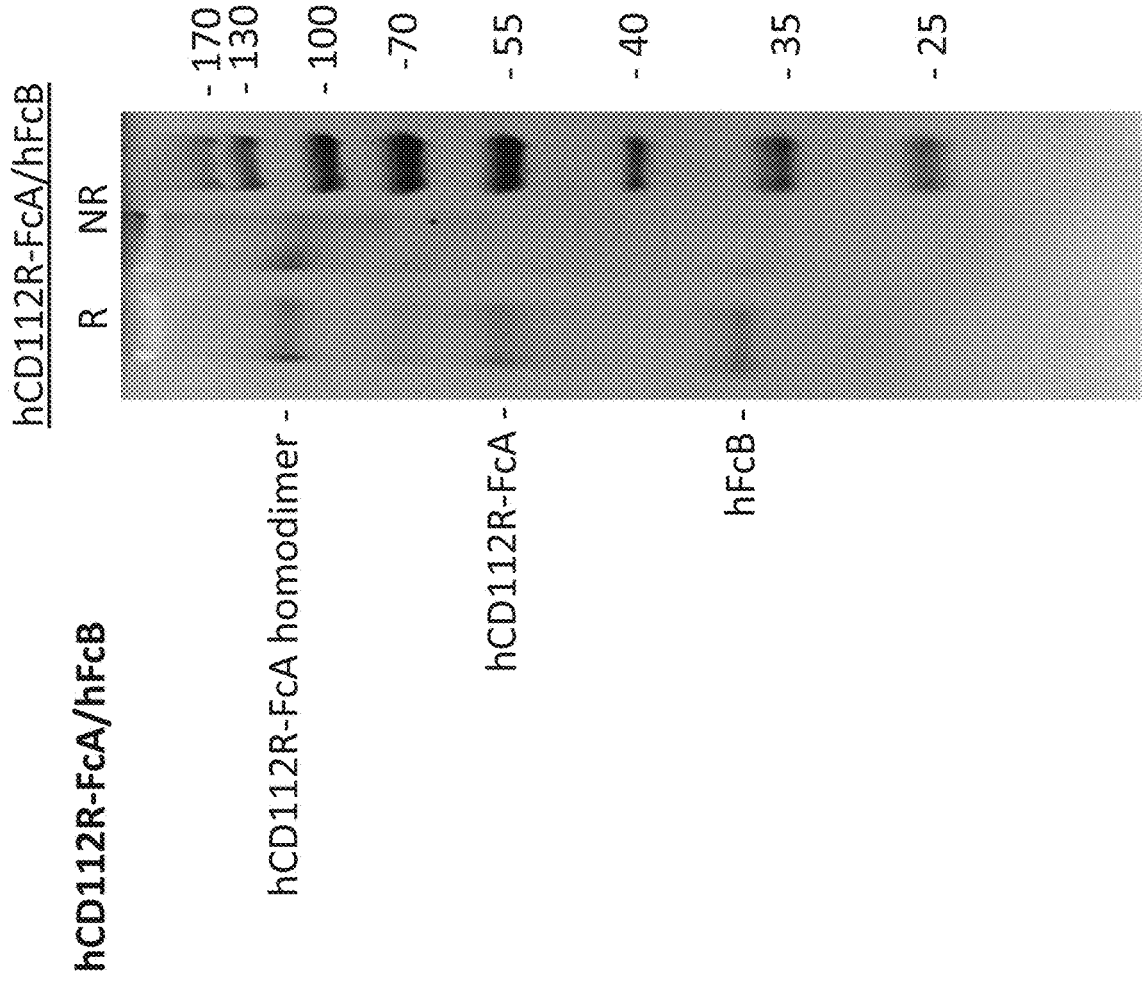
FIG. 13 is a Coomassie blue-stained SDS-PAGE gel of hCD112R-FcA/hFcB (SEQ ID NO: 16 plus SEQ ID NO: 36).
Figure 14:
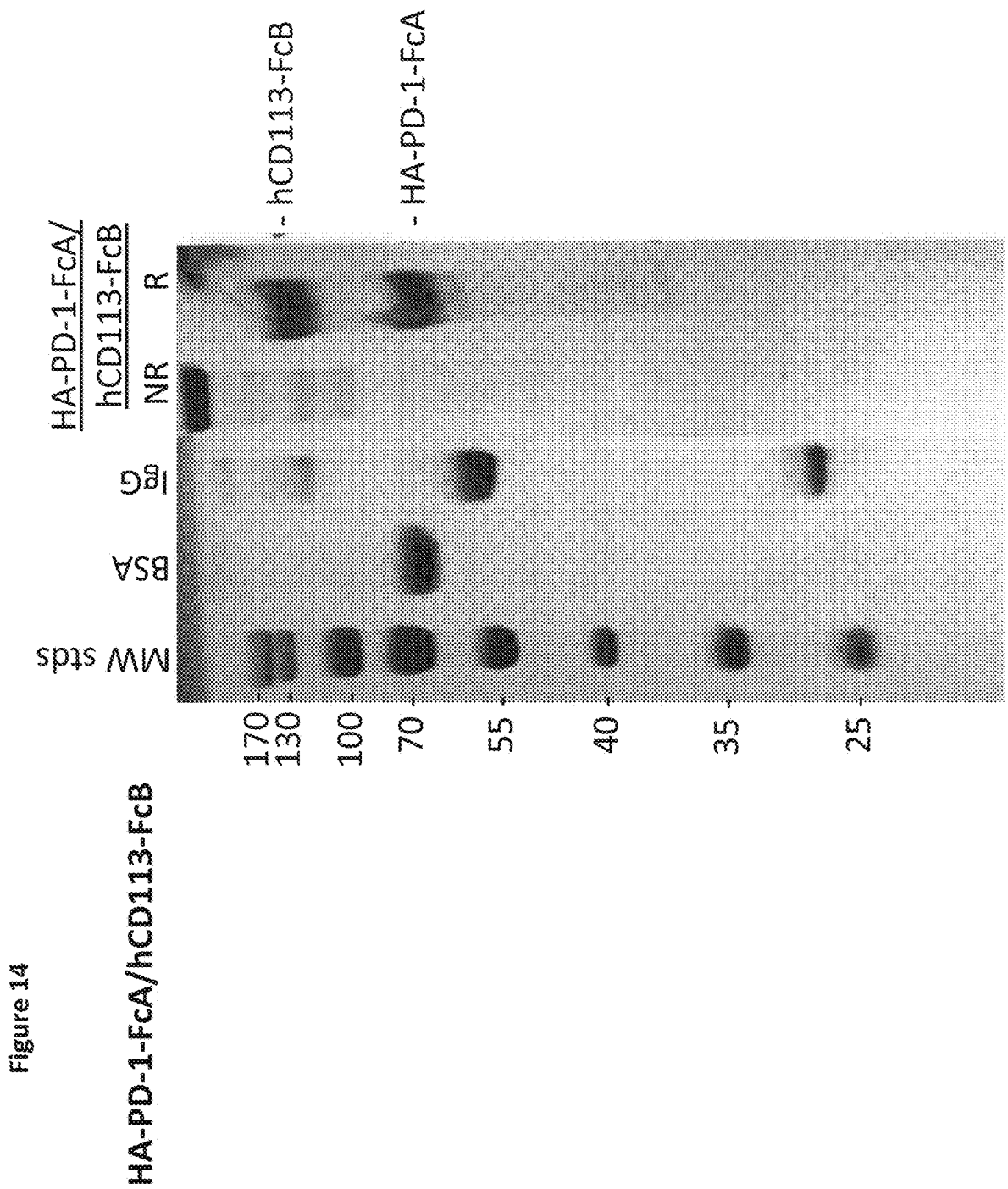
FIG. 14 is a Coomassie blue-stained SDS-PAGE gel of HA-PD-1-FcA/hCD113-FcB (SEQ ID NO: 15 plus SEQ ID NO: 35).
Figure 15:
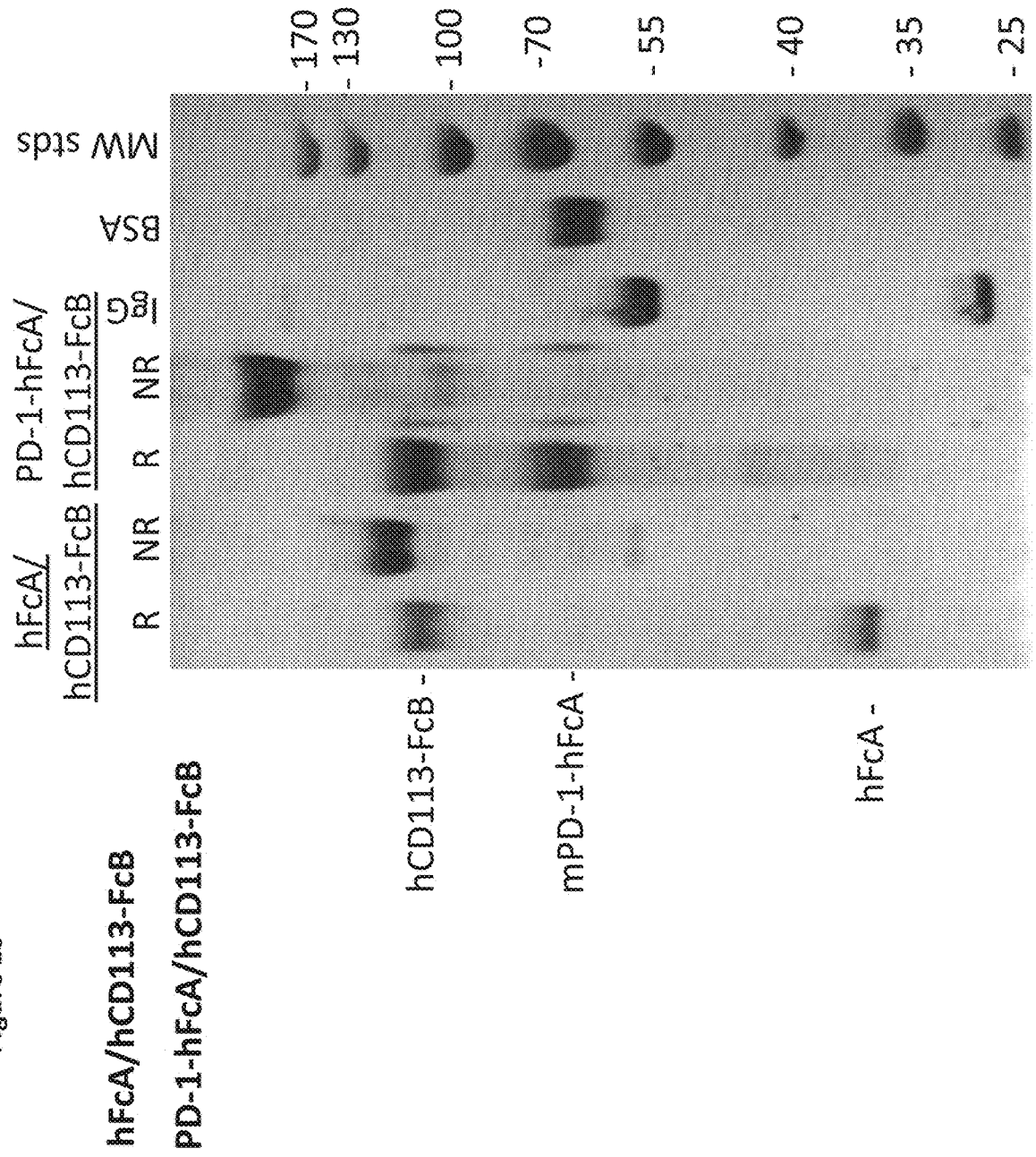
FIG. 15 is a Coomassie blue-stained SDS-PAGE gel of hFcA/hCD113-FcB (SEQ ID NO: 23 plus SEQ ID NO: 33) and PD-1-hFcA/hCD113-FcB (SEQ ID NO: 14 plus SEQ ID NO: 35).
Figure 16:
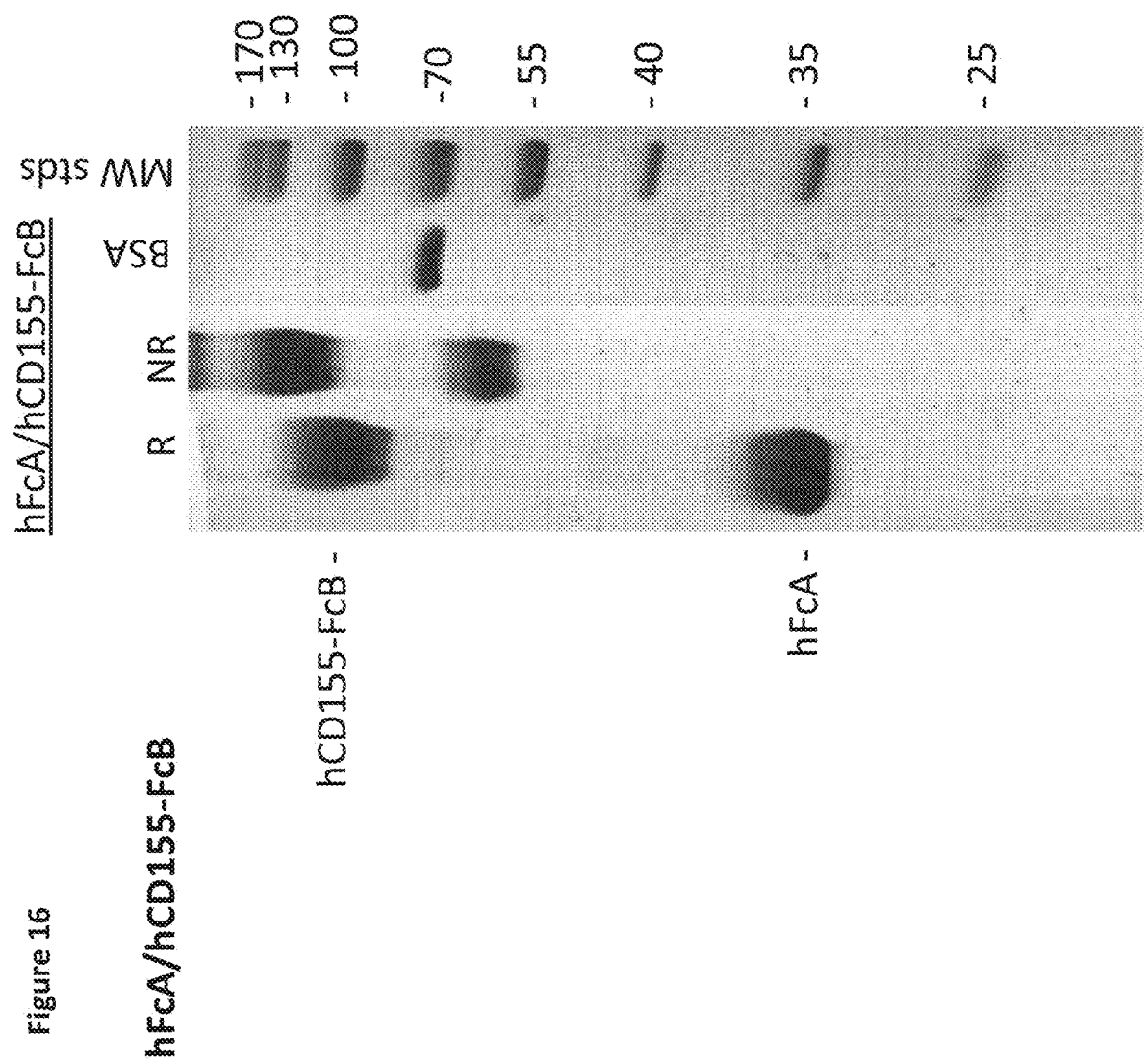
FIG. 16 is a Coomassie blue-stained SDS-PAGE gel of hFcA/hCD155-FcB (SEQ ID NO: 23 plus SEQ ID NO: 32).
Figure 17:
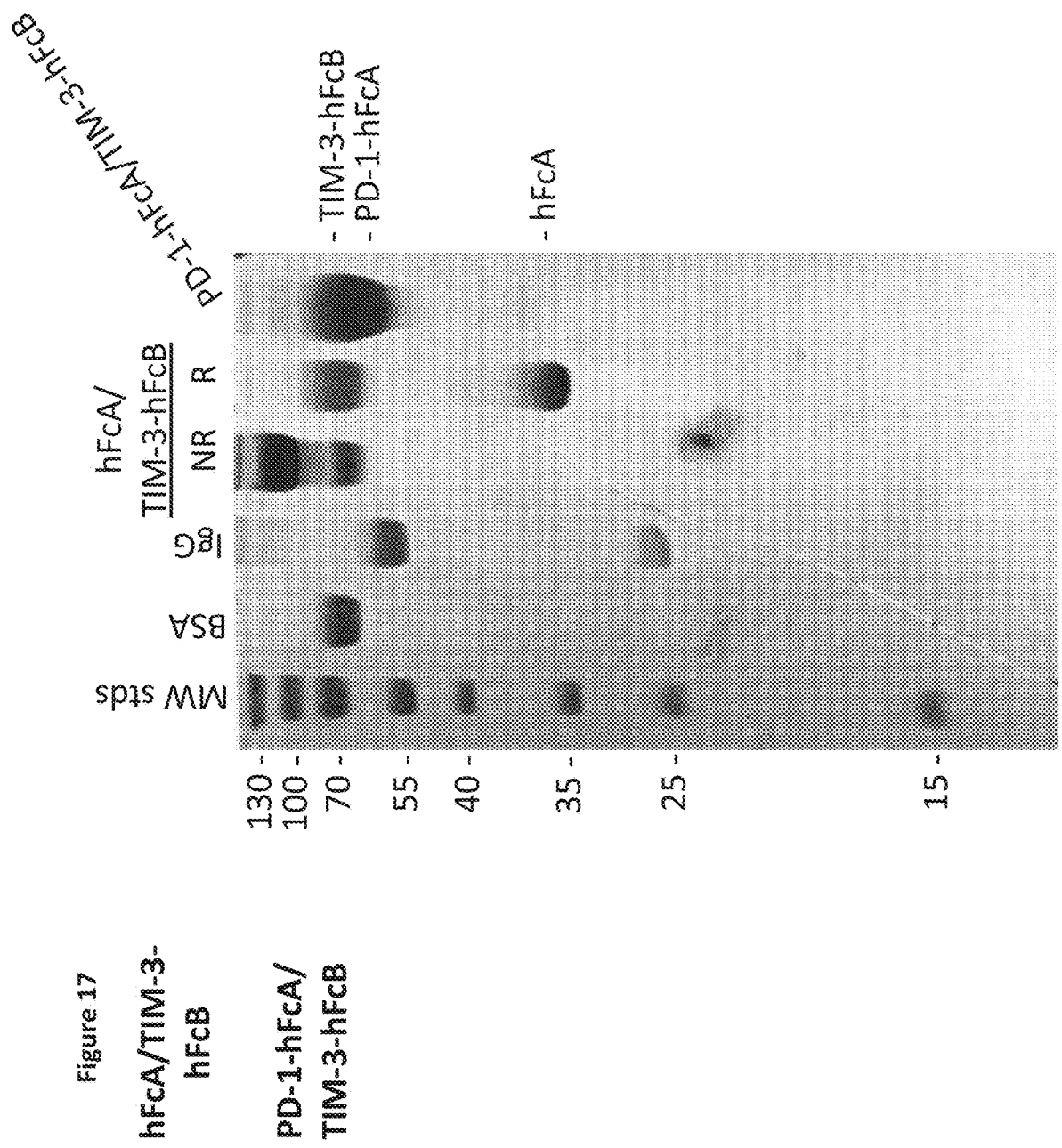
FIG. 17 is a Coomassie blue-stained SDS-PAGE gel of hFcA/TIM-3-hFcB (SEQ ID NO: 23 plus SEQ ID NO: 34) and PD-1-hFcA/TIM-3-hFcB (SEQ ID NO: 14 plus SEQ ID NO: 34).

In some exemplary embodiments, one component of the fusion protein blocks a 'don't each me' inhibitory receptor on a tumor-associated macrophage of the M1 type, thereby unleashing its anti-tumor phagocytic and other activities; two other components of the fusion protein each trigger a distinct activating receptor on said tumor-associated macrophage. The fusion protein's three interactions, a combination of blocking a macrophage inhibitory pathway and triggering separate activating receptors on the macrophage, serve to functionally reinforce each other, all three cooperatively driving activation of the tumor-associated macrophage and promoting its anti-tumor functions. In a preferred embodiment, the 'don't eat me' receptor blocked by the first component of the fusion protein is SIRPα; the activating receptors triggered by the fusion protein are CD40 and the $Fc_\gamma RIIIa$ receptor on the same macrophage (see FIG. 8, left panel).

In some exemplary embodiments, one component of the fusion protein blocks a 'don't each me' inhibitory receptor on a tumor-associated macrophage of the M1 type, thereby unleashing its anti-tumor phagocytic and other activities; a second component of the fusion protein blocks a distinct inhibitory receptor on said macrophage; and a third component of the fusion protein triggers an activating receptor on said tumor-associated macrophage. The fusion protein's three interactions, a combination of blocking two macrophage inhibitory pathways and triggering an activating receptor on the macrophage, serve to functionally reinforce each other, all three cooperatively driving activation and/or anti-tumor effector functions of the tumor-associated macrophage. In a preferred embodiment, the 'don't eat me' receptor blocked by the first component of the fusion protein is SIRPα; the inhibitory receptor blocked by the second component of the fusion protein is PD-1; and the activating receptor triggered by the fusion protein is the $Fc_\gamma RIIIa$ receptor (see FIG. 8, right panel).

Preferred embodiments of the fusion protein of the present invention comprise a cytokine, or a portion or derivative thereof, which can be incorporated in Component A, Component B, Component C and/or Component D. This includes a wide range of cytokines well known to those familiar with the art, which fall into a number of different classes, e.g., interleukins, tumor necrosis factors, interferons, colony-stimulating factors, and others; have been ascribed various functions, with a range of activating or inhibitory properties, e.g., adaptive immunity, pro-inflammatory signaling, anti-inflammatory signaling, stem cell modulation and differentiation, chemotaxis, phagocytosis, cytotoxicity, and anti-viral effects; and have been associated with a range of immune and non-immune cell targets, e.g., B cells, T cells, NK cells, macrophage/monocytes, dendritic cells, bone marrow stromal cells, stem cells, fibroblasts, endothelial cells, and epithelial cells. Preferred embodiments comprise cytokines linked to adaptive immunity (e.g., IL-2, IL-4, IL-7, IL-9, IL-15, IL-21, GM-CSF); pro-inflammatory signaling [e.g., IL-1 family (IL-1, IL-18, IL-33, IL-36); IL-6 family (IL-6, IL-11, IL-31, CNTF, CT-1, LIF, OPN, OSM); TNFalpha family (TNFα, TNFβ, BAFF, APRIL); IL-17 family (IL-17A-F, IL-25); Type I IFN family (IFNα, IFNβ, IFNκ, Limitin); Type II IFN family (IFNγ); and Type III IFN family (IFNlambda1/IL-29), IFNlambda2/IL-28A, IFNlambda3/IL-28B)]; and anti-inflammatory signaling [IL-12 family (IL-12, IL-23, IL-27, IL-35); and IL-10 family (IL-10, IL-19, IL-20, IL-22, IL-24, IL-26, IL-28, IL-29)]. See Turner, Mark D., et al.: "Cytokines and Chemokines: At the Crossroads of Cell Signaling and Inflammatory Disease", Biochimica et Biophysica Acta 1843 (2014) 2563-2582.

vMIP-II

In some embodiments, a component of the fusion protein of the invention may comprise vMIP-II or a variant thereof. The viral Macrophage Inflammatory Protein-II (vMIP-II) is a chemokine that interacts with the CC and CXC chemokine receptors, including the CCR5 and CXCR4 chemokine receptors. CCR5 and CXCR4 are the principal coreceptors required for cell entry of human immunodeficiency virus (HIV-1). CXCR4 may also be found on cancer cells, e.g. tumor cells. vMIP-II, a chemokine encoded by human herpesvirus 8 (HHV-8) (Moore, P. S., et al., Science, 274: 1739-1744, 1996) displays diverse interactions with both CC and CXC chemokine receptors and inhibits HIV-1 entry mediated through CCR3, CCR5, and CXCR4. See U.S. Patent Publication No. 2003/0220482, which is hereby incorporated by reference in its entirety. vMIP-II also binds CXCR7, which like CXCR4, has been implicated in tumorigenesis. V1 (aa 1-21 of vMIP-II), and its related DV1 (D amino acid isomer) display antagonistic activity against CXCR4 and CXCR7, but not against CCR5.

vMIP inhibits binding of CXCL12, the natural ligand. In some embodiments, the Δ signifies a mutation at the $12^{th}$ amino acid that causes dimerization between the two peptides of the B and C component. In some embodiments, the Δmut signifies a mutation at the $10^{th}$ amino acid that prevents binding of the peptide, acting as a negative control.

PD-1

In some embodiments, a component of the fusion protein of the invention may comprise PD-1 or a variant thereof. PD-1 (Programmed cell death protein 1), also known as CD279, is a protein on the surface of cells that has a role in regulating the response of the immune system to the cells. PD-1 down-regulates the immune system and promotes self-tolerance by suppressing T cell inflammatory activity.

Without wishing to be bound by theory, PD-1 acts as an immune checkpoint through at least two mechanisms. PD-1 promotes apoptosis of antigen-specific T cells in lymph nodes. PD-1 also reduces apoptosis in regulatory T cells. PD-1 binds the ligands PD-L1 and PD-L2, which are members of the B7 family. PD-L1 and PD-L2 are expressed on the surface of some tumor cells. PD-L1 expressed on tumor cells engages PD-1 on effector T cells and NK cells and inhibits their function. Thus, PD-L1 expressed on tumor cells inhibits effector T cell anti-tumor activity.

In some embodiments, the PD-1 variant of the fusion protein of the invention is high affinity PD-1. Native PD-1 has a relatively low affinity for its ligands, PD-L1 and PD-L2. Higher affinity variants of the PD-1 ectodomain would serve as greater competitive antagonists for its ligands. PD-1 contact residues between human PD-1 and PD-L1 were mutated and then assessed for binding. High affinity PD-1 described herein has ten mutated amino acids that result in enhanced affinity for PD-L1 of greater than 10,000-fold. For further details, see Maute et al., PNAS, 112(47): 6506-6514, 2015.

CD112R

In some embodiments, a component of the fusion protein of the invention may comprise CD112R or a variant thereof. CD112R is expressed on T cells and NK cells and inhibits activating responses. CD112, widely expressed on antigen-presenting cells and tumor cells, is the ligand for CD112R. CD112R competes with CD226, a coinhibitory receptor, for binding to CD112. Without wishing to be bound by theory, disrupting the CD112R-CD112 interaction may increase T cell response. Human CD112R contains a single extracellular IgV domain. The CD112R fusion protein variant described herein consists of the entire ectodomain of human CD112R linked to the hinge, CH2 and CH3 domains of human IgG1. CD112R and variants may bind to its ligand, CD112, and serve as a competitive antagonist for native CD112R on NK cells and T cells, preventing inhibitory signaling.

CD113

In some embodiments, a component of the fusion protein of the invention may comprise CD113 or a variant thereof. CD113, also known as poliovirus receptor-related 3 (PVRL3) or nectin-3, is a member of the immunoglobulin superfamily which forms part of adherens junctions. CD113 has been shown to interact, without limitation, with MLLT4, PARD3 and PTPRM. In addition, CD113 engages TIGIT, CD111, CD112, CD155 and itself. The CD113 fusion protein variant described herein consists of the entire extracellular domain of native human CD113 linked to the hinge, CH2 and CH3 domains of human IgG1. Fusion proteins containing CD113 may serve as a competitive antagonist for native TIGIT on NK cells and T cells, preventing inhibitory signaling. Alternatively, CD113 fusion proteins may bind to CD112, CD155 and/or CD111 and block their engagement with the inhibitory receptors CD112R, TIGIT and CD96, respectively, restoring NK cell and T cell cytotoxicity and cytokine production.

MICA

In some embodiments, a component of the fusion protein of the invention may comprise MHC class I polypeptide-related sequence A (MICA) or a variant thereof. MICA is a cell surface glycoprotein encoded by the MICA gene located within MHC locus. MICA is not associated with β2-microglobulin nor does it bind peptides as conventional MHC class I molecules do. Without wishing to be bound by theory, MICA may act as a stress-induced ligand for the NKG2D receptor. MICA is broadly recognized by NK cells, γδ T cells, and CD8+ αβ T cells that express NKG2D on their cell surface. Effector cytolytic responses of T cells and NK cells against tumor cells expressing MICA are initiated as a result of NKG2D-MICA binding. In some embodiments, the MICA variant consists of the entire MICA ectodomain linked to the hinge, CH2 and CH3 domains of human IgG1. MICA triggering of NKG2D signaling on NK cells and cytotoxic T cells is an important mediator of anti-tumor activity.

CD155

In some embodiments, a component of the fusion protein of the invention may comprise CD155 or a variant thereof. CD155 is a type I transmembrane glycoprotein in the immunoglobulin superfamily. In humans, CD155 is encoded by the poliovirus receptor (PVR) gene. CD155 is involved in the establishment of intercellular adherens junctions between epithelial cells. The external domain of CD155 mediates cell attachment to the extracellular matrix molecule vitronectin, while its intracellular domain interacts with the dynein light chain Tctex-1/DYNLT1. In addition, CD155 engages NK cell inhibitory receptors, TIGIT and CD96, limiting NK cell cytotoxicity, and the activating receptor CD226 (DNAM-1). Fusion proteins containing the extracellular domain of CD155 may bind to TIGIT or CD96 on NK and T cells and serve as a competitive antagonist for endogenous CD155 expressed by tumor cells or antigen presenting cells (APC). CD155-containing fusion proteins may also bind to the costimulatory receptor, CD226, and induce NK cell-mediated lysis of tumor targets.

TIGIT

In some embodiments, a component of the fusion protein of the invention may comprise TIGIT or a variant thereof. In some embodiments, the TIGIT is mouse TIGIT. In further embodiments, the TIGIT is human TIGIT. In some embodiments, the TIGIT variant comprises the entire TIGIT extracellular IgV-like domain linked to the hinge, CH2 and CH3 domains of human IgG1.

TIGIT, also known as T cell immunoreceptor with Ig and ITIM domains, is an immune receptor present on some T cells and NK cells. TIGIT is also known as WUCAM or Vstm3. TIGIT binds to CD155(PVR) on cells such as dendritic cells (DCs) and macrophages with high affinity, and also to CD112(PVRL2) with lower affinity. TIGIT is a checkpoint inhibitor and is over expressed on tumor antigen-specific (TA-specific) CD8+ T cells and CD8+ tumor infiltrating lymphocytes (TILs) from individuals with cancer, e.g. melanoma. Without wishing to be bound by theory, blockade of TIGIT may lead to increased cell proliferation, cytokine production, and degranulation of tumor antigen-specific CD8+ T cells and TIL CD8+ T cells. Fusion proteins containing TIGIT may bind to its receptors CD155(PVR) and CD112(PVRL2) and block their interaction with TIGIT on NK cells. Disrupting the interaction of TIGIT with its ligands on cancer cells will restore NK cell cytotoxic activity and cytokine production.

TIM-3

In some embodiments, a component of the fusion protein of the invention may comprise TIM-3 or a variant thereof. T-cell immunoglobulin and mucin-domain containing-3 (TIM-3), also known as Hepatitis A virus cellular receptor 2 (HAVCR2), is a protein that in humans is encoded by the HAVCR2 gene. HAVCR2 is a cell surface molecule expressed on IFNγ producing CD4+ Th1 and CD8+ Tc1 cells. TIM-3 expression has also been detected in Th17 cells, regulatory T-cells, and innate immune cells (dendritic cells, NK cells, monocytes). TIM-3 is an immune checkpoint and mediates T cell exhaustion. Without wishing to be bound by theory, TIM-3 is upregulated in tumor infiltrating lymphocytes (TIL) in several cancers, including but not limited to lung, gastric, head and neck, schwannoma, melanoma and follicular B-cell non-Hodgkin lymphoma. In some embodiments, the TIM-3 variant comprises the entire TIM-3 ectodomain, including the N-terminal IgV-like domain, linked to the hinge, CH2 and CH3 domains of human IgG1. Fusion proteins containing TIM-3 may bind to its natural ligands, Galectin-9, Ceacam-1 and Phosphatidyl serine, and block their interaction with endogenous TIM-3 expressed on NK cells, T cells and APC, reversing T cell exhaustion and restoring NK cell cytotoxicity and cytokine production.

Tumor Cell Receptor Targets

In some embodiments, the fusion protein, or one or more components thereof, binds to a tumor cell receptor target. In some embodiments, the fusion protein, or one or more components thereof, prevents binding of a ligand to a tumor cell receptor target. In some embodiments, the tumor cell receptor targets comprise, without limitation, chemokine receptors, notch receptors, immune checkpoint inhibitors, and tumor vasculature ligands and receptors. In some embodiments, the chemokine receptor comprises CXCR4, CCR10 or CCR7. In some embodiments, the immune checkpoint inhibitor comprises PD-L1 or PD-L2. In some embodiments, the tumor vasculature target comprises $\alpha v\beta 3$, $\alpha v\beta 5$, CD13 (aminopeptidase N), a target of an NGF motif peptide, or Tie2 (receptor for Angiopoietin-2).

Immune Cell Receptor Targets

In some embodiments, the immune cell receptor target is CD40. In some embodiments, the fusion protein, or one or more components thereof comprises agonist CD40 scFv. In further embodiments, the immune cell receptor target is SIRPα. In some embodiments, the fusion protein, or one or more components thereof comprises antagonist SIRPα peptide. In some embodiments, the immune cell receptor target is 4-1BB. In some embodiments, the fusion protein, or one or more components thereof comprises agonist 4-1BB scFv or agonist 4-1BB peptide.

In some embodiments, the immune cell receptor target is CD96. In some embodiments, a component of the fusion protein of the invention may comprise CD96 or a variant thereof. In some embodiments, a component of the fusion protein of the invention may comprise an antagonist or an agonist of CD96.

In some embodiments, a component of the fusion protein of the invention may comprise CD226 or a variant thereof. In some embodiments, a component of the fusion protein of the invention may comprise an antagonist or an agonist of CD226.

In some embodiments, a component of the fusion protein of the invention may comprise TIM-3 or a variant thereof. In some embodiments, a component of the fusion protein of the invention may comprise an antagonist or an agonist of TIM-3.

In some embodiments, the immune cell receptor target is CD111. In some embodiments, a component of the fusion protein of the invention may comprise CD111 or a variant thereof. In some embodiments, a component of the fusion protein of the invention may comprise an antagonist or an agonist of CD111.

In some embodiments, the immune cell receptor target is CD112. In some embodiments, a component of the fusion protein of the invention may comprise CD112 or a variant thereof. In some embodiments, a component of the fusion protein of the invention may comprise an antagonist or an agonist of CD112.

In some embodiments, the immune cell receptor target is CD113. In some embodiments, a component of the fusion protein of the invention may comprise CD113 or a variant thereof. In some embodiments, a component of the fusion protein of the invention may comprise an antagonist or an agonist of CD113.

In some embodiments, the immune cell receptor target is CD115. In some embodiments, a component of the fusion protein of the invention may comprise CD115 or a variant thereof. In some embodiments, a component of the fusion protein of the invention may comprise an antagonist or an agonist of CD115.

In some embodiments, the immune cell receptor target is TIGIT. In some embodiments, a component of the fusion protein of the invention may comprise TIGIT or a variant thereof. In some embodiments, a component of the fusion protein of the invention may comprise an antagonist or an agonist of TIGIT.

In some embodiments, the immune cell receptor target is KIR2DL1/2/or 3 or a variant thereof. In some embodiments, a component of the fusion protein of the invention may comprise KIR2DL1/2/or 3 or a variant thereof. In some embodiments, a component of the fusion protein of the invention may comprise an antagonist or an agonist of KIR2DL1/2/or 3.

In some embodiments, the immune cell receptor target is HLA-C. In some embodiments, a component of the fusion protein of the invention may comprise an antagonist or an agonist of HLA-C. In some embodiments, a component of the fusion protein of the invention may comprise an antagonist or an agonist of HLA-C.

In some embodiments, the immune cell receptor target is NKG2A (CD94) or a variant thereof. In some embodiments, a component of the fusion protein of the invention may comprise NKG2A (CD94) or a variant thereof. In some embodiments, a component of the fusion protein of the invention may comprise an antagonist or an agonist of NKG2A (CD94) or a variant thereof.

In some embodiments, the immune cell receptor target is HLA-E. In some embodiments, a component of the fusion protein of the invention may comprise an antagonist or an agonist of HLA-E. In some embodiments, a component of the fusion protein of the invention may comprise an antagonist or an agonist of HLA-E.

In some embodiments, the immune cell receptor target is 2B4 or a variant thereof. In some embodiments, a component of the fusion protein of the invention may comprise 2B4 or a variant thereof. In some embodiments, a component of the fusion protein of the invention may comprise an antagonist or an agonist of 2B4 or a variant thereof.

In some embodiments, the immune cell receptor target is CD48 or a variant thereof. In some embodiments, a component of the fusion protein of the invention may comprise an antagonist or an agonist of CD48. In some embodiments, a component of the fusion protein of the invention may comprise an antagonist or an agonist of CD48 or a variant thereof.

In some embodiments, the immune cell receptor target is NKG2D or a variant thereof. In some embodiments, a component of the fusion protein of the invention may comprise NKG2D or a variant thereof. In some embodiments, a component of the fusion protein of the invention may comprise an antagonist or an agonist of NKG2D or a variant thereof.

In some embodiments, the immune cell receptor target is MICA/B or ULBP1 or a variant thereof. In some embodiments, a component of the fusion protein of the invention may comprise an antagonist or an agonist of MICA/B or ULBP1. In some embodiments, a component of the fusion protein of the invention may comprise an antagonist or an agonist of MICA/B or ULBP1 or a variant thereof.

In any one of the preceding embodiments, the immune cell is an NK cell, a T cell, a dendritic cell (DC), an antigen-presenting cell (APC), a macrophage, or a tumor-associated macrophage (M1).

Immune Cell Receptor or Ligand

In some embodiments, the fusion protein, or one or more components thereof, binds to an immune cell receptor or ligand. In some embodiments, binding to the immune cell receptor or ligand results in NK cell activation (cytokine production (IFNγ and TNF), antibody-dependent cellular cytotoxicity (ADCC) and antibody-dependent cellular phagocytosis (ADCP)). In some embodiments, the receptor is an Fc receptor. In some embodiments, binding to the Fc receptor results in NK cell activation (ADCC and ADCP). In some embodiments, the Fc receptor is an $Fc_\gamma$, $Fc_\epsilon$, $Fc_\alpha$, $Fc_\mu$, or $Fc_\delta$ receptor. In some embodiments, the immune cell receptor or ligand is a member of the TNF superfamily or a receptor thereof, a member of the TNF-L superfamily or a receptor thereof, transferrin or a receptor thereof, human serum albumin or a receptor thereof, or a member of the lipocalin structural family or a receptor thereof.

Linkers

In some embodiments, the components of the fusion protein of the invention may be optionally connected via a peptide linker. The residues for the linker may be selected from naturally occurring amino acids, non-naturally occurring amino acids, and modified amino acids. The linker will typically connect the carboxy terminus of the first component to the amino terminus of the second component. The linker may alter the distance between the two structural components of the fusion protein, as well as alter the flexibility of this region. The linker may comprise any number of amino acids. The linker may thus comprise, for example, 1,2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, or more amino acids. In some embodiments, the linker may be composed of from 3 to 60 amino acid residues, from 3 to 40 amino acid residues, from 3 to 30 amino acid residues, from 3 to 24 amino acid residues, from 3 to 18 amino acid residues, or from 3 to 15 amino acid residues. The linker may comprise, for example, a repeating sub-sequence of 2, 3, 4, 5 or more amino acid residues, comprising 2, 3, 4, 5, 6, 7, 8, 9, 10, 11, 12 or more repeats of the sub-sequence.

Linkers may be naturally-occurring sequences or designed sequences. Peptide linkers useful in the fusion protein of the invention include, but are not limited to, glycine linkers, glycine-rich linkers, serine-glycine linkers, and the like. A glycine-rich linker comprises at least about 50% glycine and preferably at least about 60% glycine. In one embodiment, the linker comprises the amino acid sequence Gly-Ser, or repeats thereof. See, e.g. Huston, et al., Methods in Enzymology, 203:46-88 (1991). In another embodiment, the linker comprises the amino acid sequence Gly-Lys, or repeats thereof. See, e.g., Whitlow et al., Protein Eng., 6:989 (1993). In another embodiment, the linker comprises the amino acid sequence Gly-Gly-Ser or repeats thereof. In another embodiment, the linker comprises the amino acid sequence Gly-Gly-Gly-Gly-Ser (SEQ ID NO: 29), or repeats thereof. In certain specific embodiments, the linker comprises the amino acid sequence Gly-Gly-Gly-Ser-Gly-Gly-Gly-Ser (SEQ ID NO: 30). In certain embodiments, the linker contains from 2 to 12 repeats of Gly-Gly-Ser or Gly-Gly-Gly-Ser or Gly-Gly-Gly-Gly-Ser (SEQ ID NO: 29). See U.S. Pat. No. 6,541,219 for examples of peptide linkers. In one embodiment, the linker may comprise the sequence GDPLVTAASVLEFGGSGGGSEGGGSEGGGSEGGGSDI (SEQ ID NO: 31).

Linkers are useful for separating the two components of the fusion protein to enable proper folding of the components, to reduce potential steric problems, and/or to contribute to optimal receptor binding. The skilled artisan is familiar with the design and selection of peptide linkers. See, for instance, Robison et al., 1998, *Proc. Natl. Acad. Sci. USA* 95:5929-5934. Automated programs are also available for peptide linker design (e.g., Crasto et al., 2000, *Protein Engineering* 13:309-312).

Optional Other Elements

The fusion protein optionally may also include further elements apart from Component A, Component B, Component C and/or Component D. Such further elements may include, without limitation: an initiator methionine, a signal peptide, an antigen polypeptide, a trimerization domain, a higher order multimerization domain, and a purification tag, such as His-6. An exemplary purification tag is ASHHHHHHM (SEQ ID NO: 46). In an embodiment, the fusion protein of the invention comprises an optional trimerization domain.

Fusion proteins of the invention optionally comprise a signal peptide. Signal peptides can be varied according to the needs of the user, the expression system, and other factors, as would be understood by one skilled in the art. Signal peptides are well known in the art, and any desired signal peptide can be used, including those recognized/predicted by publicly available signal peptide recognition software known to those skilled in the art.

In some embodiments, the fusion protein of the invention comprises a hinge region which allows for flexibility between components. See Lobner et al. (2016) Immunol. Reviews 270:113-131. In some embodiments, Component Y and Component $Z_2$ are connected via a hinge, for example an IgG hinge. In some embodiments, Component $Z_1'$ and Component $Z_2'$ are connected via a hinge, for example an IgG hinge.

In some embodiments, a N-linked glycan is attached to an Asn on Component A and/or Component B. In some embodiments, a N-linked glycan is attached to Asn297 on Component A and/or Component B. Without wishing to be bound by theory, this may promote FcR binding and may promote structural integrity and thermal stability of the fusion protein. See Arnold et al. (2007) Annu Rev Immunol 25:21-50.

In some embodiments, Component A and/or Component B comprise a K to A mutation. In some embodiments, Component A and/or Component B comprise a K322A mutation. Without wishing to be bound by theory, this may reduce C1q binding and complement-mediated lysis. See Idusogie et al. (2000) J. Immunol 164:4178-4184.

In some embodiments, Component A and Component B comprise knobs-into-holes mutations. In some embodiments, Component A comprises mutations Y349C and T366W, and Component B comprises mutations D356C, T366S, L368A and Y407V ("Knobs-into-holes" mutations). Without wishing to be bound by theory, this may promote heterodimerization over homodimerization. See Merchant et al. (1998) Nature Biotech. 16:677-681.

In some embodiments, Component A and/or Component B comprise mutations that increase binding to neonatal Fc receptor (FcRn). In some embodiments, Component A and/or Component B comprises mutations M428L and N434S. Without wishing to be bound by theory, this may increase binding to neonatal Fc receptor (FcRn) on various cells, prolonging serum half-life. See Kuo and Aveson (2011) mAbs 3:422-430.

Trimerization Domains

Trimerization domains are well known in the art. Non-limiting examples of trimerization domains suitable as a heterologous trimerization domain in the fusion protein of the invention include: the GCN4 leucine zipper (Harbury et al., 1993, "A switch between two-, three-, and four-stranded coiled coils in GCN4 leucine zipper mutants," Science 262(5138):1401-7); a 35 amino-acid sequence from lung surfactant protein (Hoppe et al., 1994, "A parallel three stranded alpha helical bundle at the nucleation site of collagen triple-helix formation" FEBS letters 344(2-3):191-5); short, repeating heptad sequences from collagen (McAlinden et al., 2003, "Alpha-helical coiled-coil oligomerization domains are almost ubiquitous in the collagen superfamily," J Biol Chem. 278(43):42200-7. Epub 2003 Aug. 14.); and the bacteriophage T4 fibritin "foldon" (see, e.g., Miroshnikov et al., 1998, "Engineering trimeric fibrous proteins based on bacteriophage T4 adhesins," Protein Eng. 11(4):329-32). Exemplary trimerization domains are also disclosed in U.S. Pat. Nos. 6,911,205 and 8,147,843, and U.S. Patent Publication Pub. 2010/0136032. An exemplary trimerization sequence is the T4 "foldon" having the sequence: GYIPEAPRDGQAYVRKRGEWVLLSTFL (SEQ ID NO: 47). Another exemplary trimerization domain is from thrombospondin-1 and has the sequence: VTTLQD-SIRKVTEENKELANELRR (SEQ ID NO: 56).

Modification

The invention encompasses variants of the fusion proteins described herein. While in general it is desirable for variants to show enhanced ability for binding to a given molecule, in some embodiments, variants may be designed with slightly reduced activity as compared to other fusion proteins of the invention, for example in instances in which one would purposefully want to attenuate activity. Furthermore, variants or derivatives can be generated that would have altered multimerization properties.

Preferably, variants or derivatives of the fusion proteins of the present invention maintain the hydrophobicity/hydrophilicity of the amino acid sequence.

In additional embodiments, the fusion protein of the invention is a variant and/or derivative of the amino acid sequence shown in SEQ ID NO: 14, 15, 16, 17, 18, 19, 20, 21, 22, 32, 33, 34, 35, 49, 50, 51, 52, 53, 54, 55, 65, 66, 67, 68, 69, 70, or 71. In one embodiment, variants of the fusion proteins of the present invention will have at least 80% or greater sequence identity or homology, as those terms are understood in the art, to SEQ ID NO: 14, 15, 16, 17, 18, 19, 20, 21, 22, 32, 33, 34, 35, 49, 50, 51, 52, 53, 54, 55, 65, 66, 67, 68, 69, 70, or 71, more preferably at least 85%, 86%, 87%, 88%, 89%, 90%, 91%, 92%, 93%, 94%, 95%, 96%, 97%, 98%, or even 99% sequence identity SEQ ID NO: 14, 15, 16, 17, 18, 19, 20, 21, 22, 32, 33, 34, 35, 49, 50, 51, 52, 53, 54, 55, 65, 66, 67, 68, 69, 70, or 71.

The invention also provides chemical modification of a fusion protein of the invention. Non-limiting examples of such modifications may include but are not limited to aliphatic esters or amides of the carboxyl terminus or of residues containing carboxyl side chains, O-acyl derivatives of hydroxyl group-containing residues, and N-acyl derivatives of the amino-terminal amino acid or amino-group containing residues, e.g., lysine or arginine.

Other derivatives of the fusion proteins of the present invention include incorporation of unnatural amino acid residues, or phosphorylated amino acid residues such as phosphotyrosine, phosphoserine or phosphothreonine residues. Other potential modifications include sulfonation, biotinylation, or the addition of other moieties, particularly those which have molecular shapes similar to phosphate groups.

Derivatives also include polypeptides modified by glycosylation. These can be made by modifying glycosylation patterns during synthesis and processing in various alternative eukaryotic host expression systems, or during further processing steps. Methods for producing glycosylation modifications include exposing the fusion proteins to glycosylating enzymes derived from cells that normally carry out such processing, such as mammalian glycosylation enzymes. Alternatively, deglycosylation enzymes can be used to remove carbohydrates attached during production in eukaryotic expression systems. Additionally, one can also modify the coding sequence so that glycosylation site(s) are added or glycosylation sites are deleted or disabled. Furthermore, if no glycosylation is desired, the proteins can be produced in a prokaryotic host expression system.

Variants and/or derivatives of the fusion proteins of the invention can be prepared by chemical synthesis or by using site-directed mutagenesis (Gillman et al., *Gene* 8:81 (1979); Roberts et al., *Nature* 328:731 (1987) or Innis (Ed.), 1990, *PCR Protocols: A Guide to Methods and Applications*, Academic Press, New York, N.Y.) or the polymerase chain reaction method (PCR; Saiki et al., *Science* 239:487 (1988)), as exemplified by Daugherty et al., *Nucleic Acids Res.* 19:2471 (1991)) to modify nucleic acids encoding the complete receptors.

In additional embodiments, the fusion proteins of the present invention may further comprise one or more additional polypeptide domains added to facilitate protein purification, to increase expression of the recombinant protein, or to increase the solubility of the recombinant protein. Such purification/expression/solubility facilitating domains include, but are not limited to, metal chelating peptides such as histidine-tryptophan modules that allow purification on immobilized metals (Porath, 1992, *Protein Expr Purif* 3-0.26328 1), protein A domains that allow purification on immobilized immunoglobulin, and the domain utilized in the FLAGS extension/affinity purification system (Immunex Corp, Seattle, Wash.). The inclusion of a cleavable linker sequence such as Factor Xa or enterokinase (Invitrogen, San Diego, Calif.) between the purification domain and the fusion of Components A and B is useful to facilitate purification.

Fusion expression vectors include pGEX (Pharmacia, Piscataway, N.J.), pMAL (New England Biolabs, Beverly, Mass.) and pRITS (Pharmacia, Piscataway, N.J.) which fuse glutathione S transferase (GST), maltose B binding protein, or protein A, respectively, to the target recombinant protein. EBV, BKV, and other episomal expression vectors (Invitrogen) can also be used. In addition, retroviral and lentiviral expression vectors can also be used. Furthermore, any one of a number of in vivo expression systems designed for high level expression of recombinant proteins within organisms can be invoked for producing the fusion proteins specified herein.

As discussed above, a fusion protein of the present invention may contain a heterologous signal sequence at its N-terminus. In certain host cells (e.g., mammalian host cells), expression and/or secretion of the fusion protein can be increased through use of a heterologous signal sequence. Signal sequences are typically characterized by a core of hydrophobic amino acids, which are generally cleaved from the mature protein during secretion in one or more cleavage events. Such signal peptides contain processing sites that allow cleavage of the signal sequence from the mature proteins as they pass through the secretory pathway. Thus, the invention pertains to the described polypeptides having a signal sequence, as well as to polypeptides from which the signal sequence has been proteolytically cleaved (i.e., the cleavage products).

In order to enhance stability and/or reactivity, the fusion protein of the present invention can also be modified to incorporate one or more polymorphisms in the amino acid sequence resulting from natural allelic variation. Additionally, D-amino acids, non-natural amino acids or non-amino acid analogues can be substituted or added to produce a modified fusion protein within the scope of this invention.

The amino acid sequences of the present invention may be produced by expression of a nucleotide sequence coding for same in a suitable expression system.

In addition, or in the alternative, the fusion protein itself can be produced using chemical methods to synthesize the desired amino acid sequence, in whole or in part. For example, polypeptides can be synthesized by solid phase techniques, cleaved from the resin, and purified by preparative high-performance liquid chromatography (e.g., Creighton (1983) *Proteins: Structures And Molecular Principles*, WH Freeman and Co, New York N.Y.). The composition of the synthetic polypeptides may be confirmed by amino acid analysis or sequencing (e.g., the Edman degradation procedure). Additionally, the amino acid sequence of a fusion protein of the invention, or any part thereof, may be altered during direct synthesis and/or combined using chemical methods with a sequence from other subunits, or any part thereof, to produce a variant polypeptide.

Assays for measuring the biological activity of any homolog, derivative or variant of any fusion protein of the present invention are well known in the art.

Activity and Utility

In one embodiment, the fusion proteins of the present invention reduce or prevent a tumor cell from migrating, infiltrating neighboring tissues, and/or metastasizing to distant sites, in effect immobilizing said cell. In another embodiment, the fusion proteins of the present invention reduce or prevent a tumor cell from evading phagocytosis by a phagocytotic cell, such as a macrophage, while also promoting apoptosis and/or immune destruction of the tumor cell. In other embodiments, the fusion proteins of the invention reduce or prevent a tumor cell from evading phagocytosis by a phagocytotic cell, while promoting apoptosis of a neighboring tumor cell. Thus, the fusion proteins of the present invention promote tumor cell destruction by any one of a number of mechanisms.

PD-1 ligands or receptors are expressed on a wide range of tumor cells, such a solid tumor cells. Thus, in one embodiment, the invention provides a method of treating a proliferative disorder by administering a therapeutically effective amount of a fusion protein of the invention to a subject diagnosed with a proliferative disorder.

The fusion proteins according to the invention may be administered to individuals (such as mammals, including animals and humans) afflicted with a cellular proliferative disorder such as cancer, and malignant and benign tumors. In a particular embodiment of the invention, the individual treated is a human.

The fusion proteins are believed effective against a broad range of tumor types, including but not limited to the following: ovarian cancer; cervical cancer; breast cancer; prostate cancer; testicular cancer, lung cancer, renal cancer; colorectal cancer; skin cancer; brain cancer; leukemia, including acute myeloid leukemia, chronic myeloid leukemia, acute lymphoid leukemia, and chronic lymphoid leukemia.

More particularly, cancers that may be treated by the compounds, compositions and methods of the invention include, but are not limited to, the following:

cardiac cancers, including, for example sarcoma, e.g., angiosarcoma, fibrosarcoma, rhabdomyosarcoma, and liposarcoma; myxoma; rhabdomyoma; fibroma; lipoma and teratoma;

lung cancers, including, for example, bronchogenic carcinoma, e.g., squamous cell, undifferentiated small cell, undifferentiated large cell, and adenocarcinoma; alveolar and bronchiolar carcinoma; bronchial adenoma; sarcoma; lymphoma; chondromatous hamartoma; and mesothelioma;

gastrointestinal cancer, including, for example, cancers of the esophagus, e.g., squamous cell carcinoma, adenocarcinoma, leiomyosarcoma, and lymphoma; cancers of the stomach, e.g., carcinoma, lymphoma, and leiomyosarcoma; cancers of the pancreas, e.g., ductal adenocarcinoma, insulinoma, glucagonoma, gastrinoma, carcinoid tumors, and vipoma; cancers of the small bowel, e.g., adenocarcinoma, lymphoma, carcinoid tumors, Kaposi's sarcoma, leiomyoma, hemangioma, lipoma, neurofibroma, and fibroma; cancers of the large bowel, e.g., adenocarcinoma, tubular adenoma, villous adenoma, hamartoma, and leiomyoma;

genitourinary tract cancers, including, for example, cancers of the kidney, e.g., adenocarcinoma, Wilm's tumor (nephroblastoma), lymphoma, and leukemia; cancers of the bladder and urethra, e.g., squamous cell carcinoma, transitional cell carcinoma, and adenocarcinoma; cancers of the prostate, e.g., adenocarcinoma, and sarcoma; cancer of the testis, e.g., seminoma, teratoma, embryonal carcinoma, teratocarcinoma, choriocarcinoma, sarcoma, interstitial cell carcinoma, fibroma, fibroadenoma, adenomatoid tumors, and lipoma;

liver cancers, including, for example, hepatoma, e.g., hepatocellular carcinoma; cholangiocarcinoma; hepatoblastoma; angiosarcoma; hepatocellular adenoma; and hemangioma;

bone cancers, including, for example, osteogenic sarcoma (osteosarcoma), fibrosarcoma, malignant fibrous histiocytoma, chondrosarcoma, Ewing's sarcoma, malignant lymphoma (reticulum cell sarcoma), multiple myeloma, malignant giant cell tumor chordoma, osteochrondroma (osteocartilaginous exostoses), benign chondroma, chondroblastoma, chondromyxofibroma, osteoid osteoma and giant cell tumors;

nervous system cancers, including, for example, cancers of the skull, e.g., osteoma, hemangioma, granuloma, xanthoma, and osteitis deformans; cancers of the meninges, e.g., meningioma, meningiosarcoma, and gliomatosis; cancers of the brain, e.g., astrocytoma, medulloblastoma, glioma, ependymoma, germinoma (pinealoma), glioblastoma multiform, oligodendroglioma, schwannoma, retinoblastoma, and congenital tumors; and cancers of the spinal cord, e.g., neurofibroma, meningioma, glioma, and sarcoma;

gynecological cancers, including, for example, cancers of the uterus, e.g., endometrial carcinoma; cancers of the cervix, e.g., cervical carcinoma, and pre-tumor cervical dysplasia; cancers of the ovaries, e.g., ovarian carcinoma, including serous cystadenocarcinoma, mucinous cystadenocarcinoma, unclassified carcinoma, granulosa-thecal cell tumors, Sertoli-Leydig cell tumors, dysgerminoma, and malignant teratoma; cancers of the vulva, e.g., squamous cell carcinoma, intraepithelial carcinoma, adenocarcinoma, fibrosarcoma, and melanoma; cancers of the vagina, e.g., clear cell carcinoma, squamous cell carcinoma, botryoid sarcoma, and embryonal rhabdomyosarcoma; and cancers of the fallopian tubes, e.g., carcinoma;

hematologic cancers, including, for example, cancers of the blood, e.g., acute myeloid leukemia, chronic myeloid leukemia, acute lymphoblastic leukemia, chronic lymphocytic leukemia, myeloproliferative diseases, multiple myeloma, and myelodysplastic syndrome, Hodgkin's lymphoma, non-Hodgkin's lymphoma (malignant lymphoma) and Waldenström's macroglobulinemia, angioimmunoblastic T-cell lymphoma (AITL), chronic lymphocytic leukemia (CLL), acute nonlymphocytic leukemia, chronic lymphocytic leukemia, acute granulocytic leukemia, chronic granulocytic leukemia, monocytic leukemia, myeloblastic leukemia, myelocytic leukemia, myeloid granulocytic leukemia, myelomonocytic leukemia, Naegeli leukemia, plasma cell leukemia, plasmacytic leukemia, promyelocytic leukemia, Rieder cell leukemia, Schilling's leukemia, stem cell leukemia, subleukemic leukemia, acute promyelocytic leukemia, adult T-cell leukemia, aleukemic leukemia, aleukocythemic leukemia, basophilic leukemia, blast cell leukemia, bovine leukemia, chronic myelocytic leukemia, leukemia cutis, embryonal leukemia, undifferentiated cell leukemia, eosinophilic leukemia, Gross' leukemia, hairy-cell leukemia, hemoblastic leukemia, hemocytoblastic leukemia, histiocytic leukemia, stem cell leukemia, acute monocytic leukemia, leukopenic leukemia, lymphatic leukemia, lymphoblastic leukemia, lymphocytic leukemia, lymphogenous leukemia, lymphoid leukemia, lymphosarcoma cell leukemia, mast cell leukemia, megakaryocytic leukemia and micromyeloblastic leukemia;

skin cancers, including, for example, malignant melanoma, basal cell carcinoma, squamous cell carcinoma, Kaposi's sarcoma, moles dysplastic nevi, lipoma, angioma, dermatofibroma, keloids, psoriasis; and adrenal gland cancers, including, for example, neuroblastoma.

More particular examples of such cancers include kidney or renal cancer, breast cancer, colon cancer, rectal cancer, colorectal cancer, lung cancer including small-cell lung cancer, non-small cell lung cancer, adenocarcinoma of the lung and squamous carcinoma of the lung, squamous cell cancer (e.g. epithelial squamous cell cancer), cervical cancer, ovarian cancer, prostate cancer, liver cancer, bladder cancer, cancer of the peritoneum, hepatocellular cancer, gastric or stomach cancer including gastrointestinal cancer, gastrointestinal stromal tumors (GIST), pancreatic cancer, head and neck cancer, glioblastoma, retinoblastoma, astrocytoma, thecomas, arrhenoblastomas, hepatoma, hematologic malignancies including non-Hodgkins lymphoma (NHL), multiple myeloma and acute hematologic malignancies, endometrial or uterine carcinoma, endometriosis, fibrosarcomas, choriocarcinoma, salivary gland cancer, vulval cancer, thyroid cancer, esophageal carcinomas, hepatic carcinoma, anal carcinoma, penile carcinoma, nasopharyngeal carcinoma, laryngeal carcinomas, Kaposi's sarcoma, melanoma, skin carcinomas, Schwannoma, oligodendroglioma, neuroblastomas, rhabdomyosarcoma, osteogenic sarcoma, leiomyosarcomas, urinary tract carcinomas, thyroid carcinomas, Wilm's tumor, as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); acute myelogenous leukemia (AML); Hairy cell leukemia; chronic myeloblastic leukemia; and post-transplant lymphoproliferative disorder (PTLD), as well as abnormal vascular proliferation associated with phakomatoses, edema (such as that associated with brain tumors), and Meigs' syndrome. "Tumor", as used herein, refers to all neoplastic cell growth and proliferation, whether malignant or benign, and all pre-cancerous and cancerous cells and tissues.

Cancers may be solid tumors that may or may not be metastatic. Cancers may also occur, as in leukemia, as a diffuse tissue. Thus, the term "tumor cell", as provided herein, includes a cell afflicted by any one of the above identified disorders.

In a preferred embodiment, the cancer is a solid tumor. In preferred embodiments, the cancer is one of pancreatic cancer, breast cancer, ovarian cancer, bladder cancer, melanoma and glioblastoma.

In another embodiment, the cancer is a hematologic cancer. In preferred embodiments, the hematological cancer is one of acute lymphoblastic leukemia (ALL) and acute myelogenous leukemia (AML).

Pharmaceutical Compositions and Dosing Regimens

Administration of the compositions of the invention is typically parenteral, by subcutaneous, intravenous, intramuscular, or intraperitoneal injection, or by infusion or by any other acceptable systemic method. In a preferred embodiment, administration is by subcutaneous injection. In another preferred embodiment, administration is by intravenous infusion, which may typically take place over a time course of about 1 to 5 hours. In addition, there are a variety of oral delivery methods for administration of therapeutic proteins, and these can be applied to the therapeutic fusion proteins of this invention.

Often, treatment dosages are titrated upward from a low level to optimize safety and efficacy. Generally, daily dosages will fall within a range of about 0.01 to 20 mg protein per kilogram of body weight. Typically, the dosage range will be from about 0.1 to 5 mg protein per kilogram of body weight. Various modifications or derivatives of the fusion proteins, such as addition of polyethylene glycol chains (PEGylation), may be made to influence their pharmacokinetic and/or pharmacodynamic properties.

To administer the fusion protein by other than parenteral administration, it may be necessary to coat the protein with, or co-administer the protein with, a material to prevent its inactivation. For example, protein may be administered in an incomplete adjuvant, co-administered with enzyme inhibitors or in liposomes. Enzyme inhibitors include pancreatic trypsin inhibitor, diisopropylfluorophosphate (DEP) and trasylol. Liposomes include water-in-oil-in-water CGF emulsions as well as conventional liposomes (Strejan et al., 1984, *J. Neuroimmunol.* 7:27).

Although the compositions of the invention can be administered in simple solution, they are more typically used in combination with other materials such as carriers, preferably pharmaceutically acceptable carriers. Useful pharmaceutically acceptable carriers can be any compatible, non-toxic substance suitable for delivering the compositions of the invention to a patient. Sterile water, alcohol, fats, waxes, and inert solids may be included in a carrier. Pharmaceutically acceptable adjuvants (buffering agents, dispersing agents) may also be incorporated into the pharmaceutical composition. Generally, compositions useful for parenteral administration of such drugs are well known; e.g., Remington's Pharmaceutical Science, 17th Ed. (Mack Publishing Company, Easton, Pa., 1990). Alternatively, compositions of the invention may be introduced into a patient's body by implantable drug delivery systems (Urquhart et al., 1984, *Ann. Rev. Pharmacol. Toxicol.* 24:199).

Therapeutic formulations may be administered in many conventional dosage formulations. Formulations typically comprise at least one active ingredient, together with one or more pharmaceutically acceptable carriers. Formulations may include those suitable for oral, rectal, nasal, or parenteral (including subcutaneous, intramuscular, intravenous and intradermal) administration.

The formulations may conveniently be presented in unit dosage form and may be prepared by any methods well known in the art of pharmacy. See, e.g., Gilman et al. (eds.) (1990), *The Pharmacological Bases of Therapeutics*, 8th Ed., Pergamon Press; and *Remington's Pharmaceutical Sciences*, supra, Easton, Pa.; Avis et al. (eds.) (1993) *Pharmaceutical Dosage Forms: Parenteral Medications*, Dekker, N.Y.; Lieberman et al. (eds.) (1990) *Pharmaceutical Dosage Forms: Tablets*, Dekker, N.Y.; and Lieberman et al. (eds.) (1990), *Pharmaceutical Dosage Forms: Disperse Systems*, Dekker, N.Y.

In additional embodiments, the present invention contemplates administration of the fusion proteins by gene therapy methods, e.g., administration of an isolated nucleic acid encoding a fusion protein of interest. The protein building blocks (e.g., Component A and Component B) of the fusion protein of the present invention have been well-characterized, both as to the nucleic acid sequences encoding the proteins and the resultant amino acid sequences of the proteins. Engineering of such isolated nucleic acids by recombinant DNA methods is well within the ability of one skilled in the art. Codon optimization, for purposes of maximizing recombinant protein yields in particular cell backgrounds, is also well within the ability of one skilled in the art. Administration of an isolated nucleic acid encoding the fusion protein is encompassed by the expression "administering a therapeutically effective amount of a fusion protein of the invention." Gene therapy methods are well known in the art. See, e.g., WO96/07321 which discloses the use of gene therapy methods to generate intracellular antibodies. Gene therapy methods have also been successfully demonstrated in human patients. See, e.g., Baumgartner et al., 1998, *Circulation* 97: 12, 1114-1123, and more recently, Fatham, 2007, "A gene therapy approach to treatment of autoimmune diseases," *Immun. Res.* 18:15-26; and U.S. Pat. No. 7,378,089, both incorporated herein by reference. See also Bainbridge et al., 2008, "Effect of gene therapy on visual function in Leber's congenital Amaurosis," *N Engl Med* 358:2231-2239; and Maguire et al., 2008, "Safety and efficacy of gene transfer for Leber's congenital Amaurosis," *N Engl J Med* 358:2240-8. There are two major approaches for introducing a nucleic acid encoding the fusion protein (optionally contained in a vector) into a patients cells: in vivo and ex vivo. For in vivo delivery, the nucleic acid is injected directly into the patient, usually at the site where the fusion protein is required. For ex vivo treatment, the patient's cells are removed, the nucleic acid is introduced into these isolated cells and the modified cells are administered to the patient either directly or, for example, encapsulated within porous membranes which are implanted into the patient (see, e.g., U.S. Pat. Nos. 4,892,538 and 5,283,187). There are a variety of techniques available for introducing nucleic acids into viable cells. The techniques vary depending upon whether the nucleic acid is transferred into cultured cells in vitro, or in vivo in the cells of the intended host. Techniques suitable for the transfer of nucleic acid into mammalian cells in vitro include the use of liposomes, electroporation, microinjection, cell fusion, DEAE-dextran, the calcium phosphate precipitation method, etc. Commonly used vectors for ex vivo delivery of the gene are retroviral and lentiviral vectors.

Preferred in vivo nucleic acid transfer techniques include transfection with viral vectors such as adenovirus, Herpes simplex I virus, adeno-associated virus), lipid-based systems (useful lipids for lipid-mediated transfer of the gene are DOTMA, DOPE and DC-Chol, for example), naked DNA, and transposon-based expression systems. For review of the currently known gene marking and gene therapy protocols see Anderson et al., *Science* 256:808-813 (1992). See also WO 93/25673 and the references cited therein.

"Gene therapy" includes both conventional gene therapy where a lasting effect is achieved by a single treatment, and the administration of gene therapeutic agents, which involves the one time or repeated administration of a therapeutically effective DNA or mRNA. Oligonucleotides can be modified to enhance their uptake, e.g. by substituting their negatively charged phosphodiester groups by uncharged groups. Fusion proteins of the present invention can be delivered using gene therapy methods, for example locally in tumor beds, intrathecally, or systemically (e.g., via vectors that selectively target specific tissue types, for example, tissue-specific adeno-associated viral vectors). In some embodiments, primary cells (such as lymphocytes or stem cells) from the individual can be transfected ex vivo with a gene encoding any of the fusion proteins of the present invention, and then returning the transfected cells to the individual's body.

"Treating" or "treatment" refers to therapeutic treatment, wherein the object is to prevent or slow down (lessen) the targeted pathologic condition or disorder. A subject is successfully "treated" if: after receiving a therapeutic amount of a fusion protein of the invention according to the methods of the present invention, the subject shows observable and/or measurable reduction in or absence of one or more signs and symptoms of the particular disease. For example, for cancer, reduction in the number of cancer cells or absence of the cancer cells; reduction in the tumor size; inhibition (i.e., slow to some extent and preferably stop) of tumor metastasis; inhibition, to some extent, of tumor growth; increase in length of remission, and/or relief to some extent, one or more of the symptoms associated with the specific cancer; reduced morbidity and mortality, and improvement in quality of life issues. Reduction of the signs or symptoms of a disease may also be felt by the patient. Treatment can achieve a complete response, defined as disappearance of all signs of cancer, or a partial response, wherein the size of the tumor is decreased, preferably by more than 50%, more preferably by 75%. A patient is also considered treated if the patient experiences a stabilization of disease. These parameters for assessing successful treatment and improvement in the disease are readily measurable by routine procedures familiar to a physician of appropriate skill in the art.

In the context of treatment for cancer, the fusion proteins of the present invention can optionally be administered to a patient in combination with other chemotherapeutic agents. Suitable chemotherapeutic agents include, for example, alkylating agents such as thiotepa and cyclosphosphamide (CYTOXAN™); alkyl sulfonates such as busulfan, improsiilfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamine; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins, cactinomycin, calicheamicin, carabicin, caminomycin, carzinophilin, chromomycins, dactinomycin, daunorubicin, detorubicin, 6-diazo-5-oxo-L-norleucine, doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elformithine; elliptinium acetate; etoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; PSK.R™; razoxane; sizofiran; spirogermanium; tenuazonic acid; triaziquone; 2,2',2"-trichlorotriethylamine; urethan; vindesine; dacarbazine; mannomustine; mitobronitol; mitolactol; pipobroman; gacytosine; arabinoside ("Ara-C"); cyclophosphamide; thiotepa; taxanes, e.g. paclitaxel (TAXOL.R™, Bristol-Myers Squibb Oncology, Princeton, N.J.) and docetaxel (TAXOTERE.R™, Rhone-Poulenc Rorer, Antony, France); chlorambucil; gemcitabine; 6-thioguanine; mercaptopurine; methotrexate; platinum analogs such as cisplatin and carboplatin; vinblastine; platinum; etoposide (VP-16); Ifosfamide; mitomycin C; mitoxantrone; vincristine; vinorelbine; navelbine; novantrone; teniposide; daunomycin; aminopterin; xeloda; ibandronate; CPT-11; topoisomerase inhibitor RFS 2000; difluoromethylomithine (DMFO); retinoic acid; esperamicins; capecitabine; and pharmaceutically acceptable salts, acids or derivatives of any of the above.

Other chemotherapeutic agents further include anti-hormonal agents that act to regulate or inhibit hormone action on tumors such as anti-estrogens including for example tamoxifen, raloxifene, aromatase inhibiting 4(5)-imidazoles, 4-hydroxytamoxifen, trioxifene, keoxifene, LY117018, onapristone, and toremifene (Fareston); and anti-androgens such as flutamide, nilutamide, bicalutamide, leuprolide, and goserelin; and pharmaceutically acceptable salts, acids or derivatives of any of the above.

Other tumor cytotoxic agents that can be used in combination with a fusion protein of the invention are themselves fusion proteins. Exemplars of tumor cytotoxic fusion proteins are CTLA-4-FasL and Fn14-TRAIL, which, as cis loop-back proteins, can act by creating auto-apoptotic signaling loops at the surface of tumor cells. See U.S. Pat. Nos. 7,569,663; 8,329,657 and 8,039,437, each of which is incorporated by reference in its entirety. In turn, those cis loop-back proteins incorporating a TRAIL component can be administered in combination with chemotherapeutic agents that are able to sensitize tumor cells to TRAIL and overcome TRAIL resistance, such as proteasome inhibitors and histone deacetylase (HDAC) inhibitors, cycloheximide, imatinib mesylate and other protein tyrosine kinase inhibitors, 17-allylamino-17-demethoxygeldanamycin, arsenic trioxide and X-linked Inhibitors of Apoptosis Protein small molecule antagonists; and pharmaceutically acceptable salts, acids or derivatives of any of these.

Additional information on the methods of cancer treatment is provided in U.S. Pat. No. 7,285,522, incorporated by reference in its entirety.

The practice of the invention is illustrated by the following non-limiting examples. The invention should not be construed to be limited solely to the compositions and methods described herein, but should be construed to include other compositions and methods as well. One of skill in the art will know that other compositions and methods are available to perform the procedures described herein.

The practice of the present invention employs, unless otherwise indicated, conventional techniques of molecular biology (including recombinant techniques), microbiology, cell biology, biochemistry and immunology, which are well within the purview of the skilled artisan. Such techniques are explained fully in the literature, such as, "Molecular Cloning: A Laboratory Manual", fourth edition (Sambrook, 2012); "Oligonucleotide Synthesis" (Gait, 1984); "Culture of Animal Cells" (Freshney, 2010); "Methods in Enzymology" "Handbook of Experimental Immunology" (Weir, 1997); "Gene Transfer Vectors for Mammalian Cells" (Miller and Calos, 1987); "Short Protocols in Molecular Biology" (Ausubel, 2002); "Polymerase Chain Reaction: Principles, Applications and Troubleshooting", (Babar, 2011); "Current Protocols in Immunology" (Coligan, 2002). These techniques are applicable to the production of the polynucleotides and polypeptides of the invention, and, as such, may be considered in making and practicing the invention. Particularly useful techniques for particular embodiments will be discussed in the sections that follow.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1-Fusion Protein Binding

Fusion Protein Constructs and Expression.

The expression plasmid constructs for these fusion proteins were generated using gene fragments synthesized de novo (ThermoFisher Scientific) for each of the desired ligand/receptor components, linked to synthesized gene fragments of the hinge, CH2 and CH3 domains of either the A or B chains (i.e. $Z_2$, $Z_3$, $Z_2'$ or $Z_3'$ domains). The individual components were spliced together by polymerase chain reaction (PCR) using primers at the ends containing restriction sites for cloning into the expression plasmid, pCEP4, an EBV episomal expression vector (originally developed in the Tykocinski laboratory) that replicates extra-chromosomally at high copy numbers. At the time of gene synthesis, the DNA fragments are codon optimized for expression in Chinese hamster ovary suspension (CHO-S) cells. Fusion proteins were produced by transient co-transfection of an A chain construct and a B chain construct into ExpiCHO-S shake flask cultures using TransIT-Pro reagent (MIRUS) at 37° C. for 24 h, then incubated at 32° C. for 8-10 total days. Proteins were purified from conditioned culture supernatant by mixing with Protein A agarose resin at 6° C. overnight and then collected and eluted with a non-denaturing neutral pH elution buffer (PIERCE). Each fusion protein was verified by sodium dodecyl sulfate polyacrylamide gel electrophoresis (SDS-PAGE) for size and integrity.

Fusion Protein Binding Studies.

Figure 18:
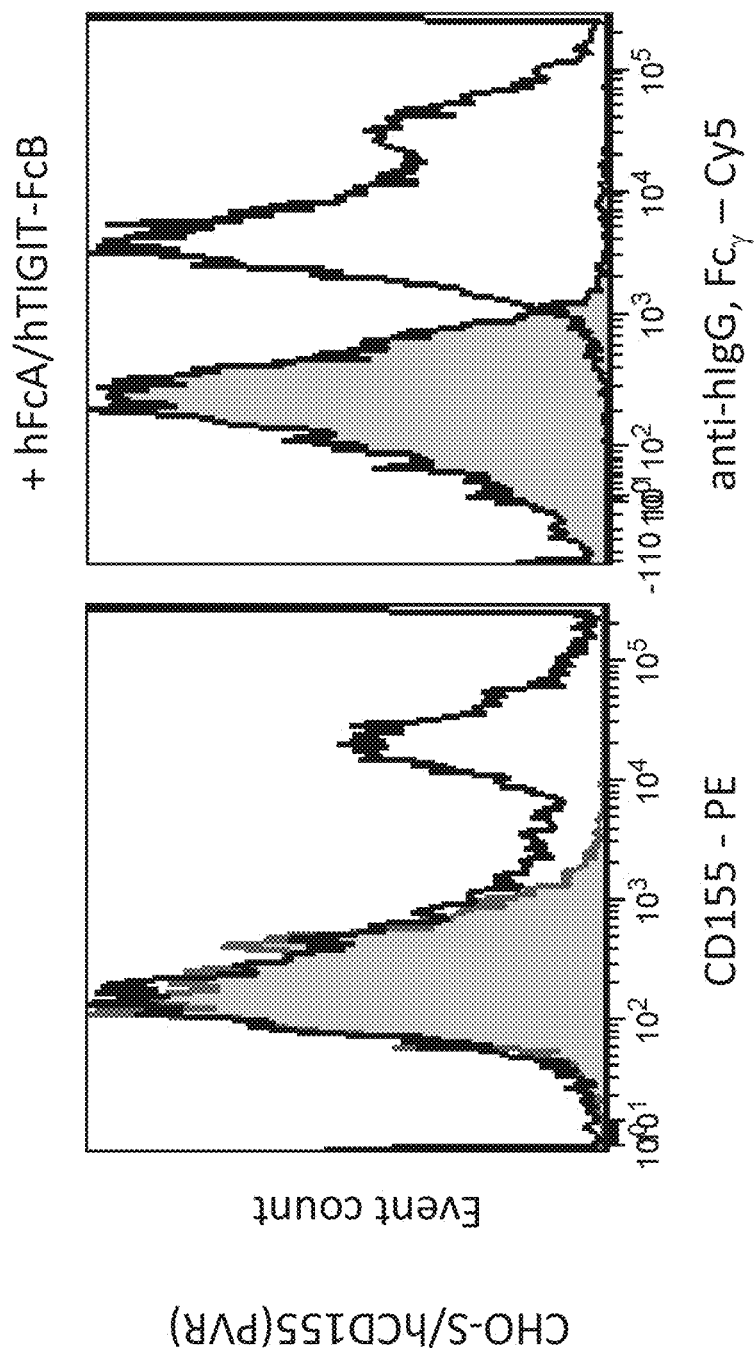
FIG. 18 shows that hFcA/hTIGIT-FcB (SEQ ID NO: 23 plus SEQ ID NO: 33) binds to cells expressing human CD155.
Figure 19:
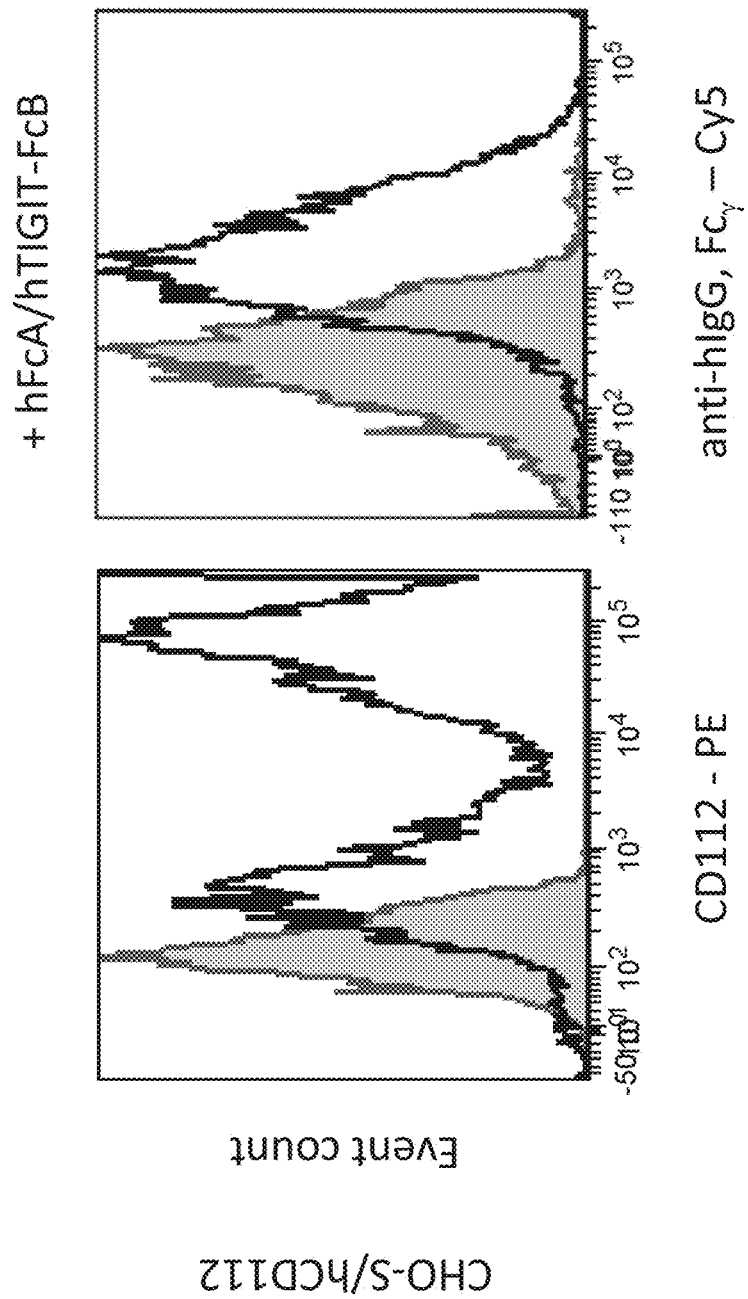
FIG. 19 shows that hFcA/hTIGIT-FcB (SEQ ID NO: 23 plus SEQ ID NO: 33) binds to cells expressing human CD112.
Figure 20:
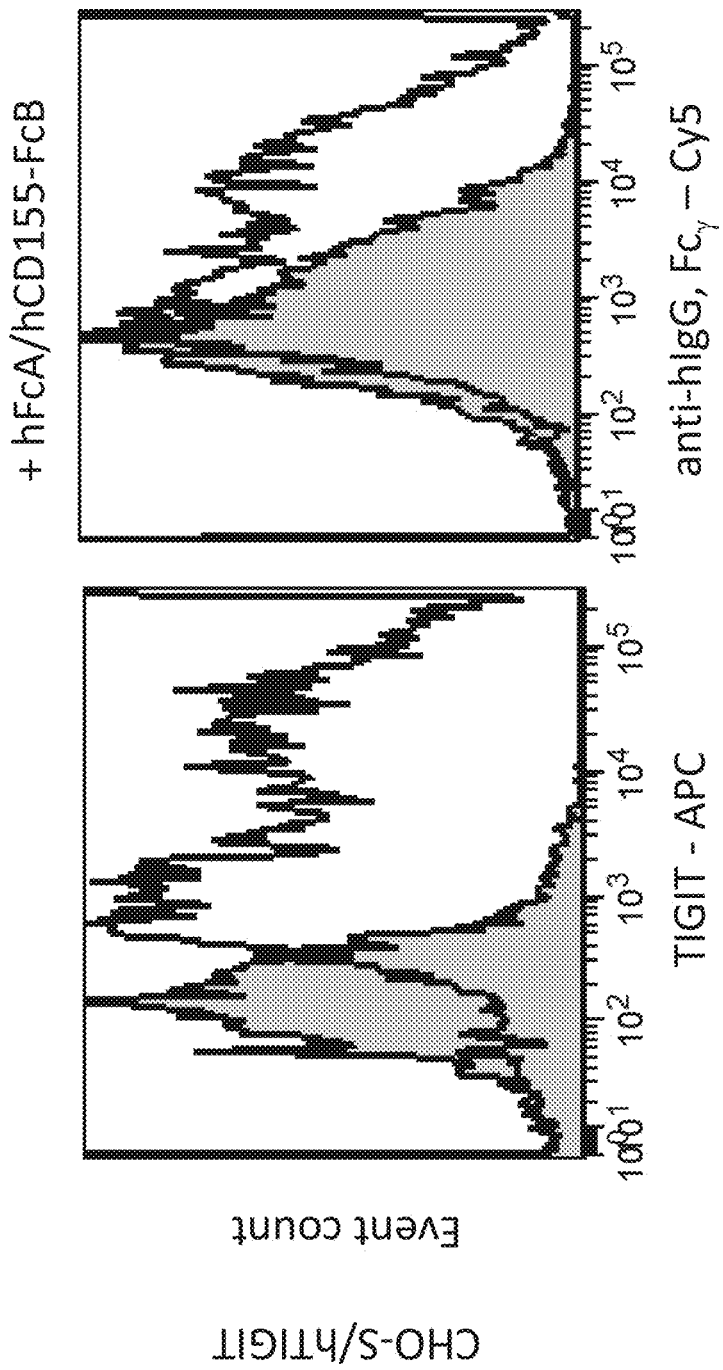
FIG. 20 shows that hFcA/hCD155-FcB (SEQ ID NO: 23 plus SEQ ID NO: 32) binds to cells expressing human TIGIT.
Figure 21:
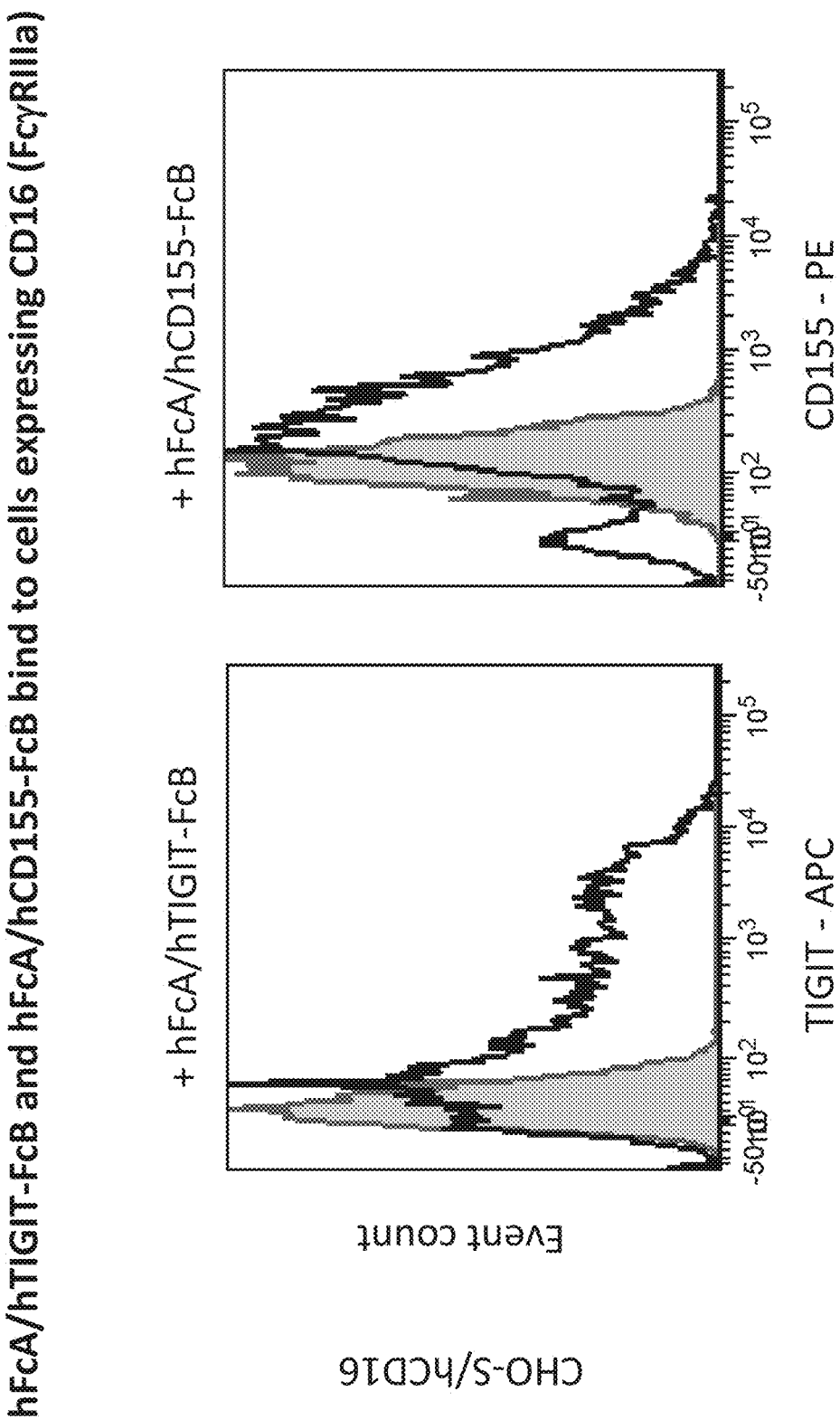
FIG. 21 shows that hFcA/hTIGIT-FcB (SEQ ID NO: 23 plus SEQ ID NO: 33) and hFcA/hCD155-FcB (SEQ ID NO: 23 plus SEQ ID NO: 32) bind to cells expressing CD16 (FcγRIIIa).

Ligand constructs expressing the full-length cDNA for human CD155, T cell immunoreceptor with immunoglobulin and ITIM domains (TIGIT), CD112 and CD16 (Fc$_\gamma$RIIIa) were generated by PCR and cloned into the expression plasmid pcDNA3.1+ (ThermoFisher Scientific). Each expression construct was transfected into CHO-S cells with Lipofectamine 3000 (ThermoFisher) and stable transfectants selected by the addition of G418. Ligand expression was determined by flow cytometry following immunostaining with the appropriate fluorochrome-conjugated anti-ligand antibody (black line) or the appropriate fluorochrome-conjugated isotype control antibody (gray line and fill). Data were analyzed using FCSalyzer software. For fusion protein binding studies, fusion proteins were added to either non-transfected CHO-S cells as control (gray line and fill) or CHO-S transfectants expressing corresponding ligands and incubated for 1 h at 6° C., then washed, and immunostained with Cy5-conjugated anti-human IgG, Fcγ-specific antibody (black line) and analyzed by flow cytometry. See FIGS. 18-20. For CD16 binding studies, TIGIT or CD155 containing fusion proteins were incubated with either non-transfected CHO-S cells as control (gray line and fill) or CD16-expressing CHO-S transfectants and detected by immunostaining with APC- or PE-conjugated antibody recognizing TIGIT or CD155, respectively (black line). See FIG. 21.

Example 2—Fusion Protein Binding Assays and Migration Assays

Protein Gel Analysis

Figure 22:
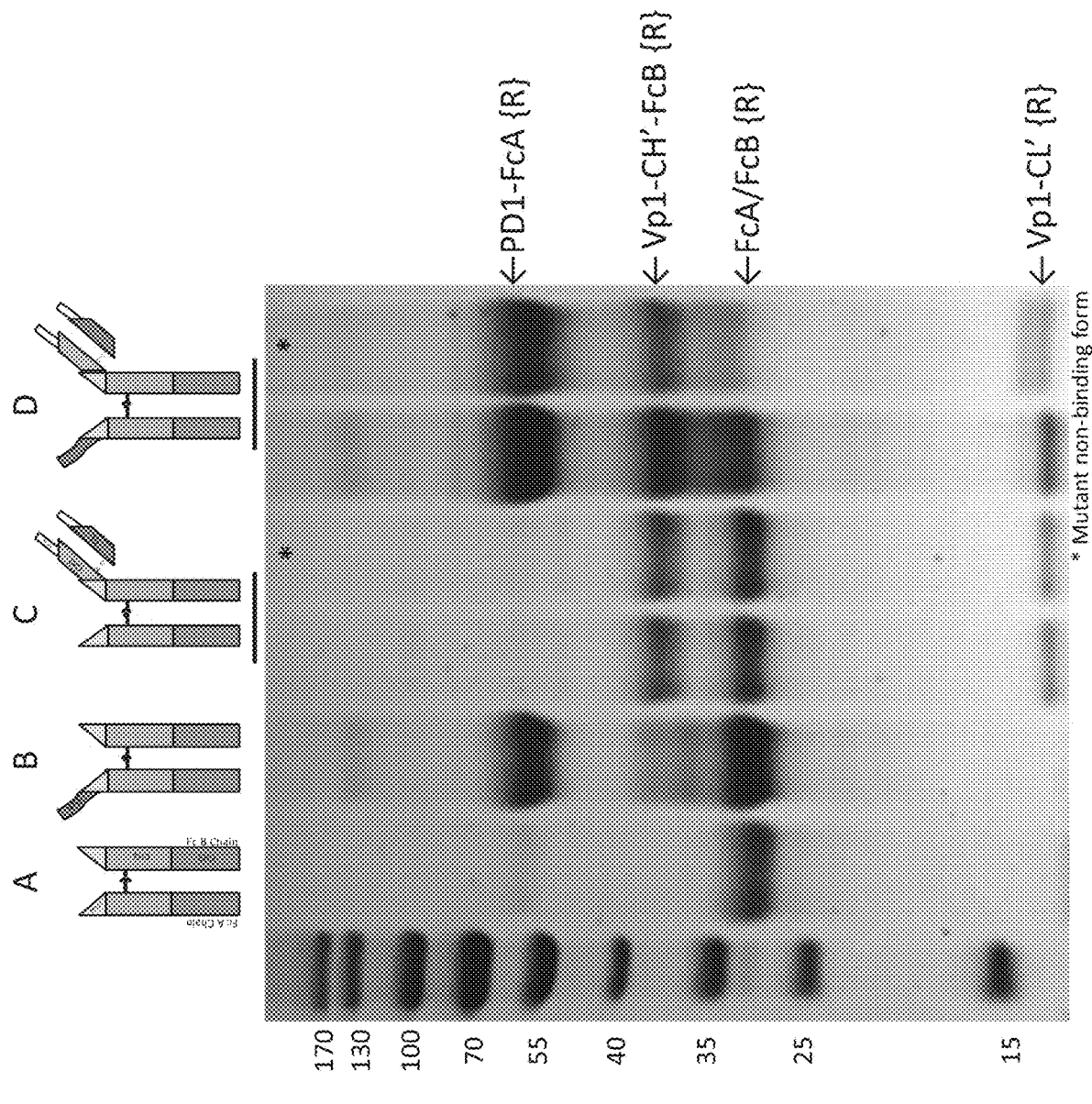
FIG. 22 shows fusion proteins separated and reduced (R) on SDS-PAGE, Coomassie gel staining. As depicted, 'A' refers to hFcA/hFcB (SEQ ID NO: 23 plus SEQ ID NO: 36), 'B' refers to PD-1-hFcA/FcB (SEQ ID NO: 14 plus SEQ ID NO: 36), 'C' refers to hFcA/VpI-CH'-FcB/VpI-CL (SEQ ID NO: 23 plus SEQ ID NO: 53 and SEQ ID NO: 61) and 'D' refers to PD-1-hFcA/VpI-CH'-FcB/VpI-CL (SEQ ID NO: 14 plus SEQ ID NO: 53 and SEQ ID NO: 61).
Figures 23A, 23B, 23C, 23D:
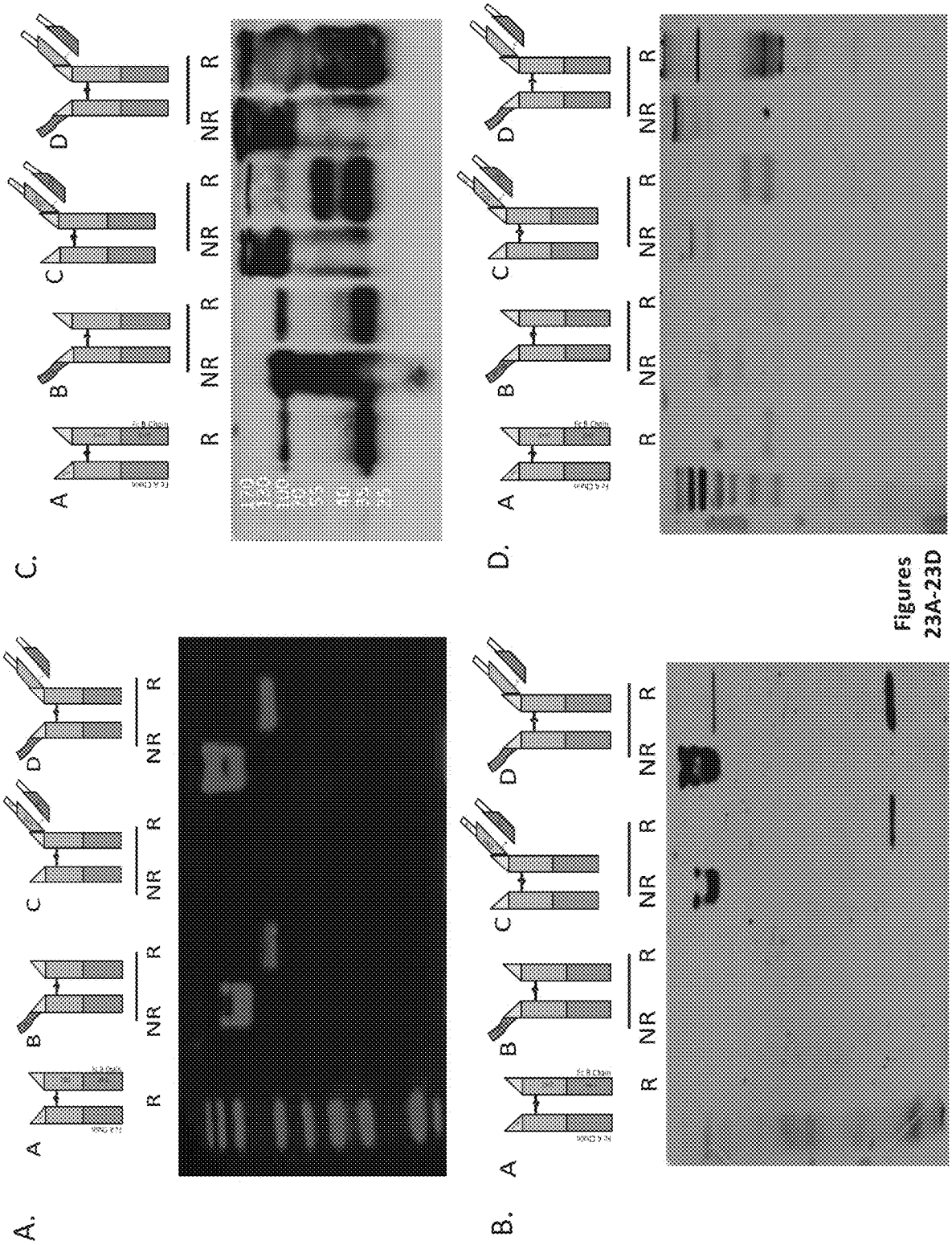
FIGS. 23A-23D are a series of Western Blots. Western Blot analysis was performed on protein-A purified fusion proteins from conditioned media of Expi-CHO cells transfected with expression constructs as indicated in FIG. 22. Observed bands were consistent with the expected sizes of PD-1-hFcA (SEQ ID NO: 14) and vMIPII-CL' (SEQ ID NO: 57); 125 kDa for non-reduced (NR) samples and 60 kDa and 20 kDa, respectively, for/reduced (R) samples. The Western Blot was probed with (FIG. 23A) antibody against PD1, (FIG. 23B) antibody against IgG kappa light chain, (FIG. 23C) antibody against IgG heavy chain, and (FIG. 23D) antibody against vMIP-II.

Fusion Proteins were separated and reduced (R) or non-reduced (NR) on 12% SDS-PAGE gel and stained for 12 hours in PageBlue Protein Staining Solution (Thermo Scientific). See FIG. 22.

Immunoblot Analysis

Fusion proteins were then quantitated by Pierce BCA Protein Assay Kit (Thermo Fisher) and loaded on 12% SDS-PAGE gels. Proteins were electrotransferred onto Immobilon-P membranes (EMD Millipore, Billerica, MA) and incubated with (A) Ab against PD1 and (B) Ab against IgG light chain primary antibodies for 12 h in Odyssey blocking buffer (Licor, Lincoln, NE). The corresponding secondary antibodies were used at 1:10,000 dilutions (Santa Cruz). Immunoblots were scanned using the Odyssey Infrared Imaging System (LI-COR Biosciences, model #9120). See FIGS. 23A-D.

Fusion Protein Binding Studies.

Figure 24:
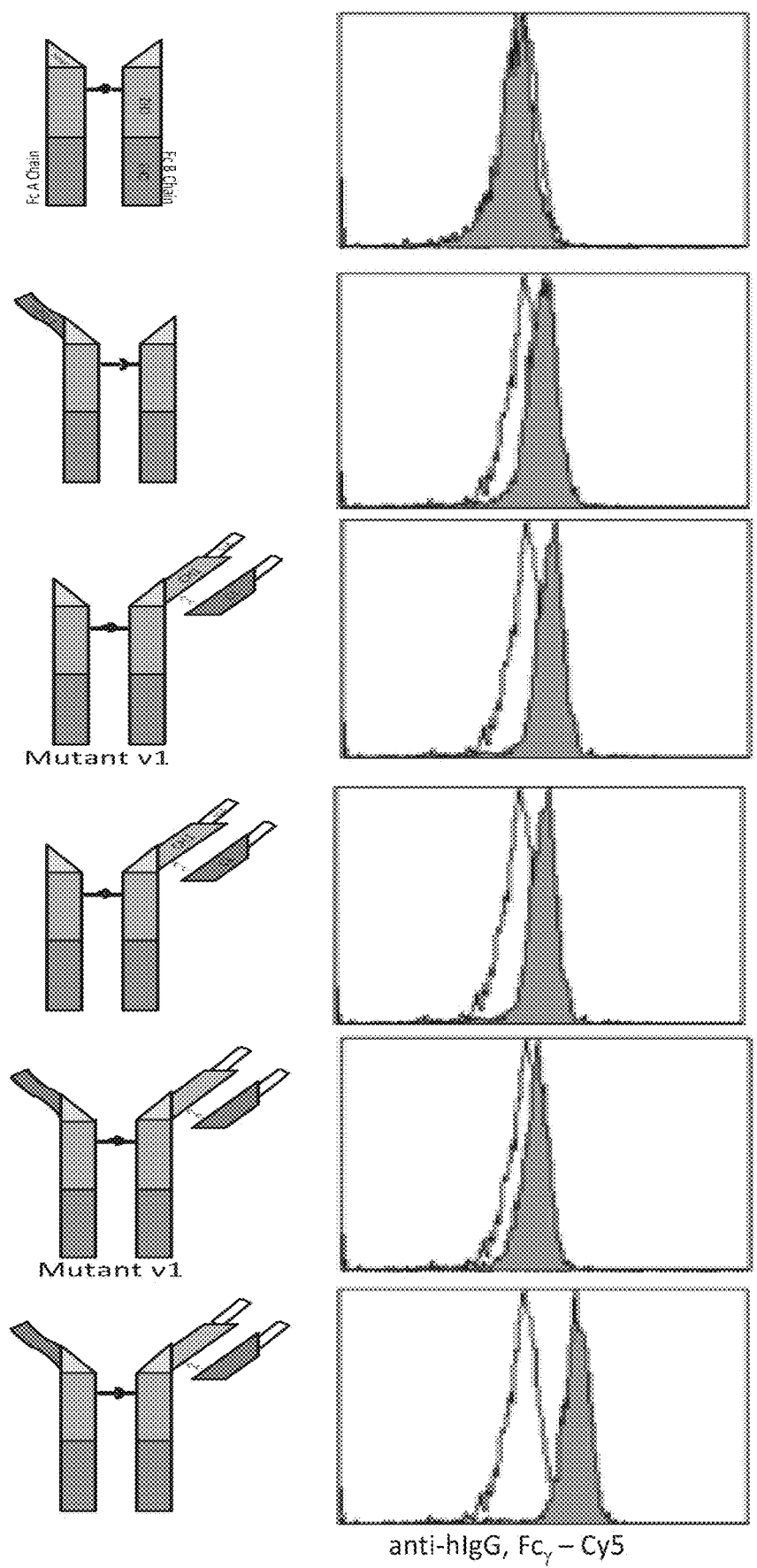
FIG. 24 shows fusion protein binding to B16 melanoma cell lines that express PD-L1 and CXCR4 or CXCR7 on their cell surface. The fusion proteins tested are (in order from top to bottom): hFcA/hFcB (SEQ ID NO: 23 plus SEQ ID NO: 36), PD-1-hFcA/FcB (SEQ ID NO: 14 plus SEQ ID NO: 36), hFcA/V1Δmut-CH'-FcB/V1Δmut-CL' (SEQ ID NO: 23 plus SEQ ID NO: 52 and SEQ ID NO: 60), hFcA/V1Δ-CH'-FcB/V1Δ-CL' (SEQ ID NO: 23 plus SEQ ID NO: 51 and SEQ ID NO: 59), PD-1-hFcA/V1Δmut-CH'-FcB/V1Δmut-CL' (SEQ ID NO: 14 plus SEQ ID NO: 52 and SEQ ID NO: 60) and PD-1-hFcA/V1Δ-CH'-FcB/V1Δ-CL' (SEQ ID NO: 14 plus SEQ ID NO: 51 and SEQ ID NO: 59).

CXCR4/7 and PD1+ melanoma cell lines, (A) YUM-MER1.7 cells or (B) B16, were incubated with the indicated fusion proteins for 1 h at 6° C., then washed, and immunostained with Cy5-conjugated anti-human IgG, Fcγ-specific antibody and analyzed by flow cytometry (solid black line), control sample incubated without fusion protein (filled grey line) as shown in FIG. 24.

Transwell Assay.

Transwell inserts were inserted in 24-well companion plates (Corning, cat. #353504). Cell suspensions were seeded in top invasion chambers at 25,000 cells/chamber. DMEM with 100 ng/mL of CXCL12 was added to each bottom well as chemoattractant. Samples were incubated at 37° C. for 24 hours to allow for cell migration. Non-invading cells on the apical surface of the insert were removed with cotton swabs, and cells that had migrated to the lower surface of the supports were stained using 2% crystal violet. See FIG. 25.

Example 3—TriTouch-101 Induces Melanoma Regression

Figure 25:
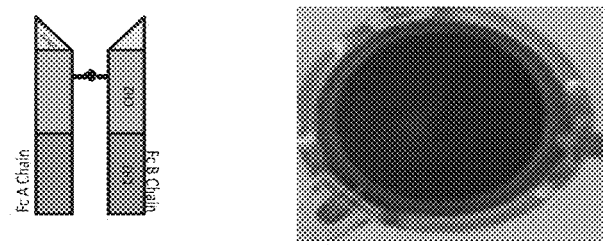
FIG. 25 shows a transwell assay, measuring the inhibitory effects of fusion proteins on melanoma cell migration. Representative images from a single transwell migration assay of migrated B16-F10 cells treated with 100 ng/mL CXCL12 and fusion proteins are shown. The fusion proteins tested are (in order from top to bottom): hFcA/hFcB (SEQ ID NO: 23 plus SEQ ID NO: 36), PD-1-hFcA/FcB (SEQ ID NO: 14 plus SEQ ID NO: 36), hFcA/V1Δmut-CH'-FcB/V1Δmut-CL' (SEQ ID NO: 23 plus SEQ ID NO: 52 and SEQ ID NO: 60), hFcA/V1Δ-CH'-FcB/V1Δ-CL' (SEQ ID NO: 23 plus SEQ ID NO: 51 and SEQ ID NO: 59), PD-1-hFcA/V1Δmut-CH'-FcB/V1Δmut-CL' (SEQ ID NO: 14 plus SEQ ID NO: 52 and SEQ ID NO: 60) and PD-1-hFcA/V1Δ-CH'-FcB/V1Δ-CL' (SEQ ID NO: 14 plus SEQ ID NO: 51 and SEQ ID NO: 59). The assays were stained with 2% crystal violet.
Figure 25:
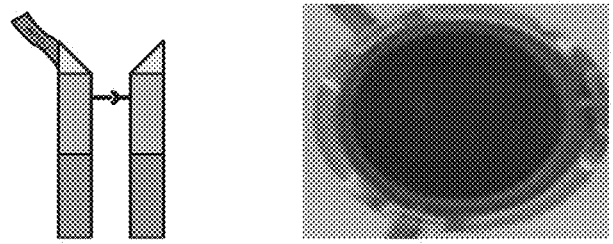
Figure 25:
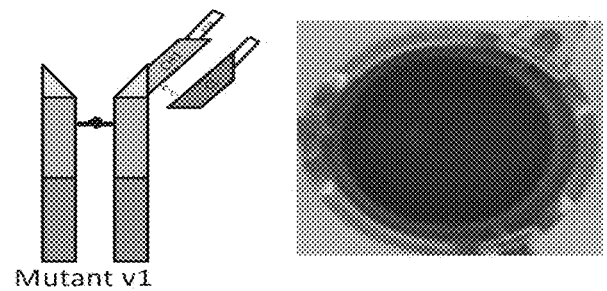
Figure 25:
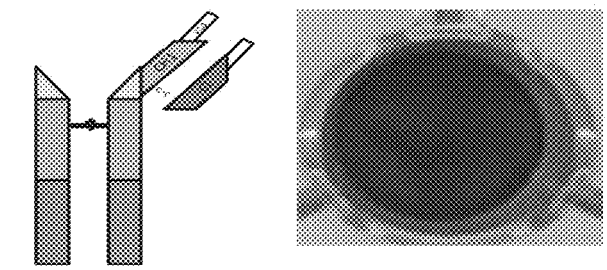
Figure 25:
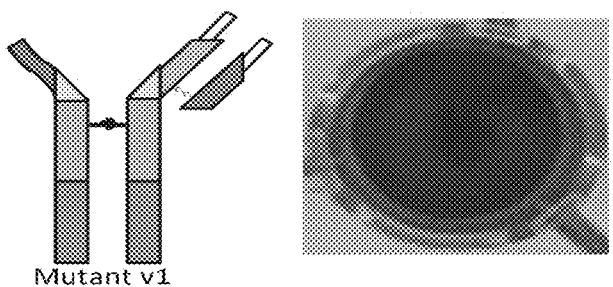
Figure 25:
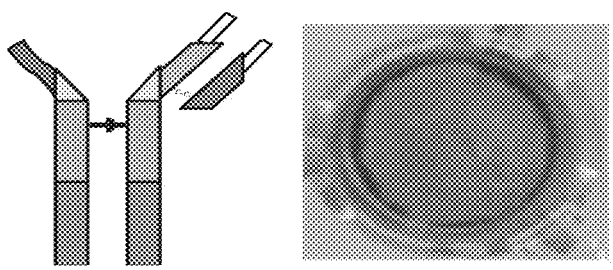
Figure 26A:
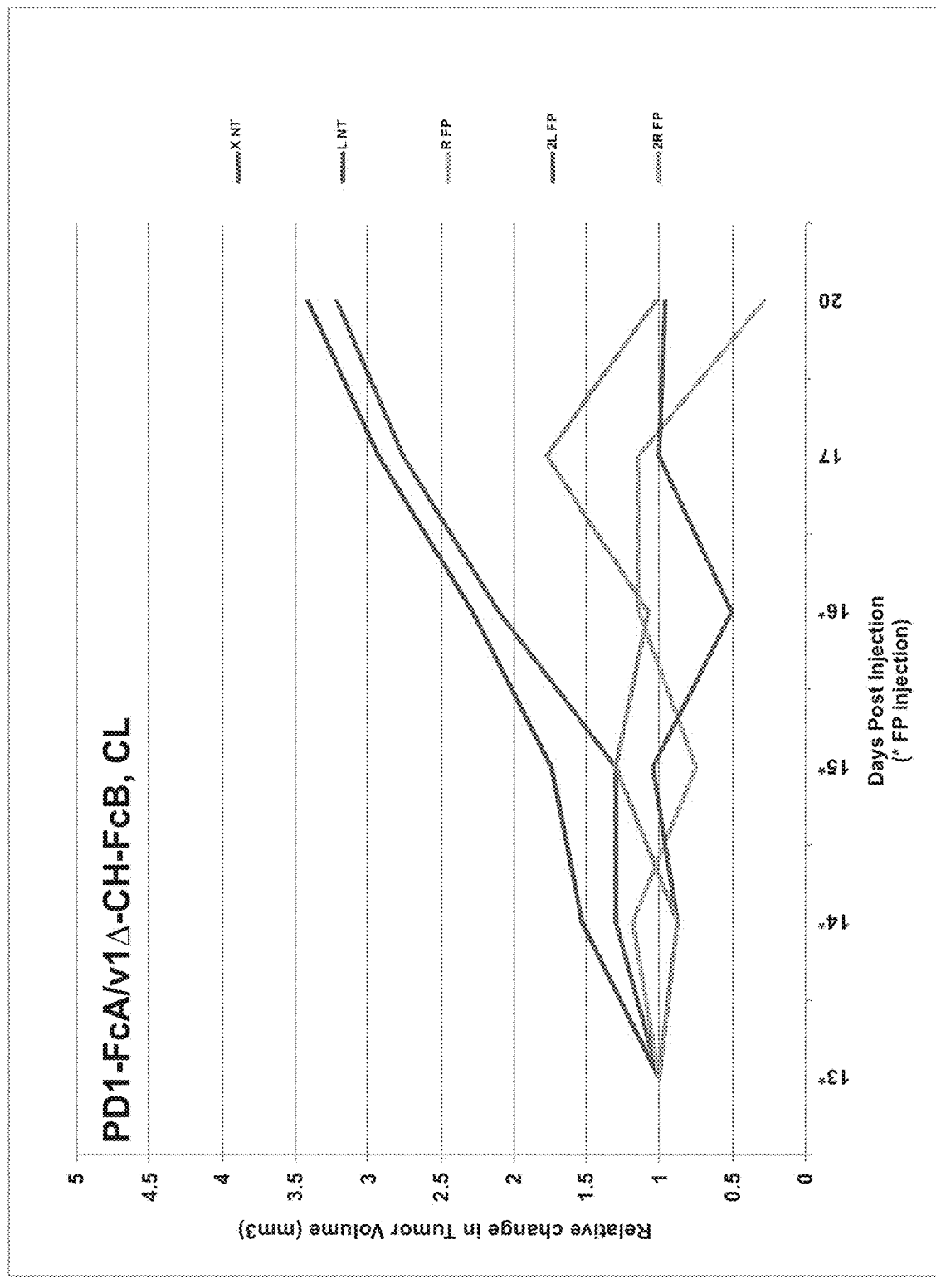
FIGS. 26A-26B show inhibition of tumor growth mediated by the fusion protein (FP) PD1-hFcA/v1Δ-CH'-hFcB/v1Δ-CL' (SEQ ID NO: 14 plus SEQ ID NO: 51 and SEQ ID NO: 59) in the B16F10 melanoma subcutaneous model. C57BL/6 mice were treated with 100 μl of (10 μg/mL) FP in PBS (mice R, 2L and 2R) or PBS only (mice X or L) on days 13, 14, 15, 16 and 21 post subcutaneous inoculation with $1 \times 10^5$ B16F10 tumor cells. Tumor size over time was measured and plotted for each mouse in FIG. 26A.
Figure 26B:

Inhibition of tumor growth was induced by TriTouch-101 PD1hFcA*vMIPIICH-hFcB*CL (FP) in vivo, The B16F10 melanoma subcutaneous model was used to demonstrate the induction of melanoma regression by PD1hFcA*vMIPIICH-hFcB*CL (FP). Briefly, BL16 mice were treated with 100 µl of (10 ug/mL) FP (mice R, 2L and 2R) or PBS (Mice X or L), 5 times on days 13, 14, 15, 16 and 21 days post-subcutaneously inoculated with 1×10$^5$ B16F10 cells. Tumor sizes were measured (FIG. 26A). Representative images of 1 mouse from each treatment group, (X top and 2R bottom) are depicted in FIG. 26B. These in vivo data showing TriTouch-101 induces melanoma regression, go along with previous data showing that this fusion protein inhibits melanoma cells in a migration assay (FIG. 25).

Example 4—NK Modulating TriTouch Protein Species

ADCC was augmented by addition of multi-functional fusion proteins (FIG. 27). The SKOV-3 ovarian cell line was plated in a 96-well plate at 3000 cells/well, allowed to adhere and labeled with CellTracker Red CMTPX reagent. The SKOV-3 cells were then labeled with a green fluorescence Caspase-3 reagent. The CD16.NK-92 cell line (V158 variant) was added to the wells at a E:T 5:1 with the various fusion proteins at 25 mg/ml or no protein and analyzed using the Incucyte live-cell analysis system, measuring the number of fluorescent double positive (red+green) cells. Results shown depict the 20 h time point (FIG. 27).

Other Embodiments

The recitation of a listing of elements in any definition of a variable herein includes definitions of that variable as any single element or combination (or subcombination) of listed elements. The recitation of an embodiment herein includes that embodiment as any single embodiment or in combination with any other embodiment or portions thereof.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A heterodimeric fusion protein comprising Component A and Component B, wherein:
   Component A comprises the amino acid sequence of any one of SEQ ID NOs: 14-22 and wherein Component B comprises the amino acid sequence of any one of SEQ ID NOs: 32-33 and 35.

\* \* \* \* \*

SEQUENCE LISTING

```
<160> NUMBER OF SEQ ID NOS: 69

<210> SEQ ID NO 1
<211> LENGTH: 144
<212> TYPE: PRT
<213> ORGANISM: Homo sapiens

<400> SEQUENCE: 1

Gly Trp Phe Leu Asp Ser Pro Asp Arg Pro Trp Asn Pro Pro Thr Phe
1               5                   10                  15

Ser Pro Ala Leu Leu Val Val Thr Glu Gly Asp Asn Ala Thr Phe Thr
            20                  25                  30

Cys Ser Phe Ser Asn Thr Ser Glu Ser Phe Val Leu Asn Trp Tyr Arg
        35                  40                  45

Met Ser Pro Ser Asn Gln Thr Asp Lys Leu Ala Ala Phe Pro Glu Asp
    50                  55                  60

Arg Ser Gln Pro Gly Gln Asp Cys Arg Phe Arg Val Thr Gln Leu Pro
65                  70                  75                  80

Asn Gly Arg Asp Phe His Met Ser Val Val Arg Ala Arg Arg Asn Asp
                85                  90                  95

Ser Gly Thr Tyr Leu Cys Gly Ala Ile Ser Leu Ala Pro Lys Ala Gln
            100                 105                 110

Ile Lys Glu Ser Leu Arg Ala Glu Leu Arg Val Thr Glu Arg Arg Ala
        115                 120                 125

Glu Val Pro Thr Ala His Pro Ser Pro Ser Pro Arg Pro Ala Gly Gln
    130                 135                 140

<210> SEQ ID NO 2
<211> LENGTH: 144
<212> TYPE: PRT
<213> ORGANISM: Homo sapiens

<400> SEQUENCE: 2

Gly Trp Phe Leu Asp Ser Pro Asp Arg Pro Trp Asn Pro Pro Thr Phe
1               5                   10                  15

Ser Pro Ala Leu Leu Val Val Thr Glu Gly Asp Asn Ala Thr Phe Thr
            20                  25                  30

Cys Ser Phe Ser Asn Thr Ser Glu Ser Phe His Val Val Trp His Arg
        35                  40                  45

Glu Ser Pro Ser Gly Gln Thr Asp Thr Leu Ala Ala Phe Pro Glu Asp
    50                  55                  60

Arg Ser Gln Pro Gly Gln Asp Cys Arg Phe Arg Val Thr Gln Leu Pro
65                  70                  75                  80

Asn Gly Arg Asp Phe His Met Ser Val Val Arg Ala Arg Arg Asn Asp
                85                  90                  95

Ser Gly Thr Tyr Val Cys Gly Val Ile Ser Leu Ala Pro Lys Ile Gln
            100                 105                 110

Ile Lys Glu Ser Leu Arg Ala Glu Leu Arg Val Thr Glu Arg Arg Ala
        115                 120                 125

Glu Val Pro Thr Ala His Pro Ser Pro Ser Pro Arg Pro Ala Gly Gln
```

130             135             140

<210> SEQ ID NO 3
<211> LENGTH: 120
<212> TYPE: PRT
<213> ORGANISM: Homo sapiens

<400> SEQUENCE: 3

Met Met Thr Gly Thr Ile Glu Thr Gly Asn Ile Ser Ala Glu Lys
1               5                   10                  15

Gly Gly Ser Ile Ile Leu Gln Cys His Leu Ser Ser Thr Thr Ala Gln
            20                  25                  30

Val Thr Gln Val Asn Trp Glu Gln Asp Gln Leu Leu Ala Ile Cys
            35                  40                  45

Asn Ala Asp Leu Gly Trp His Ile Ser Pro Ser Phe Lys Asp Arg Val
        50                  55                  60

Ala Pro Gly Pro Gly Leu Gly Leu Thr Leu Gln Ser Leu Thr Val Asn
65                  70                  75                  80

Asp Thr Gly Glu Tyr Phe Cys Ile Tyr His Thr Tyr Pro Asp Gly Thr
                85                  90                  95

Tyr Thr Gly Arg Ile Phe Leu Glu Val Leu Glu Ser Ser Val Ala Glu
            100                 105                 110

His Gly Ala Arg Phe Gln Ile Pro
            115                 120

<210> SEQ ID NO 4
<211> LENGTH: 498
<212> TYPE: PRT
<213> ORGANISM: Homo sapiens

<400> SEQUENCE: 4

Val Trp Glu Lys Thr Val Asn Thr Glu Glu Asn Val Tyr Ala Thr Leu
1               5                   10                  15

Gly Ser Asp Val Asn Leu Thr Cys Gln Thr Gln Thr Val Gly Phe Phe
            20                  25                  30

Val Gln Met Gln Trp Ser Lys Val Thr Asn Lys Ile Asp Leu Ile Ala
            35                  40                  45

Val Tyr His Pro Gln Tyr Gly Phe Tyr Cys Ala Tyr Gly Arg Pro Cys
        50                  55                  60

Glu Ser Leu Val Thr Phe Thr Glu Thr Pro Glu Asn Gly Ser Lys Trp
65                  70                  75                  80

Thr Leu His Leu Arg Asn Met Ser Cys Ser Val Ser Gly Arg Tyr Glu
                85                  90                  95

Cys Met Leu Val Leu Tyr Pro Glu Gly Ile Gln Thr Lys Ile Tyr Asn
            100                 105                 110

Leu Leu Ile Gln Thr His Val Thr Ala Asp Glu Trp Asn Ser Asn His
            115                 120                 125

Thr Ile Glu Ile Glu Ile Asn Gln Thr Leu Glu Ile Pro Cys Phe Gln
        130                 135                 140

Asn Ser Ser Ser Lys Ile Ser Ser Glu Phe Thr Tyr Ala Trp Ser Val
145                 150                 155                 160

Glu Asn Ser Ser Thr Asp Ser Trp Val Leu Leu Ser Lys Gly Ile Lys
                165                 170                 175

Glu Asp Asn Gly Thr Gln Glu Thr Leu Ile Ser Gln Asn His Leu Ile
            180                 185                 190

Ser Asn Ser Thr Leu Leu Lys Asp Arg Val Lys Leu Gly Thr Asp Tyr

```
                195                 200                 205
Arg Leu His Leu Ser Pro Val Gln Ile Phe Asp Asp Gly Arg Lys Phe
210                 215                 220

Ser Cys His Ile Arg Val Gly Pro Asn Lys Ile Leu Arg Ser Ser Thr
225                 230                 235                 240

Thr Val Lys Val Phe Ala Lys Pro Glu Ile Pro Val Ile Val Glu Asn
                245                 250                 255

Asn Ser Thr Asp Val Leu Val Glu Arg Arg Phe Thr Cys Leu Leu Lys
                260                 265                 270

Asn Val Phe Pro Lys Ala Asn Ile Thr Trp Phe Ile Asp Gly Ser Phe
            275                 280                 285

Leu His Asp Glu Lys Glu Gly Ile Tyr Ile Thr Asn Glu Glu Arg Lys
        290                 295                 300

Gly Lys Asp Gly Phe Leu Glu Leu Lys Ser Val Leu Thr Arg Val His
305                 310                 315                 320

Ser Asn Lys Pro Ala Gln Ser Asp Asn Leu Thr Ile Trp Cys Met Ala
                325                 330                 335

Leu Ser Pro Val Pro Gly Asn Lys Val Trp Asn Ile Ser Ser Glu Lys
                340                 345                 350

Ile Thr Phe Leu Leu Gly Ser Glu Ile Ser Ser Thr Asp Pro Pro Leu
            355                 360                 365

Ser Val Thr Glu Ser Thr Leu Asp Thr Gln Pro Ser Pro Ala Ser Ser
        370                 375                 380

Val Ser Pro Ala Arg Tyr Pro Ala Thr Ser Ser Val Thr Leu Val Asp
385                 390                 395                 400

Val Ser Ala Leu Arg Pro Asn Thr Thr Pro Gln Pro Ser Asn Ser Ser
                405                 410                 415

Met Thr Thr Arg Gly Phe Asn Tyr Pro Trp Thr Ser Ser Gly Thr Asp
                420                 425                 430

Thr Lys Lys Ser Val Ser Arg Ile Pro Ser Glu Thr Tyr Ser Ser Ser
            435                 440                 445

Pro Ser Gly Ala Gly Ser Thr Leu His Asp Asn Val Phe Thr Ser Thr
        450                 455                 460

Ala Arg Ala Phe Ser Glu Val Pro Thr Thr Ala Asn Gly Ser Thr Lys
465                 470                 475                 480

Thr Asn His Val His Ile Thr Gly Ile Val Val Asn Lys Pro Lys Asp
                485                 490                 495

Gly Met

<210> SEQ ID NO 5
<211> LENGTH: 151
<212> TYPE: PRT
<213> ORGANISM: Homo sapiens

<400> SEQUENCE: 5

Met Gly His Arg Thr Leu Val Leu Pro Trp Val Leu Thr Leu Leu Cys
1               5                   10                  15

Val Thr Ala Gly Thr Pro Glu Val Trp Val Gln Val Arg Met Glu Ala
                20                  25                  30

Thr Glu Leu Ser Ser Phe Thr Ile Arg Cys Gly Phe Leu Gly Ser Gly
            35                  40                  45

Ser Ile Ser Leu Val Thr Val Ser Trp Gly Gly Pro Asn Gly Ala Gly
        50                  55                  60

Gly Thr Thr Leu Ala Val Leu His Pro Glu Arg Gly Ile Arg Gln Trp
```

```
              65                  70                  75                  80
Ala Pro Ala Arg Gln Ala Arg Trp Glu Thr Gln Ser Ser Ile Ser Leu
                 85                  90                  95

Ile Leu Glu Gly Ser Gly Ala Ser Ser Pro Cys Ala Asn Thr Thr Phe
                100                 105                 110

Cys Cys Lys Phe Ala Ser Phe Pro Glu Gly Ser Trp Glu Ala Cys Gly
                115                 120                 125

Ser Leu Pro Pro Ser Ser Asp Pro Gly Leu Ser Ala Pro Pro Thr Pro
130                 135                 140

Ala Pro Ile Leu Arg Ala Asp
145                 150

<210> SEQ ID NO 6
<211> LENGTH: 236
<212> TYPE: PRT
<213> ORGANISM: Homo sapiens

<400> SEQUENCE: 6

Glu Glu Val Leu Trp His Thr Ser Val Pro Phe Ala Glu Asn Met Ser
1               5                   10                  15

Leu Glu Cys Val Tyr Pro Ser Met Gly Ile Leu Thr Gln Val Glu Trp
                20                  25                  30

Phe Lys Ile Gly Thr Gln Gln Asp Ser Ile Ala Ile Phe Ser Pro Thr
            35                  40                  45

His Gly Met Val Ile Arg Lys Pro Tyr Ala Glu Arg Val Tyr Phe Leu
        50                  55                  60

Asn Ser Thr Met Ala Ser Asn Asn Met Thr Leu Phe Phe Arg Asn Ala
65                  70                  75                  80

Ser Glu Asp Asp Val Gly Tyr Tyr Ser Cys Ser Leu Tyr Thr Tyr Pro
                85                  90                  95

Gln Gly Thr Trp Gln Lys Val Ile Gln Val Val Gln Ser Asp Ser Phe
                100                 105                 110

Glu Ala Ala Val Pro Ser Asn Ser His Ile Val Ser Glu Pro Gly Lys
            115                 120                 125

Asn Val Thr Leu Thr Cys Gln Pro Gln Met Thr Trp Pro Val Gln Ala
        130                 135                 140

Val Arg Trp Glu Lys Ile Gln Pro Arg Gln Ile Asp Leu Leu Thr Tyr
145                 150                 155                 160

Cys Asn Leu Val His Gly Arg Asn Phe Thr Ser Lys Phe Pro Arg Gln
                165                 170                 175

Ile Val Ser Asn Cys Ser His Gly Arg Trp Ser Val Ile Val Ile Pro
                180                 185                 190

Asp Val Thr Val Ser Asp Ser Gly Leu Tyr Arg Cys Tyr Leu Gln Ala
            195                 200                 205

Ser Ala Gly Glu Asn Glu Thr Phe Val Met Arg Leu Thr Val Ala Glu
        210                 215                 220

Gly Lys Thr Asp Asn Gln Tyr Thr Leu Phe Val Ala
225                 230                 235

<210> SEQ ID NO 7
<211> LENGTH: 330
<212> TYPE: PRT
<213> ORGANISM: Homo sapiens

<400> SEQUENCE: 7

Gln Asn Leu Phe Thr Lys Asp Val Thr Val Ile Glu Gly Glu Val Ala
```

```
1               5                   10                  15
Thr Ile Ser Cys Gln Val Asn Lys Ser Asp Asp Ser Val Ile Gln Leu
            20                  25                  30

Leu Asn Pro Asn Arg Gln Thr Ile Tyr Phe Arg Asp Phe Arg Pro Leu
            35                  40                  45

Lys Asp Ser Arg Phe Gln Leu Leu Asn Phe Ser Ser Glu Leu Lys
50                      55                  60

Val Ser Leu Thr Asn Val Ser Ile Ser Asp Glu Gly Arg Tyr Phe Cys
65                  70                  75                  80

Gln Leu Tyr Thr Asp Pro Pro Gln Glu Ser Tyr Thr Thr Ile Thr Val
                85                  90                  95

Leu Val Pro Pro Arg Asn Leu Met Ile Asp Ile Gln Lys Asp Thr Ala
            100                 105                 110

Val Glu Gly Glu Glu Ile Glu Val Asn Cys Thr Ala Met Ala Ser Lys
            115                 120                 125

Pro Ala Thr Thr Ile Arg Trp Phe Lys Gly Asn Thr Glu Leu Lys Gly
            130                 135                 140

Lys Ser Glu Val Glu Glu Trp Ser Asp Met Tyr Thr Val Thr Ser Gln
145                 150                 155                 160

Leu Met Leu Lys Val His Lys Glu Asp Asp Gly Val Pro Val Ile Cys
                165                 170                 175

Gln Val Glu His Pro Ala Val Thr Gly Asn Leu Gln Thr Gln Arg Tyr
            180                 185                 190

Leu Glu Val Gln Tyr Lys Pro Gln Val His Ile Gln Met Thr Tyr Pro
            195                 200                 205

Leu Gln Gly Leu Thr Arg Glu Gly Asp Ala Leu Glu Leu Thr Cys Glu
            210                 215                 220

Ala Ile Gly Lys Pro Gln Pro Val Met Val Thr Trp Val Arg Val Asp
225                 230                 235                 240

Asp Glu Met Pro Gln His Ala Val Leu Ser Gly Pro Asn Leu Phe Ile
                245                 250                 255

Asn Asn Leu Asn Lys Thr Asp Asn Gly Thr Tyr Arg Cys Glu Ala Ser
            260                 265                 270

Asn Ile Val Gly Lys Ala His Ser Asp Tyr Met Leu Tyr Val Tyr Asp
            275                 280                 285

Pro Pro Thr Thr Ile Pro Pro Pro Thr Thr Thr Thr Thr Thr Thr Thr
            290                 295                 300

Thr Thr Thr Thr Thr Ile Leu Thr Ile Ile Thr Asp Ser Arg Ala Gly
305                 310                 315                 320

Glu Glu Gly Ser Ile Arg Ala Val Asp His
                325                 330
```

<210> SEQ ID NO 8
<211> LENGTH: 342
<212> TYPE: PRT
<213> ORGANISM: Homo sapiens

<400> SEQUENCE: 8

```
Pro Ile Ile Val Glu Pro His Val Thr Ala Val Trp Gly Lys Asn Val
1               5                   10                  15

Ser Leu Lys Cys Leu Ile Glu Val Asn Glu Thr Ile Thr Gln Ile Ser
            20                  25                  30

Trp Glu Lys Ile His Gly Lys Ser Ser Gln Thr Val Ala Val His His
            35                  40                  45
```

-continued

Pro Gln Tyr Gly Phe Ser Val Gln Gly Glu Tyr Gln Gly Arg Val Leu
    50              55                  60

Phe Lys Asn Tyr Ser Leu Asn Asp Ala Thr Ile Thr Leu His Asn Ile
65              70                  75                  80

Gly Phe Ser Asp Ser Gly Lys Tyr Ile Cys Lys Ala Val Thr Phe Pro
                85                  90                  95

Leu Gly Asn Ala Gln Ser Ser Thr Thr Val Thr Val Leu Val Glu Pro
            100                 105                 110

Thr Val Ser Leu Ile Lys Gly Pro Asp Ser Leu Ile Asp Gly Gly Asn
            115                 120                 125

Glu Thr Val Ala Ala Ile Cys Ile Ala Ala Thr Gly Lys Pro Val Ala
130                 135                 140

His Ile Asp Trp Glu Gly Asp Leu Gly Glu Met Glu Ser Thr Thr Thr
145                 150                 155                 160

Ser Phe Pro Asn Glu Thr Ala Thr Ile Ile Ser Gln Tyr Lys Leu Phe
                165                 170                 175

Pro Thr Arg Phe Ala Arg Gly Arg Ile Thr Cys Val Val Lys His
            180                 185                 190

Pro Ala Leu Glu Lys Asp Ile Arg Tyr Ser Phe Ile Leu Asp Ile Gln
            195                 200                 205

Tyr Ala Pro Glu Val Ser Val Thr Gly Tyr Asp Gly Asn Trp Phe Val
210                 215                 220

Gly Arg Lys Gly Val Asn Leu Lys Cys Asn Ala Asp Ala Asn Pro Pro
225                 230                 235                 240

Pro Phe Lys Ser Val Trp Ser Arg Leu Asp Gly Gln Trp Pro Asp Gly
                245                 250                 255

Leu Leu Ala Ser Asp Asn Thr Leu His Phe Val His Pro Leu Thr Phe
            260                 265                 270

Asn Tyr Ser Gly Val Tyr Ile Cys Lys Val Thr Asn Ser Leu Gly Gln
            275                 280                 285

Arg Ser Asp Gln Lys Val Ile Tyr Ile Ser Asp Pro Thr Thr Thr
    290                 295                 300

Thr Leu Gln Pro Thr Ile Gln Trp His Pro Ser Thr Ala Asp Ile Glu
305                 310                 315                 320

Asp Leu Ala Thr Glu Pro Lys Lys Leu Pro Phe Pro Leu Ser Thr Leu
                325                 330                 335

Ala Thr Ile Lys Asp Asp
            340

<210> SEQ ID NO 9
<211> LENGTH: 285
<212> TYPE: PRT
<213> ORGANISM: Homo sapiens

<400> SEQUENCE: 9

Ala Glu Pro His Ser Leu Arg Tyr Asn Leu Thr Val Leu Ser Trp Asp
1               5                   10                  15

Gly Ser Val Gln Ser Gly Phe Leu Thr Glu Val His Leu Asp Gly Gln
            20                  25                  30

Pro Phe Leu Arg Cys Asp Arg Gln Lys Cys Arg Ala Lys Pro Gln Gly
        35                  40                  45

Gln Trp Ala Glu Asp Val Leu Gly Asn Lys Thr Trp Asp Arg Glu Thr
    50                  55                  60

Arg Asp Leu Thr Gly Asn Gly Lys Asp Leu Arg Met Thr Leu Ala His
65                  70                  75                  80

-continued

Ile Lys Asp Gln Lys Glu Gly Leu His Ser Leu Gln Glu Ile Arg Val
                85                  90                  95

Cys Glu Ile His Glu Asp Asn Ser Thr Arg Ser Ser Gln His Phe Tyr
            100                 105                 110

Tyr Asp Gly Glu Leu Phe Leu Ser Gln Asn Leu Glu Thr Lys Glu Trp
        115                 120                 125

Thr Met Pro Gln Ser Ser Arg Ala Gln Thr Leu Ala Met Asn Val Arg
    130                 135                 140

Asn Phe Leu Lys Glu Asp Ala Met Lys Thr Lys Thr His Tyr His Ala
145                 150                 155                 160

Met His Ala Asp Cys Leu Gln Glu Leu Arg Arg Tyr Leu Lys Ser Gly
                165                 170                 175

Val Val Leu Arg Arg Thr Val Pro Pro Met Val Asn Val Thr Arg Ser
            180                 185                 190

Glu Ala Ser Glu Gly Asn Ile Thr Val Thr Cys Arg Ala Ser Gly Phe
        195                 200                 205

Tyr Pro Trp Asn Ile Thr Leu Ser Trp Arg Gln Asp Gly Val Ser Leu
    210                 215                 220

Ser His Asp Thr Gln Gln Trp Gly Asp Val Leu Pro Asp Gly Asn Gly
225                 230                 235                 240

Thr Tyr Gln Thr Trp Val Ala Thr Arg Ile Cys Gln Gly Glu Glu Gln
                245                 250                 255

Arg Phe Thr Cys Tyr Met Glu His Ser Gly Asn His Ser Thr His Pro
            260                 265                 270

Val Pro Ser Gly Lys Val Leu Val Leu Gln Ser His Trp
        275                 280                 285

<210> SEQ ID NO 10
<211> LENGTH: 18
<212> TYPE: PRT
<213> ORGANISM: Homo sapiens

<400> SEQUENCE: 10

Met Lys Trp Val Thr Phe Ile Ser Leu Leu Phe Leu Phe Ser Ser Ala
1               5                   10                  15

Tyr Ser

<210> SEQ ID NO 11
<211> LENGTH: 22
<212> TYPE: PRT
<213> ORGANISM: Homo sapiens

<400> SEQUENCE: 11

Glu Pro Lys Ser Ser Asp Lys Thr His Thr Cys Pro Pro Cys Pro Ala
1               5                   10                  15

Pro Glu Leu Leu Gly Gly
            20

<210> SEQ ID NO 12
<211> LENGTH: 103
<212> TYPE: PRT
<213> ORGANISM: Homo sapiens

<400> SEQUENCE: 12

Pro Ser Val Phe Leu Phe Pro Pro Lys Pro Lys Asp Thr Leu Met Ile
1               5                   10                  15

Ser Arg Thr Pro Glu Val Thr Cys Val Val Val Asp Val Ser His Glu

-continued

```
                 20                  25                  30

Asp Pro Glu Val Lys Phe Asn Trp Tyr Val Asp Gly Val Glu Val His
            35                  40                  45

Asn Ala Lys Thr Lys Pro Arg Glu Glu Gln Tyr Asn Ser Thr Tyr Arg
        50                  55                  60

Val Val Ser Val Leu Thr Val Leu His Gln Asp Trp Leu Asn Gly Lys
65                  70                  75                  80

Glu Tyr Lys Cys Ala Val Ser Asn Lys Ala Leu Pro Ala Pro Ile Glu
                85                  90                  95

Lys Thr Ile Ser Lys Ala Lys
            100

<210> SEQ ID NO 13
<211> LENGTH: 107
<212> TYPE: PRT
<213> ORGANISM: Homo sapiens

<400> SEQUENCE: 13

Gly Gln Pro Arg Glu Pro Gln Val Cys Thr Leu Pro Pro Ser Arg Asp
1               5                   10                  15

Glu Leu Thr Lys Asn Gln Val Ser Leu Trp Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Lys Leu Thr Val Asp Lys Ser Arg Trp Gln Gln Gly
65                  70                  75                  80

Asn Val Phe Ser Cys Ser Val Leu His Glu Ala Leu His Ser His Tyr
                85                  90                  95

Thr Gln Lys Ser Leu Ser Leu Ser Pro Gly Lys
            100                 105

<210> SEQ ID NO 14
<211> LENGTH: 396
<212> TYPE: PRT
<213> ORGANISM: Artificial sequence
<220> FEATURE:
<223> OTHER INFORMATION: Human PD-1-hFcA

<400> SEQUENCE: 14

Met Lys Trp Val Thr Phe Ile Ser Leu Leu Phe Leu Phe Ser Ser Ala
1               5                   10                  15

Tyr Ser Ala Ser Gly Trp Phe Leu Asp Ser Pro Asp Arg Pro Trp Asn
            20                  25                  30

Pro Pro Thr Phe Ser Pro Ala Leu Leu Val Val Thr Glu Gly Asp Asn
        35                  40                  45

Ala Thr Phe Thr Cys Ser Phe Ser Asn Thr Ser Glu Ser Phe Val Leu
    50                  55                  60

Asn Trp Tyr Arg Met Ser Pro Ser Asn Gln Thr Asp Lys Leu Ala Ala
65                  70                  75                  80

Phe Pro Glu Asp Arg Ser Gln Pro Gly Gln Asp Cys Arg Phe Arg Val
                85                  90                  95

Thr Gln Leu Pro Asn Gly Arg Asp Phe His Met Ser Val Val Arg Ala
            100                 105                 110

Arg Arg Asn Asp Ser Gly Thr Tyr Leu Cys Gly Ala Ile Ser Leu Ala
        115                 120                 125
```

```
Pro Lys Ala Gln Ile Lys Glu Ser Leu Arg Ala Glu Leu Arg Val Thr
    130                 135                 140

Glu Arg Arg Ala Glu Val Pro Thr Ala His Pro Ser Pro Ser Pro Arg
145                 150                 155                 160

Pro Ala Gly Gln Glu Pro Lys Ser Ser Asp Lys Thr His Thr Cys Pro
                165                 170                 175

Pro Cys Pro Ala Pro Glu Leu Leu Gly Gly Pro Ser Val Phe Leu Phe
            180                 185                 190

Pro Pro Lys Pro Lys Asp Thr Leu Met Ile Ser Arg Thr Pro Glu Val
        195                 200                 205

Thr Cys Val Val Val Asp Val Ser His Glu Asp Pro Glu Val Lys Phe
    210                 215                 220

Asn Trp Tyr Val Asp Gly Val Glu Val His Asn Ala Lys Thr Lys Pro
225                 230                 235                 240

Arg Glu Glu Gln Tyr Asn Ser Thr Tyr Arg Val Val Ser Val Leu Thr
                245                 250                 255

Val Leu His Gln Asp Trp Leu Asn Gly Lys Glu Tyr Lys Cys Ala Val
            260                 265                 270

Ser Asn Lys Ala Leu Pro Ala Pro Ile Glu Lys Thr Ile Ser Lys Ala
        275                 280                 285

Lys Gly Gln Pro Arg Glu Pro Gln Val Cys Thr Leu Pro Pro Ser Arg
290                 295                 300

Asp Glu Leu Thr Lys Asn Gln Val Ser Leu Trp Cys Leu Val Lys Gly
305                 310                 315                 320

Phe Tyr Pro Ser Asp Ile Ala Val Glu Trp Glu Ser Asn Gly Gln Pro
                325                 330                 335

Glu Asn Asn Tyr Lys Thr Thr Pro Pro Val Leu Asp Ser Asp Gly Ser
            340                 345                 350

Phe Phe Leu Tyr Ser Lys Leu Thr Val Asp Lys Ser Arg Trp Gln Gln
        355                 360                 365

Gly Asn Val Phe Ser Cys Ser Val Leu His Glu Ala Leu His Ser His
370                 375                 380

Tyr Thr Gln Lys Ser Leu Ser Leu Ser Pro Gly Lys
385                 390                 395

<210> SEQ ID NO 15
<211> LENGTH: 396
<212> TYPE: PRT
<213> ORGANISM: Artificial sequence
<220> FEATURE:
<223> OTHER INFORMATION: High affinity human PD-1-hFcA

<400> SEQUENCE: 15

Met Lys Trp Val Thr Phe Ile Ser Leu Leu Phe Leu Phe Ser Ser Ala
1               5                   10                  15

Tyr Ser Ala Ser Gly Trp Phe Leu Asp Ser Pro Asp Arg Pro Trp Asn
                20                  25                  30

Pro Pro Thr Phe Ser Pro Ala Leu Leu Val Val Thr Glu Gly Asp Asn
            35                  40                  45

Ala Thr Phe Thr Cys Ser Phe Ser Asn Thr Ser Glu Ser Phe His Val
        50                  55                  60

Val Trp His Arg Glu Ser Pro Ser Gly Gln Thr Asp Thr Leu Ala Ala
65                  70                  75                  80

Phe Pro Glu Asp Arg Ser Gln Pro Gly Gln Asp Cys Arg Phe Arg Val
                85                  90                  95
```

```
Thr Gln Leu Pro Asn Gly Arg Asp Phe His Met Ser Val Val Arg Ala
            100                 105                 110

Arg Arg Asn Asp Ser Gly Thr Tyr Val Cys Gly Val Ile Ser Leu Ala
            115                 120                 125

Pro Lys Ile Gln Ile Lys Glu Ser Leu Arg Ala Glu Leu Arg Val Thr
            130                 135                 140

Glu Arg Arg Ala Glu Val Pro Thr Ala His Pro Ser Pro Ser Pro Arg
145                 150                 155                 160

Pro Ala Gly Gln Glu Pro Lys Ser Ser Asp Lys Thr His Thr Cys Pro
            165                 170                 175

Pro Cys Pro Ala Pro Glu Leu Leu Gly Gly Pro Ser Val Phe Leu Phe
            180                 185                 190

Pro Pro Lys Pro Lys Asp Thr Leu Met Ile Ser Arg Thr Pro Glu Val
            195                 200                 205

Thr Cys Val Val Val Asp Val Ser His Glu Asp Pro Glu Val Lys Phe
            210                 215                 220

Asn Trp Tyr Val Asp Gly Val Glu Val His Asn Ala Lys Thr Lys Pro
225                 230                 235                 240

Arg Glu Glu Gln Tyr Asn Ser Thr Tyr Arg Val Val Ser Val Leu Thr
            245                 250                 255

Val Leu His Gln Asp Trp Leu Asn Gly Lys Glu Tyr Lys Cys Ala Val
            260                 265                 270

Ser Asn Lys Ala Leu Pro Ala Pro Ile Glu Lys Thr Ile Ser Lys Ala
            275                 280                 285

Lys Gly Gln Pro Arg Glu Pro Gln Val Cys Thr Leu Pro Pro Ser Arg
            290                 295                 300

Asp Glu Leu Thr Lys Asn Gln Val Ser Leu Trp Cys Leu Val Lys Gly
305                 310                 315                 320

Phe Tyr Pro Ser Asp Ile Ala Val Glu Trp Glu Ser Asn Gly Gln Pro
            325                 330                 335

Glu Asn Asn Tyr Lys Thr Thr Pro Pro Val Leu Asp Ser Asp Gly Ser
            340                 345                 350

Phe Phe Leu Tyr Ser Lys Leu Thr Val Asp Lys Ser Arg Trp Gln Gln
            355                 360                 365

Gly Asn Val Phe Ser Cys Ser Val Leu His Glu Ala Leu His Ser His
            370                 375                 380

Tyr Thr Gln Lys Ser Leu Ser Leu Ser Pro Gly Lys
385                 390                 395

<210> SEQ ID NO 16
<211> LENGTH: 403
<212> TYPE: PRT
<213> ORGANISM: Artificial sequence
<220> FEATURE:
<223> OTHER INFORMATION: Human CD112R-hFcA

<400> SEQUENCE: 16

Met Lys Trp Val Thr Phe Ile Ser Leu Leu Phe Leu Phe Ser Ser Ala
1               5                   10                  15

Tyr Ser Ala Ser Met Gly His Arg Thr Leu Val Leu Pro Trp Val Leu
            20                  25                  30

Leu Thr Leu Cys Val Thr Ala Gly Thr Pro Glu Val Trp Val Gln Val
            35                  40                  45

Arg Met Glu Ala Thr Glu Leu Ser Ser Phe Thr Ile Arg Cys Gly Phe
50                  55                  60
```

Leu Gly Ser Gly Ser Ile Ser Leu Val Thr Val Ser Trp Gly Gly Pro
65                  70                  75                  80

Asn Gly Ala Gly Gly Thr Thr Leu Ala Val Leu His Pro Glu Arg Gly
                85                  90                  95

Ile Arg Gln Trp Ala Pro Ala Arg Gln Ala Arg Trp Glu Thr Gln Ser
            100                 105                 110

Ser Ile Ser Leu Ile Leu Glu Gly Ser Gly Ala Ser Ser Pro Cys Ala
        115                 120                 125

Asn Thr Thr Phe Cys Cys Lys Phe Ala Ser Phe Pro Glu Gly Ser Trp
    130                 135                 140

Glu Ala Cys Gly Ser Leu Pro Pro Ser Ser Asp Pro Gly Leu Ser Ala
145                 150                 155                 160

Pro Pro Thr Pro Ala Pro Ile Leu Arg Ala Asp Glu Pro Lys Ser Ser
                165                 170                 175

Asp Lys Thr His Thr Cys Pro Pro Cys Pro Ala Pro Glu Leu Leu Gly
                180                 185                 190

Gly Pro Ser Val Phe Leu Phe Pro Pro Lys Pro Lys Asp Thr Leu Met
            195                 200                 205

Ile Ser Arg Thr Pro Glu Val Thr Cys Val Val Val Asp Val Ser His
210                 215                 220

Glu Asp Pro Glu Val Lys Phe Asn Trp Tyr Val Asp Gly Val Glu Val
225                 230                 235                 240

His Asn Ala Lys Thr Lys Pro Arg Glu Glu Gln Tyr Asn Ser Thr Tyr
                245                 250                 255

Arg Val Val Ser Val Leu Thr Val Leu His Gln Asp Trp Leu Asn Gly
            260                 265                 270

Lys Glu Tyr Lys Cys Ala Val Ser Asn Lys Ala Leu Pro Ala Pro Ile
        275                 280                 285

Glu Lys Thr Ile Ser Lys Ala Lys Gly Gln Pro Arg Glu Pro Gln Val
    290                 295                 300

Cys Thr Leu Pro Pro Ser Arg Asp Glu Leu Thr Lys Asn Gln Val Ser
305                 310                 315                 320

Leu Trp Cys Leu Val Lys Gly Phe Tyr Pro Ser Asp Ile Ala Val Glu
                325                 330                 335

Trp Glu Ser Asn Gly Gln Pro Glu Asn Asn Tyr Lys Thr Thr Pro Pro
                340                 345                 350

Val Leu Asp Ser Asp Gly Ser Phe Phe Leu Tyr Ser Lys Leu Thr Val
            355                 360                 365

Asp Lys Ser Arg Trp Gln Gln Gly Asn Val Phe Ser Cys Ser Val Leu
        370                 375                 380

His Glu Ala Leu His Ser His Tyr Thr Gln Lys Ser Leu Ser Leu Ser
385                 390                 395                 400

Pro Gly Lys

<210> SEQ ID NO 17
<211> LENGTH: 370
<212> TYPE: PRT
<213> ORGANISM: Artificial sequence
<220> FEATURE:
<223> OTHER INFORMATION: Human TIGIT-hFcA

<400> SEQUENCE: 17

Met Lys Trp Val Thr Phe Ile Ser Leu Leu Phe Leu Phe Ser Ser Ala
1               5                   10                  15

-continued

Tyr Ser Met Met Thr Gly Thr Ile Glu Thr Thr Gly Asn Ile Ser Ala
             20                  25                  30

Glu Lys Gly Gly Ser Ile Ile Leu Gln Cys His Leu Ser Ser Thr Thr
         35                  40                  45

Ala Gln Val Thr Gln Val Asn Trp Glu Gln Gln Asp Gln Leu Leu Ala
     50                  55                  60

Ile Cys Asn Ala Asp Leu Gly Trp His Ile Ser Pro Ser Phe Lys Asp
 65                  70                  75                  80

Arg Val Ala Pro Gly Pro Gly Leu Gly Leu Thr Leu Gln Ser Leu Thr
                 85                  90                  95

Val Asn Asp Thr Gly Glu Tyr Phe Cys Ile Tyr His Thr Tyr Pro Asp
            100                 105                 110

Gly Thr Tyr Thr Gly Arg Ile Phe Leu Glu Val Leu Glu Ser Ser Val
        115                 120                 125

Ala Glu His Gly Ala Arg Phe Gln Ile Pro Glu Pro Lys Ser Ser Asp
    130                 135                 140

Lys Thr His Thr Cys Pro Pro Cys Pro Ala Pro Glu Leu Leu Gly Gly
145                 150                 155                 160

Pro Ser Val Phe Leu Phe Pro Pro Lys Pro Lys Asp Thr Leu Met Ile
                165                 170                 175

Ser Arg Thr Pro Glu Val Thr Cys Val Val Val Asp Val Ser His Glu
            180                 185                 190

Asp Pro Glu Val Lys Phe Asn Trp Tyr Val Asp Gly Val Glu Val His
        195                 200                 205

Asn Ala Lys Thr Lys Pro Arg Glu Glu Gln Tyr Asn Ser Thr Tyr Arg
    210                 215                 220

Val Val Ser Val Leu Thr Val Leu His Gln Asp Trp Leu Asn Gly Lys
225                 230                 235                 240

Glu Tyr Lys Cys Ala Val Ser Asn Lys Ala Leu Pro Ala Pro Ile Glu
                245                 250                 255

Lys Thr Ile Ser Lys Ala Lys Gly Gln Pro Arg Glu Pro Gln Val Cys
            260                 265                 270

Thr Leu Pro Pro Ser Arg Asp Glu Leu Thr Lys Asn Gln Val Ser Leu
        275                 280                 285

Trp Cys Leu Val Lys Gly Phe Tyr Pro Ser Asp Ile Ala Val Glu Trp
    290                 295                 300

Glu Ser Asn Gly Gln Pro Glu Asn Asn Tyr Lys Thr Thr Pro Pro Val
305                 310                 315                 320

Leu Asp Ser Asp Gly Ser Phe Phe Leu Tyr Ser Lys Leu Thr Val Asp
                325                 330                 335

Lys Ser Arg Trp Gln Gln Gly Asn Val Phe Ser Cys Ser Val Leu His
            340                 345                 350

Glu Ala Leu His Ser His Tyr Thr Gln Lys Ser Leu Ser Leu Ser Pro
        355                 360                 365

Gly Lys
    370

<210> SEQ ID NO 18
<211> LENGTH: 748
<212> TYPE: PRT
<213> ORGANISM: Artificial sequence
<220> FEATURE:
<223> OTHER INFORMATION: Human CD96-hFcA

<400> SEQUENCE: 18

```
Met Lys Trp Val Thr Phe Ile Ser Leu Leu Phe Leu Phe Ser Ser Ala
1               5                   10                  15

Tyr Ser Val Trp Glu Lys Thr Val Asn Thr Glu Glu Asn Val Tyr Ala
            20                  25                  30

Thr Leu Gly Ser Asp Val Asn Leu Thr Cys Gln Thr Gln Thr Val Gly
        35                  40                  45

Phe Phe Val Gln Met Gln Trp Ser Lys Val Thr Asn Lys Ile Asp Leu
    50                  55                  60

Ile Ala Val Tyr His Pro Gln Tyr Gly Phe Tyr Cys Ala Tyr Gly Arg
65                  70                  75                  80

Pro Cys Glu Ser Leu Val Thr Phe Thr Glu Thr Pro Glu Asn Gly Ser
            85                  90                  95

Lys Trp Thr Leu His Leu Arg Asn Met Ser Cys Ser Val Ser Gly Arg
            100                 105                 110

Tyr Glu Cys Met Leu Val Leu Tyr Pro Glu Gly Ile Gln Thr Lys Ile
            115                 120                 125

Tyr Asn Leu Leu Ile Gln Thr His Val Thr Ala Asp Glu Trp Asn Ser
    130                 135                 140

Asn His Thr Ile Glu Ile Glu Ile Asn Gln Thr Leu Glu Ile Pro Cys
145                 150                 155                 160

Phe Gln Asn Ser Ser Ser Lys Ile Ser Ser Glu Phe Thr Tyr Ala Trp
                165                 170                 175

Ser Val Glu Asn Ser Ser Thr Asp Ser Trp Val Leu Leu Ser Lys Gly
            180                 185                 190

Ile Lys Glu Asp Asn Gly Thr Gln Glu Thr Leu Ile Ser Gln Asn His
            195                 200                 205

Leu Ile Ser Asn Ser Thr Leu Leu Lys Asp Arg Val Lys Leu Gly Thr
    210                 215                 220

Asp Tyr Arg Leu His Leu Ser Pro Val Gln Ile Phe Asp Asp Gly Arg
225                 230                 235                 240

Lys Phe Ser Cys His Ile Arg Val Gly Pro Asn Lys Ile Leu Arg Ser
                245                 250                 255

Ser Thr Thr Val Lys Val Phe Ala Lys Pro Glu Ile Pro Val Ile Val
            260                 265                 270

Glu Asn Asn Ser Thr Asp Val Leu Val Glu Arg Arg Phe Thr Cys Leu
    275                 280                 285

Leu Lys Asn Val Phe Pro Lys Ala Asn Ile Thr Trp Phe Ile Asp Gly
    290                 295                 300

Ser Phe Leu His Asp Glu Lys Glu Gly Ile Tyr Ile Thr Asn Glu Glu
305                 310                 315                 320

Arg Lys Gly Lys Asp Gly Phe Leu Glu Leu Lys Ser Val Leu Thr Arg
            325                 330                 335

Val His Ser Asn Lys Pro Ala Gln Ser Asp Asn Leu Thr Ile Trp Cys
            340                 345                 350

Met Ala Leu Ser Pro Val Pro Gly Asn Lys Val Trp Asn Ile Ser Ser
        355                 360                 365

Glu Lys Ile Thr Phe Leu Leu Gly Ser Glu Ile Ser Ser Thr Asp Pro
    370                 375                 380

Pro Leu Ser Val Thr Glu Ser Thr Leu Asp Thr Gln Pro Ser Pro Ala
385                 390                 395                 400

Ser Ser Val Ser Pro Ala Arg Tyr Pro Ala Thr Ser Ser Val Thr Leu
            405                 410                 415

Val Asp Val Ser Ala Leu Arg Pro Asn Thr Thr Pro Gln Pro Ser Asn
```

```
                420             425             430
    Ser Ser Met Thr Thr Arg Gly Phe Asn Tyr Pro Trp Thr Ser Ser Gly
            435                 440                 445

Thr Asp Thr Lys Lys Ser Val Ser Arg Ile Pro Ser Glu Thr Tyr Ser
        450                 455                 460

Ser Ser Pro Ser Gly Ala Gly Ser Thr Leu His Asp Asn Val Phe Thr
    465                 470                 475                 480

Ser Thr Ala Arg Ala Phe Ser Glu Val Pro Thr Thr Ala Asn Gly Ser
                    485                 490                 495

Thr Lys Thr Asn His Val His Ile Thr Gly Ile Val Asn Lys Pro
                500                 505                 510

Lys Asp Gly Met Glu Pro Lys Ser Ser Asp Lys Thr His Thr Cys Pro
                515                 520                 525

Pro Cys Pro Ala Pro Glu Leu Leu Gly Gly Pro Ser Val Phe Leu Phe
    530                 535                 540

Pro Pro Lys Pro Lys Asp Thr Leu Met Ile Ser Arg Thr Pro Glu Val
    545                 550                 555                 560

Thr Cys Val Val Val Asp Val Ser His Glu Asp Pro Glu Val Lys Phe
                    565                 570                 575

Asn Trp Tyr Val Asp Gly Val Glu Val His Asn Ala Lys Thr Lys Pro
                580                 585                 590

Arg Glu Glu Gln Tyr Asn Ser Thr Tyr Arg Val Val Ser Val Leu Thr
                595                 600                 605

Val Leu His Gln Asp Trp Leu Asn Gly Lys Glu Tyr Lys Cys Ala Val
                610                 615                 620

Ser Asn Lys Ala Leu Pro Ala Pro Ile Glu Lys Thr Ile Ser Lys Ala
    625                 630                 635                 640

Lys Gly Gln Pro Arg Glu Pro Gln Val Cys Thr Leu Pro Pro Ser Arg
                    645                 650                 655

Asp Glu Leu Thr Lys Asn Gln Val Ser Leu Trp Cys Leu Val Lys Gly
                660                 665                 670

Phe Tyr Pro Ser Asp Ile Ala Val Glu Trp Glu Ser Asn Gly Gln Pro
                675                 680                 685

Glu Asn Asn Tyr Lys Thr Thr Pro Pro Val Leu Asp Ser Asp Gly Ser
    690                 695                 700

Phe Phe Leu Tyr Ser Lys Leu Thr Val Asp Lys Ser Arg Trp Gln Gln
    705                 710                 715                 720

Gly Asn Val Phe Ser Cys Ser Val Leu His Glu Ala Leu His Ser His
                    725                 730                 735

Tyr Thr Gln Lys Ser Leu Ser Leu Ser Pro Gly Lys
                740                 745

<210> SEQ ID NO 19
<211> LENGTH: 486
<212> TYPE: PRT
<213> ORGANISM: Artificial sequence
<220> FEATURE:
<223> OTHER INFORMATION: Human CD226-hFcA

<400> SEQUENCE: 19

Met Lys Trp Val Thr Phe Ile Ser Leu Leu Phe Leu Phe Ser Ser Ala
    1               5                   10                  15

Tyr Ser Glu Glu Val Leu Trp His Thr Ser Val Pro Phe Ala Glu Asn
                20                  25                  30

Met Ser Leu Glu Cys Val Tyr Pro Ser Met Gly Ile Leu Thr Gln Val
```

```
                35                  40                  45
Glu Trp Phe Lys Ile Gly Thr Gln Gln Asp Ser Ile Ala Ile Phe Ser
 50                  55                  60

Pro Thr His Gly Met Val Ile Arg Lys Pro Tyr Ala Glu Arg Val Tyr
 65                  70                  75                  80

Phe Leu Asn Ser Thr Met Ala Ser Asn Asn Met Thr Leu Phe Phe Arg
                 85                  90                  95

Asn Ala Ser Glu Asp Asp Val Gly Tyr Tyr Ser Cys Ser Leu Tyr Thr
                100                 105                 110

Tyr Pro Gln Gly Thr Trp Gln Lys Val Ile Gln Val Val Gln Ser Asp
                115                 120                 125

Ser Phe Glu Ala Ala Val Pro Ser Asn Ser His Ile Val Ser Glu Pro
130                 135                 140

Gly Lys Asn Val Thr Leu Thr Cys Gln Pro Gln Met Thr Trp Pro Val
145                 150                 155                 160

Gln Ala Val Arg Trp Glu Lys Ile Gln Pro Arg Gln Ile Asp Leu Leu
                165                 170                 175

Thr Tyr Cys Asn Leu Val His Gly Arg Asn Phe Thr Ser Lys Phe Pro
                180                 185                 190

Arg Gln Ile Val Ser Asn Cys Ser His Gly Arg Trp Ser Val Ile Val
                195                 200                 205

Ile Pro Asp Val Thr Val Ser Asp Ser Gly Leu Tyr Arg Cys Tyr Leu
210                 215                 220

Gln Ala Ser Ala Gly Glu Asn Glu Thr Phe Val Met Arg Leu Thr Val
225                 230                 235                 240

Ala Glu Gly Lys Thr Asp Asn Gln Tyr Thr Leu Phe Val Ala Glu Pro
                245                 250                 255

Lys Ser Ser Asp Lys Thr His Thr Cys Pro Pro Cys Pro Ala Pro Glu
                260                 265                 270

Leu Leu Gly Gly Pro Ser Val Phe Leu Phe Pro Pro Lys Pro Lys Asp
                275                 280                 285

Thr Leu Met Ile Ser Arg Thr Pro Glu Val Thr Cys Val Val Val Asp
290                 295                 300

Val Ser His Glu Asp Pro Glu Val Lys Phe Asn Trp Tyr Val Asp Gly
305                 310                 315                 320

Val Glu Val His Asn Ala Lys Thr Lys Pro Arg Glu Glu Gln Tyr Asn
                325                 330                 335

Ser Thr Tyr Arg Val Val Ser Val Leu Thr Val Leu His Gln Asp Trp
                340                 345                 350

Leu Asn Gly Lys Glu Tyr Lys Cys Ala Val Ser Asn Lys Ala Leu Pro
                355                 360                 365

Ala Pro Ile Glu Lys Thr Ile Ser Lys Ala Lys Gly Gln Pro Arg Glu
                370                 375                 380

Pro Gln Val Cys Thr Leu Pro Pro Ser Arg Asp Glu Leu Thr Lys Asn
385                 390                 395                 400

Gln Val Ser Leu Trp Cys Leu Val Lys Gly Phe Tyr Pro Ser Asp Ile
                405                 410                 415

Ala Val Glu Trp Glu Ser Asn Gly Gln Pro Glu Asn Asn Tyr Lys Thr
                420                 425                 430

Thr Pro Pro Val Leu Asp Ser Asp Gly Ser Phe Phe Leu Tyr Ser Lys
                435                 440                 445

Leu Thr Val Asp Lys Ser Arg Trp Gln Gln Gly Asn Val Phe Ser Cys
450                 455                 460
```

```
Ser Val Leu His Glu Ala Leu His Ser His Tyr Thr Gln Lys Ser Leu
465                 470                 475                 480

Ser Leu Ser Pro Gly Lys
                485

<210> SEQ ID NO 20
<211> LENGTH: 580
<212> TYPE: PRT
<213> ORGANISM: Artificial sequence
<220> FEATURE:
<223> OTHER INFORMATION: Human NECL2-hFcA

<400> SEQUENCE: 20

Met Lys Trp Val Thr Phe Ile Ser Leu Leu Phe Leu Phe Ser Ser Ala
1               5                   10                  15

Tyr Ser Gln Asn Leu Phe Thr Lys Asp Val Thr Val Ile Glu Gly Glu
                20                  25                  30

Val Ala Thr Ile Ser Cys Gln Val Asn Lys Ser Asp Asp Ser Val Ile
            35                  40                  45

Gln Leu Leu Asn Pro Asn Arg Gln Thr Ile Tyr Phe Arg Asp Phe Arg
    50                  55                  60

Pro Leu Lys Asp Ser Arg Phe Gln Leu Leu Asn Phe Ser Ser Ser Glu
65                  70                  75                  80

Leu Lys Val Ser Leu Thr Asn Val Ser Ile Ser Asp Glu Gly Arg Tyr
                85                  90                  95

Phe Cys Gln Leu Tyr Thr Asp Pro Pro Gln Glu Ser Tyr Thr Thr Ile
                100                 105                 110

Thr Val Leu Val Pro Pro Arg Asn Leu Met Ile Asp Ile Gln Lys Asp
            115                 120                 125

Thr Ala Val Glu Gly Glu Glu Ile Glu Val Asn Cys Thr Ala Met Ala
    130                 135                 140

Ser Lys Pro Ala Thr Thr Ile Arg Trp Phe Lys Gly Asn Thr Glu Leu
145                 150                 155                 160

Lys Gly Lys Ser Glu Val Glu Glu Trp Ser Asp Met Tyr Thr Val Thr
                165                 170                 175

Ser Gln Leu Met Leu Lys Val His Lys Glu Asp Asp Gly Val Pro Val
                180                 185                 190

Ile Cys Gln Val Glu His Pro Ala Val Thr Gly Asn Leu Gln Thr Gln
            195                 200                 205

Arg Tyr Leu Glu Val Gln Tyr Lys Pro Gln Val His Ile Gln Met Thr
    210                 215                 220

Tyr Pro Leu Gln Gly Leu Thr Arg Glu Gly Asp Ala Leu Glu Leu Thr
225                 230                 235                 240

Cys Glu Ala Ile Gly Lys Pro Gln Pro Val Met Val Thr Trp Val Arg
                245                 250                 255

Val Asp Asp Glu Met Pro Gln His Ala Val Leu Ser Gly Pro Asn Leu
                260                 265                 270

Phe Ile Asn Asn Leu Asn Lys Thr Asp Asn Gly Thr Tyr Arg Cys Glu
            275                 280                 285

Ala Ser Asn Ile Val Gly Lys Ala His Ser Asp Tyr Met Leu Tyr Val
    290                 295                 300

Tyr Asp Pro Pro Thr Thr Ile Pro Pro Pro Thr Thr Thr Thr Thr Thr
305                 310                 315                 320

Thr Thr Thr Thr Thr Thr Thr Ile Leu Thr Ile Ile Thr Asp Ser Arg
                325                 330                 335
```

Ala Gly Glu Glu Gly Ser Ile Arg Ala Val Asp His Glu Pro Lys Ser
            340                 345                 350

Ser Asp Lys Thr His Thr Cys Pro Pro Cys Pro Ala Pro Glu Leu Leu
            355                 360                 365

Gly Gly Pro Ser Val Phe Leu Phe Pro Pro Lys Pro Lys Asp Thr Leu
            370                 375                 380

Met Ile Ser Arg Thr Pro Glu Val Thr Cys Val Val Val Asp Val Ser
385                 390                 395                 400

His Glu Asp Pro Glu Val Lys Phe Asn Trp Tyr Val Asp Gly Val Glu
                405                 410                 415

Val His Asn Ala Lys Thr Lys Pro Arg Glu Glu Gln Tyr Asn Ser Thr
            420                 425                 430

Tyr Arg Val Val Ser Val Leu Thr Val Leu His Gln Asp Trp Leu Asn
            435                 440                 445

Gly Lys Glu Tyr Lys Cys Ala Val Ser Asn Lys Ala Leu Pro Ala Pro
            450                 455                 460

Ile Glu Lys Thr Ile Ser Lys Ala Lys Gly Gln Pro Arg Glu Pro Gln
465                 470                 475                 480

Val Cys Thr Leu Pro Pro Ser Arg Asp Glu Leu Thr Lys Asn Gln Val
            485                 490                 495

Ser Leu Trp Cys Leu Val Lys Gly Phe Tyr Pro Ser Asp Ile Ala Val
            500                 505                 510

Glu Trp Glu Ser Asn Gly Gln Pro Glu Asn Asn Tyr Lys Thr Thr Pro
            515                 520                 525

Pro Val Leu Asp Ser Asp Gly Ser Phe Phe Leu Tyr Ser Lys Leu Thr
            530                 535                 540

Val Asp Lys Ser Arg Trp Gln Gln Gly Asn Val Phe Ser Cys Ser Val
545                 550                 555                 560

Leu His Glu Ala Leu His Ser His Tyr Thr Gln Lys Ser Leu Ser Leu
                565                 570                 575

Ser Pro Gly Lys
            580

<210> SEQ ID NO 21
<211> LENGTH: 594
<212> TYPE: PRT
<213> ORGANISM: Artificial sequence
<220> FEATURE:
<223> OTHER INFORMATION: Human CD113-hFcA

<400> SEQUENCE: 21

Met Lys Trp Val Thr Phe Ile Ser Leu Leu Phe Leu Phe Ser Ser Ala
1               5                   10                  15

Tyr Ser Ala Ser Pro Ile Ile Val Glu Pro His Val Thr Ala Val Trp
            20                  25                  30

Gly Lys Asn Val Ser Leu Lys Cys Leu Ile Glu Val Asn Glu Thr Ile
            35                  40                  45

Thr Gln Ile Ser Trp Glu Lys Ile His Gly Lys Ser Ser Gln Thr Val
        50                  55                  60

Ala Val His His Pro Gln Tyr Gly Phe Ser Val Gln Gly Glu Tyr Gln
65                  70                  75                  80

Gly Arg Val Leu Phe Lys Asn Tyr Ser Leu Asn Asp Ala Thr Ile Thr
                85                  90                  95

Leu His Asn Ile Gly Phe Ser Asp Ser Gly Lys Tyr Ile Cys Lys Ala
            100                 105                 110

```
Val Thr Phe Pro Leu Gly Asn Ala Gln Ser Ser Thr Val Thr Val
            115                 120                 125

Leu Val Glu Pro Thr Val Ser Leu Ile Lys Gly Pro Asp Ser Leu Ile
130                 135                 140

Asp Gly Gly Asn Glu Thr Val Ala Ala Ile Cys Ile Ala Ala Thr Gly
145                 150                 155                 160

Lys Pro Val Ala His Ile Asp Trp Glu Gly Asp Leu Gly Glu Met Glu
                165                 170                 175

Ser Thr Thr Thr Ser Phe Pro Asn Glu Thr Ala Thr Ile Ile Ser Gln
            180                 185                 190

Tyr Lys Leu Phe Pro Thr Arg Phe Ala Arg Gly Arg Ile Thr Cys
            195                 200                 205

Val Val Lys His Pro Ala Leu Glu Lys Asp Ile Arg Tyr Ser Phe Ile
        210                 215                 220

Leu Asp Ile Gln Tyr Ala Pro Glu Val Ser Val Thr Gly Tyr Asp Gly
225                 230                 235                 240

Asn Trp Phe Val Gly Arg Lys Gly Val Asn Leu Lys Cys Asn Ala Asp
                245                 250                 255

Ala Asn Pro Pro Pro Phe Lys Ser Val Trp Ser Arg Leu Asp Gly Gln
        260                 265                 270

Trp Pro Asp Gly Leu Leu Ala Ser Asp Asn Thr Leu His Phe Val His
        275                 280                 285

Pro Leu Thr Phe Asn Tyr Ser Gly Val Tyr Ile Cys Lys Val Thr Asn
        290                 295                 300

Ser Leu Gly Gln Arg Ser Asp Gln Lys Val Ile Tyr Ile Ser Asp Pro
305                 310                 315                 320

Pro Thr Thr Thr Thr Leu Gln Pro Thr Ile Gln Trp His Pro Ser Thr
                325                 330                 335

Ala Asp Ile Glu Asp Leu Ala Thr Glu Pro Lys Lys Leu Pro Phe Pro
                340                 345                 350

Leu Ser Thr Leu Ala Thr Ile Lys Asp Asp Glu Pro Lys Ser Ser Asp
        355                 360                 365

Lys Thr His Thr Cys Pro Pro Cys Pro Ala Pro Glu Leu Leu Gly Gly
        370                 375                 380

Pro Ser Val Phe Leu Phe Pro Pro Lys Pro Lys Asp Thr Leu Met Ile
385                 390                 395                 400

Ser Arg Thr Pro Glu Val Thr Cys Val Val Val Asp Val Ser His Glu
                405                 410                 415

Asp Pro Glu Val Lys Phe Asn Trp Tyr Val Asp Gly Val Glu Val His
                420                 425                 430

Asn Ala Lys Thr Lys Pro Arg Glu Glu Gln Tyr Asn Ser Thr Tyr Arg
            435                 440                 445

Val Val Ser Val Leu Thr Val Leu His Gln Asp Trp Leu Asn Gly Lys
        450                 455                 460

Glu Tyr Lys Cys Ala Val Ser Asn Lys Ala Leu Pro Ala Pro Ile Glu
465                 470                 475                 480

Lys Thr Ile Ser Lys Ala Lys Gly Gln Pro Arg Glu Pro Gln Val Cys
                485                 490                 495

Thr Leu Pro Pro Ser Arg Asp Glu Leu Thr Lys Asn Gln Val Ser Leu
            500                 505                 510

Trp Cys Leu Val Lys Gly Phe Tyr Pro Ser Asp Ile Ala Val Glu Trp
            515                 520                 525
```

```
Glu Ser Asn Gly Gln Pro Glu Asn Asn Tyr Lys Thr Thr Pro Pro Val
    530                 535                 540

Leu Asp Ser Asp Gly Ser Phe Phe Leu Tyr Ser Lys Leu Thr Val Asp
545                 550                 555                 560

Lys Ser Arg Trp Gln Gln Gly Asn Val Phe Ser Cys Ser Val Leu His
                565                 570                 575

Glu Ala Leu His Ser His Tyr Thr Gln Lys Ser Leu Ser Leu Ser Pro
                580                 585                 590

Gly Lys

<210> SEQ ID NO 22
<211> LENGTH: 537
<212> TYPE: PRT
<213> ORGANISM: Artificial sequence
<220> FEATURE:
<223> OTHER INFORMATION: Human MICA-hFcA

<400> SEQUENCE: 22

Met Lys Trp Val Thr Phe Ile Ser Leu Leu Phe Leu Phe Ser Ser Ala
1               5                   10                  15

Tyr Ser Ala Ser Ala Glu Pro His Ser Leu Arg Tyr Asn Leu Thr Val
                20                  25                  30

Leu Ser Trp Asp Gly Ser Val Gln Ser Gly Phe Leu Thr Glu Val His
            35                  40                  45

Leu Asp Gly Gln Pro Phe Leu Arg Cys Asp Arg Gln Lys Cys Arg Ala
50                  55                  60

Lys Pro Gln Gly Gln Trp Ala Glu Asp Val Leu Gly Asn Lys Thr Trp
65                  70                  75                  80

Asp Arg Glu Thr Arg Asp Leu Thr Gly Asn Gly Lys Asp Leu Arg Met
                85                  90                  95

Thr Leu Ala His Ile Lys Asp Gln Lys Glu Gly Leu His Ser Leu Gln
                100                 105                 110

Glu Ile Arg Val Cys Glu Ile His Glu Asp Asn Ser Thr Arg Ser Ser
            115                 120                 125

Gln His Phe Tyr Tyr Asp Gly Glu Leu Phe Leu Ser Gln Asn Leu Glu
        130                 135                 140

Thr Lys Glu Trp Thr Met Pro Gln Ser Ser Arg Ala Gln Thr Leu Ala
145                 150                 155                 160

Met Asn Val Arg Asn Phe Leu Lys Glu Asp Ala Met Lys Thr Lys Thr
                165                 170                 175

His Tyr His Ala Met His Ala Asp Cys Leu Gln Glu Leu Arg Arg Tyr
            180                 185                 190

Leu Lys Ser Gly Val Val Leu Arg Arg Thr Val Pro Pro Met Val Asn
        195                 200                 205

Val Thr Arg Ser Glu Ala Ser Glu Gly Asn Ile Thr Val Thr Cys Arg
    210                 215                 220

Ala Ser Gly Phe Tyr Pro Trp Asn Ile Thr Leu Ser Trp Arg Gln Asp
225                 230                 235                 240

Gly Val Ser Leu Ser His Asp Thr Gln Gln Trp Gly Asp Val Leu Pro
                245                 250                 255

Asp Gly Asn Gly Thr Tyr Gln Thr Trp Val Ala Thr Arg Ile Cys Gln
            260                 265                 270

Gly Glu Glu Gln Arg Phe Thr Cys Tyr Met Glu His Ser Gly Asn His
        275                 280                 285

Ser Thr His Pro Val Pro Ser Gly Lys Val Leu Val Leu Gln Ser His
```

```
                290                 295                 300
Trp Glu Pro Lys Ser Ser Asp Lys Thr His Thr Cys Pro Cys Pro
305                 310                 315                 320

Ala Pro Glu Leu Leu Gly Gly Pro Ser Val Phe Leu Phe Pro Lys
                325                 330                 335

Pro Lys Asp Thr Leu Met Ile Ser Arg Thr Pro Glu Val Thr Cys Val
                340                 345                 350

Val Val Asp Val Ser His Glu Asp Pro Glu Val Lys Phe Asn Trp Tyr
                355                 360                 365

Val Asp Gly Val Glu Val His Asn Ala Lys Thr Lys Pro Arg Glu Glu
                370                 375                 380

Gln Tyr Asn Ser Thr Tyr Arg Val Val Ser Val Leu Thr Val Leu His
385                 390                 395                 400

Gln Asp Trp Leu Asn Gly Lys Glu Tyr Lys Cys Ala Val Ser Asn Lys
                405                 410                 415

Ala Leu Pro Ala Pro Ile Glu Lys Thr Ile Ser Lys Ala Lys Gly Gln
                420                 425                 430

Pro Arg Glu Pro Gln Val Cys Thr Leu Pro Pro Ser Arg Asp Glu Leu
                435                 440                 445

Thr Lys Asn Gln Val Ser Leu Trp Cys Leu Val Lys Gly Phe Tyr Pro
                450                 455                 460

Ser Asp Ile Ala Val Glu Trp Glu Ser Asn Gly Gln Pro Glu Asn Asn
465                 470                 475                 480

Tyr Lys Thr Thr Pro Pro Val Leu Asp Ser Asp Gly Ser Phe Phe Leu
                485                 490                 495

Tyr Ser Lys Leu Thr Val Asp Lys Ser Arg Trp Gln Gln Gly Asn Val
                500                 505                 510

Phe Ser Cys Ser Val Leu His Glu Ala Leu His Ser His Tyr Thr Gln
                515                 520                 525

Lys Ser Leu Ser Leu Ser Pro Gly Lys
                530                 535

<210> SEQ ID NO 23
<211> LENGTH: 252
<212> TYPE: PRT
<213> ORGANISM: Artificial sequence
<220> FEATURE:
<223> OTHER INFORMATION: Human FcA

<400> SEQUENCE: 23

Met Lys Trp Val Thr Phe Ile Ser Leu Leu Phe Leu Phe Ser Ser Ala
1               5                   10                  15

Tyr Ser Ala Ser Glu Pro Lys Ser Ser Asp Lys Thr His Thr Cys Pro
                20                  25                  30

Pro Cys Pro Ala Pro Glu Leu Leu Gly Gly Pro Ser Val Phe Leu Phe
                35                  40                  45

Pro Pro Lys Pro Lys Asp Thr Leu Met Ile Ser Arg Thr Pro Glu Val
            50                  55                  60

Thr Cys Val Val Val Asp Val Ser His Glu Asp Pro Glu Val Lys Phe
65              70                  75                  80

Asn Trp Tyr Val Asp Gly Val Glu Val His Asn Ala Lys Thr Lys Pro
                85                  90                  95

Arg Glu Glu Gln Tyr Asn Ser Thr Tyr Arg Val Val Ser Val Leu Thr
                100                 105                 110

Val Leu His Gln Asp Trp Leu Asn Gly Lys Glu Tyr Lys Cys Ala Val
```

```
            115                 120                 125
Ser Asn Lys Ala Leu Pro Ala Pro Ile Glu Lys Thr Ile Ser Lys Ala
    130                 135                 140

Lys Gly Gln Pro Arg Glu Pro Gln Val Cys Thr Leu Pro Pro Ser Arg
145                 150                 155                 160

Asp Glu Leu Thr Lys Asn Gln Val Ser Leu Trp Cys Leu Val Lys Gly
                165                 170                 175

Phe Tyr Pro Ser Asp Ile Ala Val Glu Trp Glu Ser Asn Gly Gln Pro
            180                 185                 190

Glu Asn Asn Tyr Lys Thr Thr Pro Pro Val Leu Asp Ser Asp Gly Ser
        195                 200                 205

Phe Phe Leu Tyr Ser Lys Leu Thr Val Asp Lys Ser Arg Trp Gln Gln
    210                 215                 220

Gly Asn Val Phe Ser Cys Ser Val Leu His Glu Ala Leu His Ser His
225                 230                 235                 240

Tyr Thr Gln Lys Ser Leu Ser Leu Ser Pro Gly Lys
                245                 250

<210> SEQ ID NO 24
<211> LENGTH: 323
<212> TYPE: PRT
<213> ORGANISM: Homo sapiens

<400> SEQUENCE: 24

Trp Pro Pro Pro Gly Thr Gly Asp Val Val Gln Ala Pro Thr Gln
1               5                   10                  15

Val Pro Gly Phe Leu Gly Asp Ser Val Thr Leu Pro Cys Tyr Leu Gln
            20                  25                  30

Val Pro Asn Met Glu Val Thr His Val Ser Gln Leu Thr Trp Ala Arg
        35                  40                  45

His Gly Glu Ser Gly Ser Met Ala Val Phe His Gln Thr Gln Gly Pro
    50                  55                  60

Ser Tyr Ser Glu Ser Lys Arg Leu Glu Phe Val Ala Ala Arg Leu Gly
65                  70                  75                  80

Ala Glu Leu Arg Asn Ala Ser Leu Arg Met Phe Gly Leu Arg Val Glu
                85                  90                  95

Asp Glu Gly Asn Tyr Thr Cys Leu Phe Val Thr Phe Pro Gln Gly Ser
            100                 105                 110

Arg Ser Val Asp Ile Trp Leu Arg Val Leu Ala Lys Pro Gln Asn Thr
        115                 120                 125

Ala Glu Val Gln Lys Val Gln Leu Thr Gly Glu Pro Val Pro Met Ala
    130                 135                 140

Arg Cys Val Ser Thr Gly Gly Arg Pro Pro Ala Gln Ile Thr Trp His
145                 150                 155                 160

Ser Asp Leu Gly Gly Met Pro Asn Thr Ser Gln Val Pro Gly Phe Leu
                165                 170                 175

Ser Gly Thr Val Thr Val Thr Ser Leu Trp Ile Leu Val Pro Ser Ser
            180                 185                 190

Gln Val Asp Gly Lys Asn Val Thr Cys Lys Val Glu His Glu Ser Phe
        195                 200                 205

Glu Lys Pro Gln Leu Leu Thr Val Asn Leu Thr Val Tyr Tyr Pro Pro
    210                 215                 220

Glu Val Ser Ile Ser Gly Tyr Asp Asn Asn Trp Tyr Leu Gly Gln Asn
225                 230                 235                 240
```

Glu Ala Thr Leu Thr Cys Asp Ala Arg Ser Asn Pro Glu Pro Thr Gly
                    245                 250                 255

Tyr Asn Trp Ser Thr Thr Met Gly Pro Leu Pro Pro Phe Ala Val Ala
            260                 265                 270

Gln Gly Ala Gln Leu Leu Ile Arg Pro Val Asp Lys Pro Ile Asn Thr
        275                 280                 285

Thr Leu Ile Cys Asn Val Thr Asn Ala Leu Gly Ala Arg Gln Ala Glu
    290                 295                 300

Leu Thr Val Gln Val Lys Glu Gly Pro Pro Ser Glu His Ser Gly Met
305                 310                 315                 320

Ser Arg Asn

<210> SEQ ID NO 25
<211> LENGTH: 120
<212> TYPE: PRT
<213> ORGANISM: Homo sapiens

<400> SEQUENCE: 25

Met Met Thr Gly Thr Ile Glu Thr Thr Gly Asn Ile Ser Ala Glu Lys
1               5                   10                  15

Gly Gly Ser Ile Ile Leu Gln Cys His Leu Ser Ser Thr Thr Ala Gln
            20                  25                  30

Val Thr Gln Val Asn Trp Glu Gln Gln Asp Gln Leu Leu Ala Ile Cys
        35                  40                  45

Asn Ala Asp Leu Gly Trp His Ile Ser Pro Ser Phe Lys Asp Arg Val
    50                  55                  60

Ala Pro Gly Pro Gly Leu Gly Leu Thr Leu Gln Ser Leu Thr Val Asn
65                  70                  75                  80

Asp Thr Gly Glu Tyr Phe Cys Ile Tyr His Thr Tyr Pro Asp Gly Thr
                85                  90                  95

Tyr Thr Gly Arg Ile Phe Leu Glu Val Leu Glu Ser Ser Val Ala Glu
            100                 105                 110

His Gly Ala Arg Phe Gln Ile Pro
        115                 120

<210> SEQ ID NO 26
<211> LENGTH: 170
<212> TYPE: PRT
<213> ORGANISM: Mus musculus

<400> SEQUENCE: 26

Leu Glu Asp Gly Tyr Lys Val Glu Val Gly Lys Asn Ala Tyr Leu Pro
1               5                   10                  15

Cys Ser Tyr Thr Leu Pro Thr Ser Gly Thr Leu Val Pro Met Cys Trp
            20                  25                  30

Gly Lys Gly Phe Cys Pro Trp Ser Gln Cys Thr Asn Glu Leu Leu Arg
        35                  40                  45

Thr Asp Glu Arg Asn Val Thr Tyr Gln Lys Ser Ser Arg Tyr Gln Leu
    50                  55                  60

Lys Gly Asp Leu Asn Lys Gly Asp Val Ser Leu Ile Ile Lys Asn Val
65                  70                  75                  80

Thr Leu Asp Asp His Gly Thr Tyr Cys Cys Arg Ile Gln Phe Pro Gly
                85                  90                  95

Leu Met Asn Asp Lys Lys Leu Glu Leu Lys Leu Asp Ile Lys Ala Ala
            100                 105                 110

Lys Val Thr Pro Ala Gln Thr Ala His Gly Asp Ser Thr Thr Ala Ser

```
            115                 120                 125
Pro Arg Thr Leu Thr Thr Glu Arg Asn Gly Ser Glu Thr Gln Thr Leu
130                 135                 140

Val Thr Leu His Asn Asn Gly Thr Lys Ile Ser Thr Trp Ala Asp
145                 150                 155                 160

Glu Ile Lys Asp Ser Gly Glu Thr Ile Arg
                165                 170

<210> SEQ ID NO 27
<211> LENGTH: 342
<212> TYPE: PRT
<213> ORGANISM: Homo sapiens

<400> SEQUENCE: 27

Pro Ile Ile Val Glu Pro His Val Thr Ala Val Trp Gly Lys Asn Val
1               5                   10                  15

Ser Leu Lys Cys Leu Ile Glu Val Asn Glu Thr Ile Thr Gln Ile Ser
                20                  25                  30

Trp Glu Lys Ile His Gly Lys Ser Gln Thr Val Ala Val His His
            35                  40                  45

Pro Gln Tyr Gly Phe Ser Val Gln Gly Glu Tyr Gln Gly Arg Val Leu
    50                  55                  60

Phe Lys Asn Tyr Ser Leu Asn Asp Ala Thr Ile Thr Leu His Asn Ile
65                  70                  75                  80

Gly Phe Ser Asp Ser Gly Lys Tyr Ile Cys Lys Ala Val Thr Phe Pro
                85                  90                  95

Leu Gly Asn Ala Gln Ser Ser Thr Thr Val Thr Val Leu Val Glu Pro
            100                 105                 110

Thr Val Ser Leu Ile Lys Gly Pro Asp Ser Leu Ile Asp Gly Gly Asn
        115                 120                 125

Glu Thr Val Ala Ala Ile Cys Ile Ala Ala Thr Gly Lys Pro Val Ala
130                 135                 140

His Ile Asp Trp Glu Gly Asp Leu Gly Glu Met Glu Ser Thr Thr Thr
145                 150                 155                 160

Ser Phe Pro Asn Glu Thr Ala Thr Ile Ile Ser Gln Tyr Lys Leu Phe
                165                 170                 175

Pro Thr Arg Phe Ala Arg Gly Arg Arg Ile Thr Cys Val Val Lys His
            180                 185                 190

Pro Ala Leu Glu Lys Asp Ile Arg Tyr Ser Phe Ile Leu Asp Ile Gln
    195                 200                 205

Tyr Ala Pro Glu Val Ser Val Thr Gly Tyr Asp Gly Asn Trp Phe Val
    210                 215                 220

Gly Arg Lys Gly Val Asn Leu Lys Cys Asn Ala Asp Ala Asn Pro Pro
225                 230                 235                 240

Pro Phe Lys Ser Val Trp Ser Arg Leu Asp Gly Gln Trp Pro Asp Gly
                245                 250                 255

Leu Leu Ala Ser Asp Asn Thr Leu His Phe Val His Pro Leu Thr Phe
            260                 265                 270

Asn Tyr Ser Gly Val Tyr Ile Cys Lys Val Thr Asn Ser Leu Gly Gln
    275                 280                 285

Arg Ser Asp Gln Lys Val Ile Tyr Ile Ser Asp Pro Pro Thr Thr Thr
    290                 295                 300

Thr Leu Gln Pro Thr Ile Gln Trp His Pro Ser Thr Ala Asp Ile Glu
305                 310                 315                 320
```

```
Asp Leu Ala Thr Glu Pro Lys Lys Leu Pro Phe Pro Leu Ser Thr Leu
                325                 330                 335
Ala Thr Ile Lys Asp Asp
            340
```

<210> SEQ ID NO 28
<211> LENGTH: 330
<212> TYPE: PRT
<213> ORGANISM: Homo sapiens

<400> SEQUENCE: 28

```
Ala Ser Thr Lys Gly Pro Ser Val Phe Pro Leu Ala Pro Ser Ser Lys
1               5                   10                  15
Ser Thr Ser Gly Gly Thr Ala Ala Leu Gly Cys Leu Val Lys Asp Tyr
            20                  25                  30
Phe Pro Glu Pro Val Thr Val Ser Trp Asn Ser Gly Ala Leu Thr Ser
        35                  40                  45
Gly Val His Thr Phe Pro Ala Val Leu Gln Ser Ser Gly Leu Tyr Ser
    50                  55                  60
Leu Ser Ser Val Val Thr Val Pro Ser Ser Ser Leu Gly Thr Gln Thr
65                  70                  75                  80
Tyr Ile Cys Asn Val Asn His Lys Pro Ser Asn Thr Lys Val Asp Lys
                85                  90                  95
Lys Val Glu Pro Lys Ser Cys Asp Lys Thr His Thr Cys Pro Pro Cys
            100                 105                 110
Pro Ala Pro Glu Leu Leu Gly Gly Pro Ser Val Phe Leu Phe Pro Pro
        115                 120                 125
Lys Pro Lys Asp Thr Leu Met Ile Ser Arg Thr Pro Glu Val Thr Cys
130                 135                 140
Val Val Val Asp Val Ser His Glu Asp Pro Glu Val Lys Phe Asn Trp
145                 150                 155                 160
Tyr Val Asp Gly Val Glu Val His Asn Ala Lys Thr Lys Pro Arg Glu
                165                 170                 175
Glu Gln Tyr Asn Ser Thr Tyr Arg Val Val Ser Val Leu Thr Val Leu
            180                 185                 190
His Gln Asp Trp Leu Asn Gly Lys Glu Tyr Lys Cys Lys Val Ser Asn
        195                 200                 205
Lys Ala Leu Pro Ala Pro Ile Glu Lys Thr Ile Ser Lys Ala Lys Gly
    210                 215                 220
Gln Pro Arg Glu Pro Gln Val Tyr Thr Leu Pro Pro Ser Arg Asp Glu
225                 230                 235                 240
Leu Thr Lys Asn Gln Val Ser Leu Thr Cys Leu Val Lys Gly Phe Tyr
                245                 250                 255
Pro Ser Asp Ile Ala Val Glu Trp Glu Ser Asn Gly Gln Pro Glu Asn
            260                 265                 270
Asn Tyr Lys Thr Thr Pro Pro Val Leu Asp Ser Asp Gly Ser Phe Phe
        275                 280                 285
Leu Tyr Ser Lys Leu Thr Val Asp Lys Ser Arg Trp Gln Gln Gly Asn
    290                 295                 300
Val Phe Ser Cys Ser Val Met His Glu Ala Leu His Asn His Tyr Thr
305                 310                 315                 320
Gln Lys Ser Leu Ser Leu Ser Pro Gly Lys
                325                 330
```

<210> SEQ ID NO 29

-continued

```
<211> LENGTH: 330
<212> TYPE: PRT
<213> ORGANISM: Artificial sequence
<220> FEATURE:
<223> OTHER INFORMATION: Component A Y349C and T366W

<400> SEQUENCE: 29
```

| | | | | | | | | | | | | | | |
|---|---|---|---|---|---|---|---|---|---|---|---|---|---|---|
| Ala | Ser | Thr | Lys | Gly | Pro | Ser | Val | Phe | Pro | Leu | Ala | Pro | Ser | Ser | Lys |
| 1 | | | | 5 | | | | | 10 | | | | | 15 | |

| Ser | Thr | Ser | Gly | Gly | Thr | Ala | Ala | Leu | Gly | Cys | Leu | Val | Lys | Asp | Tyr |
|---|---|---|---|---|---|---|---|---|---|---|---|---|---|---|---|
| | | | 20 | | | | | 25 | | | | | 30 | | |

| Phe | Pro | Glu | Pro | Val | Thr | Val | Ser | Trp | Asn | Ser | Gly | Ala | Leu | Thr | Ser |
|---|---|---|---|---|---|---|---|---|---|---|---|---|---|---|---|
| | | | 35 | | | | | 40 | | | | | 45 | | |

| Gly | Val | His | Thr | Phe | Pro | Ala | Val | Leu | Gln | Ser | Ser | Gly | Leu | Tyr | Ser |
|---|---|---|---|---|---|---|---|---|---|---|---|---|---|---|---|
| | 50 | | | | | 55 | | | | | 60 | | | | |

| Leu | Ser | Ser | Val | Val | Thr | Val | Pro | Ser | Ser | Leu | Gly | Thr | Gln | Thr |
|---|---|---|---|---|---|---|---|---|---|---|---|---|---|---|
| 65 | | | | | 70 | | | | | 75 | | | | 80 |

| Tyr | Ile | Cys | Asn | Val | Asn | His | Lys | Pro | Ser | Asn | Thr | Lys | Val | Asp | Lys |
|---|---|---|---|---|---|---|---|---|---|---|---|---|---|---|---|
| | | | | 85 | | | | | 90 | | | | | 95 | |

| Lys | Val | Glu | Pro | Lys | Ser | Ser | Asp | Lys | Thr | His | Thr | Cys | Pro | Pro | Cys |
|---|---|---|---|---|---|---|---|---|---|---|---|---|---|---|---|
| | | | 100 | | | | | 105 | | | | | 110 | | |

| Pro | Ala | Pro | Glu | Leu | Leu | Gly | Gly | Pro | Ser | Val | Phe | Leu | Phe | Pro | Pro |
|---|---|---|---|---|---|---|---|---|---|---|---|---|---|---|---|
| | | 115 | | | | | 120 | | | | | 125 | | | |

| Lys | Pro | Lys | Asp | Thr | Leu | Met | Ile | Ser | Arg | Thr | Pro | Glu | Val | Thr | Cys |
|---|---|---|---|---|---|---|---|---|---|---|---|---|---|---|---|
| | 130 | | | | | 135 | | | | | 140 | | | | |

| Val | Val | Val | Asp | Val | Ser | His | Glu | Asp | Pro | Glu | Val | Lys | Phe | Asn | Trp |
|---|---|---|---|---|---|---|---|---|---|---|---|---|---|---|---|
| 145 | | | | | 150 | | | | | 155 | | | | | 160 |

| Tyr | Val | Asp | Gly | Val | Glu | Val | His | Asn | Ala | Lys | Thr | Lys | Pro | Arg | Glu |
|---|---|---|---|---|---|---|---|---|---|---|---|---|---|---|---|
| | | | | 165 | | | | | 170 | | | | | 175 | |

| Glu | Gln | Tyr | Asn | Ser | Thr | Tyr | Arg | Val | Val | Ser | Val | Leu | Thr | Val | Leu |
|---|---|---|---|---|---|---|---|---|---|---|---|---|---|---|---|
| | | | | 180 | | | | | 185 | | | | | 190 | |

| His | Gln | Asp | Trp | Leu | Asn | Gly | Lys | Glu | Tyr | Lys | Cys | Ala | Val | Ser | Asn |
|---|---|---|---|---|---|---|---|---|---|---|---|---|---|---|---|
| | | | 195 | | | | | 200 | | | | | 205 | | |

| Lys | Ala | Leu | Pro | Ala | Pro | Ile | Glu | Lys | Thr | Ile | Ser | Lys | Ala | Lys | Gly |
|---|---|---|---|---|---|---|---|---|---|---|---|---|---|---|---|
| | 210 | | | | | 215 | | | | | 220 | | | | |

| Gln | Pro | Arg | Glu | Pro | Gln | Val | Cys | Thr | Leu | Pro | Pro | Ser | Arg | Asp | Glu |
|---|---|---|---|---|---|---|---|---|---|---|---|---|---|---|---|
| 225 | | | | | 230 | | | | | 235 | | | | | 240 |

| Leu | Thr | Lys | Asn | Gln | Val | Ser | Leu | Thr | Cys | Leu | Val | Lys | Gly | Phe | Tyr |
|---|---|---|---|---|---|---|---|---|---|---|---|---|---|---|---|
| | | | | 245 | | | | | 250 | | | | | 255 | |

| Pro | Ser | Asp | Ile | Ala | Val | Glu | Trp | Glu | Ser | Asn | Gly | Gln | Pro | Glu | Asn |
|---|---|---|---|---|---|---|---|---|---|---|---|---|---|---|---|
| | | | 260 | | | | | 265 | | | | | 270 | | |

| Asn | Tyr | Lys | Thr | Thr | Pro | Pro | Val | Leu | Asp | Ser | Asp | Gly | Ser | Phe | Phe |
|---|---|---|---|---|---|---|---|---|---|---|---|---|---|---|---|
| | | 275 | | | | | 280 | | | | | 285 | | | |

| Leu | Tyr | Ser | Lys | Leu | Thr | Val | Asp | Lys | Ser | Arg | Trp | Gln | Gln | Gly | Asn |
|---|---|---|---|---|---|---|---|---|---|---|---|---|---|---|---|
| | 290 | | | | | 295 | | | | | 300 | | | | |

| Val | Phe | Ser | Cys | Ser | Val | Leu | His | Glu | Ala | Leu | His | Asn | Ser | Tyr | Thr |
|---|---|---|---|---|---|---|---|---|---|---|---|---|---|---|---|
| 305 | | | | | 310 | | | | | 315 | | | | | 320 |

| Gln | Lys | Ser | Leu | Ser | Leu | Ser | Pro | Gly | Lys |
|---|---|---|---|---|---|---|---|---|---|
| | | | | 325 | | | | | 330 |

```
<210> SEQ ID NO 30
<211> LENGTH: 330
<212> TYPE: PRT
<213> ORGANISM: Artificial sequence
<220> FEATURE:
<223> OTHER INFORMATION: Component B D356C, T366S, L368A and Y407V
```

<400> SEQUENCE: 30

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Ser Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Ala Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Cys Glu
225                 230                 235                 240

Leu Thr Lys Asn Gln Val Ser Leu Ser Cys Ala Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Val Ser Lys Leu Thr Val Asp Lys Ser Arg Trp Gln Gln Gly Asn
    290                 295                 300

Val Phe Ser Cys Ser Val Leu His Glu Ala Leu His Ser His Tyr Thr
305                 310                 315                 320

Gln Lys Ser Leu Ser Leu Ser Pro Gly Lys
                325                 330

<210> SEQ ID NO 31
<211> LENGTH: 37
<212> TYPE: PRT
<213> ORGANISM: Artificial sequence
<220> FEATURE:
<223> OTHER INFORMATION: Linker

<400> SEQUENCE: 31

Gly Asp Pro Leu Val Thr Ala Ala Ser Val Leu Glu Phe Gly Gly Ser
1               5                   10                  15

Gly Gly Gly Ser Glu Gly Gly Gly Ser Glu Gly Gly Gly Ser Glu Gly

Gly Gly Ser Asp Ile
            35

<210> SEQ ID NO 32
<211> LENGTH: 575
<212> TYPE: PRT
<213> ORGANISM: Artificial sequence
<220> FEATURE:
<223> OTHER INFORMATION: Human CD155-hFcB

<400> SEQUENCE: 32

Met Lys Trp Val Thr Phe Ile Ser Leu Leu Phe Leu Phe Ser Ser Ala
1               5                   10                  15

Tyr Ser Ala Ser Trp Pro Pro Gly Thr Gly Asp Val Val Val Gln
            20                  25                  30

Ala Pro Thr Gln Val Pro Gly Phe Leu Gly Asp Ser Val Thr Leu Pro
            35                  40                  45

Cys Tyr Leu Gln Val Pro Asn Met Glu Val Thr His Val Ser Gln Leu
        50                  55                  60

Thr Trp Ala Arg His Gly Glu Ser Gly Ser Met Ala Val Phe His Gln
65                  70                  75                  80

Thr Gln Gly Pro Ser Tyr Ser Glu Ser Lys Arg Leu Glu Phe Val Ala
                85                  90                  95

Ala Arg Leu Gly Ala Glu Leu Arg Asn Ala Ser Leu Arg Met Phe Gly
            100                 105                 110

Leu Arg Val Glu Asp Glu Gly Asn Tyr Thr Cys Leu Phe Val Thr Phe
        115                 120                 125

Pro Gln Gly Ser Arg Ser Val Asp Ile Trp Leu Arg Val Leu Ala Lys
    130                 135                 140

Pro Gln Asn Thr Ala Glu Val Gln Lys Val Gln Leu Thr Gly Glu Pro
145                 150                 155                 160

Val Pro Met Ala Arg Cys Val Ser Gly Gly Arg Pro Pro Ala Gln
                165                 170                 175

Ile Thr Trp His Ser Asp Leu Gly Gly Met Pro Asn Thr Ser Gln Val
            180                 185                 190

Pro Gly Phe Leu Ser Gly Thr Val Thr Val Thr Ser Leu Trp Ile Leu
        195                 200                 205

Val Pro Ser Ser Gln Val Asp Gly Lys Asn Val Thr Cys Lys Val Glu
    210                 215                 220

His Glu Ser Phe Glu Lys Pro Gln Leu Leu Thr Val Asn Leu Thr Val
225                 230                 235                 240

Tyr Tyr Pro Pro Glu Val Ser Ile Ser Gly Tyr Asp Asn Asn Trp Tyr
                245                 250                 255

Leu Gly Gln Asn Glu Ala Thr Leu Thr Cys Asp Ala Arg Ser Asn Pro
            260                 265                 270

Glu Pro Thr Gly Tyr Asn Trp Ser Thr Thr Met Gly Pro Leu Pro Pro
        275                 280                 285

Phe Ala Val Ala Gln Gly Ala Gln Leu Leu Ile Arg Pro Val Asp Lys
    290                 295                 300

Pro Ile Asn Thr Thr Leu Ile Cys Asn Val Thr Asn Ala Leu Gly Ala
305                 310                 315                 320

Arg Gln Ala Glu Leu Thr Val Gln Val Lys Glu Gly Pro Pro Ser Glu
                325                 330                 335

His Ser Gly Met Ser Arg Asn Glu Pro Lys Ser Ser Asp Lys Thr His

```
                340             345              350
Thr Cys Pro Pro Cys Pro Ala Pro Glu Leu Leu Gly Gly Pro Ser Val
            355                 360             365

Phe Leu Phe Pro Pro Lys Pro Lys Asp Thr Leu Met Ile Ser Arg Thr
370             375                 380

Pro Glu Val Thr Cys Val Val Asp Val Ser His Glu Asp Pro Glu
385             390                 395             400

Val Lys Phe Asn Trp Tyr Val Asp Gly Val Glu Val His Asn Ala Lys
            405                 410             415

Thr Lys Pro Arg Glu Glu Gln Tyr Asn Ser Thr Tyr Arg Val Val Ser
            420                 425             430

Val Leu Thr Val Leu His Gln Asp Trp Leu Asn Gly Lys Glu Tyr Lys
            435                 440             445

Cys Ala Val Ser Asn Lys Ala Leu Pro Ala Pro Ile Glu Lys Thr Ile
            450                 455             460

Ser Lys Ala Lys Gly Gln Pro Arg Glu Pro Gln Val Tyr Thr Leu Pro
465             470                 475             480

Pro Ser Arg Cys Glu Leu Thr Lys Asn Gln Val Ser Leu Ser Cys Ala
            485                 490             495

Val Lys Gly Phe Tyr Pro Ser Asp Ile Ala Val Glu Trp Glu Ser Asn
            500                 505             510

Gly Gln Pro Glu Asn Asn Tyr Lys Thr Thr Pro Pro Val Leu Asp Ser
            515                 520             525

Asp Gly Ser Phe Phe Leu Val Ser Lys Leu Thr Val Asp Lys Ser Arg
            530                 535             540

Trp Gln Gln Gly Asn Val Phe Ser Cys Ser Val Leu His Glu Ala Leu
545             550                 555             560

His Ser His Tyr Thr Gln Lys Ser Leu Ser Leu Ser Pro Gly Lys
            565                 570             575

<210> SEQ ID NO 33
<211> LENGTH: 372
<212> TYPE: PRT
<213> ORGANISM: Artificial sequence
<220> FEATURE:
<223> OTHER INFORMATION: Human TIGIT-hFcB

<400> SEQUENCE: 33

Met Lys Trp Val Thr Phe Ile Ser Leu Leu Phe Leu Phe Ser Ser Ala
1               5                   10              15

Tyr Ser Ala Ser Met Met Thr Gly Thr Ile Glu Thr Thr Gly Asn Ile
            20                  25              30

Ser Ala Glu Lys Gly Gly Ser Ile Ile Leu Gln Cys His Leu Ser Ser
            35                  40              45

Thr Thr Ala Gln Val Thr Gln Val Asn Trp Glu Gln Gln Asp Gln Leu
        50                  55              60

Leu Ala Ile Cys Asn Ala Asp Leu Gly Trp His Ile Ser Pro Ser Phe
65              70                  75              80

Lys Asp Arg Val Ala Pro Gly Pro Gly Leu Gly Leu Thr Leu Gln Ser
            85                  90              95

Leu Thr Val Asn Asp Thr Gly Glu Tyr Phe Cys Ile Tyr His Thr Tyr
            100                 105             110

Pro Asp Gly Thr Tyr Thr Gly Arg Ile Phe Leu Glu Val Leu Glu Ser
            115                 120             125

Ser Val Ala Glu His Gly Ala Arg Phe Gln Ile Pro Glu Pro Lys Ser
```

```
            130                 135                 140
Ser Asp Lys Thr His Thr Cys Pro Pro Cys Pro Ala Pro Glu Leu Leu
145                 150                 155                 160

Gly Gly Pro Ser Val Phe Leu Phe Pro Pro Lys Pro Lys Asp Thr Leu
                165                 170                 175

Met Ile Ser Arg Thr Pro Glu Val Thr Cys Val Val Val Asp Val Ser
            180                 185                 190

His Glu Asp Pro Glu Val Lys Phe Asn Trp Tyr Val Asp Gly Val Glu
        195                 200                 205

Val His Asn Ala Lys Thr Lys Pro Arg Glu Glu Gln Tyr Asn Ser Thr
    210                 215                 220

Tyr Arg Val Val Ser Val Leu Thr Val Leu His Gln Asp Trp Leu Asn
225                 230                 235                 240

Gly Lys Glu Tyr Lys Cys Ala Val Ser Asn Lys Ala Leu Pro Ala Pro
                245                 250                 255

Ile Glu Lys Thr Ile Ser Lys Ala Lys Gly Gln Pro Arg Glu Pro Gln
            260                 265                 270

Val Tyr Thr Leu Pro Pro Ser Arg Cys Glu Leu Thr Lys Asn Gln Val
        275                 280                 285

Ser Leu Ser Cys Ala Val Lys Gly Phe Tyr Pro Ser Asp Ile Ala Val
    290                 295                 300

Glu Trp Glu Ser Asn Gly Gln Pro Glu Asn Asn Tyr Lys Thr Thr Pro
305                 310                 315                 320

Pro Val Leu Asp Ser Asp Gly Ser Phe Phe Leu Val Ser Lys Leu Thr
                325                 330                 335

Val Asp Lys Ser Arg Trp Gln Gln Gly Asn Val Phe Ser Cys Ser Val
            340                 345                 350

Leu His Glu Ala Leu His Ser His Tyr Thr Gln Lys Ser Leu Ser Leu
        355                 360                 365

Ser Pro Gly Lys
    370

<210> SEQ ID NO 34
<211> LENGTH: 422
<212> TYPE: PRT
<213> ORGANISM: Artificial sequence
<220> FEATURE:
<223> OTHER INFORMATION: Mouse TIM-3-hFcB

<400> SEQUENCE: 34

Met Lys Trp Val Thr Phe Ile Ser Leu Leu Phe Leu Phe Ser Ser Ala
1               5                   10                  15

Tyr Ser Ala Ser Leu Glu Asp Gly Tyr Lys Val Glu Val Gly Lys Asn
            20                  25                  30

Ala Tyr Leu Pro Cys Ser Tyr Thr Leu Pro Thr Ser Gly Thr Leu Val
        35                  40                  45

Pro Met Cys Trp Gly Lys Gly Phe Cys Pro Trp Ser Gln Cys Thr Asn
    50                  55                  60

Glu Leu Leu Arg Thr Asp Glu Arg Asn Val Thr Tyr Gln Lys Ser Ser
65                  70                  75                  80

Arg Tyr Gln Leu Lys Gly Asp Leu Asn Lys Gly Asp Val Ser Leu Ile
                85                  90                  95

Ile Lys Asn Val Thr Leu Asp Asp His Gly Thr Tyr Cys Cys Arg Ile
            100                 105                 110

Gln Phe Pro Gly Leu Met Asn Asp Lys Lys Leu Glu Leu Lys Leu Asp
```

```
                    115                 120                 125
Ile Lys Ala Ala Lys Val Thr Pro Ala Gln Thr Ala His Gly Asp Ser
            130                 135                 140

Thr Thr Ala Ser Pro Arg Thr Leu Thr Thr Glu Arg Asn Gly Ser Glu
145                 150                 155                 160

Thr Gln Thr Leu Val Thr Leu His Asn Asn Asn Gly Thr Lys Ile Ser
                165                 170                 175

Thr Trp Ala Asp Glu Ile Lys Asp Ser Gly Glu Thr Ile Arg Glu Pro
            180                 185                 190

Lys Ser Ser Asp Lys Thr His Thr Cys Pro Pro Cys Pro Ala Pro Glu
            195                 200                 205

Leu Leu Gly Gly Pro Ser Val Phe Leu Phe Pro Pro Lys Pro Lys Asp
        210                 215                 220

Thr Leu Met Ile Ser Arg Thr Pro Glu Val Thr Cys Val Val Val Asp
225                 230                 235                 240

Val Ser His Glu Asp Pro Glu Val Lys Phe Asn Trp Tyr Val Asp Gly
                245                 250                 255

Val Glu Val His Asn Ala Lys Thr Lys Pro Arg Glu Glu Gln Tyr Asn
            260                 265                 270

Ser Thr Tyr Arg Val Val Ser Val Leu Thr Val Leu His Gln Asp Trp
        275                 280                 285

Leu Asn Gly Lys Glu Tyr Lys Cys Ala Val Ser Asn Lys Ala Leu Pro
        290                 295                 300

Ala Pro Ile Glu Lys Thr Ile Ser Lys Ala Lys Gly Gln Pro Arg Glu
305                 310                 315                 320

Pro Gln Val Tyr Thr Leu Pro Pro Ser Arg Cys Glu Leu Thr Lys Asn
                325                 330                 335

Gln Val Ser Leu Ser Cys Ala Val Lys Gly Phe Tyr Pro Ser Asp Ile
            340                 345                 350

Ala Val Glu Trp Glu Ser Asn Gly Gln Pro Glu Asn Asn Tyr Lys Thr
            355                 360                 365

Thr Pro Pro Val Leu Asp Ser Asp Gly Ser Phe Phe Leu Val Ser Lys
        370                 375                 380

Leu Thr Val Asp Lys Ser Arg Trp Gln Gln Gly Asn Val Phe Ser Cys
385                 390                 395                 400

Ser Val Leu His Glu Ala Leu His Ser His Tyr Thr Gln Lys Ser Leu
                405                 410                 415

Ser Leu Ser Pro Gly Lys
            420

<210> SEQ ID NO 35
<211> LENGTH: 594
<212> TYPE: PRT
<213> ORGANISM: Artificial sequence
<220> FEATURE:
<223> OTHER INFORMATION: Human CD113-hFcB

<400> SEQUENCE: 35

Met Lys Trp Val Thr Phe Ile Ser Leu Leu Phe Leu Phe Ser Ser Ala
1               5                   10                  15

Tyr Ser Ala Ser Pro Ile Ile Val Glu Pro His Val Thr Ala Val Trp
            20                  25                  30

Gly Lys Asn Val Ser Leu Lys Cys Leu Ile Glu Val Asn Glu Thr Ile
        35                  40                  45

Thr Gln Ile Ser Trp Glu Lys Ile His Gly Lys Ser Ser Gln Thr Val
```

```
                50                  55                  60
Ala Val His His Pro Gln Tyr Gly Phe Ser Val Gln Gly Glu Tyr Gln
 65                  70                  75                  80

Gly Arg Val Leu Phe Lys Asn Tyr Ser Leu Asn Asp Ala Thr Ile Thr
                 85                  90                  95

Leu His Asn Ile Gly Phe Ser Asp Ser Gly Lys Tyr Ile Cys Lys Ala
                100                 105                 110

Val Thr Phe Pro Leu Gly Asn Ala Gln Ser Ser Thr Thr Val Thr Val
                115                 120                 125

Leu Val Glu Pro Thr Val Ser Leu Ile Lys Gly Pro Asp Ser Leu Ile
                130                 135                 140

Asp Gly Gly Asn Glu Thr Val Ala Ala Ile Cys Ile Ala Ala Thr Gly
145                 150                 155                 160

Lys Pro Val Ala His Ile Asp Trp Glu Gly Asp Leu Gly Glu Met Glu
                165                 170                 175

Ser Thr Thr Thr Ser Phe Pro Asn Glu Thr Ala Thr Ile Ile Ser Gln
                180                 185                 190

Tyr Lys Leu Phe Pro Thr Arg Phe Ala Arg Gly Arg Ile Thr Cys
                195                 200                 205

Val Val Lys His Pro Ala Leu Glu Lys Asp Ile Arg Tyr Ser Phe Ile
                210                 215                 220

Leu Asp Ile Gln Tyr Ala Pro Glu Val Ser Val Thr Gly Tyr Asp Gly
225                 230                 235                 240

Asn Trp Phe Val Gly Arg Lys Gly Val Asn Leu Lys Cys Asn Ala Asp
                245                 250                 255

Ala Asn Pro Pro Pro Phe Lys Ser Val Trp Ser Arg Leu Asp Gly Gln
                260                 265                 270

Trp Pro Asp Gly Leu Leu Ala Ser Asp Asn Thr Leu His Phe Val His
                275                 280                 285

Pro Leu Thr Phe Asn Tyr Ser Gly Val Tyr Ile Cys Lys Val Thr Asn
                290                 295                 300

Ser Leu Gly Gln Arg Ser Asp Gln Lys Val Ile Tyr Ile Ser Asp Pro
305                 310                 315                 320

Pro Thr Thr Thr Thr Leu Gln Pro Thr Ile Gln Trp His Pro Ser Thr
                325                 330                 335

Ala Asp Ile Glu Asp Leu Ala Thr Glu Pro Lys Lys Leu Pro Phe Pro
                340                 345                 350

Leu Ser Thr Leu Ala Thr Ile Lys Asp Asp Glu Pro Lys Ser Ser Asp
                355                 360                 365

Lys Thr His Thr Cys Pro Pro Cys Pro Ala Pro Glu Leu Leu Gly Gly
                370                 375                 380

Pro Ser Val Phe Leu Phe Pro Pro Lys Pro Lys Asp Thr Leu Met Ile
385                 390                 395                 400

Ser Arg Thr Pro Glu Val Thr Cys Val Val Val Asp Val Ser His Glu
                405                 410                 415

Asp Pro Glu Val Lys Phe Asn Trp Tyr Val Asp Gly Val Glu Val His
                420                 425                 430

Asn Ala Lys Thr Lys Pro Arg Glu Glu Gln Tyr Asn Ser Thr Tyr Arg
                435                 440                 445

Val Val Ser Val Leu Thr Val Leu His Gln Asp Trp Leu Asn Gly Lys
                450                 455                 460

Glu Tyr Lys Cys Ala Val Ser Asn Lys Ala Leu Pro Ala Pro Ile Glu
465                 470                 475                 480
```

```
Lys Thr Ile Ser Lys Ala Lys Gly Gln Pro Arg Glu Pro Gln Val Tyr
            485                 490                 495

Thr Leu Pro Pro Ser Arg Cys Glu Leu Thr Lys Asn Gln Val Ser Leu
        500                 505                 510

Ser Cys Ala Val Lys Gly Phe Tyr Pro Ser Asp Ile Ala Val Glu Trp
    515                 520                 525

Glu Ser Asn Gly Gln Pro Glu Asn Asn Tyr Lys Thr Thr Pro Pro Val
530                 535                 540

Leu Asp Ser Asp Gly Ser Phe Phe Leu Val Ser Lys Leu Thr Val Asp
545                 550                 555                 560

Lys Ser Arg Trp Gln Gln Gly Asn Val Phe Ser Cys Ser Val Leu His
                565                 570                 575

Glu Ala Leu His Ser His Tyr Thr Gln Lys Ser Leu Ser Leu Ser Pro
            580                 585                 590

Gly Lys

<210> SEQ ID NO 36
<211> LENGTH: 252
<212> TYPE: PRT
<213> ORGANISM: Artificial sequence
<220> FEATURE:
<223> OTHER INFORMATION: Human FcB

<400> SEQUENCE: 36

Met Lys Trp Val Thr Phe Ile Ser Leu Leu Phe Leu Phe Ser Ser Ala
1               5                   10                  15

Tyr Ser Ala Ser Glu Pro Lys Ser Ser Asp Lys Thr His Thr Cys Pro
            20                  25                  30

Pro Cys Pro Ala Pro Glu Leu Leu Gly Gly Pro Ser Val Phe Leu Phe
        35                  40                  45

Pro Pro Lys Pro Lys Asp Thr Leu Met Ile Ser Arg Thr Pro Glu Val
    50                  55                  60

Thr Cys Val Val Val Asp Val Ser His Glu Asp Pro Glu Val Lys Phe
65                  70                  75                  80

Asn Trp Tyr Val Asp Gly Val Glu Val His Asn Ala Lys Thr Lys Pro
                85                  90                  95

Arg Glu Glu Gln Tyr Asn Ser Thr Tyr Arg Val Val Ser Val Leu Thr
            100                 105                 110

Val Leu His Gln Asp Trp Leu Asn Gly Lys Glu Tyr Lys Cys Ala Val
        115                 120                 125

Ser Asn Lys Ala Leu Pro Ala Pro Ile Glu Lys Thr Ile Ser Lys Ala
    130                 135                 140

Lys Gly Gln Pro Arg Glu Pro Gln Val Tyr Thr Leu Pro Pro Ser Arg
145                 150                 155                 160

Cys Glu Leu Thr Lys Asn Gln Val Ser Leu Ser Cys Ala Val Lys Gly
                165                 170                 175

Phe Tyr Pro Ser Asp Ile Ala Val Glu Trp Glu Ser Asn Gly Gln Pro
            180                 185                 190

Glu Asn Asn Tyr Lys Thr Thr Pro Pro Val Leu Asp Ser Asp Gly Ser
        195                 200                 205

Phe Phe Leu Val Ser Lys Leu Thr Val Asp Lys Ser Arg Trp Gln Gln
    210                 215                 220

Gly Asn Val Phe Ser Cys Ser Val Leu His Glu Ala Leu His Ser His
225                 230                 235                 240
```

Tyr Thr Gln Lys Ser Leu Ser Leu Ser Pro Gly Lys
            245                 250

<210> SEQ ID NO 37
<211> LENGTH: 71
<212> TYPE: PRT
<213> ORGANISM: Human gammaherpesvirus 8

<400> SEQUENCE: 37

Leu Gly Ala Ser Trp His Arg Pro Asp Lys Cys Cys Leu Gly Tyr Gln
1               5                   10                  15

Lys Arg Pro Leu Pro Gln Val Leu Leu Ser Ser Trp Tyr Pro Thr Ser
            20                  25                  30

Gln Leu Cys Ser Lys Pro Gly Val Ile Phe Leu Thr Lys Arg Gly Arg
        35                  40                  45

Gln Val Cys Ala Asp Lys Ser Lys Asp Trp Val Lys Lys Leu Met Gln
    50                  55                  60

Gln Leu Pro Val Thr Ala Arg
65                  70

<210> SEQ ID NO 38
<211> LENGTH: 21
<212> TYPE: PRT
<213> ORGANISM: Human gammaherpesvirus 8

<400> SEQUENCE: 38

Leu Gly Ala Ser Trp His Arg Pro Asp Lys Cys Cys Leu Gly Tyr Gln
1               5                   10                  15

Lys Arg Pro Leu Pro
            20

<210> SEQ ID NO 39
<211> LENGTH: 21
<212> TYPE: PRT
<213> ORGANISM: Artificial sequence
<220> FEATURE:
<223> OTHER INFORMATION: V1delta

<400> SEQUENCE: 39

Leu Gly Ala Ser Trp His Arg Pro Asp Lys Cys Ala Leu Gly Tyr Gln
1               5                   10                  15

Lys Arg Pro Leu Pro
            20

<210> SEQ ID NO 40
<211> LENGTH: 21
<212> TYPE: PRT
<213> ORGANISM: Artificial sequence
<220> FEATURE:
<223> OTHER INFORMATION: V1delta mut

<400> SEQUENCE: 40

Leu Gly Ala Ser Trp His Arg Pro Asp Ala Cys Ala Leu Gly Tyr Gln
1               5                   10                  15

Lys Arg Pro Leu Pro
            20

<210> SEQ ID NO 41
<211> LENGTH: 34
<212> TYPE: PRT
<213> ORGANISM: Human gammaherpesvirus 8

<400> SEQUENCE: 41

```
Leu Gly Ala Ser Trp His Arg Pro Asp Lys Cys Cys Leu Gly Tyr Gln
1               5                   10                  15

Lys Arg Pro Leu Pro Gln Val Leu Leu Ser Ser Trp Tyr Pro Thr Ser
            20                  25                  30

Gln Leu
```

<210> SEQ ID NO 42
<211> LENGTH: 34
<212> TYPE: PRT
<213> ORGANISM: Artificial sequence
<220> FEATURE:
<223> OTHER INFORMATION: Vp1delta

<400> SEQUENCE: 42

```
Leu Gly Ala Ser Trp His Arg Pro Asp Lys Cys Ala Leu Gly Tyr Gln
1               5                   10                  15

Lys Arg Pro Leu Pro Gln Val Leu Leu Ser Ser Trp Tyr Pro Thr Ser
            20                  25                  30

Gln Leu
```

<210> SEQ ID NO 43
<211> LENGTH: 34
<212> TYPE: PRT
<213> ORGANISM: Artificial sequence
<220> FEATURE:
<223> OTHER INFORMATION: Vp1delta mut

<400> SEQUENCE: 43

```
Leu Gly Ala Ser Trp His Arg Pro Asp Ala Cys Ala Leu Gly Tyr Gln
1               5                   10                  15

Lys Arg Pro Leu Pro Gln Val Leu Leu Ser Ser Trp Tyr Pro Thr Ser
            20                  25                  30

Gln Leu
```

<210> SEQ ID NO 44
<211> LENGTH: 107
<212> TYPE: PRT
<213> ORGANISM: Artificial sequence
<220> FEATURE:
<223> OTHER INFORMATION: IgG1 Z3 domain

<400> SEQUENCE: 44

```
Gly Gln Pro Arg Glu Pro Gln Val Cys Thr Leu Pro Pro Ser Arg Asp
1               5                   10                  15

Glu Leu Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Lys Leu Thr Val Asp Lys Ser Arg Trp Gln Gln Gly
65                  70                  75                  80

Asn Val Phe Ser Cys Ser Val Leu His Glu Ala Leu His Asn Ser Tyr
                85                  90                  95

Thr Gln Lys Ser Leu Ser Leu Ser Pro Gly Lys
            100                 105
```

<210> SEQ ID NO 45
<211> LENGTH: 100

```
<212> TYPE: PRT
<213> ORGANISM: Artificial sequence
<220> FEATURE:
<223> OTHER INFORMATION: exemplary sequence for component Z1 prime
<220> FEATURE:
<221> NAME/KEY: misc_feature
<222> LOCATION: (100)..(100)
<223> OTHER INFORMATION: Xaa can be any naturally occurring amino acid

<400> SEQUENCE: 45

Ser Ser Ala Ser Thr Lys Gly Pro Ser Val Phe Pro Leu Ala Pro Ser
1               5                   10                  15

Ser Lys Ser Thr Ser Gly Gly Thr Ala Ala Leu Gly Cys Leu Val Lys
            20                  25                  30

Asp Tyr Phe Pro Glu Val Thr Val Ser Trp Asn Ser Gly Ala Leu Thr
        35                  40                  45

Ser Gly Val His Thr Phe Pro Ala Val Leu Gln Ser Ser Gly Leu Tyr
    50                  55                  60

Ser Leu Ser Ser Val Val Thr Val Pro Ser Ser Ser Leu Gly Thr Gln
65                  70                  75                  80

Thr Tyr Ile Cys Asn Val Asn His Lys Pro Ser Asn Thr Lys Val Asp
                85                  90                  95

Lys Lys Val Xaa
            100

<210> SEQ ID NO 46
<211> LENGTH: 9
<212> TYPE: PRT
<213> ORGANISM: Artificial sequence
<220> FEATURE:
<223> OTHER INFORMATION: exemplary purification tag

<400> SEQUENCE: 46

Ala Ser His His His His His His Met
1               5

<210> SEQ ID NO 47
<211> LENGTH: 27
<212> TYPE: PRT
<213> ORGANISM: Artificial sequence
<220> FEATURE:
<223> OTHER INFORMATION: exemplary trimerization sequence

<400> SEQUENCE: 47

Gly Tyr Ile Pro Glu Ala Pro Arg Asp Gly Gln Ala Tyr Val Arg Lys
1               5                   10                  15

Arg Gly Glu Trp Val Leu Leu Ser Thr Phe Leu
            20                  25

<210> SEQ ID NO 48
<211> LENGTH: 107
<212> TYPE: PRT
<213> ORGANISM: Artificial sequence
<220> FEATURE:
<223> OTHER INFORMATION: exemplary sequence for component Z3 prime

<400> SEQUENCE: 48

Gly Gln Pro Arg Glu Pro Gln Val Tyr Thr Leu Pro Pro Ser Arg Cys
1               5                   10                  15

Glu Leu Thr Lys Asn Gln Val Ser Leu Ser Cys Ala Val Lys Gly Phe
            20                  25                  30

Tyr Pro Ser Asp Ile Ala Val Glu Trp Glu Ser Asn Gly Gln Pro Glu
        35                  40                  45
```

Asn Asn Tyr Lys Thr Thr Pro Pro Val Leu Asp Ser Asp Gly Ser Phe
            50                   55                  60

Phe Leu Val Ser Lys Leu Thr Val Asp Lys Ser Arg Trp Gln Gln Gly
 65                  70                  75                  80

Asn Val Phe Ser Cys Ser Val Leu His Glu Ala Leu His Ser His Tyr
                 85                  90                  95

Thr Gln Lys Ser Leu Ser Leu Ser Pro Gly Lys
            100                 105

<210> SEQ ID NO 49
<211> LENGTH: 421
<212> TYPE: PRT
<213> ORGANISM: Artificial sequence
<220> FEATURE:
<223> OTHER INFORMATION: vMIPII-CH-hFcB
<220> FEATURE:
<221> NAME/KEY: misc_feature
<222> LOCATION: (189)..(189)
<223> OTHER INFORMATION: Xaa can be any naturally occurring amino acid

<400> SEQUENCE: 49

Met Lys Trp Val Thr Phe Ile Ser Leu Leu Phe Leu Phe Ser Ser Ala
 1               5                  10                  15

Tyr Ser Leu Gly Ala Ser Trp His Arg Pro Asp Lys Cys Cys Leu Gly
                20                  25                  30

Tyr Gln Lys Arg Pro Leu Pro Gln Val Leu Leu Ser Ser Trp Tyr Pro
            35                  40                  45

Thr Ser Gln Leu Cys Ser Lys Pro Gly Val Ile Phe Leu Thr Lys Arg
 50                  55                  60

Gly Arg Gln Val Cys Ala Asp Lys Ser Lys Asp Trp Val Lys Lys Leu
 65                  70                  75                  80

Met Gln Gln Leu Pro Val Thr Ala Arg Ser Ser Ala Ser Thr Lys Gly
                 85                  90                  95

Pro Ser Val Phe Pro Leu Ala Pro Ser Ser Lys Ser Thr Ser Gly Gly
                100                 105                 110

Thr Ala Ala Leu Gly Cys Leu Val Lys Asp Tyr Phe Pro Glu Val Thr
            115                 120                 125

Val Ser Trp Asn Ser Gly Ala Leu Thr Ser Gly Val His Thr Phe Pro
130                 135                 140

Ala Val Leu Gln Ser Ser Gly Leu Tyr Ser Leu Ser Ser Val Val Thr
145                 150                 155                 160

Val Pro Ser Ser Ser Leu Gly Thr Gln Thr Tyr Ile Cys Asn Val Asn
                165                 170                 175

His Lys Pro Ser Asn Thr Lys Val Asp Lys Lys Val Xaa Glu Pro Lys
            180                 185                 190

Ser Ser Asp Lys Thr His Thr Cys Pro Pro Cys Pro Ala Pro Glu Leu
            195                 200                 205

Leu Gly Gly Pro Ser Val Phe Leu Phe Pro Pro Lys Pro Lys Asp Thr
            210                 215                 220

Leu Met Ile Ser Arg Thr Pro Glu Val Thr Cys Val Val Val Asp Val
225                 230                 235                 240

Ser His Glu Asp Pro Glu Val Lys Phe Asn Trp Tyr Val Asp Gly Val
                245                 250                 255

Glu Val His Asn Ala Lys Thr Lys Pro Arg Glu Glu Gln Tyr Asn Ser
            260                 265                 270

Thr Tyr Arg Val Val Ser Val Leu Thr Val Leu His Gln Asp Trp Leu

```
                275                 280                 285
Asn Gly Lys Glu Tyr Lys Cys Ala Val Ser Asn Lys Ala Leu Pro Ala
            290                 295                 300
Pro Ile Glu Lys Thr Ile Ser Lys Ala Lys Gly Gln Pro Arg Glu Pro
305                 310                 315                 320
Gln Val Tyr Thr Leu Pro Pro Ser Arg Cys Glu Leu Thr Lys Asn Gln
                325                 330                 335
Val Ser Leu Ser Cys Ala Val Lys Gly Phe Tyr Pro Ser Asp Ile Ala
            340                 345                 350
Val Glu Trp Glu Ser Asn Gly Gln Pro Glu Asn Asn Tyr Lys Thr Thr
                355                 360                 365
Pro Pro Val Leu Asp Ser Asp Gly Ser Phe Phe Leu Val Ser Lys Leu
            370                 375                 380
Thr Val Asp Lys Ser Arg Trp Gln Gln Gly Asn Val Phe Ser Cys Ser
385                 390                 395                 400
Val Leu His Glu Ala Leu His Ser His Tyr Thr Gln Lys Ser Leu Ser
                405                 410                 415
Leu Ser Pro Gly Lys
            420

<210> SEQ ID NO 50
<211> LENGTH: 371
<212> TYPE: PRT
<213> ORGANISM: Artificial sequence
<220> FEATURE:
<223> OTHER INFORMATION: V1-CH- hFcB
<220> FEATURE:
<221> NAME/KEY: misc_feature
<222> LOCATION: (139)..(139)
<223> OTHER INFORMATION: Xaa can be any naturally occurring amino acid

<400> SEQUENCE: 50

Met Lys Trp Val Thr Phe Ile Ser Leu Leu Phe Leu Phe Ser Ser Ala
1               5                   10                  15
Tyr Ser Leu Gly Ala Ser Trp His Arg Pro Asp Lys Cys Cys Leu Gly
            20                  25                  30
Tyr Gln Lys Arg Pro Leu Pro Ser Ser Ala Ser Thr Lys Gly Pro Ser
        35                  40                  45
Val Phe Pro Leu Ala Pro Ser Ser Lys Ser Thr Ser Gly Gly Thr Ala
    50                  55                  60
Ala Leu Gly Cys Leu Val Lys Asp Tyr Phe Pro Glu Val Thr Val Ser
65                  70                  75                  80
Trp Asn Ser Gly Ala Leu Thr Ser Gly Val His Thr Phe Pro Ala Val
                85                  90                  95
Leu Gln Ser Ser Gly Leu Tyr Ser Leu Ser Ser Val Val Thr Val Pro
            100                 105                 110
Ser Ser Ser Leu Gly Thr Gln Thr Tyr Ile Cys Asn Val Asn His Lys
        115                 120                 125
Pro Ser Asn Thr Lys Val Asp Lys Lys Val Xaa Glu Pro Lys Ser Ser
    130                 135                 140
Asp Lys Thr His Thr Cys Pro Pro Cys Pro Ala Pro Glu Leu Leu Gly
145                 150                 155                 160
Gly Pro Ser Val Phe Leu Phe Pro Pro Lys Pro Lys Asp Thr Leu Met
                165                 170                 175
Ile Ser Arg Thr Pro Glu Val Thr Cys Val Val Val Asp Val Ser His
            180                 185                 190
```

```
Glu Asp Pro Glu Val Lys Phe Asn Trp Tyr Val Asp Gly Val Glu Val
            195                 200                 205

His Asn Ala Lys Thr Lys Pro Arg Glu Gln Tyr Asn Ser Thr Tyr
    210                 215                 220

Arg Val Val Ser Val Leu Thr Val Leu His Gln Asp Trp Leu Asn Gly
225                 230                 235                 240

Lys Glu Tyr Lys Cys Ala Val Ser Asn Lys Ala Leu Pro Ala Pro Ile
                245                 250                 255

Glu Lys Thr Ile Ser Lys Ala Lys Gly Gln Pro Arg Glu Pro Gln Val
            260                 265                 270

Tyr Thr Leu Pro Pro Ser Arg Cys Glu Leu Thr Lys Asn Gln Val Ser
    275                 280                 285

Leu Ser Cys Ala Val Lys Gly Phe Tyr Pro Ser Asp Ile Ala Val Glu
290                 295                 300

Trp Glu Ser Asn Gly Gln Pro Glu Asn Asn Tyr Lys Thr Thr Pro Pro
305                 310                 315                 320

Val Leu Asp Ser Asp Gly Ser Phe Phe Leu Val Ser Lys Leu Thr Val
                325                 330                 335

Asp Lys Ser Arg Trp Gln Gln Gly Asn Val Phe Ser Cys Ser Val Leu
            340                 345                 350

His Glu Ala Leu His Ser His Tyr Thr Gln Lys Ser Leu Ser Leu Ser
    355                 360                 365

Pro Gly Lys
    370

<210> SEQ ID NO 51
<211> LENGTH: 371
<212> TYPE: PRT
<213> ORGANISM: Artificial sequence
<220> FEATURE:
<223> OTHER INFORMATION: V1delta-CH- hFcB
<220> FEATURE:
<221> NAME/KEY: misc_feature
<222> LOCATION: (139)..(139)
<223> OTHER INFORMATION: Xaa can be any naturally occurring amino acid

<400> SEQUENCE: 51

Met Lys Trp Val Thr Phe Ile Ser Leu Leu Phe Leu Phe Ser Ser Ala
1               5                   10                  15

Tyr Ser Leu Gly Ala Ser Trp His Arg Pro Asp Lys Cys Ala Leu Gly
            20                  25                  30

Tyr Gln Lys Arg Pro Leu Pro Ser Ser Ala Ser Thr Lys Gly Pro Ser
        35                  40                  45

Val Phe Pro Leu Ala Pro Ser Ser Lys Ser Thr Ser Gly Gly Thr Ala
50                  55                  60

Ala Leu Gly Cys Leu Val Lys Asp Tyr Phe Pro Glu Val Thr Val Ser
65                  70                  75                  80

Trp Asn Ser Gly Ala Leu Thr Ser Gly Val His Thr Phe Pro Ala Val
                85                  90                  95

Leu Gln Ser Ser Gly Leu Tyr Ser Leu Ser Ser Val Val Thr Val Pro
            100                 105                 110

Ser Ser Ser Leu Gly Thr Gln Thr Tyr Ile Cys Asn Val Asn His Lys
        115                 120                 125

Pro Ser Asn Thr Lys Val Asp Lys Lys Val Xaa Glu Pro Lys Ser Ser
130                 135                 140

Asp Lys Thr His Thr Cys Pro Pro Cys Pro Ala Pro Glu Leu Leu Gly
145                 150                 155                 160
```

```
Gly Pro Ser Val Phe Leu Phe Pro Pro Lys Pro Lys Asp Thr Leu Met
            165                 170                 175

Ile Ser Arg Thr Pro Glu Val Thr Cys Val Val Val Asp Val Ser His
            180                 185                 190

Glu Asp Pro Glu Val Lys Phe Asn Trp Tyr Val Asp Gly Val Glu Val
            195                 200                 205

His Asn Ala Lys Thr Lys Pro Arg Glu Glu Gln Tyr Asn Ser Thr Tyr
    210                 215                 220

Arg Val Val Ser Val Leu Thr Val Leu His Gln Asp Trp Leu Asn Gly
225                 230                 235                 240

Lys Glu Tyr Lys Cys Ala Val Ser Asn Lys Ala Leu Pro Ala Pro Ile
                245                 250                 255

Glu Lys Thr Ile Ser Lys Ala Lys Gly Gln Pro Arg Glu Pro Gln Val
            260                 265                 270

Tyr Thr Leu Pro Pro Ser Arg Cys Glu Leu Thr Lys Asn Gln Val Ser
            275                 280                 285

Leu Ser Cys Ala Val Lys Gly Phe Tyr Pro Ser Asp Ile Ala Val Glu
    290                 295                 300

Trp Glu Ser Asn Gly Gln Pro Glu Asn Tyr Lys Thr Thr Pro Pro
305                 310                 315                 320

Val Leu Asp Ser Asp Gly Ser Phe Phe Leu Val Ser Lys Leu Thr Val
                325                 330                 335

Asp Lys Ser Arg Trp Gln Gln Gly Asn Val Phe Ser Cys Ser Val Leu
            340                 345                 350

His Glu Ala Leu His Ser His Tyr Thr Gln Lys Ser Leu Ser Leu Ser
            355                 360                 365

Pro Gly Lys
    370

<210> SEQ ID NO 52
<211> LENGTH: 371
<212> TYPE: PRT
<213> ORGANISM: Artificial sequence
<220> FEATURE:
<223> OTHER INFORMATION: V1delta mut-CH- hFcB
<220> FEATURE:
<221> NAME/KEY: misc_feature
<222> LOCATION: (139)..(139)
<223> OTHER INFORMATION: Xaa can be any naturally occurring amino acid

<400> SEQUENCE: 52

Met Lys Trp Val Thr Phe Ile Ser Leu Leu Phe Leu Phe Ser Ser Ala
1               5                   10                  15

Tyr Ser Leu Gly Ala Ser Trp His Arg Pro Asp Ala Cys Ala Leu Gly
            20                  25                  30

Tyr Gln Lys Arg Pro Leu Pro Ser Ser Ala Ser Thr Lys Gly Pro Ser
        35                  40                  45

Val Phe Pro Leu Ala Pro Ser Lys Ser Thr Ser Gly Gly Thr Ala
    50                  55                  60

Ala Leu Gly Cys Leu Val Lys Asp Tyr Phe Pro Glu Val Thr Val Ser
65                  70                  75                  80

Trp Asn Ser Gly Ala Leu Thr Ser Gly Val His Thr Phe Pro Ala Val
                85                  90                  95

Leu Gln Ser Ser Gly Leu Tyr Ser Leu Ser Ser Val Val Thr Val Pro
            100                 105                 110

Ser Ser Ser Leu Gly Thr Gln Thr Tyr Ile Cys Asn Val Asn His Lys
```

```
            115                 120                 125
Pro Ser Asn Thr Lys Val Asp Lys Lys Val Xaa Glu Pro Lys Ser Ser
    130                 135                 140

Asp Lys Thr His Thr Cys Pro Pro Cys Pro Ala Pro Glu Leu Leu Gly
145                 150                 155                 160

Gly Pro Ser Val Phe Leu Phe Pro Pro Lys Pro Lys Asp Thr Leu Met
                165                 170                 175

Ile Ser Arg Thr Pro Glu Val Thr Cys Val Val Val Asp Val Ser His
            180                 185                 190

Glu Asp Pro Glu Val Lys Phe Asn Trp Tyr Val Asp Gly Val Glu Val
        195                 200                 205

His Asn Ala Lys Thr Lys Pro Arg Glu Glu Gln Tyr Asn Ser Thr Tyr
    210                 215                 220

Arg Val Val Ser Val Leu Thr Val Leu His Gln Asp Trp Leu Asn Gly
225                 230                 235                 240

Lys Glu Tyr Lys Cys Ala Val Ser Asn Lys Ala Leu Pro Ala Pro Ile
                245                 250                 255

Glu Lys Thr Ile Ser Lys Ala Lys Gly Gln Pro Arg Glu Pro Gln Val
            260                 265                 270

Tyr Thr Leu Pro Pro Ser Arg Cys Glu Leu Thr Lys Asn Gln Val Ser
        275                 280                 285

Leu Ser Cys Ala Val Lys Gly Phe Tyr Pro Ser Asp Ile Ala Val Glu
    290                 295                 300

Trp Glu Ser Asn Gly Gln Pro Glu Asn Asn Tyr Lys Thr Thr Pro Pro
305                 310                 315                 320

Val Leu Asp Ser Asp Gly Ser Phe Phe Leu Val Ser Lys Leu Thr Val
                325                 330                 335

Asp Lys Ser Arg Trp Gln Gln Gly Asn Val Phe Ser Cys Ser Val Leu
            340                 345                 350

His Glu Ala Leu His Ser His Tyr Thr Gln Lys Ser Leu Ser Leu Ser
        355                 360                 365

Pro Gly Lys
    370

<210> SEQ ID NO 53
<211> LENGTH: 384
<212> TYPE: PRT
<213> ORGANISM: Artificial sequence
<220> FEATURE:
<223> OTHER INFORMATION: Vp1-CH- hFcB
<220> FEATURE:
<221> NAME/KEY: misc_feature
<222> LOCATION: (152)..(152)
<223> OTHER INFORMATION: Xaa can be any naturally occurring amino acid

<400> SEQUENCE: 53

Met Lys Trp Val Thr Phe Ile Ser Leu Leu Phe Leu Phe Ser Ser Ala
1               5                   10                  15

Tyr Ser Leu Gly Ala Ser Trp His Arg Pro Asp Lys Cys Cys Leu Gly
            20                  25                  30

Tyr Gln Lys Arg Pro Leu Pro Gln Val Leu Leu Ser Ser Trp Tyr Pro
        35                  40                  45

Thr Ser Gln Leu Ser Ser Ala Ser Thr Lys Gly Pro Ser Val Phe Pro
    50                  55                  60

Leu Ala Pro Ser Ser Lys Ser Thr Ser Gly Gly Thr Ala Ala Leu Gly
65                  70                  75                  80
```

```
Cys Leu Val Lys Asp Tyr Phe Pro Glu Val Thr Val Ser Trp Asn Ser
                85                  90                  95

Gly Ala Leu Thr Ser Gly Val His Thr Phe Pro Ala Val Leu Gln Ser
            100                 105                 110

Ser Gly Leu Tyr Ser Leu Ser Ser Val Val Thr Val Pro Ser Ser Ser
        115                 120                 125

Leu Gly Thr Gln Thr Tyr Ile Cys Asn Val Asn His Lys Pro Ser Asn
130                 135                 140

Thr Lys Val Asp Lys Lys Val Xaa Glu Pro Lys Ser Ser Asp Lys Thr
145                 150                 155                 160

His Thr Cys Pro Pro Cys Pro Ala Pro Glu Leu Leu Gly Gly Pro Ser
                165                 170                 175

Val Phe Leu Phe Pro Pro Lys Pro Lys Asp Thr Leu Met Ile Ser Arg
            180                 185                 190

Thr Pro Glu Val Thr Cys Val Val Val Asp Val Ser His Glu Asp Pro
        195                 200                 205

Glu Val Lys Phe Asn Trp Tyr Val Asp Gly Val Glu Val His Asn Ala
210                 215                 220

Lys Thr Lys Pro Arg Glu Glu Gln Tyr Asn Ser Thr Tyr Arg Val Val
225                 230                 235                 240

Ser Val Leu Thr Val Leu His Gln Asp Trp Leu Asn Gly Lys Glu Tyr
                245                 250                 255

Lys Cys Ala Val Ser Asn Lys Ala Leu Pro Ala Pro Ile Glu Lys Thr
            260                 265                 270

Ile Ser Lys Ala Lys Gly Gln Pro Arg Glu Pro Gln Val Tyr Thr Leu
        275                 280                 285

Pro Pro Ser Arg Cys Glu Leu Thr Lys Asn Gln Val Ser Leu Ser Cys
290                 295                 300

Ala Val Lys Gly Phe Tyr Pro Ser Asp Ile Ala Val Glu Trp Glu Ser
305                 310                 315                 320

Asn Gly Gln Pro Glu Asn Asn Tyr Lys Thr Thr Pro Pro Val Leu Asp
                325                 330                 335

Ser Asp Gly Ser Phe Phe Leu Val Ser Lys Leu Thr Val Asp Lys Ser
            340                 345                 350

Arg Trp Gln Gln Gly Asn Val Phe Ser Cys Ser Val Leu His Glu Ala
        355                 360                 365

Leu His Ser His Tyr Thr Gln Lys Ser Leu Ser Leu Ser Pro Gly Lys
370                 375                 380

<210> SEQ ID NO 54
<211> LENGTH: 384
<212> TYPE: PRT
<213> ORGANISM: Artificial sequence
<220> FEATURE:
<223> OTHER INFORMATION: Vp1delta-CH- hFcB
<220> FEATURE:
<221> NAME/KEY: misc_feature
<222> LOCATION: (152)..(152)
<223> OTHER INFORMATION: X

```
Thr Ser Gln Leu Ser Ser Ala Ser Thr Lys Gly Pro Ser Val Phe Pro
 50                  55                  60

Leu Ala Pro Ser Ser Lys Ser Thr Ser Gly Gly Thr Ala Ala Leu Gly
 65                  70                  75                  80

Cys Leu Val Lys Asp Tyr Phe Pro Glu Val Thr Val Ser Trp Asn Ser
                 85                  90                  95

Gly Ala Leu Thr Ser Gly Val His Thr Phe Pro Ala Val Leu Gln Ser
                100                 105                 110

Ser Gly Leu Tyr Ser Leu Ser Ser Val Val Thr Val Pro Ser Ser Ser
            115                 120                 125

Leu Gly Thr Gln Thr Tyr Ile Cys Asn Val Asn His Lys Pro Ser Asn
130                 135                 140

Thr Lys Val Asp Lys Lys Val Xaa Glu Pro Lys Ser Ser Asp Lys Thr
145                 150                 155                 160

His Thr Cys Pro Pro Cys Pro Ala Pro Glu Leu Leu Gly Gly Pro Ser
                165                 170                 175

Val Phe Leu Phe Pro Pro Lys Pro Lys Asp Thr Leu Met Ile Ser Arg
                180                 185                 190

Thr Pro Glu Val Thr Cys Val Val Val Asp Val Ser His Glu Asp Pro
            195                 200                 205

Glu Val Lys Phe Asn Trp Tyr Val Asp Gly Val Glu Val His Asn Ala
210                 215                 220

Lys Thr Lys Pro Arg Glu Glu Gln Tyr Asn Ser Thr Tyr Arg Val Val
225                 230                 235                 240

Ser Val Leu Thr Val Leu His Gln Asp Trp Leu Asn Gly Lys Glu Tyr
                245                 250                 255

Lys Cys Ala Val Ser Asn Lys Ala Leu Pro Ala Pro Ile Glu Lys Thr
                260                 265                 270

Ile Ser Lys Ala Lys Gly Gln Pro Arg Glu Pro Gln Val Tyr Thr Leu
            275                 280                 285

Pro Pro Ser Arg Cys Glu Leu Thr Lys Asn Gln Val Ser Leu Ser Cys
290                 295                 300

Ala Val Lys Gly Phe Tyr Pro Ser Asp Ile Ala Val Glu Trp Glu Ser
305                 310                 315                 320

Asn Gly Gln Pro Glu Asn Asn Tyr Lys Thr Thr Pro Pro Val Leu Asp
                325                 330                 335

Ser Asp Gly Ser Phe Phe Leu Val Ser Lys Leu Thr Val Asp Lys Ser
                340                 345                 350

Arg Trp Gln Gln Gly Asn Val Phe Ser Cys Ser Val Leu His Glu Ala
            355                 360                 365

Leu His Ser His Tyr Thr Gln Lys Ser Leu Ser Leu Ser Pro Gly Lys
370                 375                 380

<210> SEQ ID NO 55
<211> LENGTH: 384
<212> TYPE: PRT
<213> ORGANISM: Artificial sequence
<220> FEATURE:
<223> OTHER INFORMATION: Vp1delta mut-CH- hFcB
<220> FEATURE:
<221> NAME/KEY: misc_feature
<222> LOCATION: (152)

```
              1               5                   10                  15
            Tyr Ser Leu Gly Ala Ser Trp His Arg Pro Asp Ala Cys Ala Leu Gly
                            20                  25                  30

Tyr Gln Lys Arg Pro Leu Pro Gln Val Leu Leu Ser Ser Trp Tyr Pro
                            35                  40                  45

Thr Ser Gln Leu Ser Ser Ala Ser Thr Lys Gly Pro Ser Val Phe Pro
            50                              55                  60

Leu Ala Pro Ser Ser Lys Ser Thr Ser Gly Gly Thr Ala Ala Leu Gly
            65                  70                  75                  80

Cys Leu Val Lys Asp Tyr Phe Pro Glu Val Thr Val Ser Trp Asn Ser
                            85                  90                  95

Gly Ala Leu Thr Ser Gly Val His Thr Phe Pro Ala Val Leu Gln Ser
                            100                 105                 110

Ser Gly Leu Tyr Ser Leu Ser Ser Val Val Thr Val Pro Ser Ser Ser
                            115                 120                 125

Leu Gly Thr Gln Thr Tyr Ile Cys Asn Val Asn His Lys Pro Ser Asn
            130                 135                 140

Thr Lys Val Asp Lys Lys Val Xaa Glu Pro Lys Ser Ser Asp Lys Thr
            145                 150                 155                 160

His Thr Cys Pro Pro Cys Pro Ala Pro Glu Leu Leu Gly Gly Pro Ser
                            165                 170                 175

Val Phe Leu Phe Pro Pro Lys Pro Lys Asp Thr Leu Met Ile Ser Arg
                            180                 185                 190

Thr Pro Glu Val Thr Cys Val Val Val Asp Val Ser His Glu Asp Pro
                            195                 200                 205

Glu Val Lys Phe Asn Trp Tyr Val Asp Gly Val Glu Val His Asn Ala
            210                 215                 220

Lys Thr Lys Pro Arg Glu Glu Gln Tyr Asn Ser Thr Tyr Arg Val Val
            225                 230                 235                 240

Ser Val Leu Thr Val Leu His Gln Asp Trp Leu Asn Gly Lys Glu Tyr
                            245                 250                 255

Lys Cys Ala Val Ser Asn Lys Ala Leu Pro Ala Pro Ile Glu Lys Thr
                            260                 265                 270

Ile Ser Lys Ala Lys Gly Gln Pro Arg Glu Pro Gln Val Tyr Thr Leu
                            275                 280                 285

Pro Pro Ser Arg Cys Glu Leu Thr Lys Asn Gln Val Ser Leu Ser Cys
                            290                 295                 300

Ala Val Lys Gly Phe Tyr Pro Ser Asp Ile Ala Val Glu Trp Glu Ser
            305                 310                 315                 320

Asn Gly Gln Pro Glu Asn Asn Tyr Lys Thr Thr Pro Pro Val Leu Asp
                            325                 330                 335

Ser Asp Gly Ser Phe Phe Leu Val Ser Lys Leu Thr Val Asp Lys Ser
                            340                 345                 350

Arg Trp Gln Gln Gly Asn Val Phe Ser Cys Ser Val Leu His Glu Ala
                            355                 360                 365

Leu His Ser His Tyr Thr Gln Lys Ser Leu Ser Leu Ser Pro Gly Lys
                            370                 375                 380

<210> SEQ ID NO 56
<211> LENGTH: 24
<212> TYPE: PRT
<213> ORGANISM: Artificial sequence
<220> FEATURE:
<223> OTHER INFORMATION: exemplary trimerization domain
```

```
<400> SEQUENCE: 56

Val Thr Thr Leu Gln Asp Ser Ile Arg Lys Val Thr Glu Glu Asn Lys
1               5                   10                  15

Glu Leu Ala Asn Glu Leu Arg Arg
            20

<210> SEQ ID NO 57
<211> LENGTH: 197
<212> TYPE: PRT
<213> ORGANISM: Artificial sequence
<220> FEATURE:
<223> OTHER INFORMATION: vMIPII-CL prime

<400> SEQUENCE: 57

Met Lys Trp Val Thr Phe Ile Ser Leu Leu Phe Leu Phe Ser Ser Ala
1               5                   10                  15

Tyr Ser Leu Gly Ala Ser Trp His Arg Pro Asp Lys Cys Cys Leu Gly
            20                  25                  30

Tyr Gln Lys Arg Pro Leu Pro Gln Val Leu Leu Ser Ser Trp Tyr Pro
        35                  40                  45

Thr Ser Gln Leu Cys Ser Lys Pro Gly Val Ile Phe Leu Thr Lys Arg
    50                  55                  60

Gly Arg Gln Val Cys Ala Asp Lys Ser Lys Asp Trp Val Lys Lys Leu
65                  70                  75                  80

Met Gln Gln Leu Pro Val Thr Ala Arg Lys Arg Thr Val Ala Ala Pro
                85                  90                  95

Ser Val Phe Ile Phe Pro Pro Ser Asp Glu Gln Leu Lys Ser Gly Thr
            100                 105                 110

Ala Ser Val Val Cys Leu Leu Asn Asn Phe Tyr Pro Arg Glu Ala Lys
        115                 120                 125

Val Gln Trp Lys Val Asp Asn Ala Leu Gln Ser Gly Asn Ser Gln Glu
    130                 135                 140

Ser Val Thr Glu Gln Asp Ser Lys Asp Ser Thr Tyr Ser Leu Ser Ser
145                 150                 155                 160

Thr Leu Thr Leu Ser Lys Ala Asp Tyr Glu Lys His Lys Val Tyr Ala
                165                 170                 175

Cys Glu Val Thr His Gln Gly Leu Ser Ser Pro Val Thr Lys Ser Phe
            180                 185                 190

Asn Arg Gly Glu Cys
        195

<210> SEQ ID NO 58
<211> LENGTH: 147
<212> TYPE: PRT
<213> ORGANISM: Artificial sequence
<220> FEATURE:
<223> OTHER INFORMATION: V1-CL prime

<400> SEQUENCE: 58

Met Lys Trp Val Thr Phe Ile Ser Leu Leu Phe Leu Phe Ser Ser Ala
1               5                   10                  15

Tyr Ser Leu Gly Ala Ser Trp His Arg Pro Asp Lys Cys Cys Leu Gly
            20                  25                  30

Tyr Gln Lys Arg Pro Leu Pro Lys Arg Thr Val Ala Ala Pro Ser Val
        35                  40                  45

Phe Ile Phe Pro Pro Ser Asp Glu Gln Leu Lys Ser Gly Thr Ala Ser
    50                  55                  60
```

```
Val Val Cys Leu Leu Asn Asn Phe Tyr Pro Arg Glu Ala Lys Val Gln
 65                  70                  75                  80

Trp Lys Val Asp Asn Ala Leu Gln Ser Gly Asn Ser Gln Glu Ser Val
                 85                  90                  95

Thr Glu Gln Asp Ser Lys Asp Ser Thr Tyr Ser Leu Ser Ser Thr Leu
                100                 105                 110

Thr Leu Ser Lys Ala Asp Tyr Glu Lys His Lys Val Tyr Ala Cys Glu
            115                 120                 125

Val Thr His Gln Gly Leu Ser Ser Pro Val Thr Lys Ser Phe Asn Arg
        130                 135                 140

Gly Glu Cys
145

<210> SEQ ID NO 59
<211> LENGTH: 147
<212> TYPE: PRT
<213> ORGANISM: Artificial sequence
<220> FEATURE:
<223> OTHER INFORMATION: V1deleta-CL prime

<400> SEQUENCE: 59

Met Lys Trp Val Thr Phe Ile Ser Leu Leu Phe Leu Phe Ser Ser Ala
  1               5                  10                  15

Tyr Ser Leu Gly Ala Ser Trp His Arg Pro Asp Lys Cys Ala Leu Gly
                 20                  25                  30

Tyr Gln Lys Arg Pro Leu Pro Lys Arg Thr Val Ala Ala Pro Ser Val
             35                  40                  45

Phe Ile Phe Pro Pro Ser Asp Glu Gln Leu Lys Ser Gly Thr Ala Ser
 50                  55                  60

Val Val Cys Leu Leu Asn Asn Phe Tyr Pro Arg Glu Ala Lys Val Gln
 65                  70                  75                  80

Trp Lys Val Asp Asn Ala Leu Gln Ser Gly Asn Ser Gln Glu Ser Val
                 85                  90                  95

Thr Glu Gln Asp Ser Lys Asp Ser Thr Tyr Ser Leu Ser Ser Thr Leu
                100                 105                 110

Thr Leu Ser Lys Ala Asp Tyr Glu Lys His Lys Val Tyr Ala Cys Glu
            115                 120                 125

Val Thr His Gln Gly Leu Ser Ser Pro Val Thr Lys Ser Phe Asn Arg
        130                 135                 140

Gly Glu Cys
145

<210> SEQ ID NO 60
<211> LENGTH: 147
<212> TYPE: PRT
<213> ORGANISM: Artificial sequence
<220> FEATURE:
<223> OTHER INFORMATION: V1delta mut-CL prime

<400> SEQUENCE: 60

Met Lys Trp Val Thr Phe Ile Ser Leu Leu Phe Leu Phe Ser Ser Ala
  1               5                  10                  15

Tyr Ser Leu Gly Ala Ser Trp His Arg Pro Asp Ala Cys Ala Leu Gly
                 20                  25                  30

Tyr Gln Lys Arg Pro Leu Pro Lys Arg Thr Val Ala Ala Pro Ser Val
             35                  40                  45

Phe Ile Phe Pro Pro Ser Asp Glu Gln Leu Lys Ser Gly Thr Ala Ser
 50                  55                  60
```

```
Val Val Cys Leu Leu Asn Asn Phe Tyr Pro Arg Glu Ala Lys Val Gln
 65                  70                  75                  80

Trp Lys Val Asp Asn Ala Leu Gln Ser Gly Asn Ser Gln Glu Ser Val
                 85                  90                  95

Thr Glu Gln Asp Ser Lys Asp Ser Thr Tyr Ser Leu Ser Ser Thr Leu
            100                 105                 110

Thr Leu Ser Lys Ala Asp Tyr Glu Lys His Lys Val Tyr Ala Cys Glu
        115                 120                 125

Val Thr His Gln Gly Leu Ser Ser Pro Val Thr Lys Ser Phe Asn Arg
130                 135                 140

Gly Glu Cys
145

<210> SEQ ID NO 61
<211> LENGTH: 160
<212> TYPE: PRT
<213> ORGANISM: Artificial sequence
<220> FEATURE:
<223> OTHER INFORMATION: Vp1-CL prime

<400> SEQUENCE: 61

Met Lys Trp Val Thr Phe Ile Ser Leu Leu Phe Leu Phe Ser Ser Ala
 1               5                  10                  15

Tyr Ser Leu Gly Ala Ser Trp His Arg Pro Asp Lys Cys Cys Leu Gly
                20                  25                  30

Tyr Gln Lys Arg P

```
                  50                  55                  60

Pro Pro Ser Asp Glu Gln Leu Lys Ser Gly Thr Ala Ser Val Val Cys
 65                  70                  75                  80

Leu Leu Asn Asn Phe Tyr Pro Arg Glu Ala Lys Val Gln Trp Lys Val
                     85                  90                  95

Asp Asn Ala Leu Gln Ser Gly Asn Ser Gln Glu Ser Val Thr Glu Gln
                100                 105                 110

Asp Ser Lys Asp Ser Thr Tyr Ser Leu Ser Ser Thr Leu Thr Leu Ser
                115                 120                 125

Lys Ala Asp Tyr Glu Lys His Lys Val Tyr Ala Cys Glu Val Thr His
                130                 135                 140

Gln Gly Leu Ser Ser Pro Val Thr Lys Ser Phe Asn Arg Gly Glu Cys
145                 150                 155                 160

<210> SEQ ID NO 63
<211> LENGTH: 160
<212> TYPE: PRT
<213> ORGANISM: Artificial sequence
<220> FEATURE:
<223> OTHER INFORMATION: Vp1delta mut-CL prime

<400> SEQUENCE: 63

Met Lys Trp Val Thr Phe Ile Ser Leu Leu Phe Leu Phe Ser Ser Ala
 1               5                  10                  15

Tyr Ser Leu Gly Ala Ser Trp His Arg Pro Asp Ala Cys Ala Leu Gly
                 20                  25                  30

Tyr Gln Lys Arg Pro Leu Pro Gln Val

Gln Ser Gly Asn Ser Gln Glu Ser Val Thr Glu Gln Asp Ser Lys Asp
                50                  55                  60

Ser Thr Tyr Ser Leu Ser Ser Thr Leu Thr Leu Ser Lys Ala Asp Tyr
 65                  70                  75                  80

Glu Lys His Lys Val Tyr Ala Cys Glu Val Thr His Gln Gly Leu Ser
                 85                  90                  95

Ser Pro Val Thr Lys Ser Phe Asn Arg Gly Glu Cys
            100                 105

<210> SEQ ID NO 65
<211> LENGTH: 5
<212> TYPE: PRT
<213> ORGANISM: Artificial sequence
<220> FEATURE:
<223> OTHER INFORMATION: Linker

<400> SEQUENCE: 65

Gly Gly Gly Gly Ser
1               5

<210> SEQ ID NO 66
<211> LENGTH: 8
<212> TYPE: PRT
<213> ORGANISM: Artificial sequence
<220> FEATURE:
<223> OTHER INFORMATION: Linker

<400> SEQUENCE: 66

Gly Gly Gly Ser Gly Gly Gly Ser
1               5

<210> SEQ ID NO 67
<211> LENGTH: 98
<212> TYPE: PRT
<213> ORGANISM: Artificial sequence
<220> FEATURE:
<223> OTHER INFORMATION: IgG1 Z1 domain

<400> SEQUENCE: 67

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Gln Thr
 65                 70                  75                  80

Tyr Ile Cys Asn Val Asn His Lys Pro Ser Asn Thr Lys Val Asp Lys
                 85                 90                  95

Lys Val

<210> SEQ ID NO 68
<211> LENGTH: 22
<212> TYPE: PRT
<213> ORGANISM: Artificial sequence
<220> FEATURE:
<223> OTHER INFORMATION: IgG1 hinge region

<400> SEQUENCE: 68

Glu Pro Lys Ser Ser Asp Lys Thr His Thr Cys Pro Pro Cys Pro Ala
1               5                   10                  15

Pro Glu Leu Leu Gly Gly
            20

<210> SEQ ID NO 69
<211> LENGTH: 103
<212> TYPE: PRT
<213> ORGANISM: Artificial sequence
<220> FEATURE:
<223> OTHER INFORMATION: IgG1 Z2 domain

<400> SEQUENCE: 69

Pro Ser Val Phe Leu Phe Pro Pro Lys Pro Lys Asp Thr Leu Met Ile
1               5                   10                  15

Ser Arg Thr Pro Glu Val Thr Cys Val Val Val Asp Val Ser His Glu
            20                  25                  30

Asp Pro Glu Val Lys Phe Asn Trp Tyr Val Asp Gly Val Glu Val His
            35                  40                  45

Asn Ala Lys Thr Lys Pro Arg Glu Glu Gln Tyr Asn Ser Thr Tyr Arg
        50                  55                  60

Val Val Ser Val Leu Thr Val Leu His Gln Asp Trp Leu Asn Gly Lys
65                  70                  75                  80

Glu Tyr Lys Cys Ala Val Ser Asn Lys Ala Leu Pro Ala Pro Ile Glu
                85                  90                  95

Lys Thr Ile Ser Lys Ala Lys
            100